(12) United States Patent
Yui et al.

(10) Patent No.: US 7,825,987 B2
(45) Date of Patent: Nov. 2, 2010

(54) INFORMATION PROCESSOR, TV SYSTEM, CONTROL METHOD AND PROGRAM

(75) Inventors: Hideaki Yui, Kanagawa (JP); Makoto Uehara, Kanagawa (JP); Takashi Tsunoda, Kanagawa (JP); Kenichiro Ono, Kanagawa (JP); Masaki Nakano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1779 days.

(21) Appl. No.: 10/951,715

(22) Filed: Sep. 29, 2004

(65) Prior Publication Data

US 2005/0114901 A1    May 26, 2005

(30) Foreign Application Priority Data

Oct. 3, 2003    (JP) ............................. 2003-346112
Oct. 17, 2003   (JP) ............................. 2003-358299

(51) Int. Cl.
*H04N 5/50* (2006.01)

(52) U.S. Cl. .................................................. 348/554
(58) Field of Classification Search ........................ None
See application file for complete search history.

(56) References Cited

U.S. PATENT DOCUMENTS

| 5,926,228 | A  | * | 7/1999  | Jeon et al. ................. 348/554 |
| 6,288,750 | B1 | * | 9/2001  | Yamada et al. ............. 348/553 |
| 6,483,553 | B1 | * | 11/2002 | Jung ........................... 348/731 |
| 6,501,507 | B1 | * | 12/2002 | Canfield ...................... 348/441 |
| 6,519,283 | B1 | * | 2/2003  | Cheney et al. ......... 375/240.01 |
| 6,587,154 | B1 | * | 7/2003  | Anderson et al. ........... 348/553 |
| 6,678,005 | B2 | * | 1/2004  | Anderson et al. ........... 348/553 |
| 7,253,843 | B2 | * | 8/2007  | Lee ............................. 348/565 |
| 2002/0018115 | A1 | | 2/2002  | Sakata |
| 2002/0059585 | A1 | | 5/2002  | Maeda et al. |
| 2002/0093518 | A1 | | 7/2002  | Nakano |
| 2002/0167503 | A1 | | 11/2002 | Tsunoda et al. |
| 2003/0189674 | A1 | | 10/2003 | Inoue et al. |
| 2004/0046773 | A1 | | 3/2004  | Inoue et al. |

FOREIGN PATENT DOCUMENTS

| JP | 8-79720     |   | 3/1996  |
| JP | 2000-181421 |   | 6/2000  |
| JP | 2001-224003 | A | 8/2001  |
| JP | 2001-358966 |   | 12/2001 |

* cited by examiner

*Primary Examiner*—Paulos M Natnael
(74) *Attorney, Agent, or Firm*—Fitzpatrick, Cella, Harper & Scinto

(57) ABSTRACT

An information processor enabling a digital broadcast to be viewed at a child device at a low cost, a TV system and a program are provided. Video decoders are corrected to the post-stage of demultiplexers, respectively, and video data of MPEG divided by the demultiplexers is decoded by the video decoders. At this time, the video data of MPEG is converted into a display format of a base band in a raster scan form. A common memory having a capacity equivalent to at least one displayed image, and a memory controller controlling the operation of the common memory are further provided. Three write video data output from resolution converters is stored in the common memory under control by the memory controller.

12 Claims, 84 Drawing Sheets

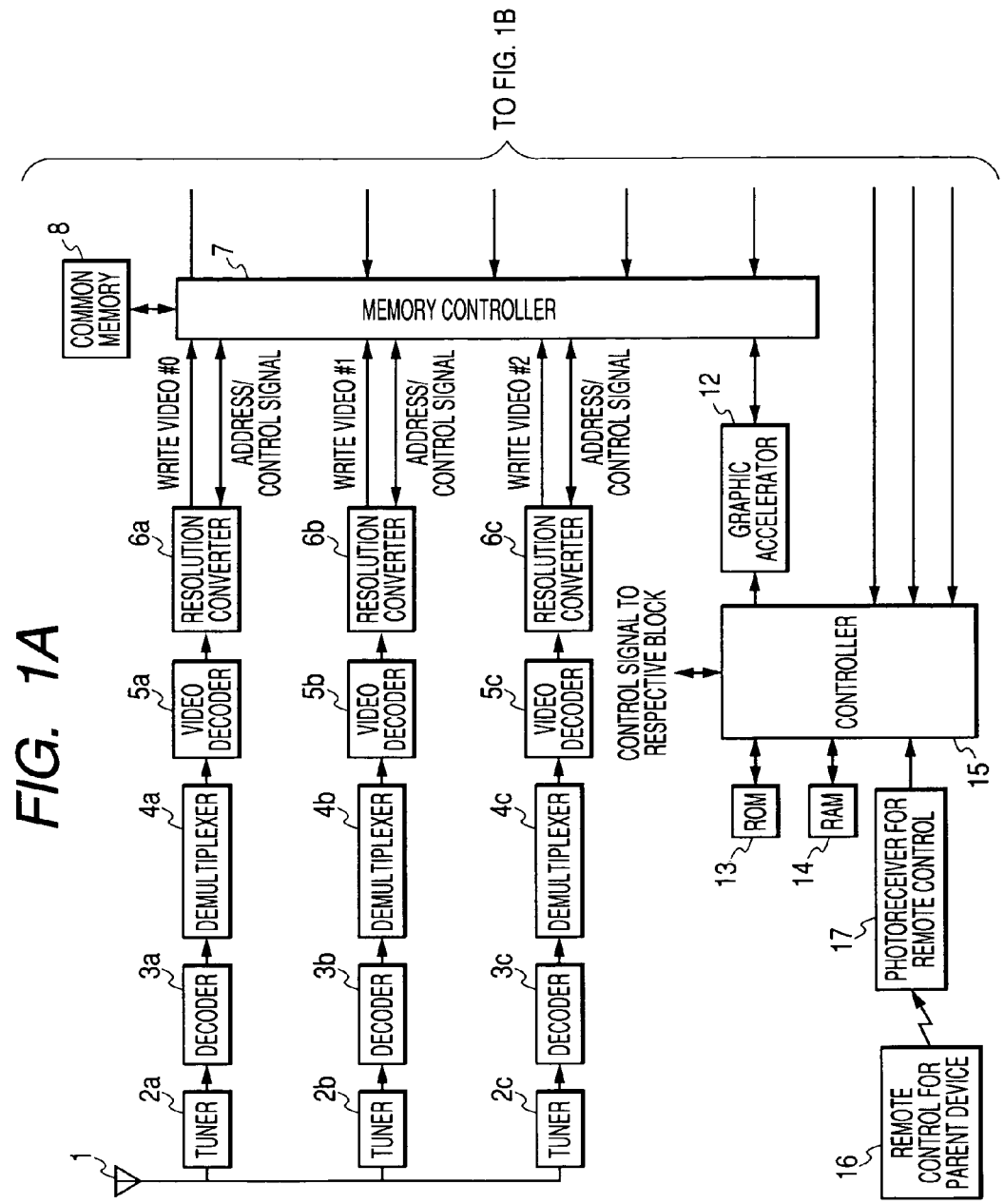

DECIDE VIEW TO BE TRANSFERRED TO CHILD DEVICE BY MOVING CURSOL

CURSOL FRAME

DESIGNATE CHILD DEVICE TO BE REACHED FOR TRANSFERRING

CHILD DEVICE DESIGNATING VIEW

DISPLAY WARNING AT PARENT DEVICE

WARNING VIEW

CHANGE PARENT LAYOUT (FROM TRIPLE VIEW TO TWIN VIEW)

DISPLAY LETTER BOX AT CHILD DEVICE (4:3)

FULL VIEW DISPLAY AT CHILD DEVICE (4:3)

CHANNEL INPUT MENU

NOTIFY REFUSAL OF TRANSFERRING TO CHILD DEVICE

FIG. 13A
DISPLAY OF OSD ALONE

CHANNEL SELECTABLE BY CHILD DEVICE

BS DIGITAL: IN USE AT PARENT DEVICE
CS DIGITAL: SELECTABLE
GROUND WAVE DIGITAL: SELECTABLE

??? CH

FIG. 13B
DISPLAY OF OSD IN COMBINATION WITH PICTURE

CHANNEL SELECTABLE BY CHILD DEVICE

BS DIGITAL: IN USE AT PARENT DEVICE
CS DIGITAL: SELECTABLE
GROUND WAVE DIGITAL: SELECTABLE

??? CH

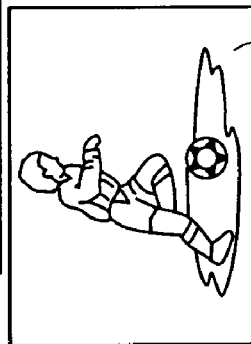

PICTURE DISPLAYED IN CHILD DEVICE

FIG. 16A
PARENT/CHILD NON-IDENTICAL DISPLAY VIEW IMAGE
<PARENT DEVICE DISPLAY VIEW>    <CHILD DEVICE DISPLAY VIEW>
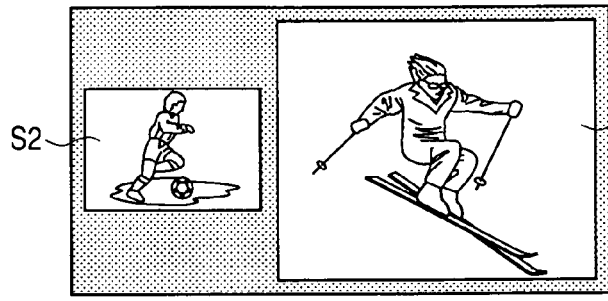
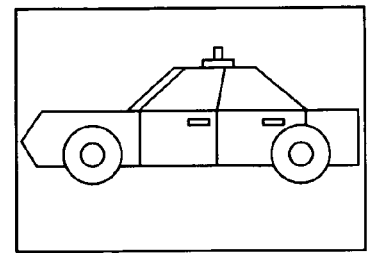
FIG. 16B
WARNING VIEW DISPLAY AT PARENT DEVICE
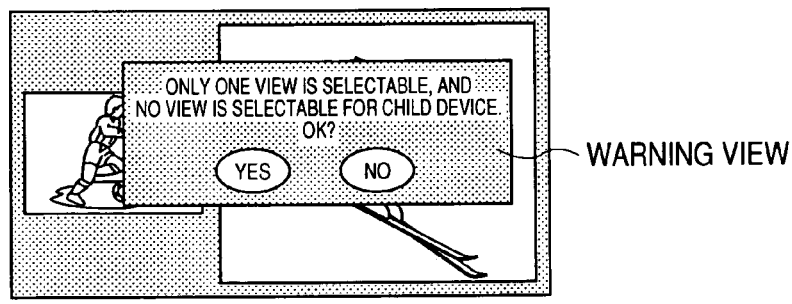
FIG. 16C
PARENT/CHILD IDENTICAL DISPLAY VIEW IMAGE
<PARENT DEVICE DISPLAY VIEW>    <CHILD DEVICE DISPLAY VIEW>
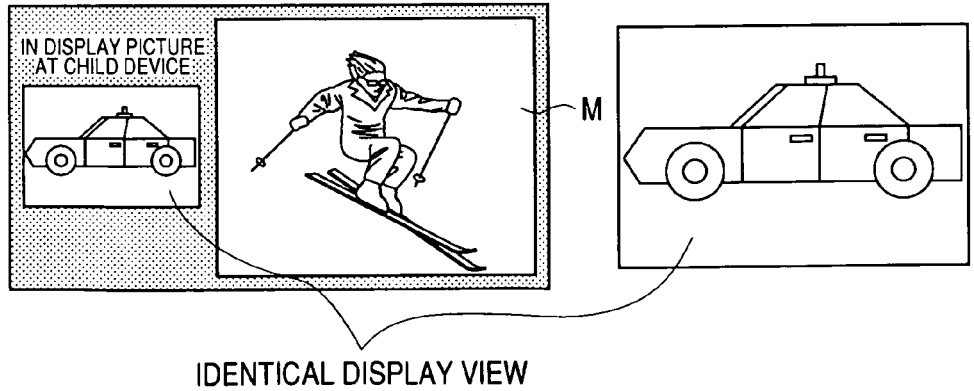
IDENTICAL DISPLAY VIEW

VIEW IMAGE OF PARENT/CHILD DEVICE BEFORE TRANSFER TO CHILD DEVICE

DISPLAY WARNING AT PARENT DEVICE

PARENT/CHILD IDENTICAL DISPLAY VIEW IMAGE

STATE OF TRANSFERRING TO ONE CHILD DEVICE

STATE OF TRANSFERRING TO TWO CHILD DEVICES

STATE OF TRANSFERRING TO THREE CHILD DEVICES

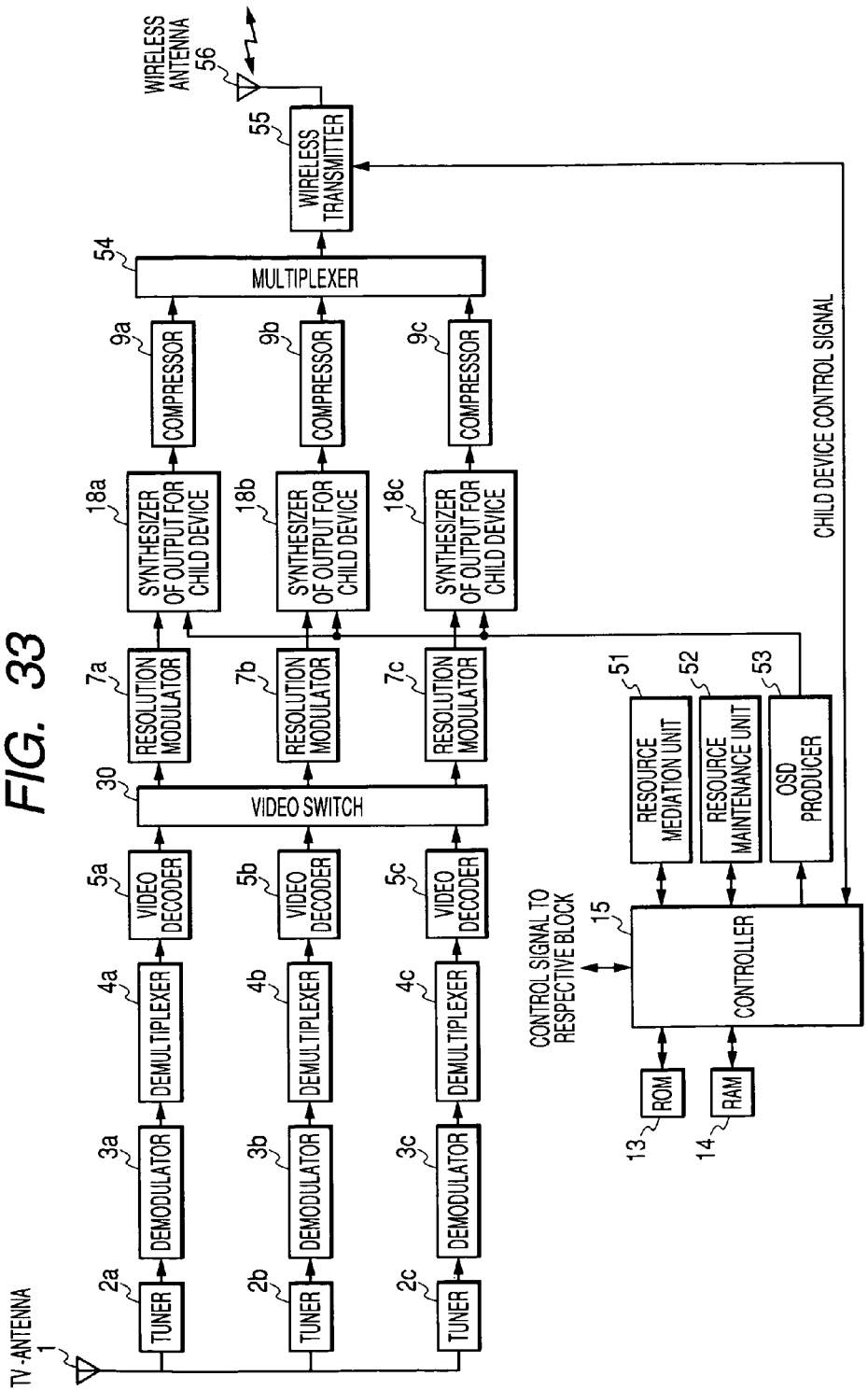

FIG. 37A
CHILD DEVICE VIEW AT NON-COMPETITIVENESS FOR RESOURCE

<CHILD DEVICE A>  
BS DIGITAL BROADCAST  
DISTRIBUTION PROGRAM

<CHILD DEVICE B>  
CS DIGITAL BROADCAST  
DISTRIBUTION PROGRAM

<CHILD DEVICE C>  
GROUND WAVE DIGITAL BROADCAST  
DISTRIBUTION PROGRAM

 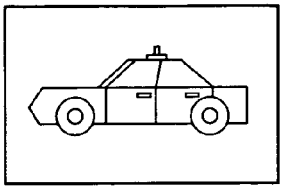 

FIG. 37B
CHILD DEVICE DISPLAY 1 AT RESOURCE COMPETITION MEDIATION

<CHILD DEVICE A>  
BS DIGITAL BROADCAST  
DISTRIBUTION PROGRAM

<CHILD DEVICE B>  
CS DIGITAL BROADCAST  
DISTRIBUTION PROGRAM

<CHILD DEVICE C>  
GROUND WAVE DIGITAL BROADCAST  
DISTRIBUTION PROGRAM

 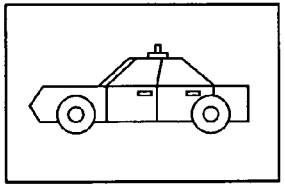 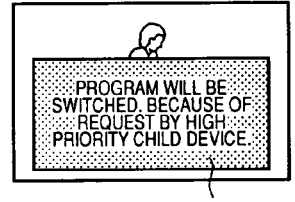

CHILD DEVICE OSD DISPLAY  
<WARNING VIEW>

FIG. 37C
CHILD DEVICE DISPLAY 2 AT RESOURCE COMPETITION MEDIATION

<CHILD DEVICE A>  
BS DIGITAL BROADCAST  
DISTRIBUTION PROGRAM

<CHILD DEVICE B>  
CS DIGITAL BROADCAST  
DISTRIBUTION PROGRAM

<CHILD DEVICE C>  
GROUND WAVE DIGITAL BROADCAST  
DISTRIBUTION PROGRAM

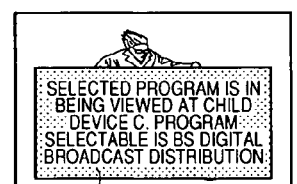 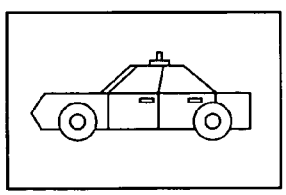 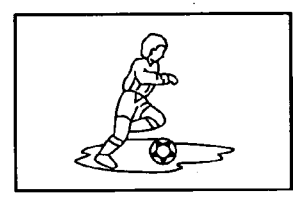

CHILD DEVICE OSD DISPLAY  
<SELECTION ASSIST VIEW>

FIG. 37D
CHILD DEVICE DISPLAY AFTER COMPETITION MEDIATION

<CHILD DEVICE A>  
BS DIGITAL BROADCAST  
DISTRIBUTION PROGRAM

<CHILD DEVICE B>  
CS DIGITAL BROADCAST  
DISTRIBUTION PROGRAM

<CHILD DEVICE C>  
GROUND WAVE DIGITAL BROADCAST  
DISTRIBUTION PROGRAM

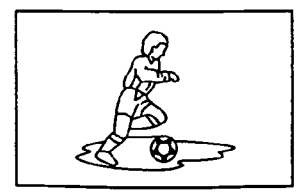 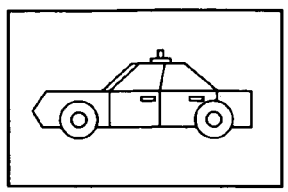 

NON-COMPETITIVENESS FOR RESOURCE

CHILD DEVICE DISPLAY 3 AT RESOURCE COMPETITION MEDIATION

AFTER RESOURCE MEDIATION (COMPETITIVE VIEW)

EXAMPLE OF MULTI VIEW (TRIPLE VIEW) DISPLAY

SUB VIEW S1 (CS DIGITAL BROADCAST DISTRIBUTION)

MAIN VIEW M (BS DIGITAL BROADCAST DISTRIBUTION)

SUB VIEW S2 (GROUND WAVE DIGITAL BROADCAST DISTRIBUTION)

BACKGROUND DATA

CONFIRMATION VIEW TO PARENT DEVICE

PARENT DEVICE OSD DISPLAY
<CONFIRMATION VIEW>

FIG. 45A
STATE OF TRANSFER TO ONE CHILD DEVICE
<PARENT DEVICE>
MAIN VIEW: BS DIGITAL BROADCAST DISTRIBUTION PROGRAM
SUB VIEW: GROUND WAVE DIGITAL BROADCAST DISTRIBUTION PROGRAM

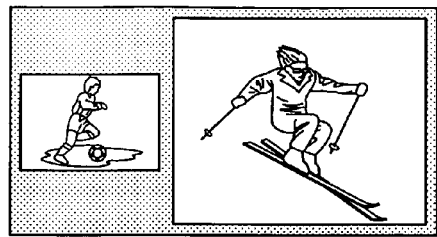

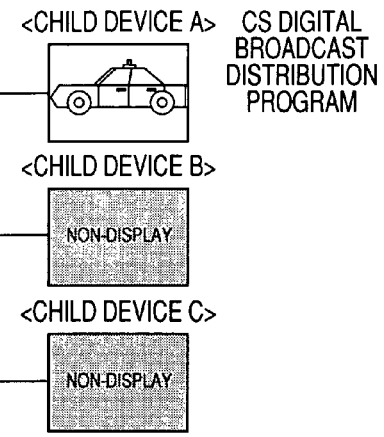

<CHILD DEVICE A> CS DIGITAL BROADCAST DISTRIBUTION PROGRAM
<CHILD DEVICE B>
<CHILD DEVICE C>

FIG. 45B
STATE OF TRANSFER TO TWO CHILD DEVICES
<PARENT DEVICE>
MAIN VIEW: BS DIGITAL BROADCAST DISTRIBUTION PROGRAM

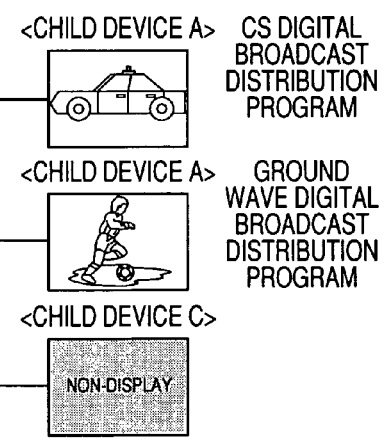

<CHILD DEVICE A> CS DIGITAL BROADCAST DISTRIBUTION PROGRAM
<CHILD DEVICE A> GROUND WAVE DIGITAL BROADCAST DISTRIBUTION PROGRAM
<CHILD DEVICE C>

FIG. 45C
STATE OF TRANSFER TO THREE CHILD DEVICES
(PARENT DEVICE IN STANDBY STATE)
<PARENT DEVICE>

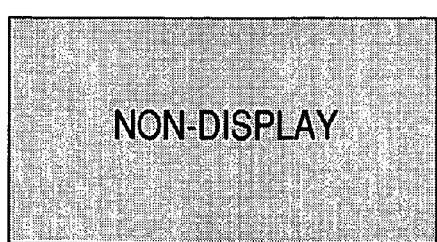

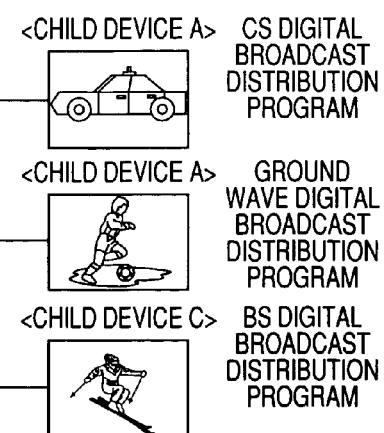

<CHILD DEVICE A> CS DIGITAL BROADCAST DISTRIBUTION PROGRAM
<CHILD DEVICE A> GROUND WAVE DIGITAL BROADCAST DISTRIBUTION PROGRAM
<CHILD DEVICE C> BS DIGITAL BROADCAST DISTRIBUTION PROGRAM

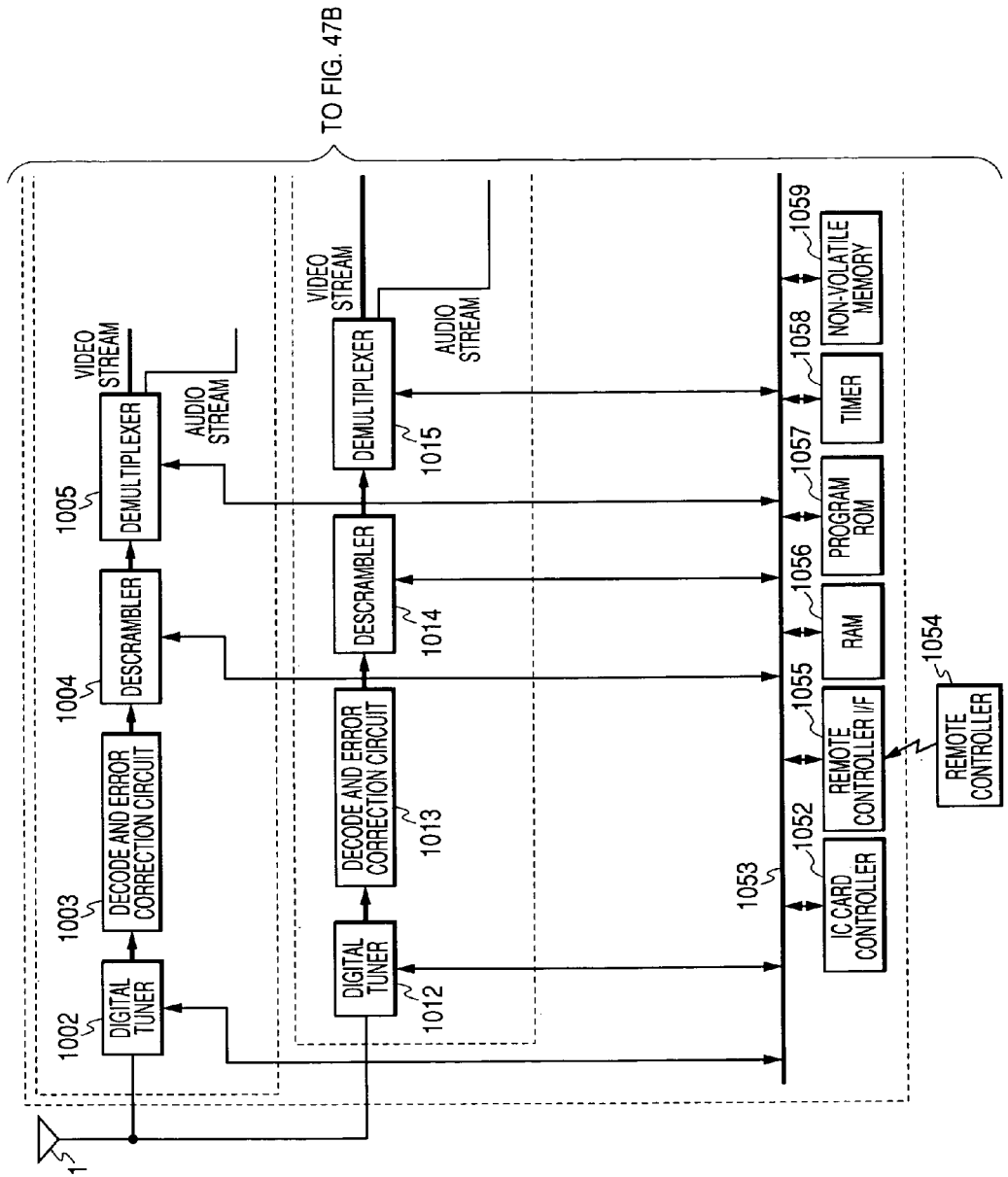

FIG. 50

| | ch120: NIIYAMA TV | ch123: TV HONSYU | ch125: MAINICH HOUSO 〜1301 |
|---|---|---|---|
| 7:00 | NEWS AND WEATHER REPORT AT 7:00 A.M. | ANIME "MR. SATO OVERTHERE" | PRO-BASE BALL REPLAY "GOLD SHARKS VS HAKATA HAWKS" |
| 8:00 | COMMEDY PEOPLE IN OSAKA | NINETY EIGHT CHALLENGES EVERYTHING 〜1302 | |
| 9:00 | NIIYAMA TV SPECIAL "MYSTERY OF LIFE" | FRIDAY SUSPENSE THEATHER "UNCLE POLICE DETECTIVE" | HELLO "WOMAN WHO MADE FUN OF ME" |
| 10:00 | PILGRIMAGE OF OLD TEMPLE "HORYU-JI IN NARA" | KEIZO SASUGA, KAZUMIYA NAGASAKI "HATEFUL JOURNEY OF ISLAND" | WORLD COOKING SHOW |

FIG. 51

| | ch120: NIIYAMA TV | ch123: TV HONSYU | ch125: MAINICH HOUSO 〜1301 |
|---|---|---|---|
| 7:00 | NEWS AND WEATHER REPORT AT 7:00 A.M. | ANIME "MR. SATO OVERTHERE" | PRO-BASE BALL REPLAY "GOLD SHARKS VS HAKATA HAWKS" |
| 8:00 | COMMEDY PEOPLE IN OSAKA | NINETY EIGHT CHALLENGES EVERYTHING 〜1302 | |
| 9:00 | NIIYAMA TV SPECIAL "MYSTERY | FRIDAY SUSPENSE THEATHER | HELLO "WOMAN WHO MADE FUN |
| | RESERVE OF PROGRAM IN RECORDING OR VIEWING 〜1303 | | |
| 10:00 | PILGRIMAGE OF OLD TEMP "HORYU-JI IN NARA" | "HATEFUL JOURNEY OF ISLAND" | LD COOKING SHOW |

FIG. 52

| | ch120: NIIYAMA TV | ch123: TV HONSYU | ch125: MAINICH HOUSO |
|---|---|---|---|
| 7:00 | NEWS AND WEATHER REPORT AT 7:00 A.M. | ANIME "MR. SATO OVERTHERE" | PRO-BASE BALL REPLAY "GOLD SHARKS VS HAKATA HAWKS" |
| 8:00 | COMMEDY PEOPLE IN OSAKA | NINETY EIGHT CHALLENGES EVERYTHING | |
| 9:00 | NIIYAMA TV SPECIAL "MYSTERY OF LIFE" | FRIDAY SUSPENSE THEATER | HELLO "WOMAN WHO MADE FUN ...ME" |
| 10:00 | PILGRIMAGE OF OLD TEMP "HORYU-JI IN NARA" | "HATEFUL JOURNEY OF ISLAND" | ...LD COOKING SHOW |

1301, 1302, 1313

RESERVE OF PROGRAM IN VIEWING

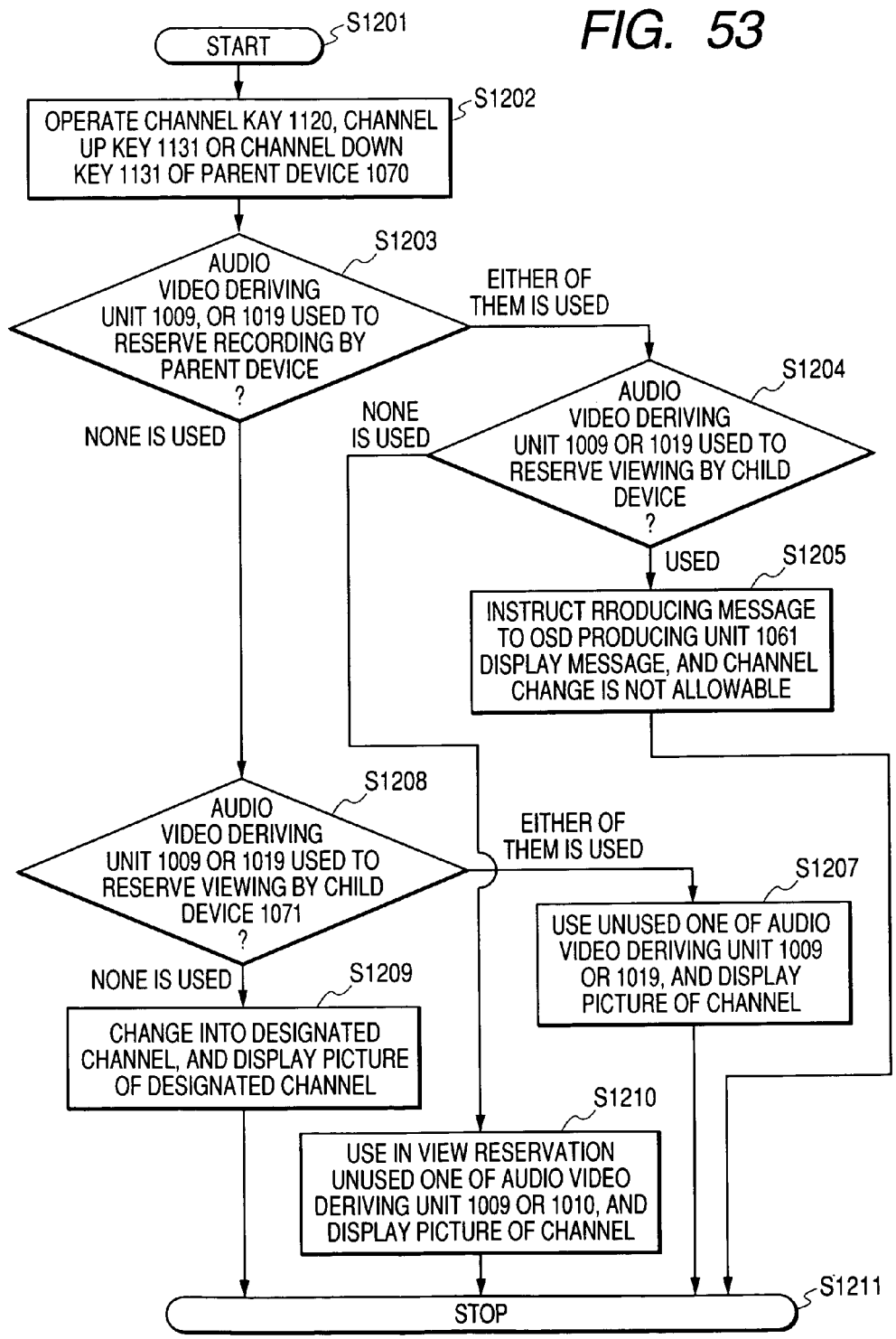

1097
OK BUTTON

1098
CANCEL BUTTON

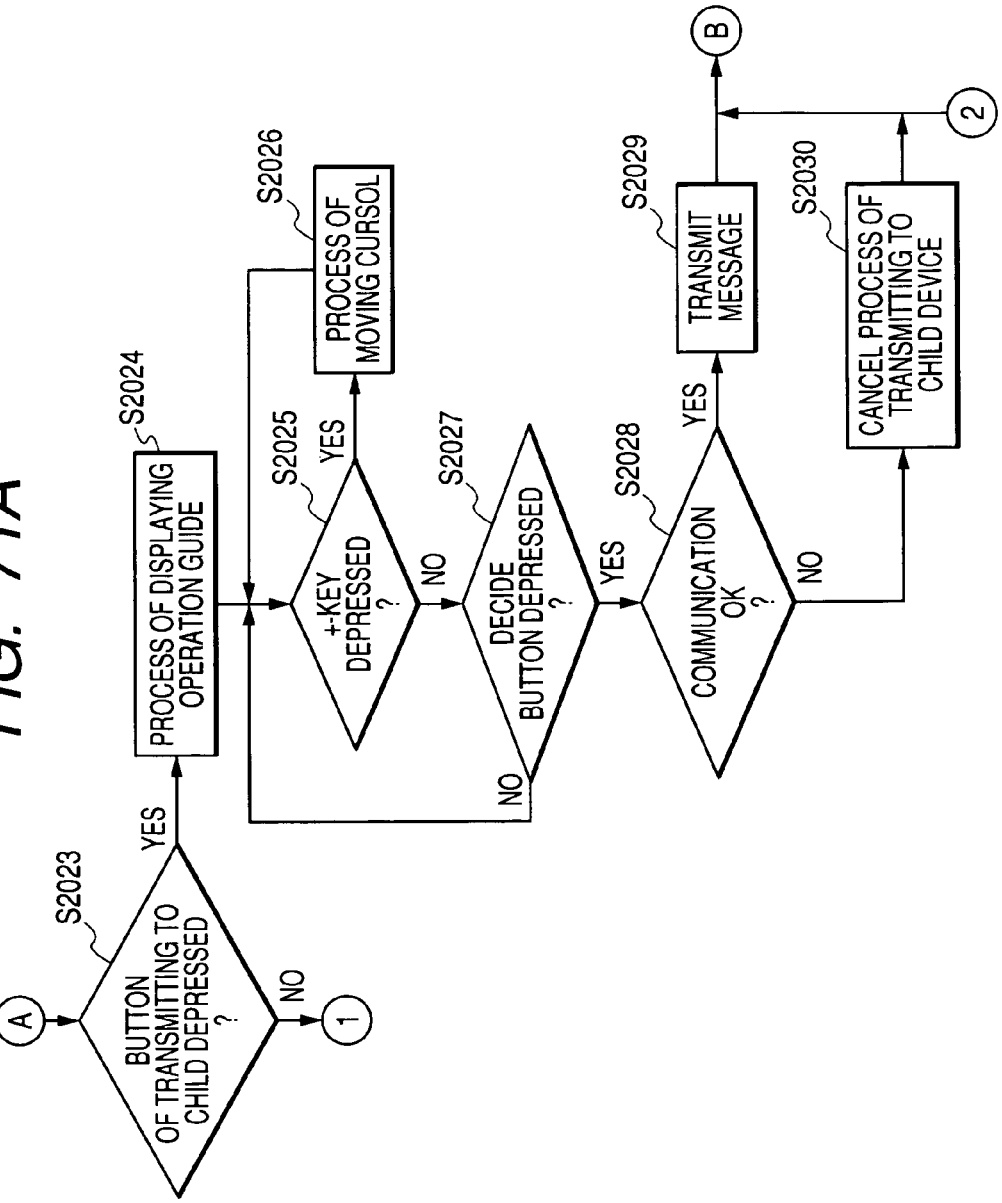

INFORMATION PROCESSOR, TV SYSTEM, CONTROL METHOD AND PROGRAM

BACKGROUND OF THE INVENTION

1. Field of the Invention

The present invention relates to (a) an information processor which is used in, for example, a parent device/child device TV system that has as part of a parent device a digital TV having a multi view display function capable of displaying a plurality of video sources, and can transfer at least one video source to a child device monitor provided outside the parent device, (b) a TV system, (c) a control method, and (d) a program.

2. Related Background Art

With digitization of broadcasts and increase in size of view and improvement in fineness in displays, a display form called multi view display in which various video sources are displayed on one display at a time is expected as one of means for using a display as a "window of information in a household". Some current displays have incorporated therein a function capable of receiving broadcasts of two channels at a time and displaying the same on a screen at a time, and there is a high possibility that the number of received channels and the number of display views will further increase depending on purposes.

If a display enabling such multi view display is used, programs being broadcasted at a same time zone can be viewed on the instant and at the same time, and one program being broadcasted can be viewed while viewing other program previously recorded in a VTR at the same time.

Furthermore, with digitization of broadcasts, the display starts to change from those simply displaying a picture broadcasted unilaterally to those allowing the user to interact with a broadcast station. Typical examples thereof include data broadcasts. The data broadcast has developed from a teletext system providing information unilaterally from a broadcast station in the conventional analog broadcast to the user, and is given new service such as bilateral on-demand type multimedia service. Typical examples of the service include program linkage service, EPG (electronic program guide) service, e-commerce and delivery of data.

The data broadcast has been standardized in Association of Radio Industries and Businesses (ARIB), and details of the data broadcast are described in ARIB Standard (ARIB STD B-24: Data Broadcast Coding System and Transmission System in Digital Broadcast). According to ARIB Standard, the receiver is required to have a function of OSD (On-Screen Display) for smoothly synthesizing into a picture a user interface using drawings (GUI: Graphical User Interface) like a personal computer. The OSD is required not only as display for the above data broadcast but also as display for operation aid for enabling easy control of devices from the display side when a variety of devices (digital camera, digital video, DVD, DVHS, etc.) and pictures from those devices are displayed on the display.

Further, in addition to the above digitization and increase in added value, construction of business models using the display is actively conducted. One example thereof is service based on accumulation by a service provider with a receiver equipped with a HDD (hard disk drive) (delivery of music, delivery of information, e-commerce, etc.).

From this background, functions required for household receivers in future include (1) function of displaying broadcasted pictures of multiple views, pictures from peripheral devices and the like on multi views at a time, (2) function of smoothly displaying OSD such as OSD for data broadcasts, UI (user interface) and the like using drawings and (3) function of coping with accumulation type service, which far surpass just receiving functions of conventional TV and are proceeding toward improvement in function and increase in added value.

However, such tendency for digitization of the display is innovative as to functions and applications of the display, but its cost increases with improvement in function of the receiver. This is one of causes of the fact that spread of digital TV stagnates at present.

Furthermore, there arises no particular problem if a high-functional receiver is installed on a one-per-household basis, but if consumers install digital TV not on "one-per-household basis" but on "one-per-room basis" as in the case of conventional analog TV, a total installation cost significantly increases. Therefore, it is difficult to use digital TV directly as a replacement for analog TV at present.

Further, if digital TV comes into use, there arises a possibility that analog TV or the like that has been used becomes unnecessary, and thus money spent for purchase of analog TV goes to waste.

Focusing on the multi view display function, for example, there may be cases where some digital broadcast sources are unused such as the case where one digital broadcast source is displayed on a full view, in addition to the case where a plurality of digital broadcast sources such as normal display and display of programs on different channels are displayed at a time in a display form of a main view and sub views.

Furthermore, in many households, a main large TV receiver set is placed in a living room where all family members enjoy themselves by sharing the receiver set. Thus, external devices such as a DVD and a VTR are connected to the large TV receiver set, and it is used as a hub of multimedia in the household. Therefore, the large TV receiver set which is shared by family members is often hard to be monopolized by some of the members.

Further, if, when several persons use a large TV receiver set having a multi view display function as described above, some of them display on a sub view a program other than a program displayed on a main view, the main view decreases in size, and thus others may be annoyed.

In this case, a recorder such as a VTR or hard disk recorder may be connected to an external output terminal of the large TV receiver set to record a program so that some persons view the program after others view the program. However, if a video source output from the external output terminal of the large TV receiver set during recording is changed, recording of video contents selected may end in failure, thus making it impossible to view the video contents.

In consideration of these situations, it is preferable that a parent device/child device TV system enabling send/receive with an information processor is constructed using as a parent device a combination of an information processor such as a set stop box as described above and a digital display such as a PDP connected to one specified terminal of the information processor, and further using as child devices an analog TV comprising one or more sub-information processors and displays and the like. If in this TV system, use of a digital tuner, HDD or the like being a video resource in the parent device is assigned to the child device as required using the parent device as a high-functional receiver and using as the child device devices that have been used (analog TV, VTR, etc.), the digital broadcast can be viewed even with conventional devices while keeping a total installation cost at a low level.

One of such TV systems is a home network. In this home network, a plurality of video resources such as tuners are interconnected via network means (e.g., IEEE 1394). In this case, data having a large bandwidth such as video data is generally compressed and transmitted depending on the transmission ability of the network. Furthermore, for the digital broadcast, the tuner part and the HDD can be connected to the network by defining those devices as IEEE 1394 devices (subunits).

For construction of the network, especially LAN (Local Area Network), wireless LAN represented by the standards of IEEE 802.11a/b/g and the like starts to come into wide use in not only enterprises but also households, as means for constructing a network between personal computers, instead of wired LAN by Ethernet® that has been in the mainstream. However, wireless LAN has an advantage in that physical cable wiring is eliminated and an installation place can be freely selected, and therefore it is used as a replacement for wired LAN. Thus, wireless LAN is used mainly for the purpose of data communication at present because of limitation of bands that can be secured.

For such situations, recently, it has been fully possible to pass compressed video data and speech data through wireless LAN owing to progress of video compression techniques such as MPEG 2. Further, with a drop in price of modules used in wireless communication acting as a favorable factor, wireless LAN becomes one of remarkable techniques not only for data communication but also for digital household appliances that can cope with delivery of moving pictures.

As a result of such tendency, wireless LAN has come into use for communication between the parent device and the child device in the TV system using the parent device and the child device described above. One example of such TV systems is a TV system in which TV pictures, audio, internet information and the like which are received by the parent device are transmitted to a child device using wireless LAN and video can be displayed at the child device, and switching between programs at the child device and remote operations of a browser of the Internet are enabled. A technique regarding such a TV system is disclosed in, for example, Japanese Patent Application Laid-Open No. 2001-358966.

FIG. 46 is a block diagram showing the configuration of a TV system using a conventional wireless LAN. In the example of the conventional technique shown in FIG. 46, wireless communication is carried out between one parent device 150 and three child devices 151a, 151b, and 151c.

The parent device (video transmitter) 150 is provided with a TV antenna 130, mutually independent three tuners 131a to 131c, video processors 132a to 132c, compressors 133a to 133c, a multiplexer 134, a wireless transmitter 135 and a wireless send/receive antenna 136.

In the parent device 150 constructed as described above, a video signal including a plurality of programs is received by the TV antenna 130, and a specified program is selected by the tuners 131a to 131c. Video data is produced from received data of the selected program by the video processors 132a to 132c. Then, the data transmission band is limited to a bit rate allowing wireless transmission by the compressors 133a to 133c. Then, compressed data of three lines is subjected to time division multiplex by the multiplexer 134. The data is subjected to coding, amplification and the like by the wireless transmitter 135, and transmitted via the send/receive antenna 136.

The child devices 151a to 151c are provided with wireless send/receive antennas 137a to 137c, wireless receivers 138a to 138c, multiple dividers 139a to 139c, expanders 140a to 140c and child device monitors 141a to 141c, respectively.

In the child devices 151a to 151c constructed as described above, the video signal transmitted from the parent device 150 is received by the wireless send/receive antennas 137a to 137c, and subjected to processing such as decoding in the wireless receivers 138a to 138c. Then, only required data is separated and derived in the multiple dividers 139a to 139c, and compressed data is decoded by the expanders 140a to 140c. Pictures are displayed at the child device monitors 141a to 141c.

In this TV system, switching between programs can be performed by controlling the tuners 131a to 131c of the parent device 150 using selection buttons (not shown) provided in the child device monitors 141a to 141c by the user.

By using the TV system employing wireless LAN, the child devices 151a to 151c can freely be installed within a range where wireless communication is possible if the parent device 150 is connected to the antenna terminal even when the place for installation of the antenna terminal and the like on the wall surface is limited in the household and the like, and thus pictures can be viewed without specific limitations on the place.

In the TV system described above, while no display is provided in the parent device, a TV system with a display provided in the parent device is disclosed in, for example, Japanese Patent Application Laid-Open No. H8-79720. In this example of the conventional technique, one tuner is provided in the parent device, and video data broadcasted and tuned is accumulated in a storage device such as a memory. Video is displayed at the display (monitor) of the parent device based on the video data, or video is displayed at the display (monitor) of the child device after it is transmitted to the child device. That is, in this TV system, the parent device is used as if it were a home server of pictures.

However, if a technique for compressing video data is employed for communication between a parent device and a child device, audio/video data compressed in, for example, the MPEG 2 format is treated in a packetted form such as a TS (transport stream). Accordingly, for using an analog device such as a conventional analog TV as the child device, expensive functions such as a demultiplexer for taking desired MPEG 2 data from a TS packet, an MPEG 2 video decoder for expansion and an audio video decoder are required. Thus, in some cases, introduction of a general digital broadcast receiver having no multi view display function as the child device may result in a higher benefit-to-cost ratio. This contradicts the purpose of viewing the digital broadcast at a low cost while using a conventional analog device.

Further, if a GUI menu by OSD display is to be displayed on a view transferred from the parent device to the child device, reprocessing of the TS packet for the purpose of insertion of OSD data as is done with an authoring tool of a broadcast station or the like is required to be carried out at the parent device. This increases the cost of the parent device.

Furthermore, if a program or the like being transmitted from the parent device to the child device is freely changed by the parent device, the picture may be switched unexpectedly so that a desired picture is missed on the child device side.

Furthermore, in the TV system described in Japanese Patent Application Laid-Open No. 2001-358966, tuners, the number of which equals the number of child devices, are required. In this case, if the types of tuners are the same, tuning from one child device inevitably allows one tuner to be occupied, thus eliminating the problem such that requests for tuning from a plurality of child devices go to one tuner and as a result, video resources compete. However, if the types of tuners are different, or multi view display can be provided at any child device, video resources may compete as described below.

(Configuration where Types of Tuners are Different)

As described previously, a transition has been made from analog ground wave broadcasts to BS/CS digital broadcasts, and ground wave digital broadcasts will be operated in near future. If all these broadcasts are to be received, tuners having different broadcast types are required. In FIG. 46, for example, the TV system is constructed with the tuner 131a as a tuner for analog ground wave, the tuner 131b as a BS/CS digital tuner and the tuner 131c as a tuner for digital ground wave.

In this case, even if the number of tuners equals the number of child devices, competition of video resources occur if requests for viewing of BS/CS digital broadcasts at a time from the child devices 151a and 151b, for example, because the types of tuners are different.

(Case where there is a Child Device Comprising a Multi View Function)

If a display terminal having a multi view display function is used, a plurality of video resources may be used at a time for multi view display in the case where there is a child device comprising a multi view display function even if the types of tuners are all the same and the number of tuners equals the number of child devices. This causes shortage of tuners, resulting in competition of video resources.

Furthermore, in Japanese Patent Application Laid-Open No. H8-79720, there arises a problem similar to competition for the tuner between video resources if a plurality of users try to regenerate the picture from a storage device such as a memory.

When competition of video resources (tuners) occurs, a program may suddenly change while the program is viewed, or a program to be viewed may not be selected. In particular, if wireless LAN is involved, child devices, and the child device and the parent device are often at a distance from each other, and therefore a situation may not understood quickly, resulting in significant confusion on operations.

If a required number of tuners different in type are simply provided, competition of video resources can be avoided, but the cost considerably increases, and it is thus impractical.

Further, in the conventional parent device/child device TV system disclosed in Japanese Patent Application Laid-Open No. 2000-181421, a program cannot be selected from the child device to the parent device.

Furthermore, if a program or the like being transmitted from the parent device to the child device is freely changed by the parent device, the picture may be switched unexpectedly so that a desired picture is missed on the child device side, or recording ends in failure on the child device side.

The present invention has been made in view of such problems, and its first object is to provide an information processor enabling a digital broadcast to be viewed at a child device at a low cost, a TV system and a program.

Furthermore, the second object of the present invention is to provide an information processor which can prevent sudden switching of the video displayed at a child device even if a video source of video data being output to the child device coincides with a video source to be used, TV system and a program.

Furthermore, the third object of the present invention is to provide an information processor which can prevent confusion of users of child devices when requests for output of video data included in one video source are made from a plurality of child devices on the video source, a TV system, a control method and a program.

Furthermore, the fourth object of the present invention is to provide an information processor capable of tuning by a child device, a TV system and a program.

Furthermore, the fifth object of the present invention is to provide an information processor which can prevent sudden switching of the picture displayed at a child device even if a video source of video data being output to the child device coincides with a video source to be used, TV system and a program.

SUMMARY OF THE INVENTION

As a result of conducting vigorous studies over and over again for solving the problems described above, the inventor of this application has devised the following aspects.

The information processor according to the first invention of this application is an information processor comprising sub-output means selecting from a plurality of types of video sources input a video source for each sub-information processor, and outputting video data included in the video source to sub-information processors for sub-display provided outside, wherein the sub-output means outputs the video data to at least one of the plurality types of sub-information processors in a non-compressed base band.

The control method according to the second invention of this application is a control method for controlling the operation of an information processor comprising:

main output means outputting to a main display video data included in at least one type of video source selected from a plurality of types of video sources input; and sub-output means selecting from the plurality of types of video sources a video source for each sub-information processor, and outputting video data included in the video source to sub-information processors for sub-display provided outside, the method comprising the steps of:

comparing the video source of video data requested to be output to the main display with the video source of video data being output to the sub-information processor; and displaying an alternative picture different from the requested picture on the main display if the video sources coincide with each other.

The control method according to the third invention of this application is a control method for controlling the operation of an information processor comprising sub-output means selecting from a plurality of types of video sources input a video source for each sub-information processor, and outputting video data included in the video source to sub-information processors for sub-display provided outside, the method comprising the steps of:

accepting a request of output of video data from the sub-information processor;

managing the video source of video data being output to the sub-information processor; and determining a sub-information processor capable of mediating between requests based on a predetermined priority if requests for output of video data from a plurality of sub-information processors are made on any of the plurality of types of video sources at the same time.

The information processor according to the fourth invention of this application is an information processor comprising sub-output means selecting from a plurality of types of video sources input a video source for each sub-information processor, and outputting video data included in the video source to sub-information processors for sub-display provided outside, the information processor comprising:

request accepting means for accepting a request of output of video data from the sub-information processor; and control means for causing the sub-output means to output the video data according to the request.

The information processor according to the fifth invention of this application is an information processor comprising sub-output means selecting from a plurality of types of video sources input a video source for each sub-information processor, and outputting video data included in the video source to sub-information processors for sub-display provided outside, the information processor comprising:

inquiry means for inquiring of the sub-information processor whether it is allowable or unallowable to stop output of video data being output; and output stopping means for causing the sub-output means to stop output of video data if receiving a signal indicating admitting of the stop of output of the video data from the sub-information processor.

According to the first invention according to this application, the digital broadcast can be viewed using a device called a legacy device such as an analog TV and an analog VTR. This enables the digital broadcast to be viewed at a low cost.

Furthermore, according to the second invention according to this application, there is no possibility of sudden switching of video data being processed by the sub-information processor even if the video source of video data being output to the sub-information coincides with the video source to be used.

Furthermore, according to the third invention according to this application, confusion of users of sub-information processors can be prevented by mediation based on resource maintenance information even if requests for output of video data included in a same video source is made on the video source from a plurality of sub-information processors.

Furthermore, according to the fourth invention of this application, operations such as change of a channel can be performed from the sub-information processor (child device) Furthermore, if resources are managed based on a preset priority, mediation of resource requests of the information processor (parent device) and sub-information processor (child device) can be eased.

Furthermore, according to the fifth invention of this application, an inquiry can be made via inquiry means, thus making it possible to avoid the situation in which the picture is suddenly switched, even if the video source of video data being output to the sub-information processor (child device) coincides with the video source to be used. As a result, mediation for effectively using limited video resources can be smoothly performed.

BRIEF DESCRIPTION OF THE DRAWINGS

FIGS. 13A and 13B show examples of information of channels transferable to corresponding child device OSD planes;

FIGS. 16A, 16B and 16C shows a change of pictures displayed when a program viewed at the child device is monitored;

FIG. 33 is a block diagram showing the configuration of the parent device of the TV system according to the fifth embodiment of the present invention;

FIGS. 37A, 37B, 37C and 37D show a change of pictures displayed in each child device in the fifth embodiment of the present invention;

FIGS. 45A, 45B and 45C show a change of pictures displayed when transmission is performed between three child devices and the parent device in the seventh embodiment of the present invention;

FIG. 50 shows an example of a program table of a program list;

FIG. 51 shows a state of a program table when a decision key 1103 is depressed;

FIG. 52 shows a state of a program table when a decision key 1403 is depressed;

FIG. 53 shows a flowchart showing the channel operation when the channel operation is performed at the parent device 1070;

DESCRIPTION OF THE PREFERRED EMBODIMENTS

Embodiments of the present invention will be described below with reference to the attached drawings.

First, the data broadcast will be briefly described. With development of digital technology, systems in which a variety of information is digitalized including broadcast signals have been developed in the broadcast industry and among them, a new transmission system called data carousel has been developed. This is a system in which contents files of multimedia service associated with programs are repeatedly transmitted over an MPEG 2 transport stream, and by employing this transmission system, a receiver such as a set top box can derive a contents file in any timing during broadcasting. As a result, a user can view latest news, a weather broadcast and the like whenever necessary. Furthermore, a modem is included in a receiver for data broadcasts to enable broadcasting via a telephone line, so that viewers can participate in quiz programs, movie popularity vote programs and the like. Thus, according to the data broadcast, two-way service linking a broadcast station with a viewer can be realized.

First Embodiment

Figure 1B:
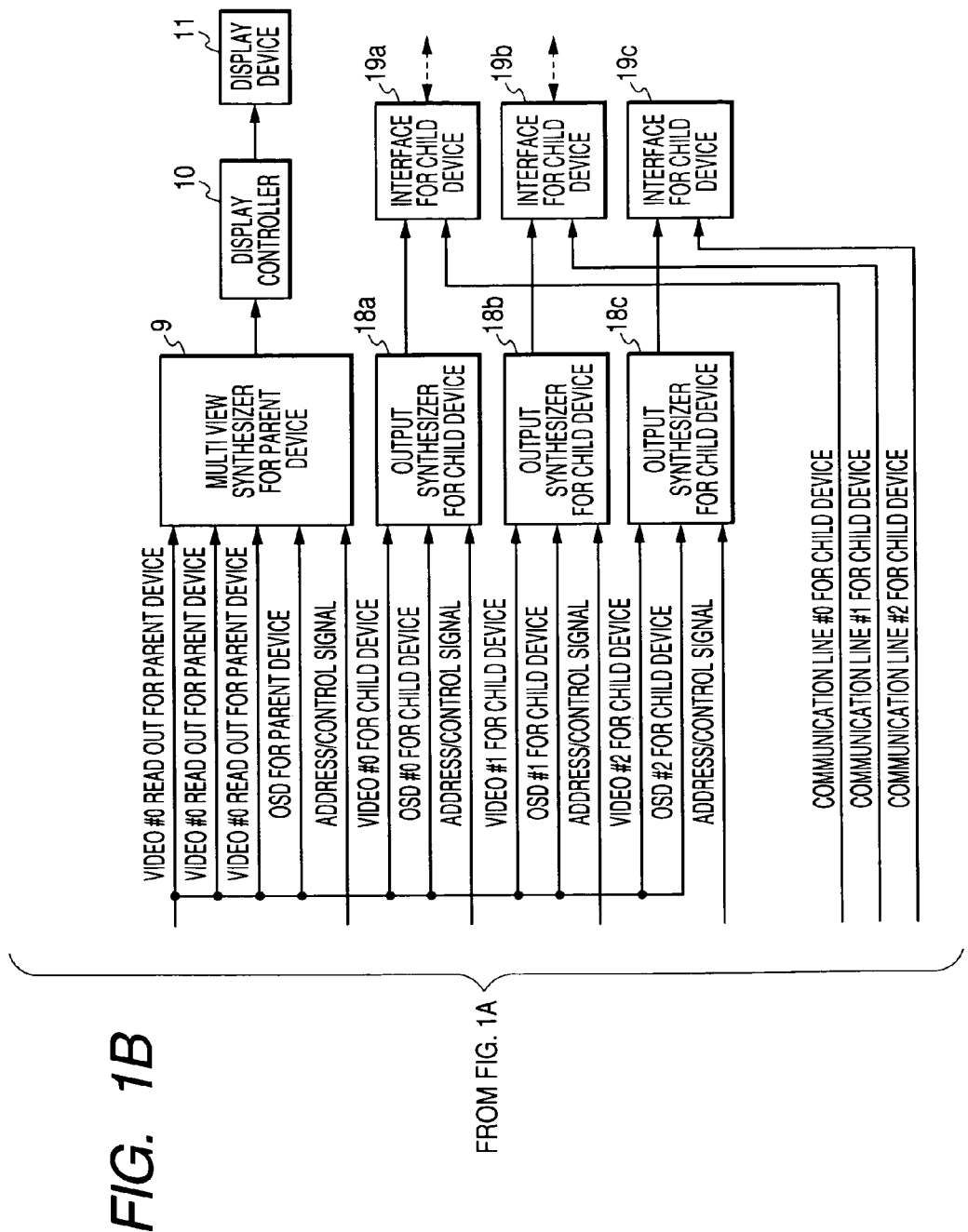
FIG. 1 is comprised of FIGS. 1A and 1B which are block diagrams showing a parent device having a multi view display function, which constituted a TV system according to the first embodiment of the present invention.

First, the first embodiment of the present invention will be described. FIGS. 1A and 1B are block diagrams showing the configuration of a parent device having a multi view function constituting a TV system according to the first embodiment of the present invention. The parent device of the first embodiment is configured to enable multi view synthesis display of three independent broadcast video sources on one display based on a predetermined layout. The number of video sources may be 1, 2, 4 or more.

The parent device of the first embodiment is provided with an antenna 1 such as a parabola antenna. Radio waves of the BS digital broadcast, the CS digital broadcast and the like are received by the antenna 1. In addition to such satellite broadcasts, broadcasts capable of receiving signals from ground waves, optical cables and the like are acceptable. Three tuners 2a, 2b and 2c are connected to the antenna 1. For the tuners 2a to 2c, BS dedicated tuners, CS dedicated tuners, BS/CS common tuners, ground wave digital tuners and the like may be used, and the tuners may be all different in type, or some or all of them may be identical in type. The tuners 2a to 2c are provided with, for example, a band pass filter and a down converter.

Decoders 3a, 3b and 3c are connected to the post-stages of the tuners 2a to 2c, respectively. The decoders 3a to 3c perform decoding process matching a transmission form, as well as error correction process and the like. For example, if video data in the form of MPEG 2 is input, a desired MPEG 2 transport stream is output.

Demultiplexers 4a, 4b and 4c are connected to the post-stages of the decoders 3a to 3c, respectively. The demultiplexers 4a to 4c separates video data of MPEG 2, audio data of MPEG 2 and additional information of a desired program from the MPEG 2 transport stream, for example. The separated audio data of MPEG 2 is decoded by an audio decoder (not shown), and output as an audio signal. If an amplifier and a speaker are connected to the audio decoder, one can listen to audio of a received program.

Video decoders 5a, 5b and 5c are connected to the post-stages of demultiplexers 4a to 4c, respectively, video data of MPEG 2 separated by the demultiplexers 4a to 4c is decoded by the video decoders 5a to 5c. At this time, video data of MPEG 2 is converted into a display format in a non-compressed base band in a raster scan form.

Resolution converters 6a, 6b and 6c are connected to the post-stages of the video decoders 5a to 5c, respectively, and video data output from video decoders 5a to 5c is passed to the resolution converters 6a to 6c.

Further, a controller 15 controlling the operations of the tuners 2a to 2c, the decoders 3a to 3c, the demultiplexers 4a to 4c, video decoders 5a to 5c, resolution converters 6a to 6c and the like is provided in the first embodiment. The additional information separated by the demultiplexers 4a to 4c is passed to the controller 15.

If the additional information is related to the data broadcast scheduled to be operated in the BS digital broadcast, the controller 15 interprets a BML (Broadcast Markup Language) script language, and obtains a contents scenario of a multimedia information service provider. This scenario is composed of attributes (individual data such as texts, still pictures, moving pictures and audio, control information specifying the layout of the individual data on a view, view control information for updating a view according to the operation of a button or the like, and so on) of structured data, and the controller 15 interprets this, and forms a view for data broadcasts in association with a graphic accelerator 12 described later and the video decoders 5a to 5c.

Furthermore, if the additional information is EPG (Electrical Program Guide) information, the controller 15 interprets PSI (Program Specific Information)/SI (system Information) and obtains program information (e.g., program, time of broadcast, title, category, etc.).

The controller 15 is provided with a counter (not shown) counting time, a peripheral input/output interface (not shown) and the like, and connected to a RAM 14 temporarily storing CPU data having a capability of performing an operation, and a ROM 13 storing a control program. The controller 15 may be composed of a logical logic alone, or may be a CPU, or a media processor capable of performing a parallel operation. The program executed for performing control may be included in the ROM 13, or may be transferred from outside via the peripheral input/output interface. Furthermore, in the ROM 13, character fonts and the like are stored as required, and used when character information is spread on a view. Further, a photoreceiver for remote control 17 is connected to the controller 15, and thus a command of a remote controller for parent device 16 using infrared light can be accepted. For the remote controller for parent device 16, not only a normal remote controller but also, for example, a keyboard, mouse or joystick capable of emitting infrared light may be used.

The controller 15 controls the resolution converters 6a to 6c based on the display format (the number of display lines, the number of dots, the number of colors, etc.) and preset multi view layout information, and sets resolution conversion parameters (enlargement ratio or reduction ratio, weighted filter coefficient of enlargement and reduction, etc.) in the resolution converters 6a to 6c independently, whereby the resolution converters 6a to 6c perform picture enlargement process, reduction process, equimultiple process and the like. Furthermore, the resolution converters 6a to 6c process of converting formats such as I-P conversion (Interlace-Progressive conversion) or P-I conversion according to the output format of the video decoders 5a to 5c and the scan form of a display 11 described later.

A data path for process of input pictures from the tuner 2a to the video decoder 5a, a data path for process of input pictures from the tuner 2b to the video decoder 5b, and a data path for process of input pictures from the tuner 2c to the video decoder 5c are mutually independent, and are process systems integral with types of tuners 2a to 2c, respectively. These sequence of data paths are referred to as "broadcast video resources" below.

Further, in the first embodiment, a common memory (frame memory) 8 having a capacity equivalent to at least one display picture, and a memory controller 7 controlling the operation of the common memory 8 are provided. Three write video data output from the resolution converters 6a to 6c is stored in the common memory 8 under control of the memory controller 7. What has been described above is the flow until video data is written into the common memory 8.

The configuration of the stage below the memory controller 7 and the flow until data read out from the common memory 8 is output will now be described.

A graphic accelerator 12 is connected to the controller 15, and the graphic accelerator 12 is used when the controller 15 issues rendering instructions, whereby the GUI of an OSD view, EPG (electronic program guide) view, data broadcast view or the like is produced in the common memory 8 using an acceleration function such as BitBlt (Bit Block Transfer) or DMA (Direct Memory Access).

In the first embodiment, a multi view synthesizer for parent device (main output means) 9 synthesizing and outputting pictures to be displayed on the display 11 of the parent device is further provided. The multi view synthesizer for parent device 9 issues to the memory controller 7 a memory address in which video data of a video source to be displayed is stored, based on instructions of management of the layout of multi views from the controller 15, and reads out video data from the common memory 8. At this time, video data stored in the common memory 8 from three broadcast video resources is read out mutually independently and in synchronization with a refresh rate matching the display 11. Therefore, the multi view synthesizer for parent device 9 can realize synthesis of multi views by outputting desired video data while switching between video data.

Here, control of the common memory 8 by the memory controller 7 will be briefly described. Three types of requests for write in the common memory 8 from the resolution converters 6a to 6c and three types of read requests from the multi view synthesizer for parent device are fully asynchronous random accesses to the common memory 8. Therefore, the memory controller 7 performs scalable memory mediation process based on a preset priority level. By this memory mediation, an address corresponding to a request admitted to be transferred to the common memory 8 is issued to the common memory 8 to provide a UMA (Unified Memory Architecture) capable of realizing time-division memory transfer. Furthermore, as shown in FIGS. 1A and 1B, a read data line from the common memory 8 is a line common to blocks issuing read requests. However, in association with the memory mediation described above, individual read data signals for respective blocks issuing read requests are given back, whereby whether data for the read request is effective can be determined. Further, the common memory 8 can keep a bandwidth allowing the above six types of transfer requests to be handled at the same time.

A display controller 10 is connected between the multi view synthesizer for parent device 9 and the display 11. The display controller 10 performs control of display drive matching characteristics of the display 11, conversion of a display format and the like in synchronization with the frame rate of the display 11.

For the display 11, either a flat panel having a matrix electrode structure (liquid crystal display, plasma display, etc.) or a CRT may be used as long as it is a display displaying pictures. For example, if a TV is used as the display 11, the display is preferably compatible with high vision, and if the display is used for a personal computer, a large view display capable of displaying high definition pictures equivalent to or higher than SXGA.

In the first embodiment, three output synthesizers for child device 18a, 18b and 18c are further provided, and the output synthesizers for child device 18a to 18c issue requests for reading out data from the common memory 8 to the memory controller 7 in synchronization with the refresh rate of an external display defined as a child device.

Interfaces for child device 19a, 19b and 19c are provided in the post-stages of output synthesizers for child device 18a to 18c, respectively. Sub-output means is constituted by the output synthesizers for child device 18a to 18c and the interfaces 19a to 19c, and the sub-output means outputs the video data in a non-compressed base band to at least one of child devices being a plurality of sub-information processors connected. The form of the interfaces for child device 19a to 19c is not specifically limited, but a D/A converter or video amplifier is used, for example, in the case of analog wired connection with the child device, a TMDS (Transition Minimized Differential Signaling) or LVDS (Low Voltage Differential Signaling) transceiver is used in the case of digital wired connection, and a wireless protocol I/F such as Wireless 1394 or the like is used in the case of wireless connection.

Figure 2:
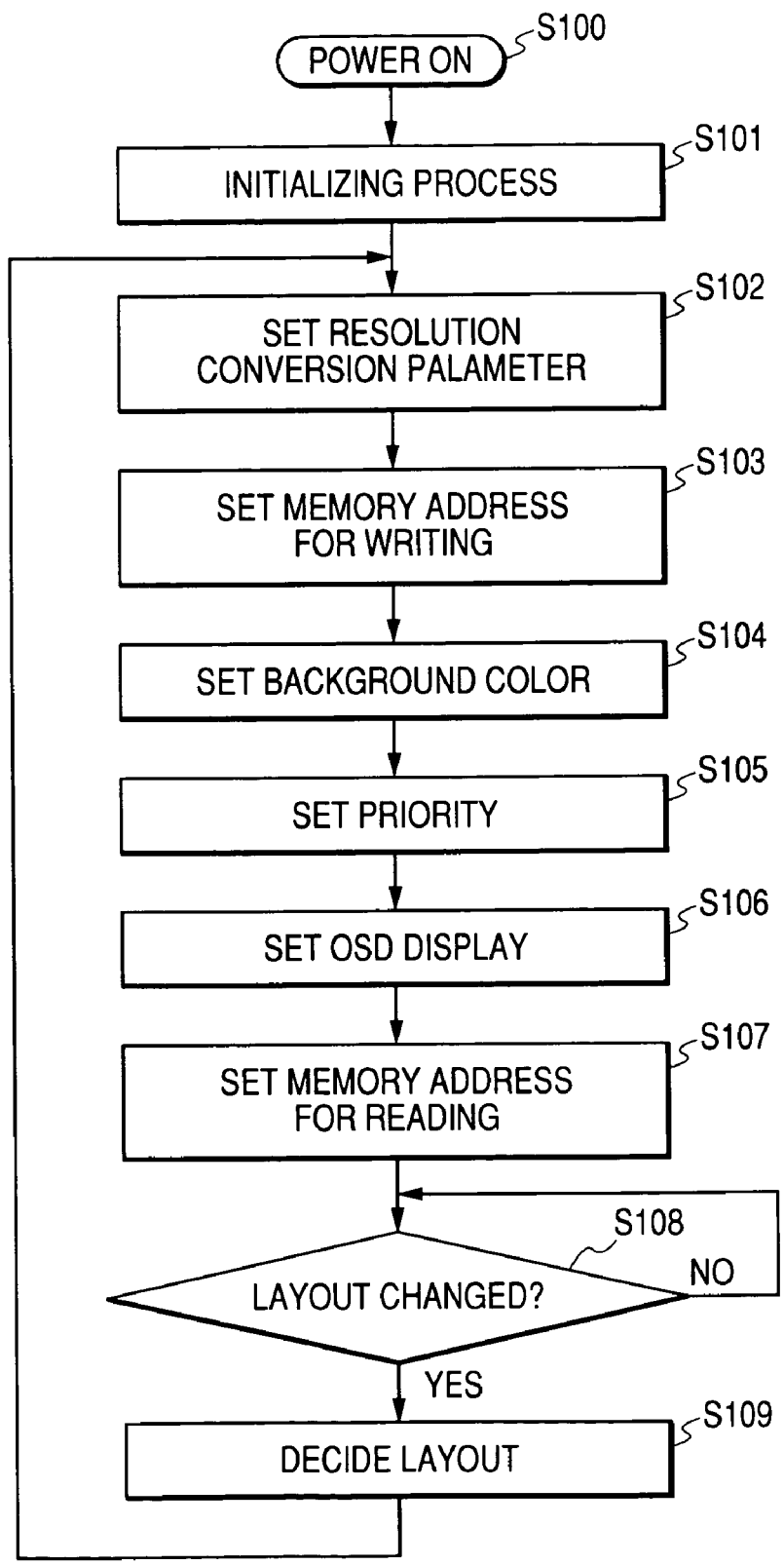
FIG. 2 is a flowchart showing the operation of a controller 15.

The operation of a parent device having a multi view display function configured as described above will now be described centering particularly on the operation of the controller 15. FIG. 2 is a flowchart showing the operation of the controller 15.

First, if normal multi view display is provided, the controller 15 detects power-on at step S100, and then performs initializing process at step S101. Here, initial view layout information (start/end information in an amount equivalent to the number of views displayed, display priority information if views overlap, etc.) is derived from the ROM 13. If a broadcasted video source is input, a format of the broadcasted video source and a default selection channel are determined, and respective broadcasted video resources, i.e., tuners 2a to 2c, decoders 3a to 3c, demultiplexers 4a to 4c, and video decoders 5a to 5c are initialized.

The controller 15 calculates horizontal/vertical enlargement/reduction factors of the video sources based on the view layout information derived at step S101, determines a resolution conversion parameter and sets parameters at the resolution converters 6a to 6c.

Figure 3:
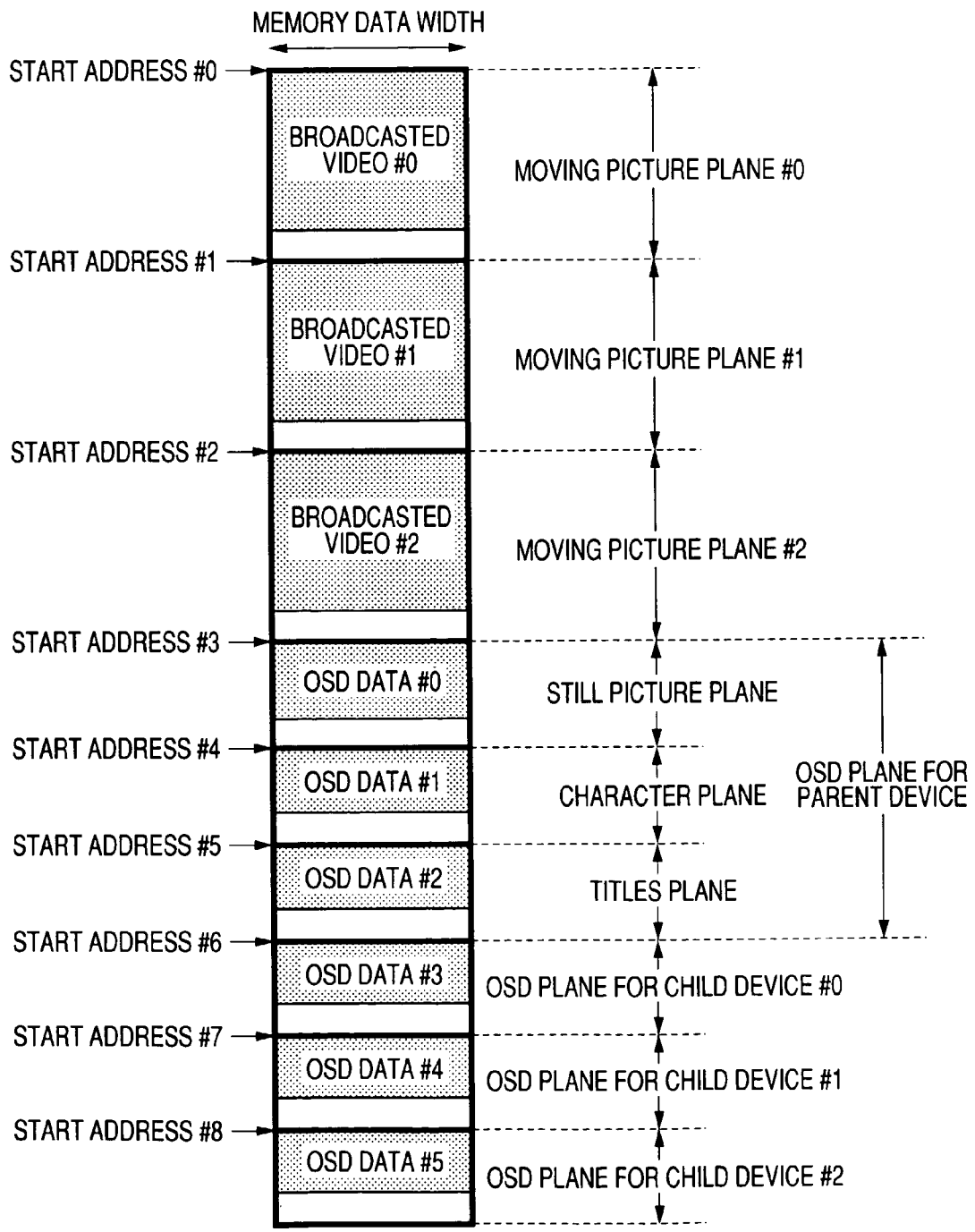
FIG. 3 shows a memory logic address map of a common memory 8.

The controller 15 sets a memory address for writing required for writing outputs of the resolution converters 6a to 6c into the common memory 8 at step S103. FIG. 3 shows a memory logic address map of the common memory 8. In this embodiment, for realizing the multi view function for parent device (one main view and two sub views), total six planes of three moving picture planes #0 to #2 and OSD planes for parent device (still picture plane, character plane and titles plane) for DUI data by the ARIB standard are constructed in the common memory 8. Details of a method for constructing the OSD planes for parent device are described in the ARIB standard (ARIB STD TR-15 BS digital broadcast operation regulations). A memory space equivalent to the display resolution of the display 11 is assigned to each plane. Furthermore, at the time of writing in the common memory 8, synthesis for display is, not done. In this case, start addresses #0 to #5 in FIG. 3 are mainly referenced in the resolution converters 6a to 6c and the graphic accelerator 12, and used as base address values of memory addresses of write address producers (not shown) provided therein.

The controller 15 sets a background color (pattern) at the multi view synthesizer for parent device 9 at step S104. This is applied to a non-picture display area (area around the main view and sub view).

The controller 15 sets the display priority derived at step S101 at the multi view synthesizer for parent device 9 at step S105. However, a top level priority is given to the OSD plane.

The controller 15 sets OSD display of the GUI for control of multi views at step S106. The GUI is compatible for all views for rendering by the controller 15 such as Web views, EPC views and data broadcast views. Specifically, the controller 15 issues rendering instructions for rendering the GUI to the graphic accelerator 12, and writes characters spread in a bit map form and other data into the common memory 8 through the memory controller 7 using an accelerator function such as DMA or BitBlt of the graphic accelerator 12 to create views.

The controller 15 sets a memory address for reading at step S107. The multi view synthesizer for parent device 9 is provided with a display area horizontal pixel number counter and vertical line number counter (not shown) on the basis of horizontal/vertical synchronization signals of the display 11, and the number of raster scans during a display period is counted. If OSD display is required, the multi view synthesizer 9 produces an address for reading based on the count value. At this time, the multi view synthesizer for parent device 9 designates as start addresses of read addresses the start addresses #3, #4 and #5 of the OSD plane for parent device of FIG. 3 corresponding to desired OSD data. In the GUI data, only the character plane and titles plane are rendered in the common memory 8 as index data of the 8 bit CLUT (Color Look Up Table), and it is recommended in ARIB that the index data is converted into video data and α data by the CLUT constructed in the multi view synthesizer for parent device 9, and can be synthesized by an α operation circuit constructed in the multi view synthesizer fro parent device 9.

If the above counter coincides with the area of each video source, the multi view synthesizer for parent device 9 produces an address for reading into a corresponding moving picture plane area in FIG. 3 based on view layout information (start/end coordinates of broadcasted video #0, broadcasted video #2 and broadcasted video #2 in the above display area) set by the controller 15. If read requests overlap, the multi view synthesizer for parent device 9 selects reading of a video source having the highest level priority based on display priority information set by the controller 15, and refraining from producing other addresses for reading. If determining that there is no data to be synthesized, the multi view synthesizer for parent device 9 outputs background data set by the controller 15 without producing an address for reading. In this way, video data corresponding to the display layout is read out, and synthesis of video data is realized.

The OSD data and video sources are read out from the common memory 8 alternately in time division, and the GUI data and multi view synthesis data is subjected to OSD data selection, video synthesis data selection and alpha synthesis of GUI data and video synthesis data according to the a value, and output to the display controller 10 as final multi view synthesis data. The alpha synthesis is expressed by "A×α+B (1−α) . . . (formula 1)" when the original picture is A, the gray view is B, and the alpha coefficient is α (0≦mixing ratio α≦1)

Figure 4:
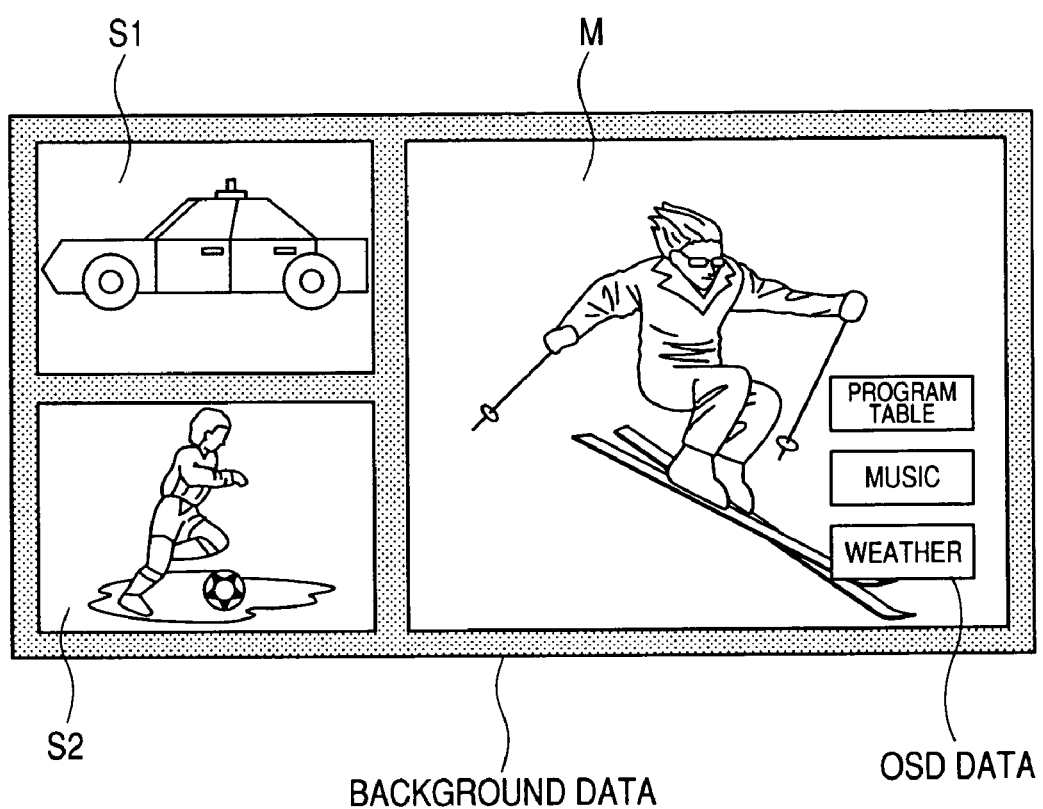
FIG. 4 shows pictures in initialization synthesis of a multi view.

After such initializing process, pictures at the time of initialization of synthesis of multi views, in which one main view and two sub views are provided as shown in FIG. 4, are produced. The display form shown in FIG. 4 is one example of the multi view display form, and the multi view display form is not limited thereto.

Then, if the layout is changed at step S108, the controller 15 decides a layout at step S109, and repeats the steps S102 to S107 described above to change the layout of the multi views.

Here, for the sake of clarity of the explanation described below, video data processed by the tuner 2a to resolution converter 6a is assigned to the moving picture plane #0 for the main view M, video data processed by the tuner 2b to resolution converter 6b is assigned to the moving picture plane #1 for the sub view S1, and video data processed by the tuner 2c to resolution converter 6c is assigned to the moving picture plane #2 for the sub view S2, as shown in Table 1, in the state before the layout is changed.

TABLE 1

| Views | Broadcasted video resources | Moving picture planes |
|---|---|---|
| Main view M | Tuner 2a to video decoder 5a | #0 |
| Sub view S1 | Tuner 2b to video decoder 5b | #1 |
| Sub view S2 | Tuner 2c to video decoder 5c | #2 |

Figure 5:
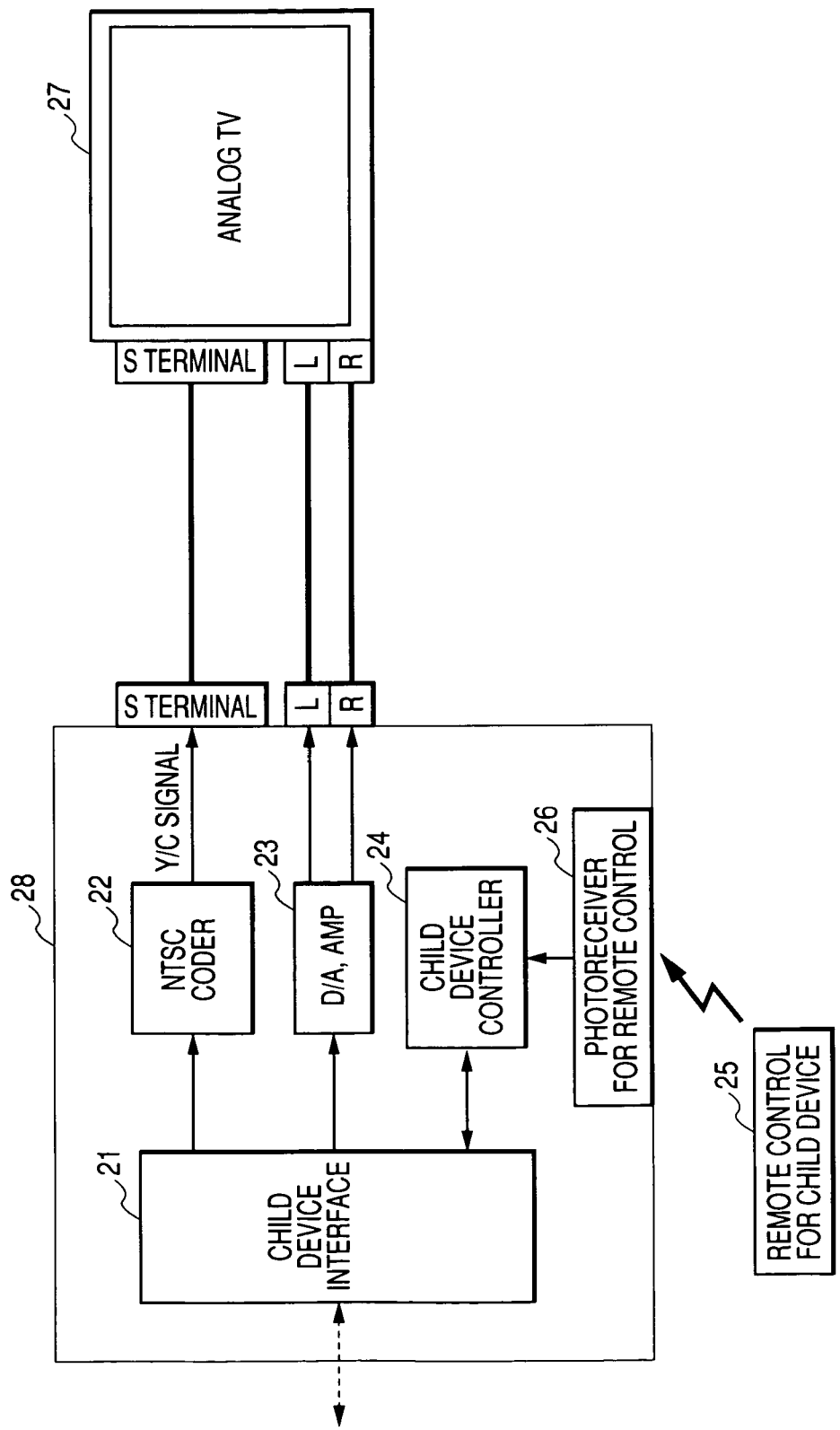
FIG. 5 is a block diagram showing the configuration of a child device of the TV system according to the first embodiment of the present invention.

The child device that is used in combination with the parent device in the first embodiment will now be described. FIG. 5 is a block diagram showing the configuration of the child device. Here, the child device has interconnected a child device adapter 28 and an analog TV 27 simple in configuration and inexpensive. The child device adapter 28 is provided with a child device interface 21, an NTSC coder 22, a digital-analog converter (D/A) and amplifier (AMP) 23, a child device controller 24, a remote controller for child device 25 and a photoreceiver for remote control 26. The child device adapter 28 and the analog TV 27 are connected via S-terminals, audio L-terminals and audio R-terminals provided in each of them. Audio/video sources transferred from the parent device are input to the child device interface 21. The NTSC coder 22 converts digital video data of 480i into an analog Y/C signal of the NTSC standard for video data input to the child device interface 21. The signal is passed to the analog TV 27 through the S-terminal, and the audio data is converted into an analog signal and amplified by the D/A and AMP 23, and then passed to the analog TV 27 via the audio L-terminal and audio R-terminal. In this way, the analog TV 27 is brought into an external input selection state, whereby digital broadcasted video from the parent device can be displayed.

(PUSH-Type Transferring to Child Device)

Figure 6:
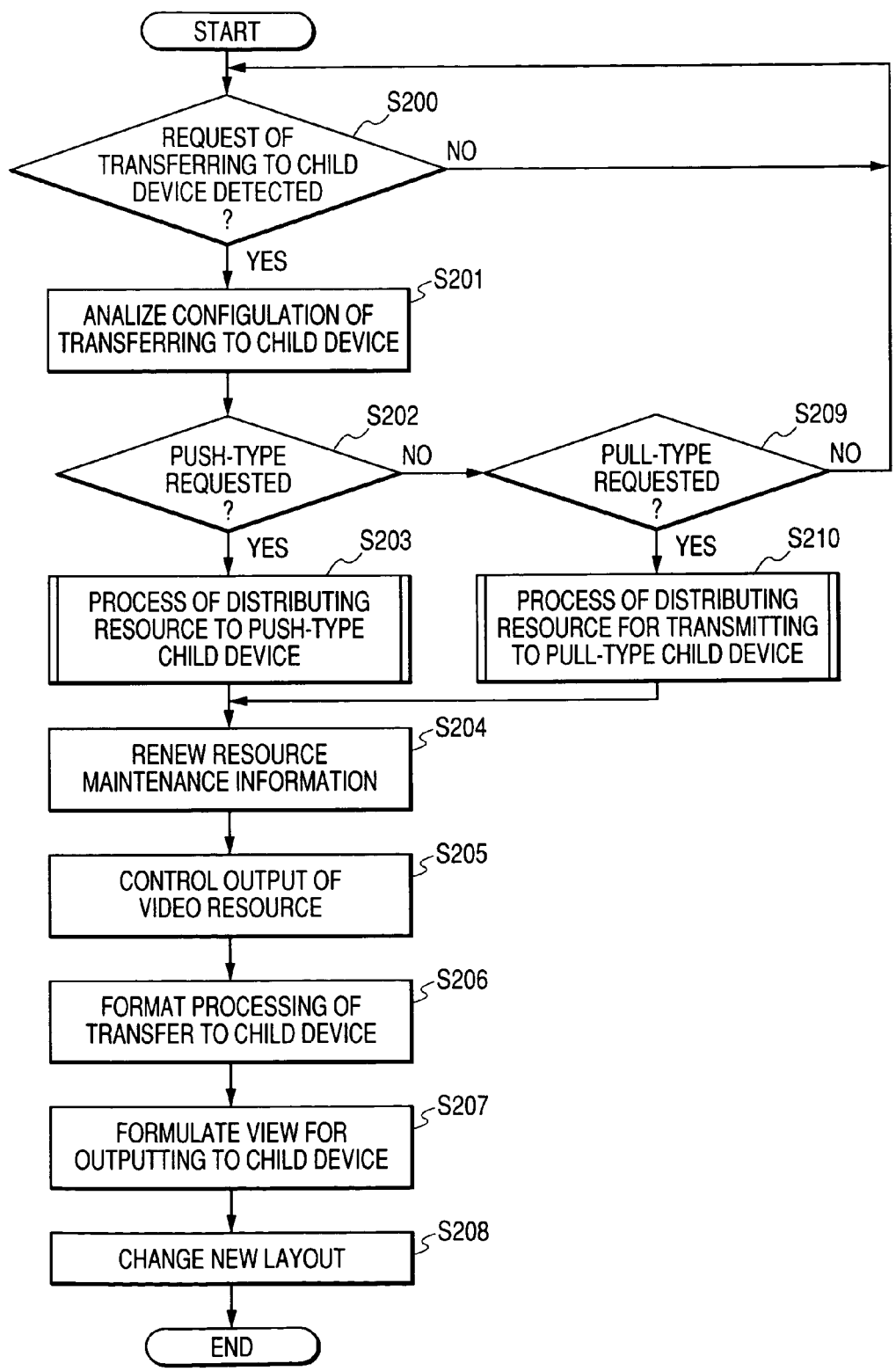
FIG. 6 is a flowchart showing process of PUSH-type transferring to the child device in the first embodiment of the present invention.

Process for performing PUSH-type transferring to the child device using the child device configured as described above and the above parent device will now be described. FIG. 6 is a flowchart showing process of PUSH-type transferring to the child device in the first embodiment of the present invention. In the PUSH-type transferring to the child device, the photoreceiver for remote control 17 and the controller 15 function as picture selection accepting means and output destination designating means, and the controller 15 functions as output allowable/unallowable determining means. The PUSH-type transferring to the child device means transfer performed based on a request of transmission of a program, which is made by operating the remote controller for parent device 16. Cases where such PUSH-type transferring to the child device is required include, for example, cases where when two or more persons, e.g., family members are viewing a program with a parent device (living TV), a request arises such that (1) one wants to view the rest of the program in a leisurely manner, (2) one wants to view the continuation broadcasted when he or she leaves the living room to go to a rest room, kitchen or the like, (3) one wants to record a desired program on a different channel in an analog VTR in his or her own room, or the like, and thus video is transferred to a child device "room TV" in other room.

As shown in FIG. 6, if the controller 15 detects a request of transferring to the child device at step S200, the controller 15 analyzes the configuration of transferring to the child device at step S201. In the PUSH type, the request of transferring to the child device is detected when the user of the parent device requests a mode of transferring to the child device using the remote controller for parent device 16. The configurations of transferring to the child device include the PULL type, in addition to the PUSH type. If the request is from the remote controller for parent device 16, the configuration is inevitably the PUSH type, and therefore the controller 15 interprets it as the PUSH type at step S202.

Figure 7:
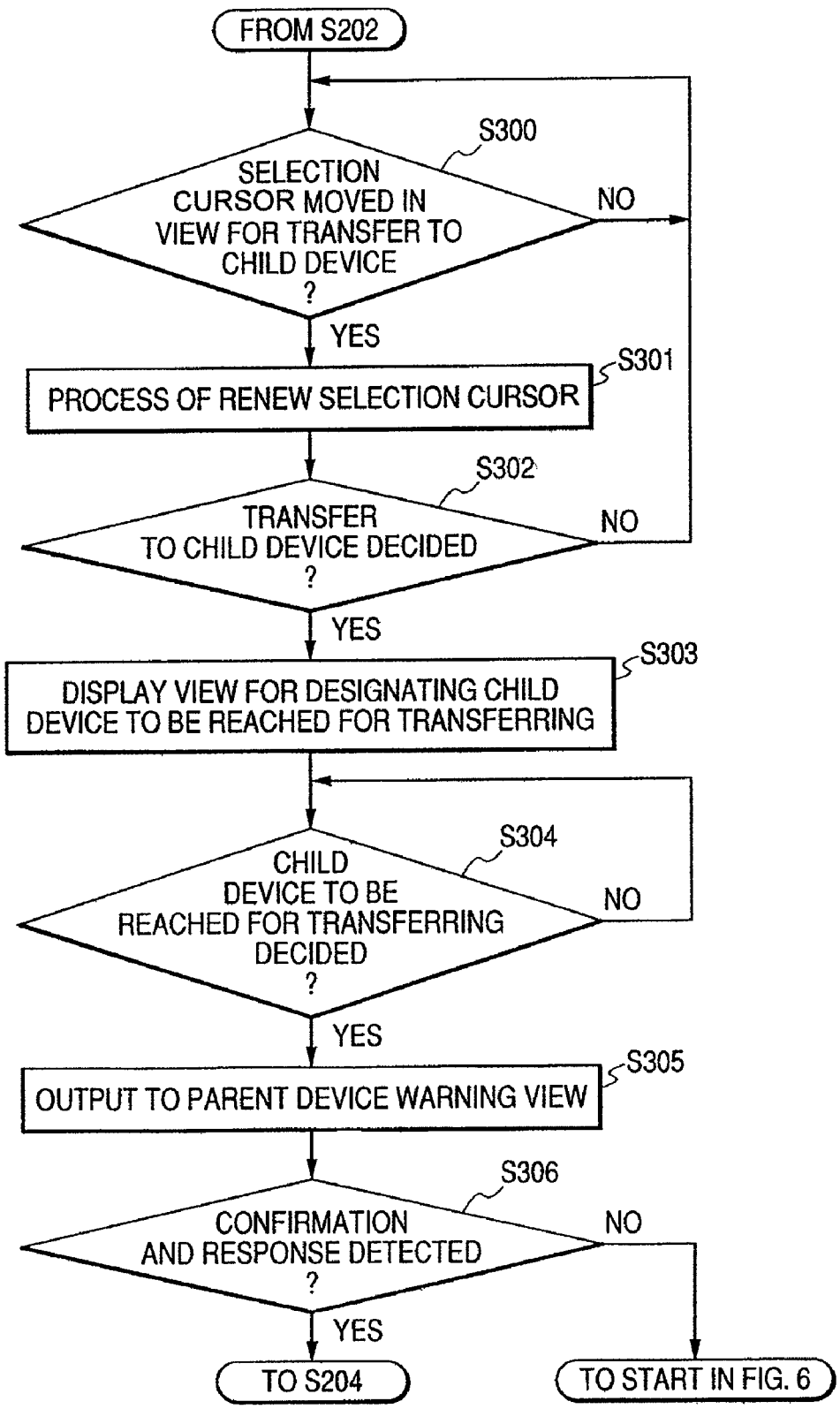
FIG. 7 is a flowchart showing process of distributing resources in PUSH-type transferring to the child device.

Then, the controller 15 performs process of distributing resources for PUSH-type transferring to the child device at step S203. The details of PULL-type transferring to the child device will be described later. At step S203, a video source to be transferred to the child device by the remote controller for parent device 16 and a device to be reached for transferring are decided. FIG. 7 is a flowchart showing process of distributing resources for PUSH-type transferring to the child device.

The remote controller for parent device 16 is provided with an up-and-down and left-and-right key (not shown), and by operating the up-and-down and left-and-right, one selection cursor can be selected from a plurality of selection cursors (options) displayed on the display 11 capable of providing multi view display. The selection cursor can move, for example, between the main view M and two sub views S1 and S2.

Figure 8A:
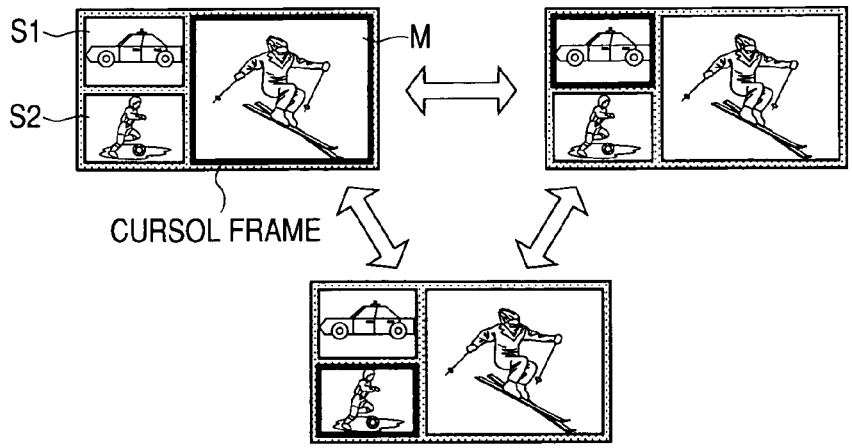
FIGS. 8A, 8B, 8C and 8D show a change of pictures displayed on a display 11 in PUSH-type transferring to the child device.

In the process of distributing resources (step S203), if the selection cursor moves in the view for transfer to the child device at step S300, process of renewing the selection cursor is performed at step S301. If the picture shown in FIG. 4 is displayed, for example, the selection cursor moves as in a display state shown in FIG. 8A.

If a video source to be transferred from the multi view display view to the child device is decided at step S302, process for allowing the user to designate a child device to be reached for transferring is performed at step S303. This process is required when there are a plurality of child devices, and in this embodiment, three child devices independently performing transmission between themselves and the parent device as shown in FIGS. 1A and 1B.

Figure 8B:
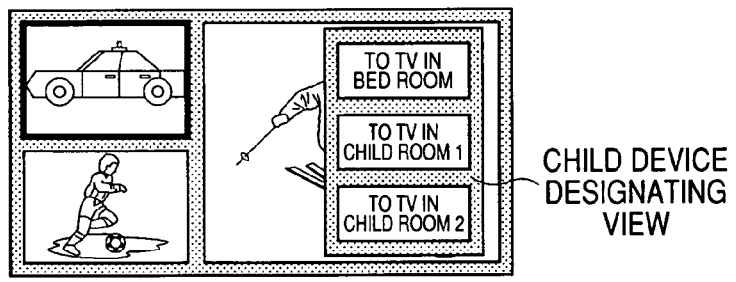

At step S303, for example, a method in which appropriate names of child devices are previously registered in the parent device by the user, a designated view of a child device to be reached for transferring is OSD-displayed, and the user is allowed to designate the child device to be reached, as shown in FIG. 8B, is suitable in terms of the interface.

Figure 8C:
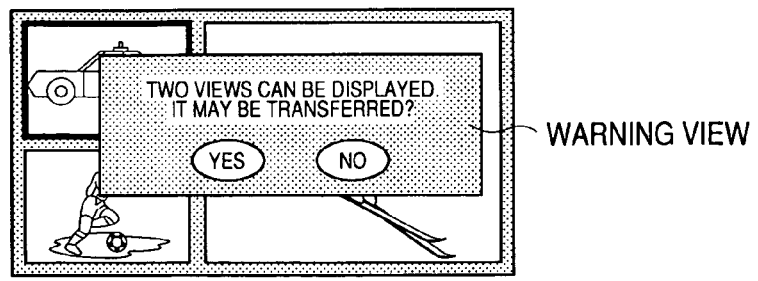

If decision of the child device to be reached for transferring is detected at step S304, the controller 15 recognizes the child device to be reached for transferring. Then, at step S305, for example, a warning indicating that multi view display of the parent device is limited by transferring to the child device is output and displayed on the display 11 of the parent device as shown in FIG. 8C, and process of displaying a guide to request the user to confirm the warning is performed. At this time, the controller 15 functions as output confirming means.

Then, if continuation of transferring is detected in confirmation and response at step S306, process moves to step S204, and if stop of transferring is detected, process of transferring to the child device is ended, and it is determined that there has been no request of transferring to the child device. After step S204, hardware in the parent device is controlled as process after decision of the child device to be reached for transferring and the video source.

The controller 15 renews resource maintenance information at step S204. Specifically, which process system (broadcasted video resource) of the parent device is used for processing a video source to be transferred to the child device is decided. The system of process of input pictures until writing into the common memory 8 from the tuner is integrated as a broadcasted video resource as described previously because the types of tuners may be different. Consequently, the broadcasted video resource of the view selected as a view for transferring to the child device, the sub view S1 in the example shown in FIG. 8, is directly assigned for transferring to the child device. Thus, in the case of assignment shown in Table 1, the broadcasted video resource composed of the tuner 2b to video decoder 5b, and the moving picture plane #1 is a moving picture plane for child device.

As a result, in the state after the layout is changed, video data processed by the broadcasted video resource constituted by the tuner 2a to the video decoder 5a is assigned to the moving picture plane #0 for the main view M, video data processed by the broadcasted video resource constituted by the tuner 2b to video decoder 5b is assigned to the moving picture plane #1 for the child device A, and video data processed by the broadcasted video resource constituted by the tuner 2c to video decoder 5c is assigned to the moving picture plane #2 for the sub view S2, as shown in Table 2.

TABLE 2

| Views | Broadcasted video resources | Moving picture planes |
|---|---|---|
| Main view M | Tuner 2a to video decoder 5a | #0 |
| Child device A | Tuner 2b to video decoder 5b | #1 |
| Sub view S2 | Tuner 2c to video decoder 5c | #2 |

Then, which is selected of three independent child device output systems (18a to 19a, 18b to 19b and 18c to 19c) is then decided. If the parent device and the child device are connected by a wired connection (cable, etc.) in a point-to-point manner, a child device output process system linked to a child device to be reached for transferring is selected, and if the parent device can be connected to the child device with the network ID by a wireless connection (Wireless 1394, etc.), a child device output process system is arbitrarily selected. In any case, the controller 15 renews resource maintenance information and renews the contents of the RAM 14 based on the decided process system. For example, in this embodiment, if the child device output process system 18a to 19a is selected, this fact is stored in the RAM 14. Furthermore, by conducting the resource maintenance described above, the moving picture plane of FIG. 3 can be shared by the parent device and the child device during connection of the child device.

Then, the controller 15 controls output of the video source at step S205. Specifically, the output is controlled such that the multi view synthesizer for parent device 9 is caused to stop generation of the address for reading to the moving picture plane #1 to which the broadcasted video resource open to the child device has been assigned, and the output synthesizer for child device 18a is caused to start generation of the address for reading to the moving picture plane #1.

The sharing of the moving picture plane by the parent device and child device described previously and the switching of the access described above do not require an increase in memory capacity of the common memory 8 and an improvement in transferring bandwidth, and therefore there is no possibility of a rise in cost with increase in capacity and enhancement of speed of the memory.

Then, the controller 15 performs format processing of transfer to the child device at step S206. The analog TV as a child device is compliant with the NTSC standard, and is therefore required to have an output equivalent to 480i (vertical 525 interlaces) in digital process. Accordingly, the resolution converter 6*b* is shared as in the case of the parent device, and video data is converted in format into 480*i*, and then stored in the moving picture plane #1 of the common memory 8. The output synthesizer for child device 18*a* issues the address for reading to the memory controller 7 in synchronization with the display rate of 480*i* (60 Hz, 13.5 MHz) to receive a picture #0 read out for child device.

In this way, in this embodiment, the resolution converters 6*a* to 6*c* are provided in the pre-stage of the common memory 8, and therefore asynchronous absorption is performed by the common memory 8 even if the display rate changes from that of the parent device to that of the child device. Accordingly, the process configuration of the parent device can be directly used.

Figure 9A:
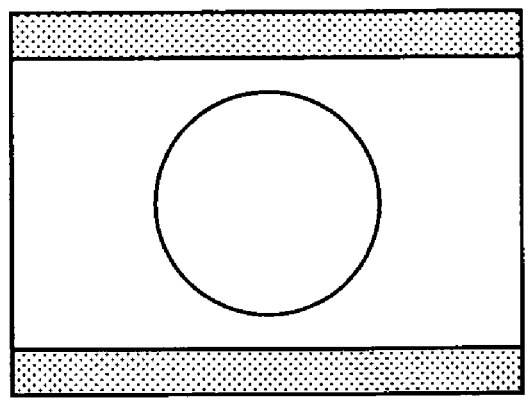
FIGS. 9A and 9B show a display form of the display.
Figure 9B:
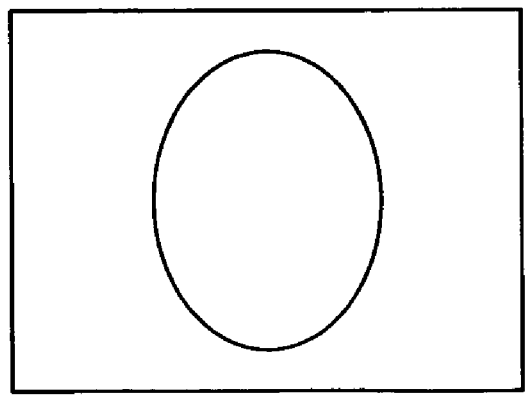

In step S207, a view for outputting to the child device such as, for example, letter box display shown in FIG. 9A and full view display shown in FIG. 9B is formulated for displaying a picture having an aspect ratio of 16:9 at a child device having an aspect ratio of 4:3. In the case of letter box display, a background for child device is added by the output synthesizer for child device 18*a*. Thereafter, by the interface for child device 19*a*, video data is adapted to the transmission format, and then output.

Figure 8D:
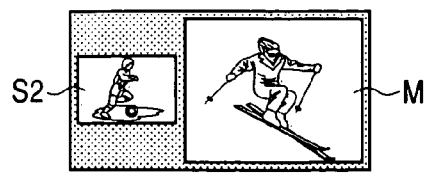

Finally, at step S208, the layout of the view of the parent device in a child device outputting state is changed, for example, from display of three views to display of two views as shown in FIG. 8D, whereby the process of PUSH-type transferring to the child device is fully completed.

The audio has not been described in detail, but simple process of switching outputs from a plurality of audio decoders not shown in FIGS. 1A and 1B to the child device side in accordance with the picture is sufficiently acceptable (both the picture and audio are sent to a designated child device during transferring to the child device).

(First PULL-Type Transferring to Child Device)

Process for performing PULL-type transferring to the child device will now be described with reference to FIG. 6. In the PULL-type transferring to the child device, the interfaces for child device 19*a* to 19*c* and the controller 15 function as request accepting means, and the controller 15 functions as request allowable/unallowable determining means. The PULL-type transferring to the child device means transferring performed based on a request of transmission of a program, which is made by operating the remote controller for child device 25 of the child device adapter 28. Cases where such PULL-type transferring to the child device is required include, for example, cases where in a room other than a room where the parent device is installed, there arises a request such that (1) one wants to view a digital broadcast with the analog TV 27 connected to the child device adapter 28, (2) one wants to record a digital broadcast in an analog VTR connected to the child device adapter 28, or the like, and thus the picture is transferred from the child device (room TV) to the parent device.

A large difference between the PULL-type and the PUSH-type in terms of process lies in whether transferring to the child device is requested from the remote controller for parent device 16, or transferring to the child device is requested from the remote controller for child device 25. PULL-type transferring to the child device will be described below focusing on process different from that of PUSH-type transferring to the child device.

Process of PULL-type transferring to the child device is started when the user depresses a key for requesting transferring to the child device (not shown) provided in the remote controller for child device 25, for example. When the key for requesting transferring to the child device is depressed, the child device controller 24 detects a request of transferring via the photoreceiver for remote control 26, and issues a request command to the child device interface 21 in accordance with a predetermined protocol. This request command can be transmitted to the parent device by defining a two-way command line for the interface between the parent device and the child device. If the parent device and the child device are connected by a wired connection (cable, etc.) in a point-to-point manner, one interface for child device of the interfaces for child device 19*a* to 19*c* in the parent device to be reached for transferring receives the request command. If the child device can be connected to the parent device with a network ID by a wireless connection (Wireless 1394, etc.) or the like, an interface for child device is arbitrarily selected. In particular, in the case of the wireless communication, a child device ID for indicating a child device from which the request has been made is added with the request command.

As shown in FIG. 6, if the controller 15 detects a request of transferring to the child device from the child device at step S200, the controller analyzes a configuration of transferring to the child device at step S201. In the PULL type, it is performed if the user of the child device requests a mode of transferring to the child device using the remote controller for child device 25.

Furthermore, in this embodiment, the command request from the remote controller for child device 25 is passed directly to the controller 15 through communication lines for child device output from the interfaces for child device 19*a* to 19*c*, and therefore the controller 15 detects an interruption from the communication line to recognize at step S209 that a PULL-type request has been made from a predetermined child device.

Figure 11:
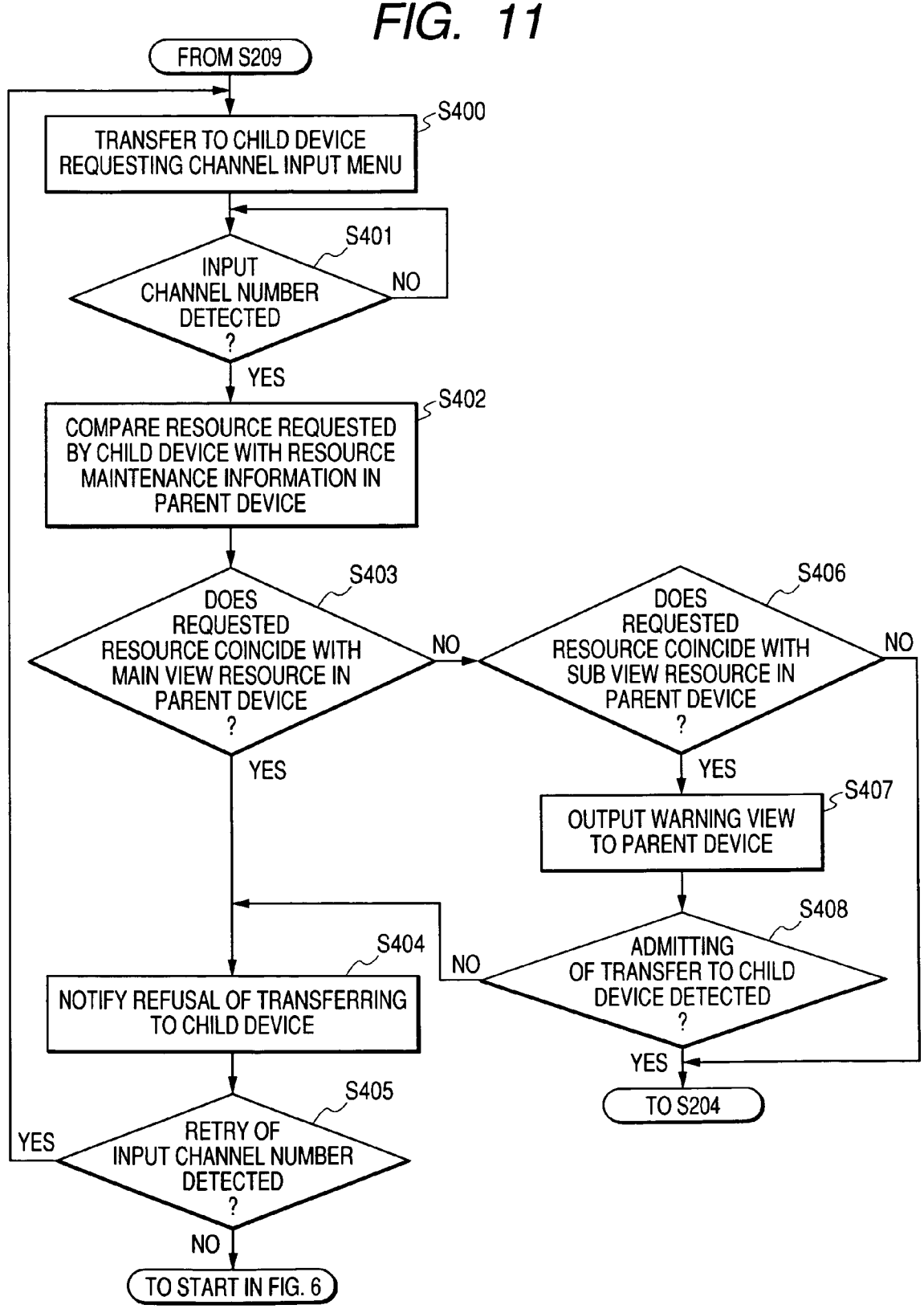
FIG. 11 is a flowchart showing process of distributing resources in PULL-type transferring to the child device.

Thereafter, at step S210, the controller 15 moves to process of distributing resources for PULL-type transferring to the child device. At step S210, a video source to be transferred to the child device by the remote controller for child device 25 is decided. Here, since child device ID is previously added to the child device to be reached for transferring, the controller 15 already recognizes which is a child device to be reached for transferring. FIG. 11 is a flowchart showing process of distributing resources for PULL-type transferring to the child device.

Figure 10A:
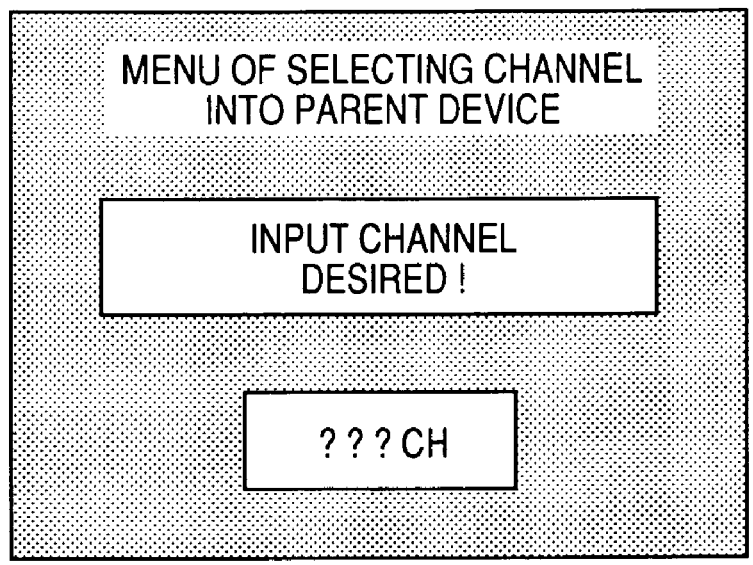
FIGS. 10A and 10B show examples of OSD display provided at the child device.

In the process of distributing resources (step S210), the controller 15 performs process of formulating a channel input menu composed of OSD display as shown in FIG. 10A and transferring the same to a child device represented by the child device ID at step S400. A specific method for creating OSD display output to the child device will now be described.

If the child device to be reached for transferring is connected to the interface for child device 19*b*, the controller 15 performs OSD rendering for the OSD plane #1 for child device constructed in the common memory 8 as shown in FIG. 3, and the output synthesizer for child device 18*b* reads out OSD#1 data for child device from the OSD plane for child device #1 of the common memory 8, and transfers the OSD#1 data via the interface for child device 19*b*, whereby the channel input menu is displayed at the analog TV 27 of the child device. Consequently, the user of the child device can directly input a channel number (CH number) with a number key (not shown) of the remote controller for child device 25 while looking at the channel input menu. Input character strings are transferred to the controller 15 one after another by the child device controller 24, and the controller 15 renews the OSD plane #1 for child device based on the input data, whereby the user of the child device can check whether channel display is provided correctly. Thus, it is not necessary to provide a function for providing OSD display on the child device side.

Then, if the controller 15 detects an input channel number at step S401, then the resource maintenance information described previously is read out from the RAM 14, and whether the broadcasted video resource which is used when a requested channel is transferred is used for the main view of the parent device is determined by comparison at step S402.

Figure 10B:
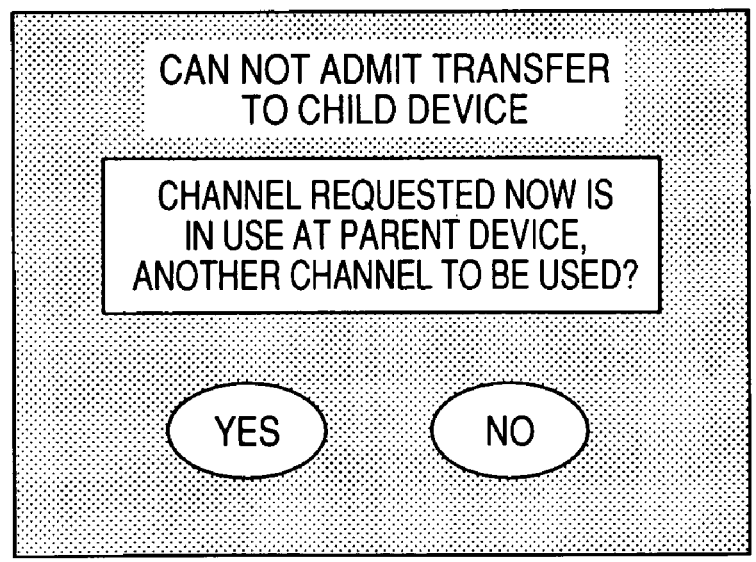

If the broadcasted video resource for the requested channel coincides with the broadcasted video resource of the picture displayed on the main view of the parent device at step S403, it is determined that the channel should not be transferred to the child device because it is a broadcasted video resource which the parent device mainly uses, and a notification of refusal of transferring to the child device as shown in FIG. 10B is rendered again in the OSD plane #1 for child device at step S404. At this time, the child device is notified of whether other channel is also requested or not as shown in FIG. 10B. Furthermore, at this time, the controller 15 functions as request confirming means. It may be determined that the channel should not be transferred if the broadcasted video resource for the requested channel is used at the parent device or child device, regardless of the main view or the sub view.

As a result, if the user of the child device changes the requested channel number and retries a request at step S405, the channel input menu shown in FIG. 10A is transferred to the child device again at step S400. By repeating this process, the user of the child device can make a channel request over and over again.

If the broadcasted video resource for the requested channel does not coincide with the broadcasted video resource of the picture displayed on the main view of the parent device at step S403, whether the broadcasted video resource for the requested channel coincides with the broadcasted video resource displayed on the sub view of the parent device is determined at step S406.

If they coincide with each other as a result, it is determined that the channel may be transferred to the child device because it is not a broadcasted video resource which the parent device mainly uses. A warning shown in FIG. 8C as in the case of the PUSH type is displayed on the display view of the parent device at step S407, and admitting of transferring to the child device is confirmed with the user at step S408.

If it is determined that transferring is not admitted at step S408, process moves to step S404, where the child device is notified of refusal of transferring to the child device by the same process as described previously. Furthermore, if admitting of transferring is detected, process moves to step S204, where the picture of the requested channel is transferred to the child device by process same as that for the PUSH type described previously.

Furthermore, if the broadcasted video resource for the requested channel does not coincide with the broadcasted video resource of the picture displayed on the main view of the parent device at step S406, the parent device does not use the requested broadcasted video resource, or the parent device is not used at all because of the standby state, and therefore process unconditionally moves to step S204, where the picture of the requested channel is transferred to the child device by process same as that for the PUSH type described previously.

Process subsequent to step S204 is performed as in the case of the PUSH type, whereby PULL-type transferring to the child device is fully completed.

(Second PULL-Type Transferring to Child Device)

Another method of process of PULL-type transferring to the child device will now be described. In the PULL-type transferring to the child device described above, a channel number is designated from the child device side via two-way communications, and transferring to the child device is performed if it is admitted by the parent device. It can be said that this configuration and method provides very simple and effective means because admitting of transferring for a channel request from the child device can relatively easily be obtained by the parent device if the types of the tuners 2a to 2c are all the same (e.g., all the tuners are BS digital/CS digital common tuners, etc.).

However, if the types of the tuners 2a to 2c are different (e.g., the tuner 2a is a BS digital tuner, the tuner 2b is a CS digital tuner, and the tuner 2c is a ground wave digital tuner, etc.), there is a high possibility that if a channel of the CS broadcast is requested from the child device side when the parent device uses a CS digital tuner for display of the main view, the request is continuously refused. Further, even in this case, the configuration and the like of the tuner of the parent device are not known from the child device. Thus, a method allowing PULL-type transferring to the child device to be smoothly realized even in this case is desired.

Figure 12:
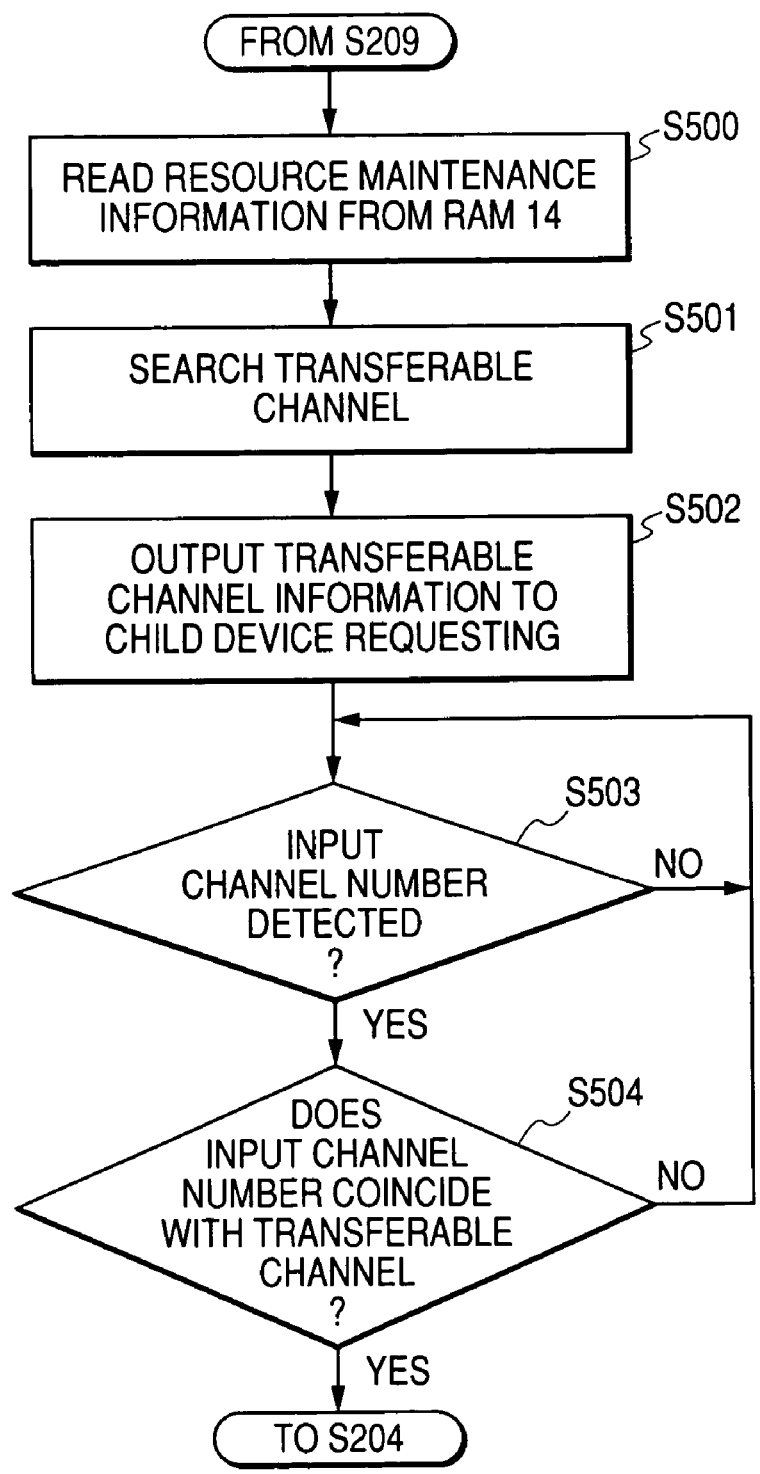
FIG. 12 is a flowchart showing another process of distributing resources in PULL-type transferring to the child device.

The method of process of PULL-type transferring to the child device described here is different from the above method of process only in process of distributing resources, and enables smooth transferring. FIG. 12 is a flowchart showing other process of distributing resources for PULL-type transferring to the child device. In this PULL-type transferring to the child device, the interfaces for child device 19a to 19c and the controller 15 function as request accepting means, and the controller 15 functions as request allowable/unallowable determining means.

In the method of process, if the parent device detects a request of PULL-type transferring to the child device at step S209, the controller 15 reads out resource maintenance information from the RAM 14 at step S500 as process of distributing resources. Then, at step S501, the controller 15 retrieves a broadcasted video resource capable of being assigned for the child device and a channel capable of being transferred to the child device using the broadcasted video resource based on the resource maintenance information. For example, when the program viewed on the main view by the parent device uses the tuner 2a (BS digital tuner) if the tuner 2a is a BS digital tuner, the tuner 2b is a CS digital tuner and the tuner 2c is a ground wave digital tuner, it is determined that the tuner 2b (CS digital tuner) and the tuner 2c (ground wave digital tuner) can distribute the resource. At this time, the controller 15 functions as retrieval means.

Then, at step S502, transferable channel information is rendered in the corresponding child device OSD plane for the child device requesting transferring, the corresponding output synthesizer for child device reads out the information and transfers the information to the child device to output the same. The view of transferable channel information output may be a view of display of OSD alone as shown in FIG. 13A, for example, or may be a view of display of OSD in combination with a picture being displayed as shown in FIG. 13B if the channel is switched or the like when a program transferred previously is being viewed at the child device. At this time, the controller 15 functions as retrieval result outputting means.

If input of a channel number from the child device is detected at step S503, the controller 15 moves to step S204, where a desired program is transferred to the child device if the channel number is included in the transferable channel information at step S504.

According to this method of process, the user of the child device can recognize a channel that can be transferred by the parent device, and therefore the channel can be smoothly selected, thus making it possible to avoid the problems of the PULL-type transferring to the child device described above.

Second Embodiment The second embodiment of the present invention will now be described. In the configuration of the first embodiment, pictures of the same video source are not displayed at the parent device and the child device. However, in the following examples, it is required to display pictures of the same video source at the parent device and the child device at the same time. The examples include cases where (1) one wants to monitor on the parent device side the contents of a program viewed at the child device, (2) in PUSH-type transferring to the child device, pictures on the main view of the parent device are requested to be transferred to the child device, but one wants to continuously view the same pictures at the parent device, (3) in PULL-type transferring to the child device, the parent device is requested to transfer pictures to the child device, but transferring is refused because parent device displays the requested pictures on the main view, and the like.

Figure 14:
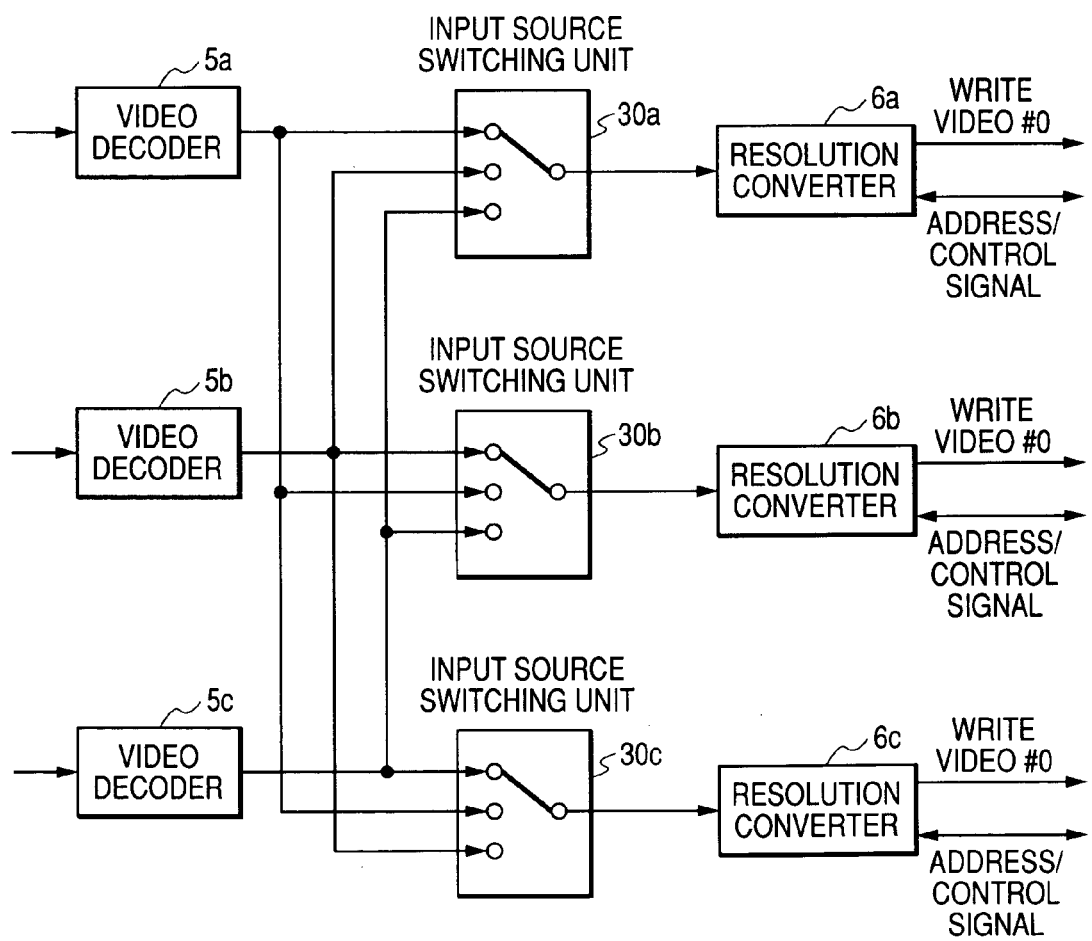
FIG. 14 is a block diagram showing part of the parent device of the TV system according to the second embodiment of the present invention.

The second embodiment can meet the demands described above and specifically, input source switches 30a, 30b and 30c are provided between the video decoders 5a to 5c and the resolution converters 6a to 6c as shown in FIG. 14. The input source switches 30a to 30c select one from video data (video source) output from the video decoders 5a to 5c, and output the same to the resolution converters 6a to 6c, respectively, under control by the controller 15. That is, input switches 30a to 30c allowing the resolution converters 6a to 6c to select all outputs from the video decoders 5a to 5c and process the same are provided.

(Monitoring of Program Viewed at Child Device)

Figure 15A:
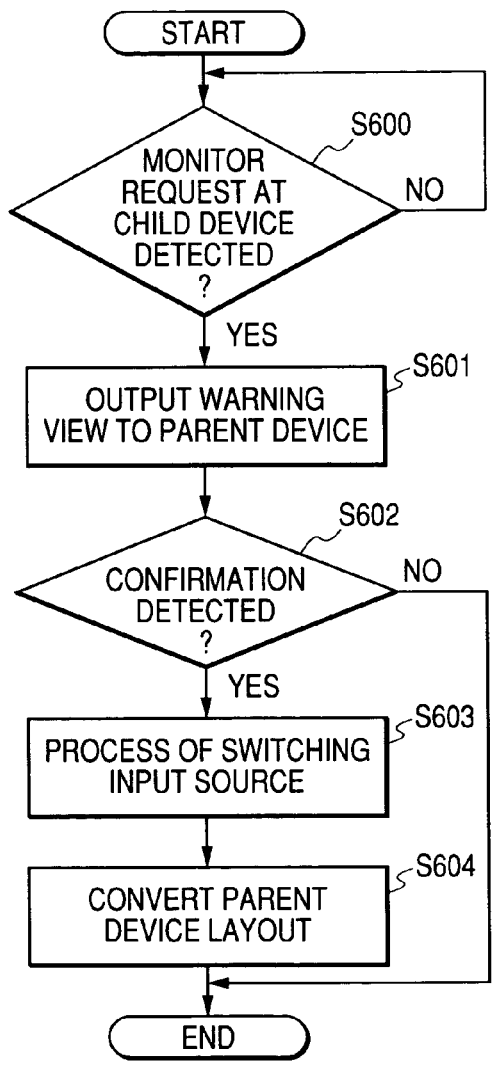
FIGS. 15A and 15B are flowcharts showing the operation where a program viewed at the child device is monitored.
Figure 15B:
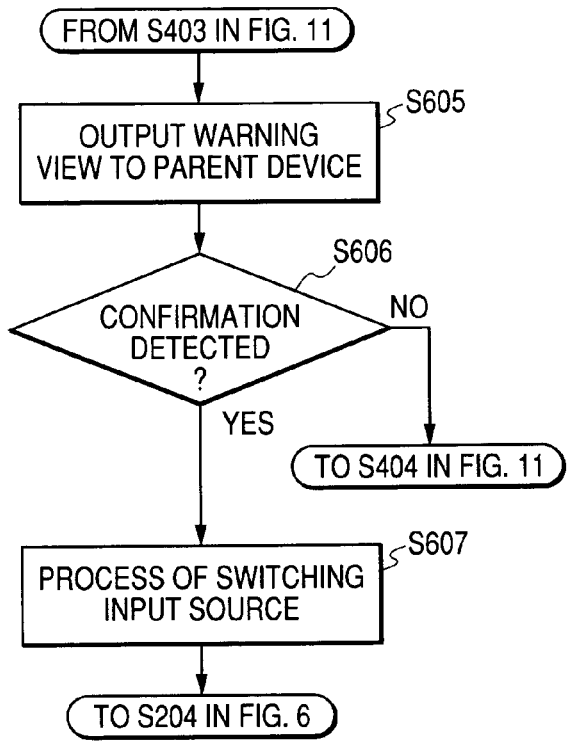

The operation of the second embodiment where a program viewed at the child device is monitored on the parent device side will now be described. FIG. 15 is a flowchart showing the operation where a program viewed at the child device is monitored.

First, as shown in FIG. 16A, a main view and a sub view are used at the parent device, and pictures are transferred to one child device. If in this state, the user of the parent device issues, using the remote controller for parent device 16, a request of monitoring the pictures transferred to the child device, the controller 15 detects this request at step S600.

Then, the controller 15 displays on the display 11 of the parent device a warning view shown in FIG. 16B at step S601. That is, the controller 15 warns that the number of views selectable at the main view is reduced to one by monitoring the child device.

The meaning of the warning contents will now be described in detail. In this embodiment, three broadcasted video resources are provided. When the child device is monitored in this configuration, one broadcasted video resource should be shared between the parent device and the child device if the types of tuners 2a to 2c are different. In this case, the controller 15 divides the video source output from the same video decoder for outputting to the parent device and outputting to the child device to be output using two of the input source switches 30a to 30c. Mutually different resolution converters convert a resolution, and the video source after the conversion is assigned different moving picture planes of the common memory 8. Then, the multi view synthesizer for parent device 9 and one of the synthesizers 8a to 8c read out pictures different in resolution from mutually different moving picture planes, whereby the same video source is displayed at the same time.

If such process is performed, two resolution converters are used, one for transferring to the child device and the other for monitoring at the parent device, and therefore only one resolution converter can be used for other purpose. In this state, the tuner sending the video source to the resolution converter other than those for transferring to the child device and for monitoring at the parent device can be freely used for viewing at the parent device without any problems, but if a channel can be freely selected on the parent device side with respect to the tuner sending the video source to the resolution converters for transferring to the child device and for monitoring at the parent device, the picture displayed at the child device is changed. Accordingly, the number of broadcasted video sources selectable on the parent device side should be limited to one, and notification of this is provided as a warning.

If after warning step S601, the user agrees with the warning and the controller 15 detects a confirmation response at step S602, the input source switches 30a to 30c are switched to enable simultaneous display at step S603. That is, output signals of the video decoder connected to the tuner that are used for receiving the video source transferred to the child device are input to two resolution converters for transferring to the child device and for monitoring at the parent device.

Then, the controller 15 changes the layout of the view of the parent device at step S604. The view after its layout is changed is, for example, a view shown in FIG. 16C.

According to such a method, identical pictures can be displayed at the parent device and the child device at the same time without degradation in image quality.

Even with the first embodiment, it is still possible to display identical pictures without limiting the number of views selectable at the parent device if control is performed so that read pictures from moving picture planes assigned by the controller 15 for transferring to the child device of the common memory 8 are processed by the multi view synthesizer for parent device 9 and the output synthesizer for child device at the same time. However, there is a high possibility that the picture displayed at the child device and the picture displayed at the parent device have different picture formats (especially display resolutions). Therefore, in order that the picture read from the same moving picture plane is processed by the multi view synthesizer for parent device 9 and the output synthesizer for child device at the same time, an additional resolution converter should be provided in the pre-stage of the multi view synthesizer for parent device 9 (post-stage of memory controller 7 and common memory 8) to reconvert the resolution of the picture displayed at the child device into the resolution for multi view display of the parent device.

However, employment of this configuration results in not only an increase in cost caused by a considerable increase in circuit size resulting from addition of the resolution converter, but also two-stage conversion process in the pre-stage and post-stage of the common memory 8, and therefore detrimental factors are more significant such as degradation in display image quality.

According to the second embodiment described above, it is not necessary to increase the number of resolution converters, thus making it possible to monitor the child device while avoiding a considerable increase in cost and degradation in image quality.

(Sharing of Picture Displayed on Main View of Parent Device with Child Device)

A method allowing pictures displayed on the main view of the parent device to be viewed at the child device as well, especially a method where a broadcasted video resource for use in processing of pictures required by the child device in PULL-type transferring to the child device is displayed on the main view of the parent device.

In PULL-type transferring to the child device of the first embodiment, transferring to the child device is completely refused as shown in FIG. 11 if the broadcasted video resource for use in processing of pictures required by the child device in PULL-type transferring to the child device is displayed on the main view of the parent device. In this embodiment, the broadcasted video resource can be shared by the parent device and the child device in input process, and therefore a transfer request from the child device can be satisfied even in the case described above.

Figure 17A:
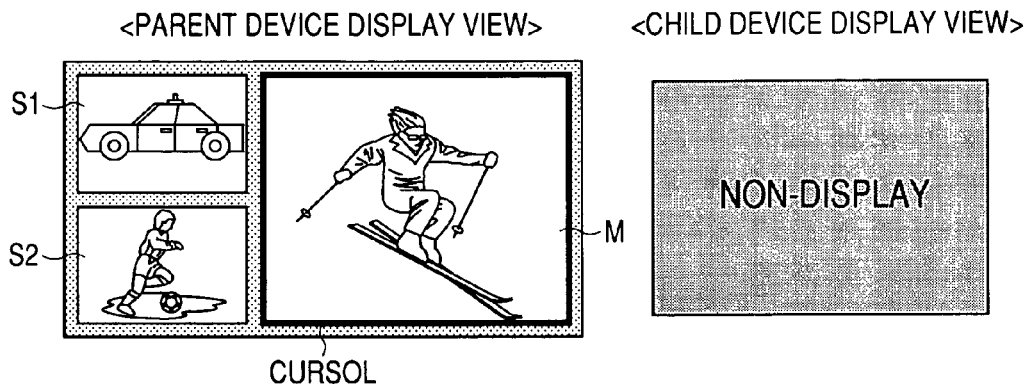
FIGS. 17A, 17B and 17C show a change of pictures displayed when a picture displayed on a main view of the parent device is shared with the child device.
Figure 17B:
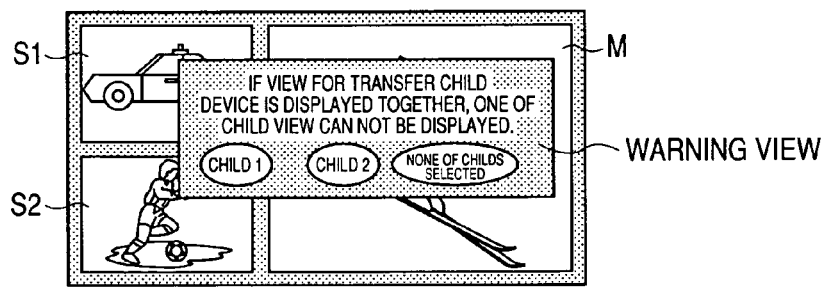

Specifically, if a request of PULL-type transferring of a picture identical to that on the initial main view of the parent device is made from the child device in the case of a display state shown in FIG. 17A, a warning view shown in FIG. 17B, i.e. a warning view for selection on whether one of two sub views of the parent device may be non-displayed or not is displayed at the parent device at step S605. This is because two resolution converters share one video source, whereby the number of additional broadcasted video resources capable of being used for display at the parent device is one as in the case described previously.

Figure 17C:
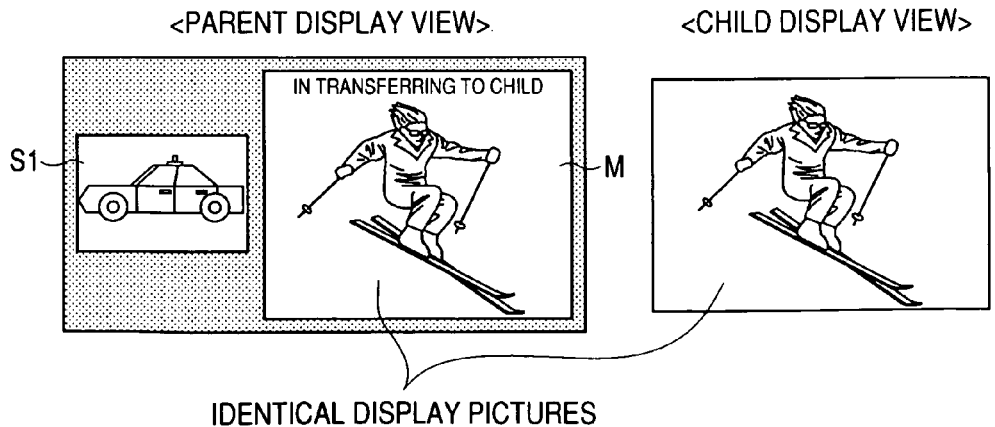

If it is detected that the user of the parent device admitted one of the sub views to be non-displayed at step S606, input source switches 30-1 to 30-3 are switched so that display of a sub view selected to be non-displayed by the user of the parent device, e.g., the sub view S2, is stopped, and the picture on the main view is transferred to the child device at step S607. Then, the controller 15 changes the layout of the view of the parent device. The view after the layout is changed is a view shown in FIG. 17C, for example.

According to such a method, identical pictures can be displayed at the parent device and the child device without degradation in image quality. In this way, input process can be shared, thus making it possible to further improve a degree of freedom of PULL-type transferring to the child device. If pictures on the main view are transferred to the child device in PUSH-type transferring to the child device, processes of step S605 and subsequent steps are performed in the same manner except that only the initial operation of the remote controller for the request is different.

Figure 18A:
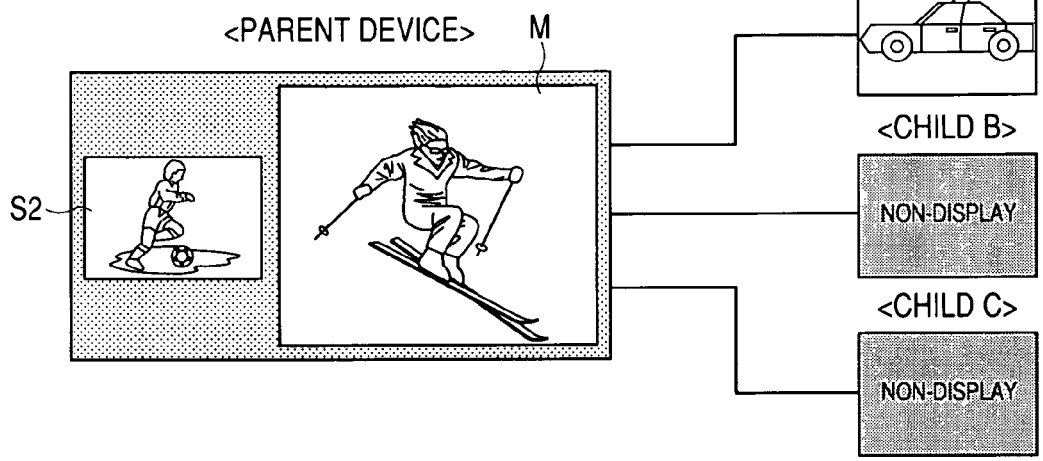
FIGS. 18A, 18B and 18C show a change of pictures displayed when transmission is performed between three child devices and the parent device in the first and second embodiments of the present invention.
Figure 18B:
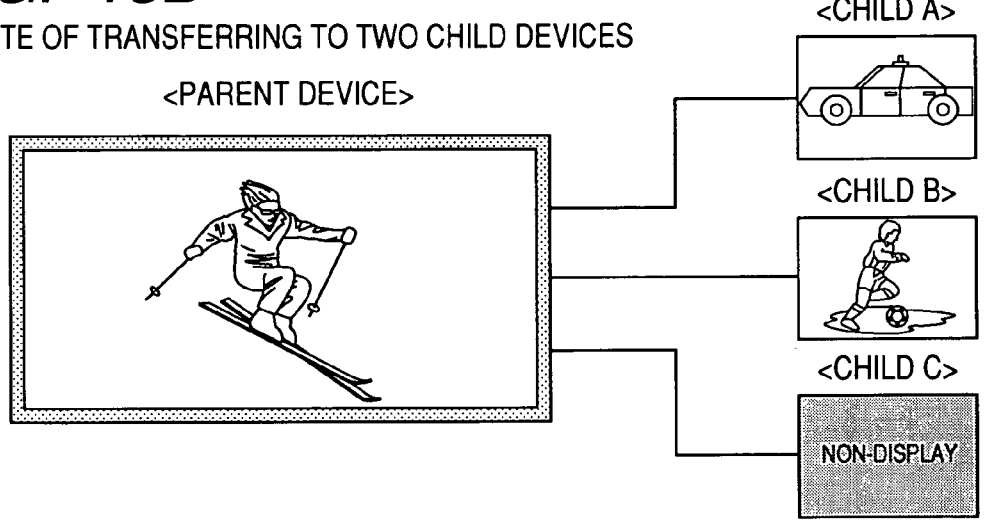
Figure 18C:
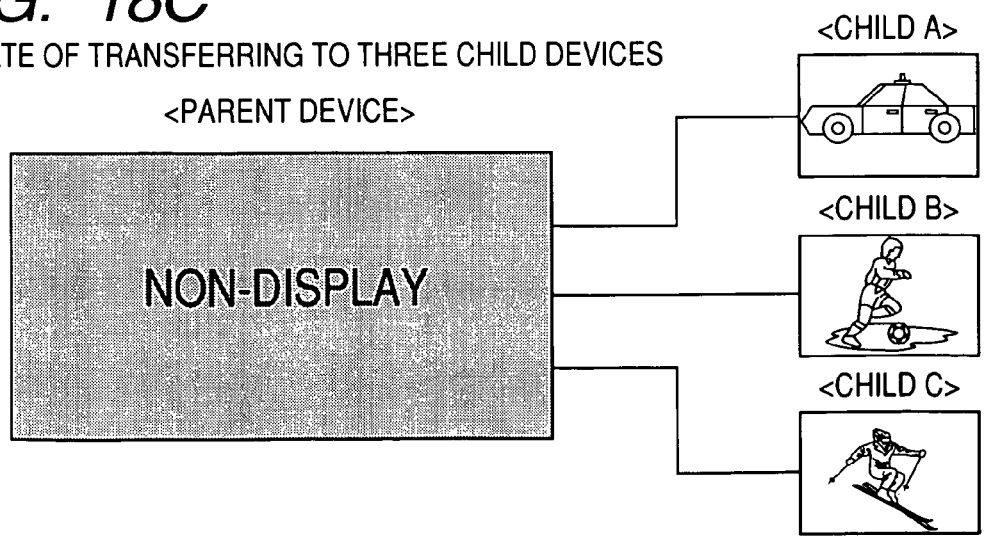

In the descriptions of the first and second embodiments, methods of process for PUSH-type transferring to the child device, PULL-type transferring to the child device, and simultaneous display at the parent device and child device are described separately, but these methods of process may be applied in combination. Furthermore, the number of child devices to be reached for transferring is not limited to one, but pictures of different video sources may be transferred to a plurality of child devices, or pictures of identical video sources may be transferred to a plurality of child devices. Furthermore, in both the first and second embodiments, communications between the parent device and three child devices can be enabled as shown in FIGS. 18A to 18C and in this case, a state can be provided in which the parent device is in a standby mode and thus is not used during transferring to three child devices.

Further, pictures transferred to the child device are not limited to those using broadcasted video resources being input from tuners, accumulated video resources from recording devices such as hard disks included in the parent device and external DVD and D-VHS may be targeted.

Third Embodiment

Figure 19:
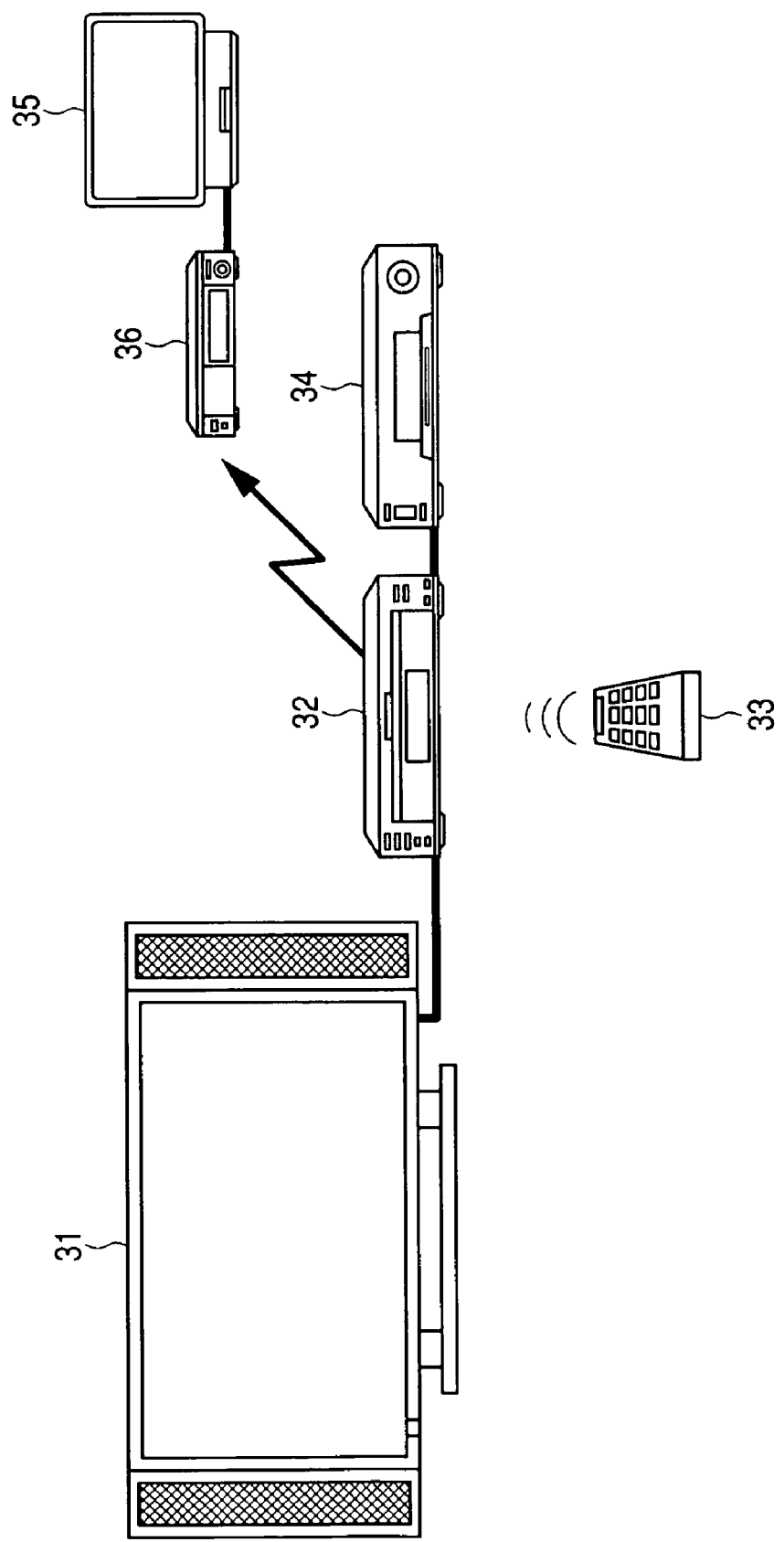
FIG. 19 shows the configuration of the TV system according to the third embodiment of the present invention.

The third embodiment of the present invention will now be described. The first and second embodiments relate mainly to control until pictures are transferred to the child device, while the third embodiment relates mainly to control of the parent device during transferring of pictures to the child device. FIG. 19 shows the configuration of a TV system according to the third embodiment of the present invention.

The TV system is provided with a display 31 using a display device such as a PDP or CRT, and a set box (hereinafter abbreviated as STB) 32 being a receiver having also a function to transmit video data. The parent device is constituted by a display 31 (main display) and an STB 32 (information processor).

Further, a remote control device (hereinafter abbreviated as remote control) 33 for remotely operating the STB 32, a video tape recorder (hereinafter abbreviated as VTR) 34, an analog TV receiver set 35 using a display device such as a small CRT, and a converter 36 receiving video data transmitted from the STB 32 and converting the video data into display data are provided. The child device is constituted by the analog TV receiver set 35 (sub-display) and the converter (sub-information processor).

Figure 20:
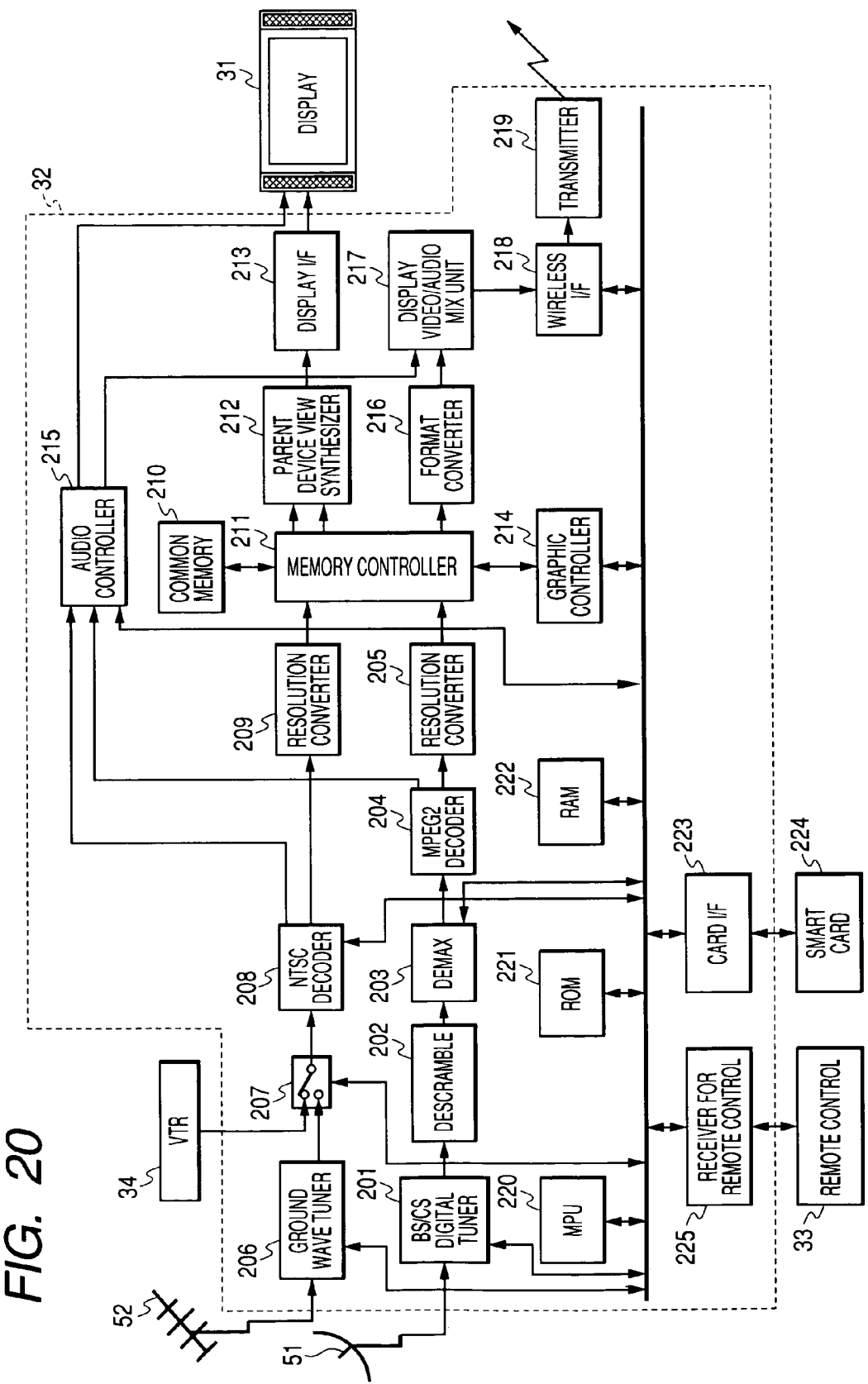
FIG. 20 is a block diagram showing the outlined configuration of an STB 32 and peripheral devices.

FIG. 20 is a block diagram showing the outlined configuration of the STB 32 and peripheral devices. To the STB 32, not only the display 31 is connected as in FIG. 19, but also, for example, a BS/CS digital Rebroadcast receiving antenna 51 receiving broadcasts of TV programs, an analog ground wave broadcast receiving antenna 52 and a VTR 54 are connected.

The STB 32 is provided therein with a BS/CS digital tuner 201, a scramble cancel IC 202, a demultiplexer (demux) 203 for dividing signals into a picture, audio and data, an MPEG 2 decoder 204 expanding a picture and audio, and a resolution converter 205 for video data expanded by the decoder 204.

Further, the STB 32 is provided therein with a tuner 206 for ground wave broadcast, a switch circuit 207 switching between NTSC signals from the tuner 206 and the VTR 34, an NTSC decoder 208 decoding the NTSC signal, and a resolution converter 209 for decoded video data.

Further, the STB 32 is provided therein with a common memory 210 temporarily storing video data converted by the resolution converters 205 and 209, a memory controller 211 controlling the common memory 210, a parent device view synthesizer 212 synthesizing a plurality of views for the display 31, and a display I/F 213 converting an output signal of the parent device view synthesizer 212 into a signal for the display 31. In this embodiment, main output means is constituted by the parent device view synthesizer 212 and the display I/F 213.

Further, the STB 32 is provided therein with a graphic controller 214, an audio controller 215 dividing audio data expanded by the decoder 204 or 208 among the parent device and the child device, a format converter 216 converting video data into video data matching the view size of the child device, an audio/video Mix unit 217 synthesizing audio data divided by the audio controller 215 and video data converted by the format converter 216, a wireless I/F 218 converting data synthesized by the audio/video Mix unit into a signal to be transmitted to the child device, and a transmitter 219 transmitting data to the child device. In this embodiment, sub-output means is constituted by the format converter 216 and the wireless I/F 218.

Further, the STB 32 is provided therein with a microprocessor (hereinafter referred to as MPU) 220 controlling the entire STB 32, a ROM 221 storing preformed video data, a RAM 222 temporarily storing various data in the STB 32, a card interface 223, and a remote control receiver 225 receiving a signal from the remote control 33. Information in the smart card 224 having the ID number and the like of the STB 32 incorporated therein is read from the card interface (card I/F) 223.

In the STB 32 configured as described above, a stream of MPEG 2 received by the BS/CS digital tuner 201 is descrambled by the descramble IC 202, and divided into a picture, audio and added data by the demultiplexer 203, and the picture and the audio are decoded by the decoder 204. For the broadcast radio wave received by the ground wave tuner 206 and the regenerated picture from the VTR 34 connected to the STB 32, a signal output from the switch circuit 207 to the NTSC decoder 208 is switched by an input signal from the remote control 33, and decoded by the NTSC decoder 208.

Data of the picture decoded by the decoder 204 or 208 has its resolution converted by the resolution converter 205 or 209, respectively, and is temporarily stored in the common memory 210 through the memory controller 211. Video data for OSD is previously stored in the ROM 220, the picture stored in the common memory 210 and the picture for OSD are synthesized by the view synthesizer 212 as appropriate, and the synthesized picture is output to the display 31 through the display I/F 213.

Furthermore, for the audio data decoded by the decoder 204 or 208, audio data matching the picture output to the display 31 by the audio controller 215 is selected by the MPU 220, sent to the display 31 and output.

Furthermore, the added data such as an electronic program table and program information is separated by the demultiplexer 203, stored in the RAM 222, analyzed by the MPU 220, and displayed on the view through the graphic controller 214 as appropriate.

The video data designated by the remote control 33 from video data stored in the common memory 210 becomes optimized video data on the view of the child device through the format converter 216, and the video data is synthesized with audio data sent from the audio controller by the audio/video Mix unit 217, and converted into a signal for transmission by the wireless I/F 218. The converted data is transmitted from the transmitter 219 to the child device. The method for transmission to the child device is not limited to a wireless transmission method, but may be a wired transmission method.

Figure 21:
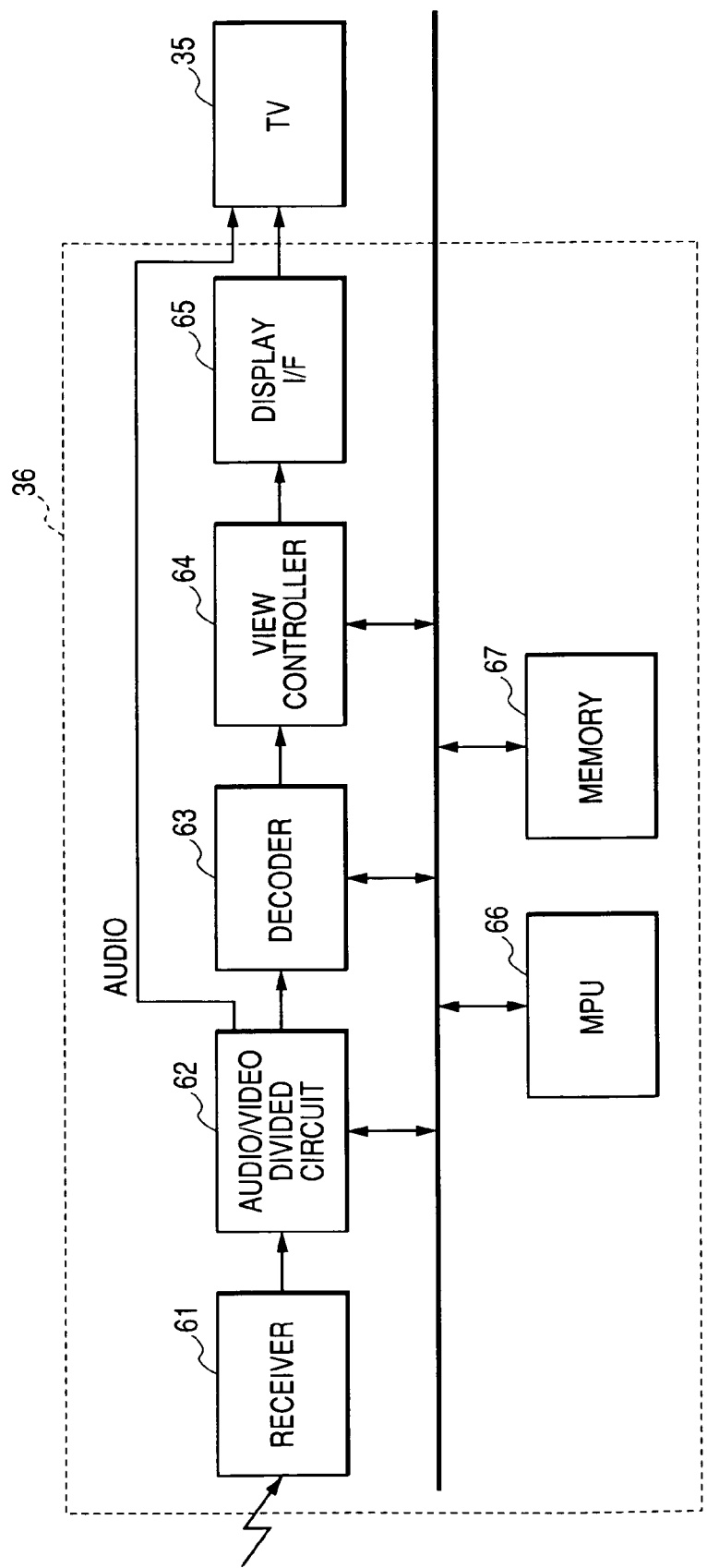
FIG. 21 is a block diagram showing the outlined configuration of a converter 36.

FIG. 21 is a block diagram showing the outlined configuration of the converter 36. The converter 36 is provided with a receiver receiving a signal transmitted from the STB 32 constituting the parent device, an audio/video divide circuit 62 dividing synthesized video data and audio data, a decoder 63 decoding divided video data from each other, a view controller 64 controlling decoded video data, a display I/F 65 converting data into a signal for display, an MPU 66 controlling the entire converter 36, and a memory 67 temporarily storing video data and the like.

In the converter 36 configured as described above, the receiver 61 receives a signal transmitted from the STB 32, and the audio/video divide circuit 62 divides video data and audio data from each other. Audio data is sent to the TV receiver set 35 connected to the converter 36, and output. Video data is decoded by the decoder 63, and converted into a signal for display at the display I/F 65 through the view controller 64. The converted video data is output to the TV receiver set 35.

Figure 22:
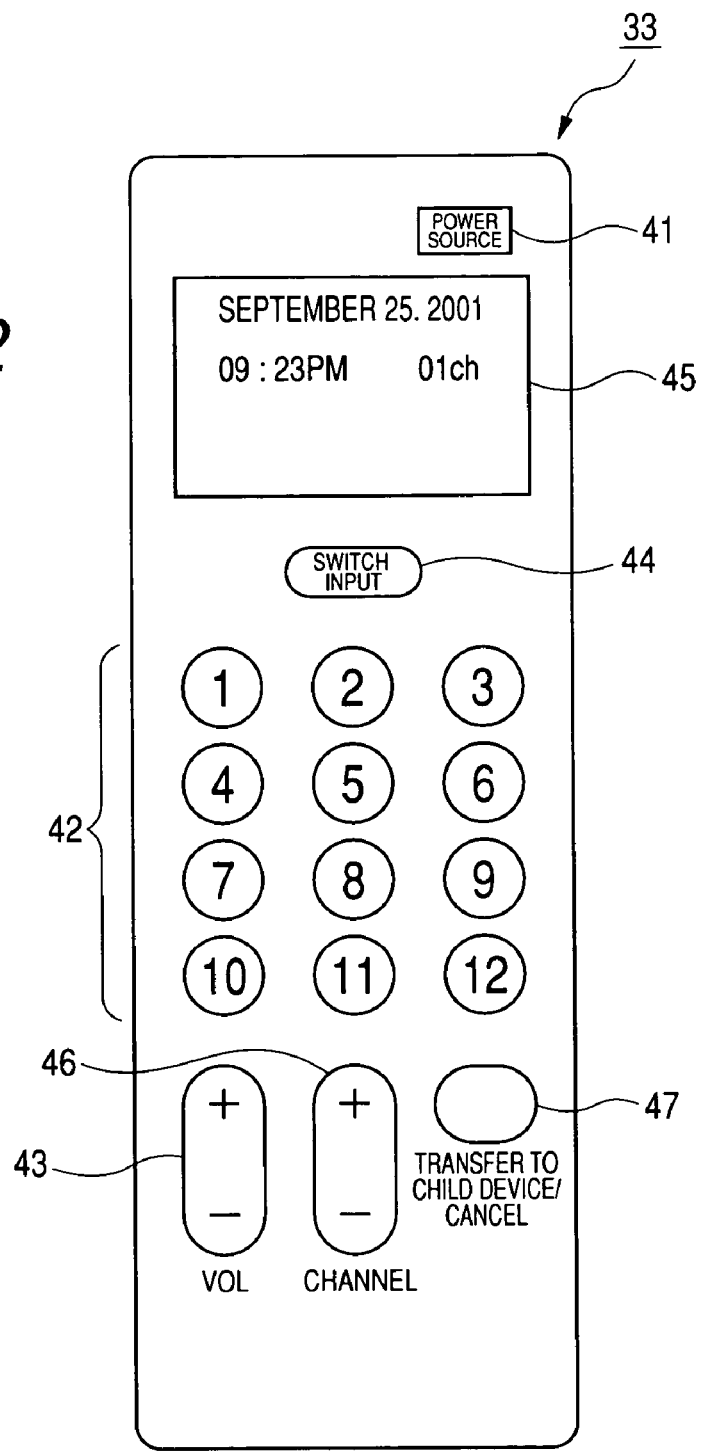
FIG. 22 shows one example of the exterior appearance of a remote control 33 in the third embodiment of the present invention.

FIG. 22 shows one example of the exterior appearance of the remote control 33. The remote control 33 is provided with a power source button 41 for controlling ON/OFF of the power source of the STB 32, 12 selection buttons 42 for selecting channels of the STB 32, an audio volume adjustment button 43, an input switch button 44 switching between the ground wave broadcast and the BS/CS digital broadcast and external input, a display 45 constituted by a liquid crystal display, LED or the like displaying the date and time and the number of a channel being received, a channel switch button 46 switching between channels one after another, and a button of transferring to the child device/cancellation 47 selecting start of transfer to the converter 36/cancel. In the remote control 33, the input source is sequentially switched from the ground wave to BS/CS digital to external input to ground wave . . . when the input switch button 44 is depressed.

When the remote control 33 is used to select a channel, a desired input source is selected through the tuner or external input using the input switch button 44, and then any one of selection buttons 42 is depressed, or the channel switch button 46 is depressed. When data is transferred to the child device, a program desired to be transferred or external input is selected, and then the button of transferring to the child device/cancellation 47 is depressed. If the button of transferring to the child device/cancellation 47 is depressed while data is being transferred to the child device, transfer is canceled.

Figure 23:
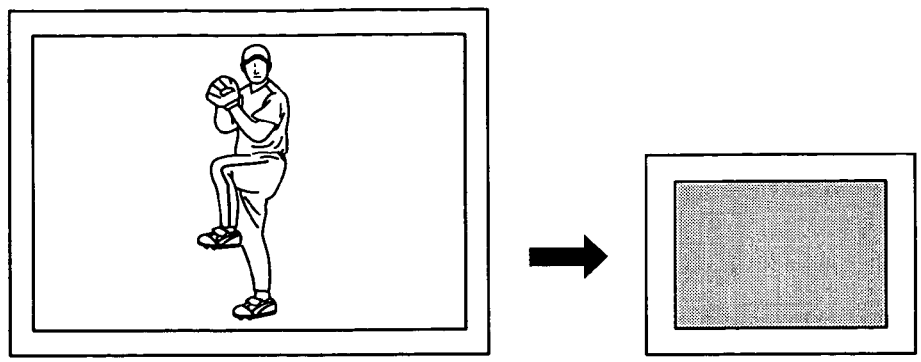
FIG. 23 shows an example of views of a display 31 and a TV receiver set 35 in the third embodiment of the present invention.

FIGS. 23 to 25 each show an example of the view of the display 31 and the TV receiver set 35 in the third embodiment of the present invention. In FIGS. 23 to 25, the larger view (left side) represents the view of the display 31, and the smaller view (right side) represents the view of the TV receiver set 35.

FIG. 23 shows a state before video data is transferred to the child device, in which the picture is displayed only on the view of the display 31 constituting the parent device, and no picture is displayed on the view of the TV receiver set 35 constituting the child device.

Figure 24A:
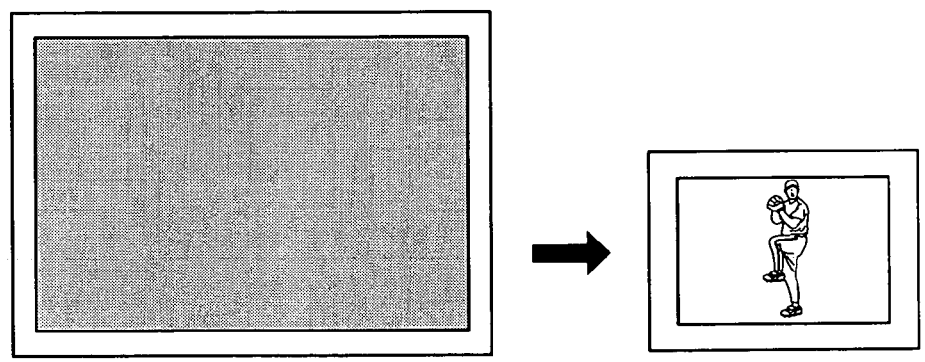
FIGS. 24A and 24B show examples of views of a display 31 and a TV receiver set 35 in the third embodiment of the present invention.

FIG. 24A shows a state in which identical pictures are not displayed at the parent device and the child device, wherein the picture displayed on the display 31 is transferred to the child device and in particular, a video source identical to that of the child device is selected on the parent device side during transferring to the child device. More specifically, a picture being transferred is displayed on the view of the TV receiver set 35 on the child device side, and a plain color (e.g., black) or the like is displayed on the display 31 on the parent device side.

Figure 24B:
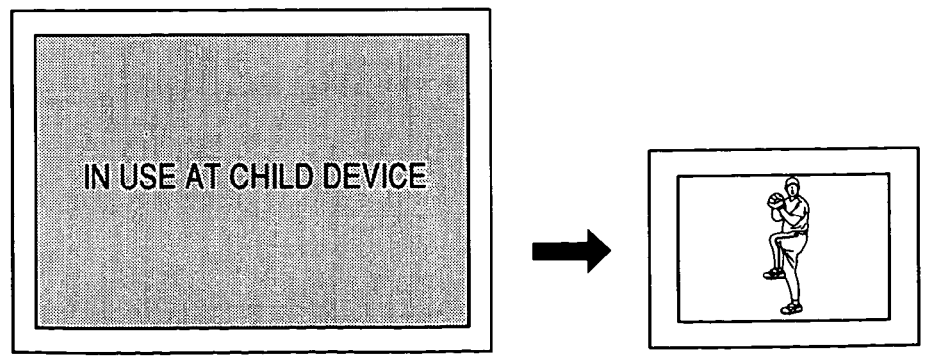

FIG. 24B shows a state same as that of FIG. 24A except that a guide of "In Use At Child Device" is displayed on the display 31 on the parent device side. More specifically, a picture a picture being transferred is displayed on the view of the TV receiver set 35 on the child device side, and a presentation of the state of the child device is displayed in a plane color (e.g. black) background on the display 31 on the parent device side with the presentation synthesized with the background as OSD. This presentation is not limited to the example described previously.

Figure 25A:
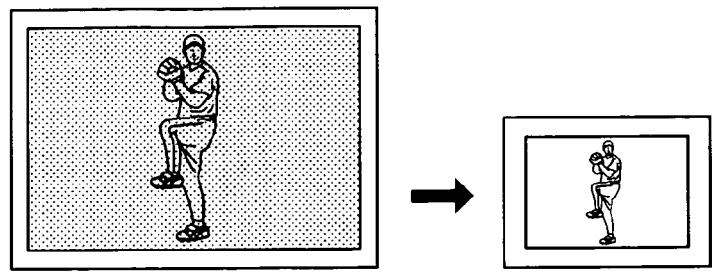
FIGS. 25A, 25B, 25C, 25D and 25E show examples of views of a display 31 and a TV receiver set 35 in the third embodiment of the present invention.

FIG. 25A shows a state when identical pictures are displayed at the parent device and the child device, and a video source identical to that of the child device is selected on the parent device side during transferring to the child device. More specifically, video data identical to the video data transferred to the child device is displayed on the display 31 in a normal size and in half gray. The half gray display may be realized by providing display with the luminance of the original picture reduced, or the plane color gray view may be realized by alpha synthesis expressed by the formula 1 described above.

Figure 25B:
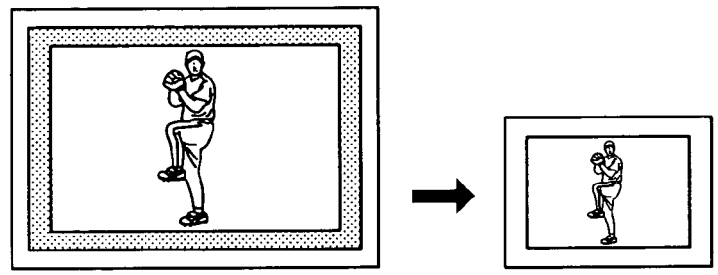

FIG. 25B shows a state same as that of FIG. 25A except that a picture identical to the picture at the child device is displayed on the display 31 on the parent device side in an original color and in a normal size, and plane color frames are displayed around the picture in a layered manner. Display of the frames is realized by, for example, layering frame pictures as OSD.

Figure 25C:
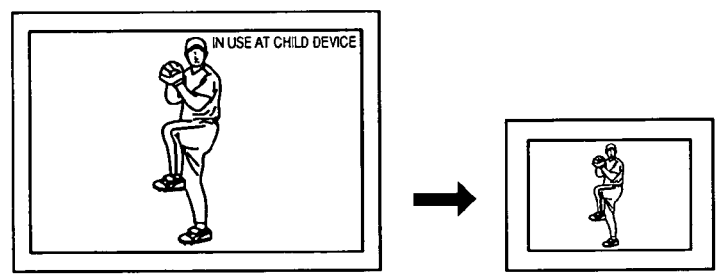

FIG. 25C shows a state same as that of FIG. 25A except that a picture identical to the picture at the child device is displayed on the display 31 on the parent device side in an original color and in a normal size, and a guide of "In Use At Child Device" is displayed as OSD in part of the picture.

Figure 25D:
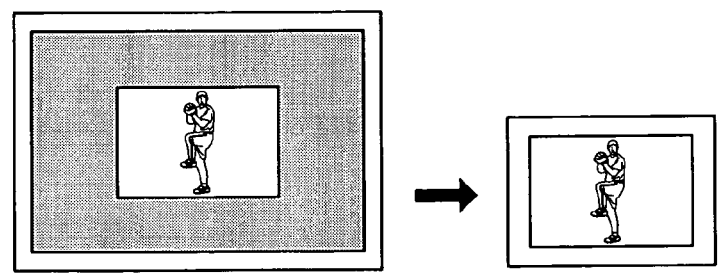

FIG. 25D shows a state same as that of FIG. 25A except that a picture identical to the picture at the child device is displayed on the display 31 on the parent device side in an original color and in a reduced size, and plane color pictures, are displayed around the picture as a background in a layered manner. The display is realized by, for example, layering background pictures as OSD.

Figure 25E:
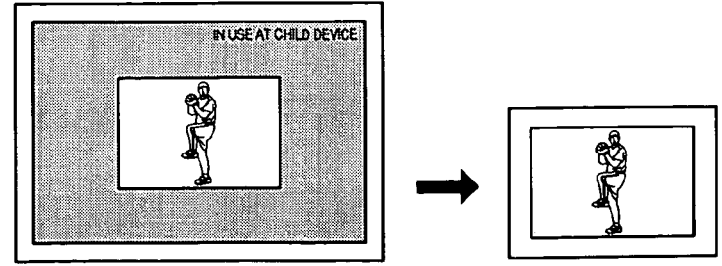

FIG. 25E shows a state same as that of FIG. 25A except that a picture identical to the picture at the child device is displayed on the display 31 on the parent device side in an original color and in a reduced size, and plane color pictures are displayed around the picture as a background in a layered manner. Moreover, unlike FIG. 23G, a guide of "In Use At Child Device" is displayed as OSD in the background.

Figure 26:
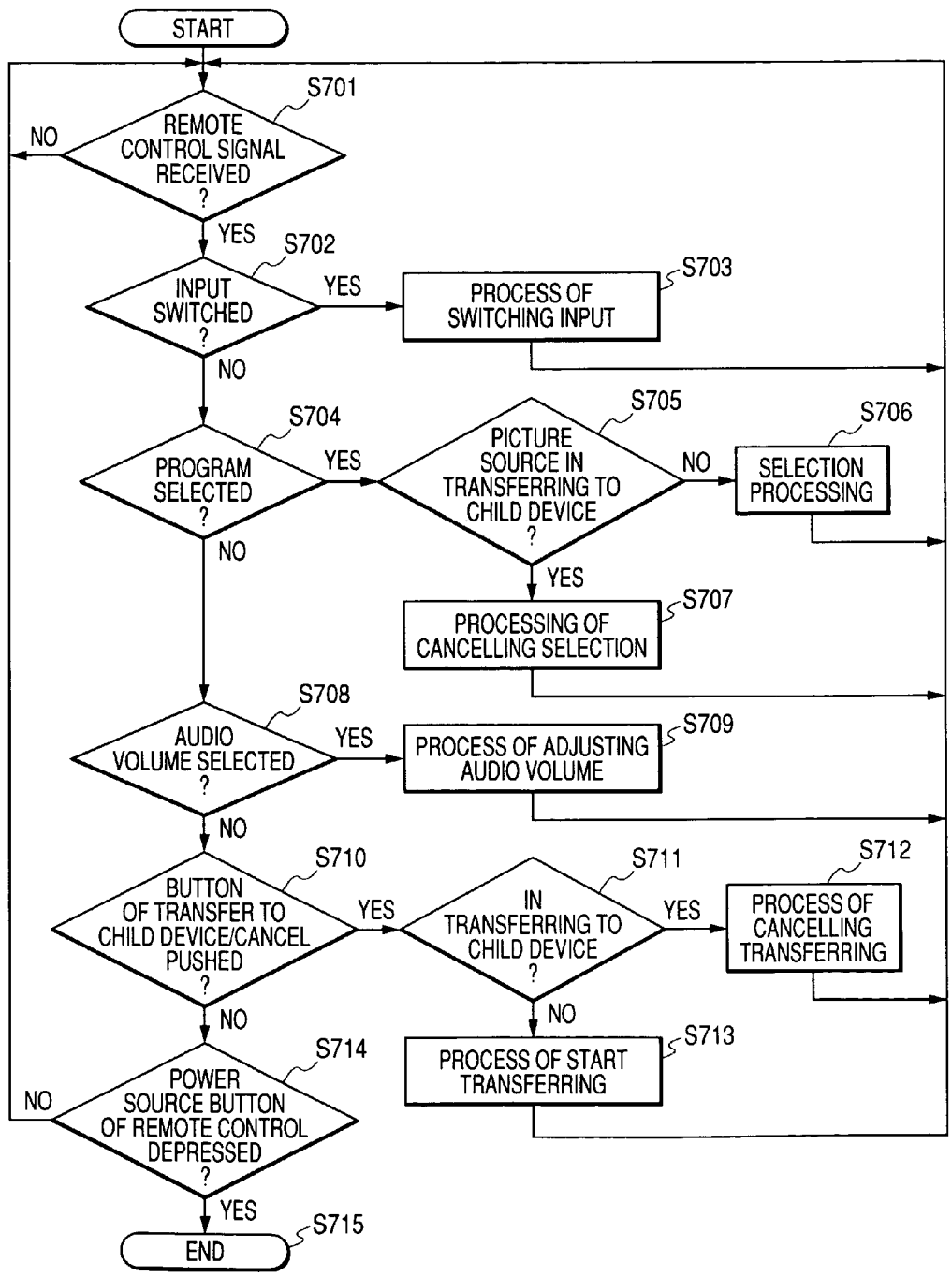
FIG. 26 is a flowchart showing the operation of the STB 32 in the third embodiment of the present invention.

The operation of the STB 32 will now be described. FIG. 26 is a flowchart showing the operation of the STB 32 in the third embodiment of the present invention.

At step S601, the powered STB 32 determines whether a signal from the remote control 33 has been received or not. If the signal from the remote control 33 has been received, whether the signal indicates switch of input is determined at step S602. If the signal indicates switch of input, process of switching input is performed immediately at step S603, and process returns to step S601.

If the signal from remote control 33 does not indicate switch of input at step S602, whether it indicates selection of a program is determined at step S604.

If the signal indicates selection of a program at step S604, whether the selected video source is the video source being transferred to the child device (converter 36) or not is determined at step S605. If it is not the video source being transferred to the child device, process proceeds to step S606, where selection process is performed, and process returns to step S601.

If it is determined at step S605 that it is the video source being transferred to the child device, selection process is canceled, and display shown in any one of FIGS. 24A and 24B and FIG. 25A to 25B at step S607, and process returns to step S601.

Furthermore, if the signal from the remote control 33 does not indicate selection of a program at step S604, process proceeds to step S608, where whether the signal indicates adjustment of audio volume or not is determined. If the signal indicates adjustment of audio volume, process of adjusting audio volume is performed immediately at step S609, and process returns to step S601.

If the signal does not indicate adjustment of audio volume at step S608, whether the button of transferring to the child device/cancellation has been depressed or not is determined at step S610. If it is determined that the button of transferring to the child device/cancellation has been depressed, whether the STB 32 is in transferring to the child device or not is determined at step S611. If it is in transferring to the child device, process of canceling transferring is performed immediately, and process returns to step S601.

If the STB 32 is not in transferring to the child device at step S611, process of transferring the picture displayed at the parent device at this time is started immediately at step S613, and process returns to step S601.

It is not determined that the button of transferring to the child device/cancellation has been depressed at step S610, whether the power source button of the remote control 33 has been depressed or not is determined at step S614. If it is determined the power source button of the remote control 33 has been depressed, process of ending of the STB 32 is performed immediately, and the power source of the STB 32 itself is turned off at step S615. If it is determined at step S614 that the power source button has not been depressed, process returns to step S601.

Fourth Embodiment

The fourth embodiment of the present invention will now be described. In contrast to the third embodiment, the fourth embodiment is a TV system where a display capable of providing multi view display is used as a display on the parent device side like the first and second embodiments. That is, a display capable of displaying video data for multi view display for displaying on a display in a window form video data from a plurality of video sources (e.g., input pictures from tuners and external devices) synthesized by the parent device view synthesizer 212 of the STB 32 is used as the display 31. One of the video sources is transferred to the child device in the fourth embodiment. In the description about the fourth embodiment, components same as those of the third embodiment are given like symbols, and detailed descriptions thereof are not presented.

Figure 27:
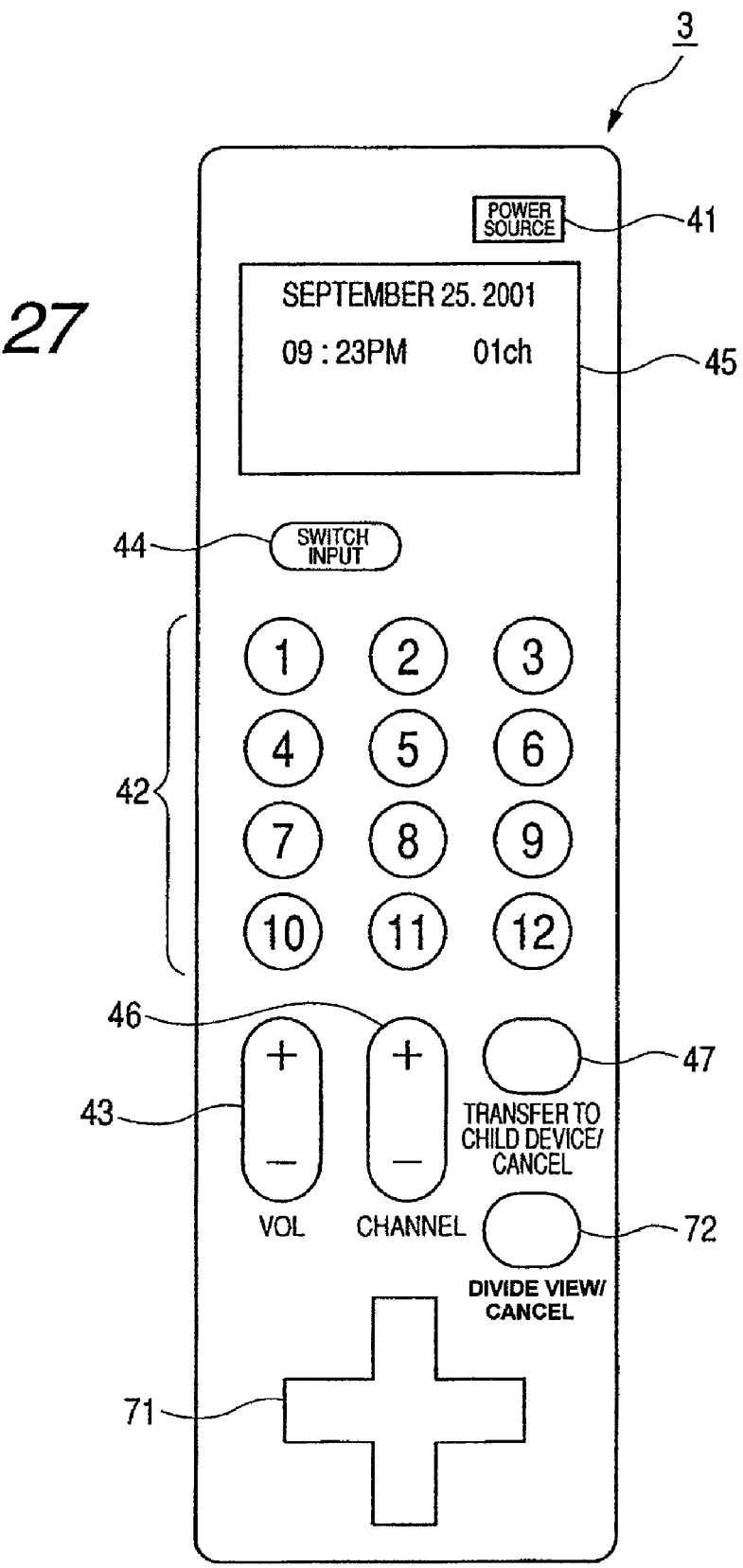
FIG. 27 shows one example of the exterior appearance of the remote control 33 in the fourth embodiment of the present invention.

FIG. 27 shows one example of the exterior appearance of the remote control 33 in the fourth embodiment of the present invention. Unlike the third embodiment, the remote control 33 is further provided with a window divide/cancel button 71 and a cross key 72 for selection of window.

If the window divide/cancel button 71 is depressed, display of the view of the display 31 is sequentially switched from multi-window display to single view display to multi-window display to Specifically, for example, the main view M, the sub view S1 and the sub view S2 are displayed separately as shown in FIG. 28A in the case of multi-window display, and only the main view M is displayed as shown in FIG. 28B in the case of single view.

Furthermore, if a key in any one of up-and-down and left-and-right directions constituting the cross key 72 is depressed in the case of multi-window display shown in FIG. 28A, a window selection frame for notifying the user that the view is in a state allowing operations of program selection and the like appears on the main view M as shown in FIG. 28C, and if a key of the cross key 48 in any one of the directions is further depressed, the window frame moves according to the direction indicated by the depressed key as shown FIG. 28D and 28E.

The method for notifying the user of a view that can be operated is not limited to the method of displaying a selection frame, but a small mark, e.g., a black circle mark, may be displayed to notify the user, any mark may be used as long as it can be recognized by the user, and particularly preferable is a mark that is easily recognizable.

FIGS. 29 to 31A through 31C each show an example of the display 31 and the TV receiver set 31 in the fourth embodiment of the present invention. In FIGS. 29 to 31A through 31C, the larger view (left side) represents the view of the display 31, and the smaller view (right view) represents the view of the TV receiver set 35. Furthermore, in this case, the main view M is arranged at the right, and the sub view S1 and the sub view S2 are arranged vertically at the left, but the number of sub views and arrangement are not limited to this example.

Figure 29:
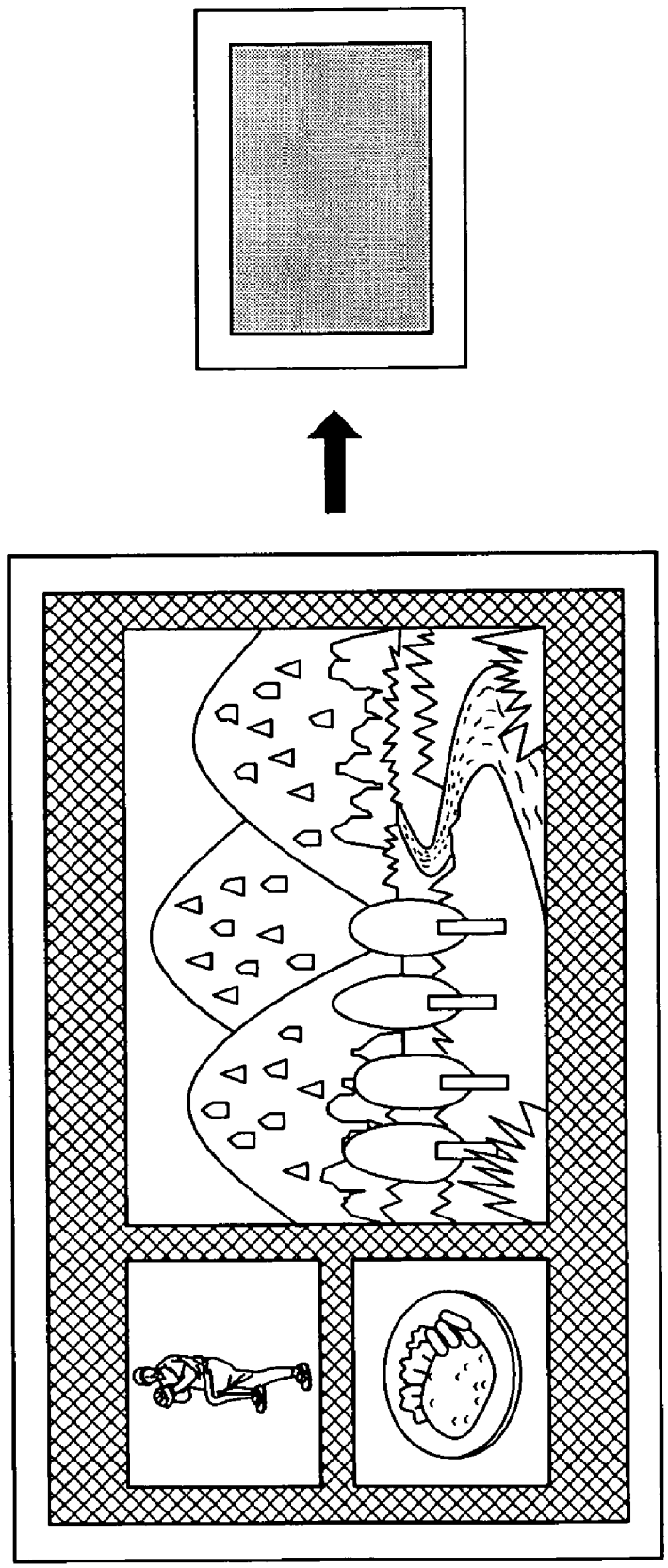
FIG. 29 shows an example of views of the display 31 and the TV receiver set 35 in the fourth embodiment of the present invention.

FIG. 29 shows a state before video data is transferred to the child device, in which the picture is displayed in multi view display only on the view of the display 31 constituting the parent device, and no picture is displayed on the view of the TV receiver set 35 constituting the child device.

Figure 30A:
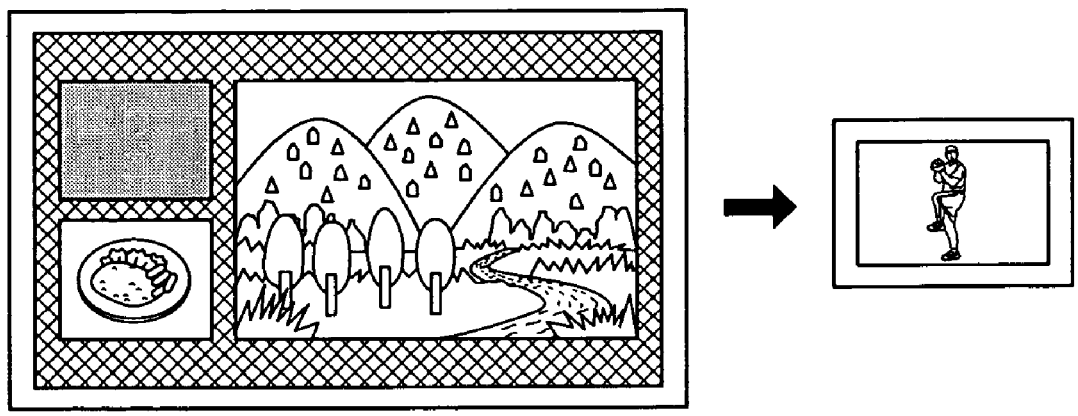
FIGS. 30A and 30B show examples of views of the display 31 and the TV receiver set 35 in the fourth embodiment of the present invention.

FIG. 30A shows a state in which identical pictures are not displayed at the parent device and the child device, wherein the picture displayed on the sub view 1 is transferred to the child device. More specifically, a picture being transferred is displayed on the view of the TV receiver set 35 on the child device side, and a plain color (e.g. black) or the like is displayed on the sub-view of the display 31 on the parent device side.

Figure 30B:
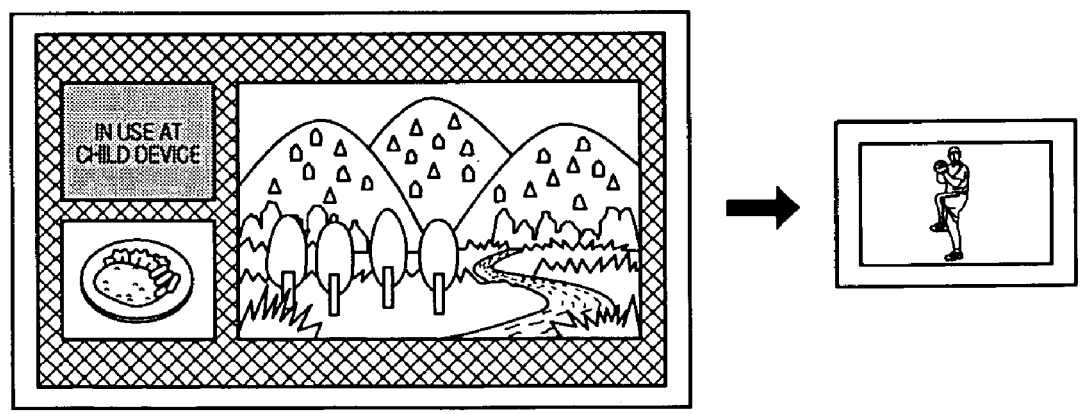

FIG. 30B shows a state same as that of FIG. 30A except that a guide of "In Use At Child Device" is displayed on the sub view S1 of the display 31. More specifically, a picture being transferred is displayed on the view of the TV receiver set 35 on the child device side, and a presentation of the state of the child device is displayed in a plane color (e.g. black) background on the sub view S1 of the display 31 with the presentation synthesized with the background as OSD. This presentation is not limited to the example described previously.

Figure 31A:
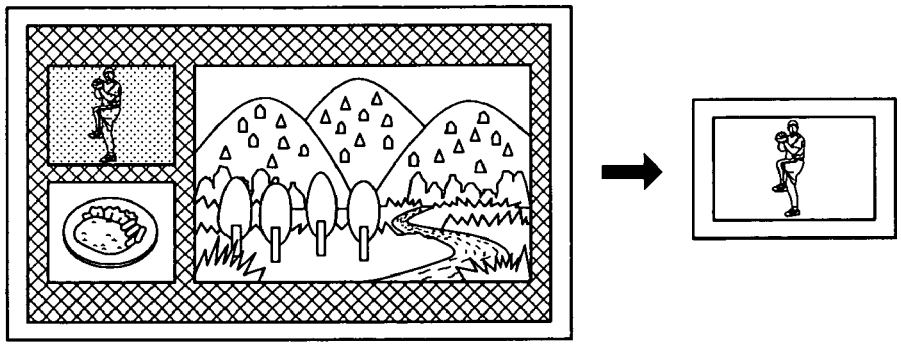
FIGS. 31A, 31B and 31C show examples of views of the display 31 and the TV receiver set 35 in the fourth embodiment of the present invention.

FIG. 31A shows a state in which identical pictures are not displayed at the parent device and the child device, wherein the picture displayed on the display 31 is transferred to the child device and in particular, a video source identical to that of the child device is selected on the parent device side during transferring to the child device. More specifically, video data identical to the video data transferred to the child device is displayed on the sub view S1 of the display 31 in a normal size and in half gray. The half gray may be realized by providing display with the luminance of the original picture on the sub view S1 reduced, or the plane color gray view may be realized by alpha synthesis expressed by the formula 1 described above as in the case of the third embodiment.

Figure 31B:
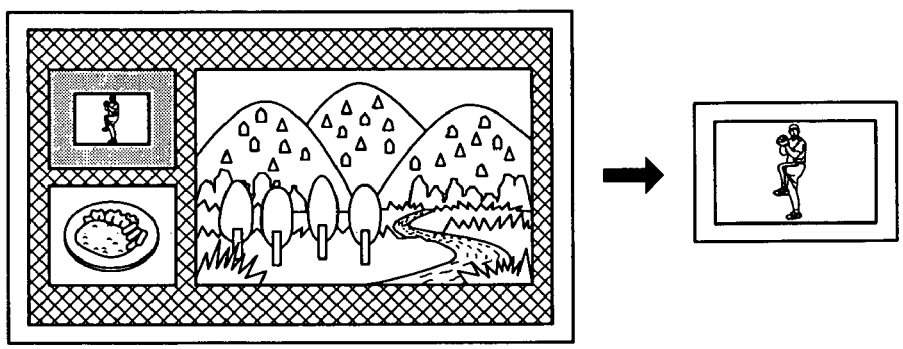

FIG. 31B shows a state same as that of FIG. 31A except that a picture identical to the picture at the child device is displayed on the sub view of the display 31 on the parent device side in an original color and in a reduced size, and plane color pictures are displayed around the picture as a background in a layered manner. The display is realized by, for example, layering background pictures as OSD.

Figure 31C:
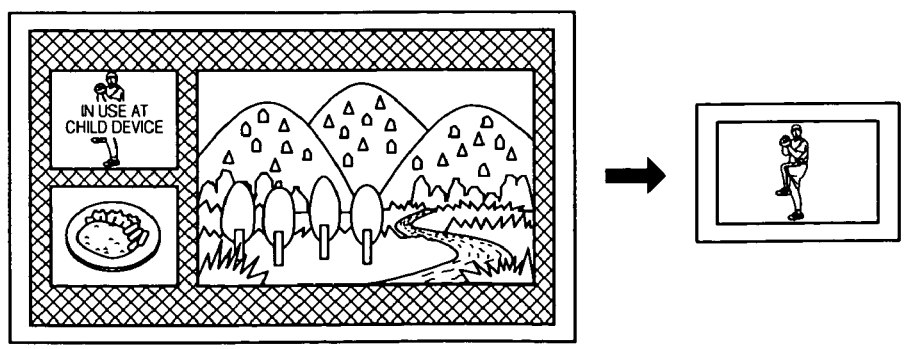

FIG. 31C shows a state same as that of FIG. 31A except that a picture identical to the picture at the child device is displayed on the sub view of the display 31 on the parent device side in an original color and in a normal size, and a guide of "In Use At Child Device" is displayed as OSD in part of the picture. This presentation is not limited to the example described previously.

Figures 32, 32A:
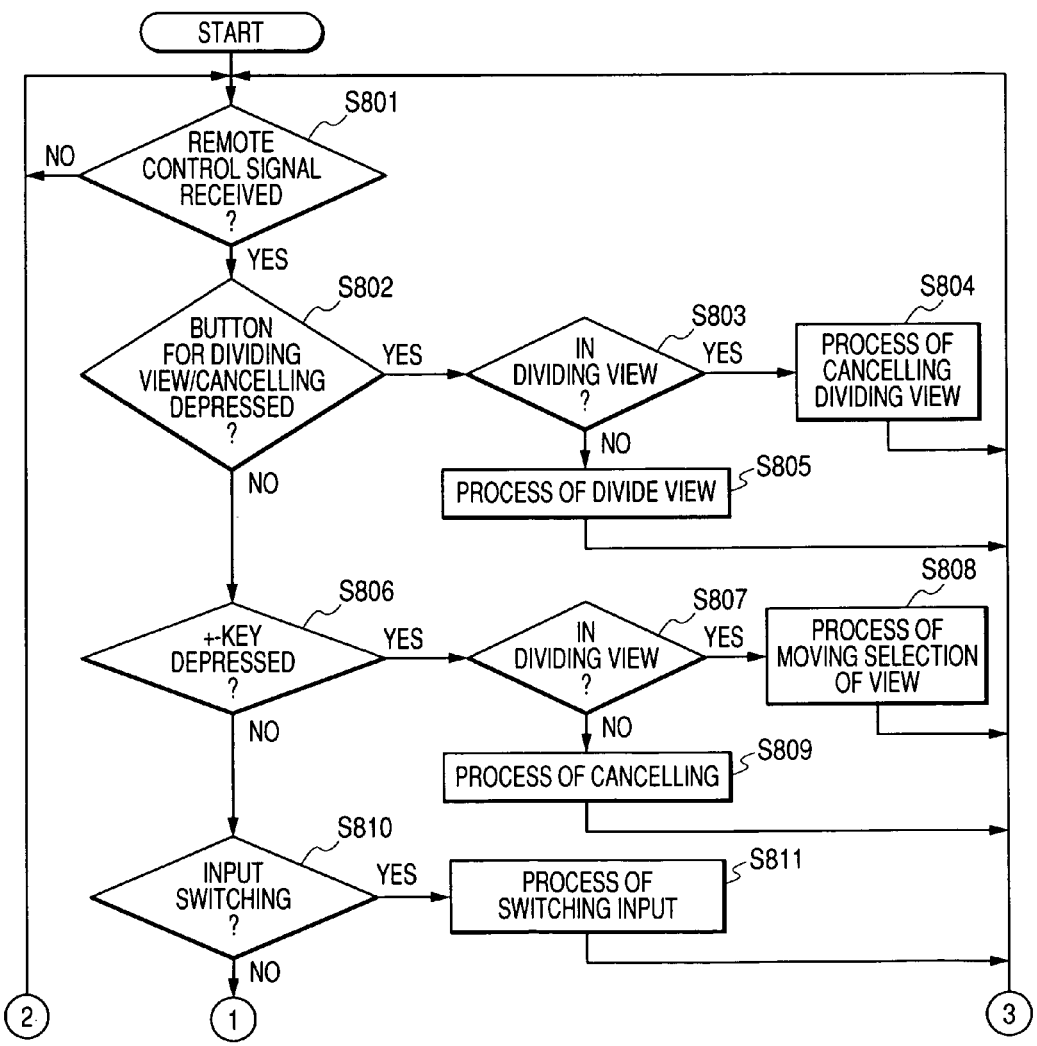
FIG. 32 is comprised of FIGS. 32A and 32B which are flowcharts showing the operation of the STB 32 in the fourth embodiment of the present invention.
Figure 32B:
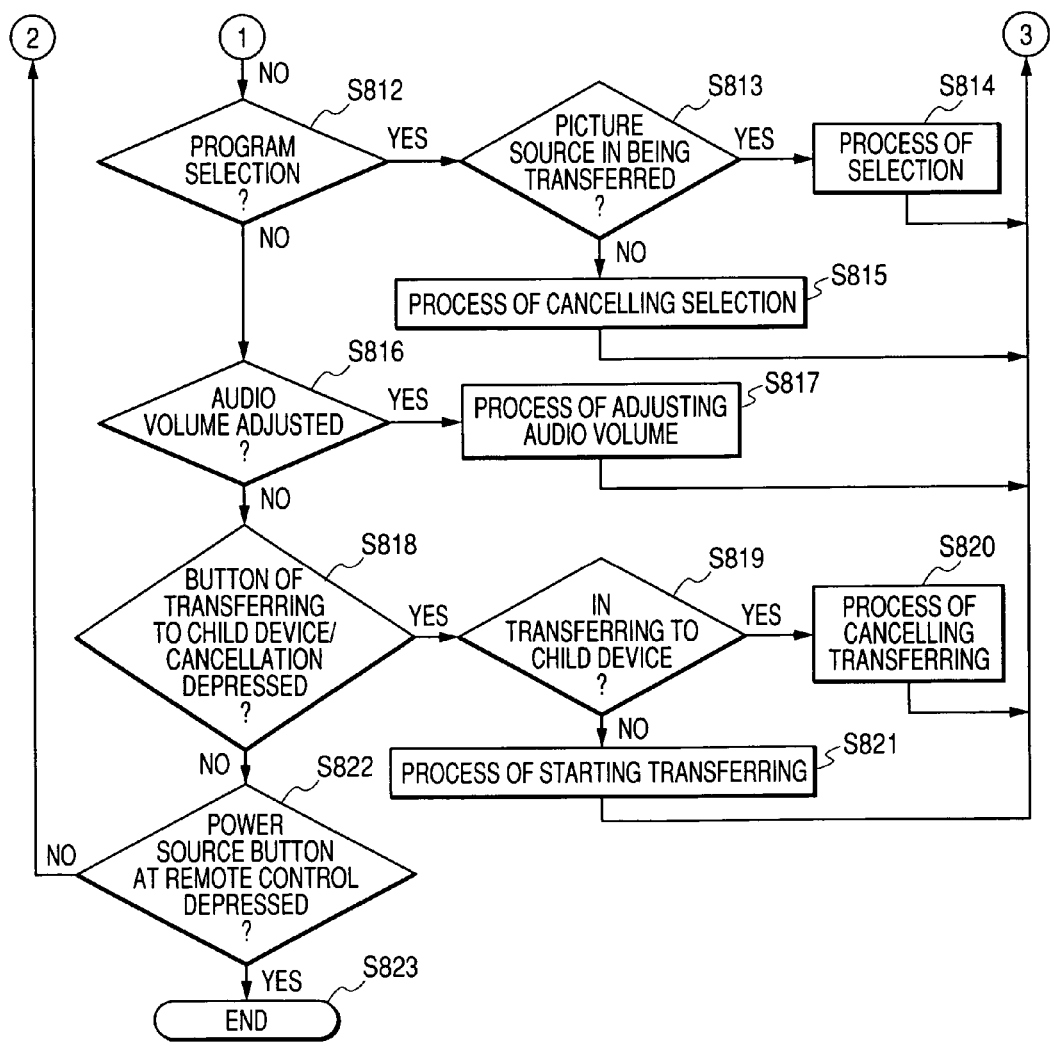

The operation of the STB 32 will now be described. FIGS. 32A and 32B are flowcharts showing the operation of the STB 32 in the fourth embodiment of the present invention.

At step S901, the powered STB 32 determines whether a signal from the remote control 33 has been received or not. If the signal from the remote control 33 has been received, whether the signal indicates that a button for dividing view/canceling 72 has been depressed or not is determined at step S902. If it is determined that the button for dividing view/canceling 72 has been depressed, whether a view currently displayed is being divided or not is determined at step S903. If the view is being divided, process of canceling dividing a view is performed immediately at step S904, and process returns to step S901. If the view is not being divided at step S903, process of dividing a view is performed at step S905, and process returns to step S901.

If it is determined at step S902 that the button for dividing view/canceling 72 has not been depressed, whether the cross key 71 has been depressed or not is determined at step S906. If it is determined that the cross key 71 has been depressed, whether the view is being divided or not is determined at step S907. If it is determined that the view is being divided, process of moving selection of view is performed at step S908, and process returns to step S901. If the view is not being divided at step S907, indication of operation of the cross key 71 is cancelled, and process returns to step S901.

If it is determined at step S906 that the cross key 71 has not been depressed, whether switch of input is indicated or not is determined at step S910, and if switch of input is indicated, process of switching input is performed immediately at step S911, and process returns to step S901. If it is determined at step S910 that a signal from the remote control 33 does not indicate switching of input, whether the signal indicates program selection or not is determined at step S912.

If the signal indicates program selection at step S912, whether the selected video source is the video source of a picture being transferred to the child device (converter 36) or not is determined at step S913. If it is not the video source being transferred to the child device, process proceeds to step S914, where a process of program selection is performed, and process returns to step S601. If it is determined that it is the video source being transferred to the child device at step S913, process of program selection is canceled at step S915, display shown in any one of FIGS. 30A and 30B and FIGS. 31A to 31C is provided, and process returns to step S901.

If the signal from the remote control 33 does not indicate program selection at step S912, process proceeds to step S916, where whether the signal indicates adjustment of audio volume or not is determined. If the signal indicates adjustment of audio volume, process of adjusting audio volume is performed immediately at step S917, and process returns to step S901.

If the signal does not indicate adjustment of audio volume at step S916, whether a button of transferring to the child device/cancellation has been depressed or not is determined at step S918. If it is determined that the button of transferring to the child device/cancellation has been depressed, whether the STB 32 is in transferring to the child device or not is determined at step S919. If it is in transferring to the child device, process of canceling transferring is performed immediately, and process returns to step S901.

If the STB 32 is not in transferring to the child device at step S919, process of transferring a picture displayed on the view selected at the parent device at this time is performed immediately at step S921, and process returns to step S901.

It is not determined that the button of transferring to the child device/cancellation has been depressed at step S918, whether the power source button of the remote control 33 has been depressed or not is determined at step S922. If it is determined the power source button of the remote control 33 has been depressed, process of ending of the STB 32 is performed immediately, and the power source of the STB 32 itself is turned off at step S923. If it is determined at step S922 that the power source button has not been depressed, process returns to step S901.

The STB 32 may be included in a housing of the display 31, and the converter 36 may be included in the TV receiver set 35. Further, three or more tuners may be mounted in the STB 32, and a recording device such as HDD may be included in the STB. Moreover, as an input device from outside, a device connectable to a general TV receiver set, such as a DVD or digital video camera, may be used other than the VTR 34.

Fifth Embodiment

The fifth embodiment of the present invention will now be described. FIG. 33 is a block diagram showing the configuration of a parent device of a TV system according to the fifth embodiment of the present invention. Components same as those of the first embodiment are given like symbols, and detailed descriptions thereof are not presented.

In this embodiment, a video switch 30 is provided between video decoders 5a to 5c and resolution converters 7a to 7c. The video switch 30 is constituted by, for example, input source switches 30a to 30c of the second embodiment. The video switch 30 functions as a circuit of switching a data path intended for switching three independent video data output from the video decoders 5a to 5c into any of the resolution converters 7a to 7c. Switching methods include two ways of methods. For the first way of method, the video decoders 5a to 5c and the resolution converters 7a to 7c are switched and connected on a one-to-one basis (e.g. 5a and 7c, 5b and 7a, 5c and 7b, etc.). In this case, independent broadcasted video resources are connected to the resolution converters 7a to 7c. For the second way of method, the video decoders 5a to 5c and the resolution converters 7a to 7c are switched and connected on a three-to-n basis (n is 1 or 2) (e.g. 5a and 7a, 5a and 7b, 5c and 7c, etc.). In this case, the same broadcasted video resource is connected to two or more of the resolution converters 7a to 7c. Furthermore, the video switch 30 can have a role not only for switching the output destination as described previously, but also as a switch for turning off output to the resolution converters 7a to 7c.

In this embodiment, a resource mediator 51, a resource maintenance unit 52 and an OSD producer 53 are further provided. When one of broadcasted video resources encounters resource competition, the resource mediator 51 performs a mediation operation based on a predefined rule, and notifies the controller 15 of the result thereof. The resource maintenance unit 52 performs maintenance by a table method on which broadcasted video resource is used in which child device, and is referenced and renewed by the controller 15 as required. That is, for example, the contents of Tables 1 and 2 used in the description of the first embodiment are maintained by the resource maintenance unit 52.

The output synthesizers for child device 18a to 18c synthesize an OSD view such as GUI produced by the OSD producer 53 based on rendering instructions issued from the controller 15 and video data output from the resolution converters 7a to 7c, forms the same into OSD synthesized video data, and then passes the video data to compressors 9a to 9c. For synthesis at the output synthesizers for child device 18a to 18c, the OSD view may be substituted for the gray view of B in alpha synthesis expressed by formula 1. Application of this alpha synthesis enables various synthesis patterns such as only an original picture at α=0, only OSD at α=1, and alpha synthesis of the picture and OSD in other cases.

Further, in the post-stage of the compressors 9a to 9c, a multiplexer 54, a wireless transmitter 55 and a wireless antenna 56 are provided. The multiplexer 54 links compressed video data output from the compressors 9a to 9c with audio data divided by demultiplexers 4a to 4c, and performs time division multiplex in a format having added header information including an ID to be reached for transferring so that the data is easily divided at a child device to be reached for transferring. By performing such time division multiplex, a communication channel divided for each wireless carrier wave frequency can be used effectively.

Figure 34:
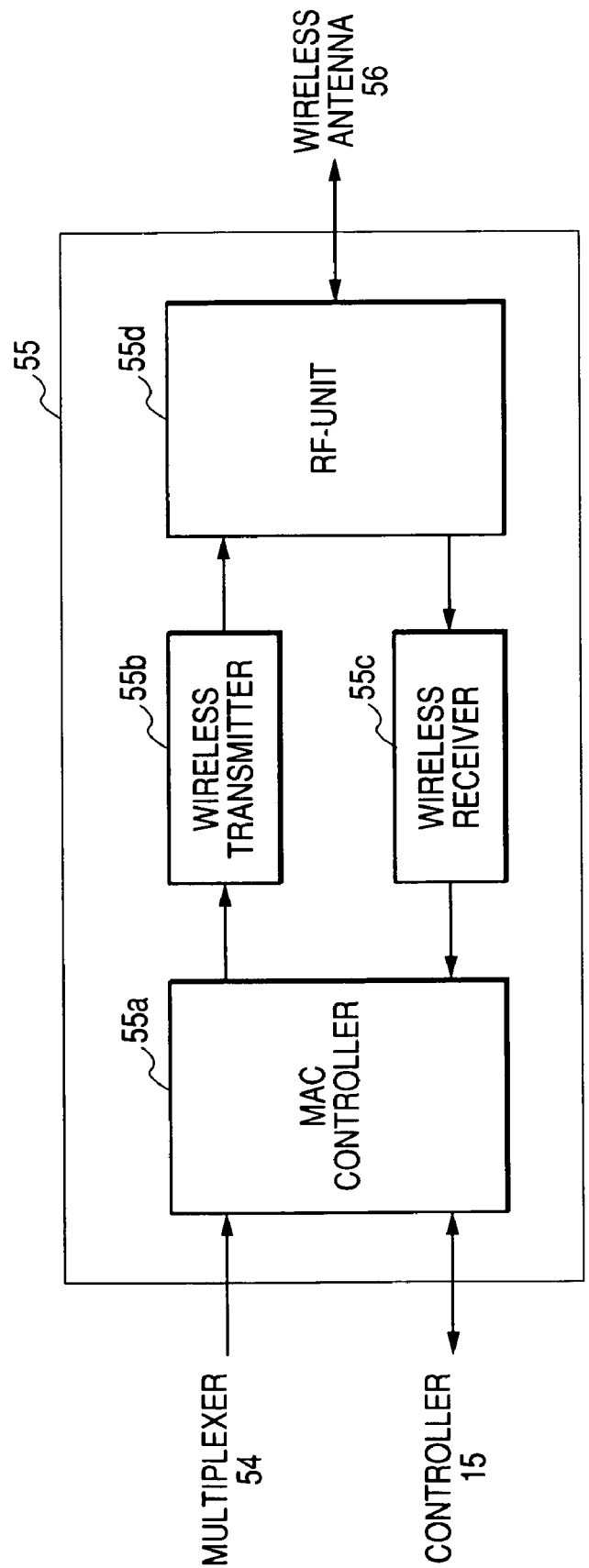
FIG. 34 is a block diagram showing the internal configuration of a wireless unit 55.

An output signal from the multiplexer 54 is passed to the wireless transmitter 55. FIG. 34 is a block diagram showing the internal configuration of the wireless transmitter 55. A MAC (Media Access Control) controller 55a is a block forming a transmission signal from a signal the multiplexer 54, compliant with a predefined communication protocol, and is defined as a common MAC layer in the case of the wireless LAN standard of IEEE 802.11a/b/g. Furthermore, the MAC controller 55a performs transmission control ensuring QoS (Quality of service) of audio/video multiplexing signals from the multiplexer 54. Thus, if a command is transmitted from a parent device to a designated child device, some contrivance, such as utilization of gaps of audio/video multiplexing signals (e.g. blanking periods of pictures, etc.), is effective. The audio/video multiplexing signal from the MAC controller 55a is subjected to coding process or the like defined by the physical layer of the wireless LAN standard at a wireless transmitter 55b, amplified in the frequency band of a channel for transmitter at an RF-unit 55, and then transmitted and output from the wireless antenna 56.

Received data such as a control command from the child device, received from the wireless antenna 56, is divided in the frequency band of α-channel for reception by a BPF (bandpass filter) at the RF-unit 55d, amplified by an LNA (low noise filter) or the like, then subjected to decoding process or the like at a wireless receiver 55c, and passed to the MAC controller 55a. The received data is converted into a signal capable of being handled by the controller at the MAC controller 55a, and passed to the parent device controller 15 as a control signal for child device. Furthermore, in the RF-unit 55d, the frequency channels for transmission and reception are divided, thus making it possible to prevent the situation in which the frequency channels interfere with each other.

They are not required if a wired connection is selected as physical transmission means between the parent device and the child device, instead of a wireless connection. For example, a D/A converter or video amplifier is provided if the connection with the child device is an analog wired connection, a TMDS, LVDS transceiver or the like is provided if the connection is a digital wired connection.

Figure 35:
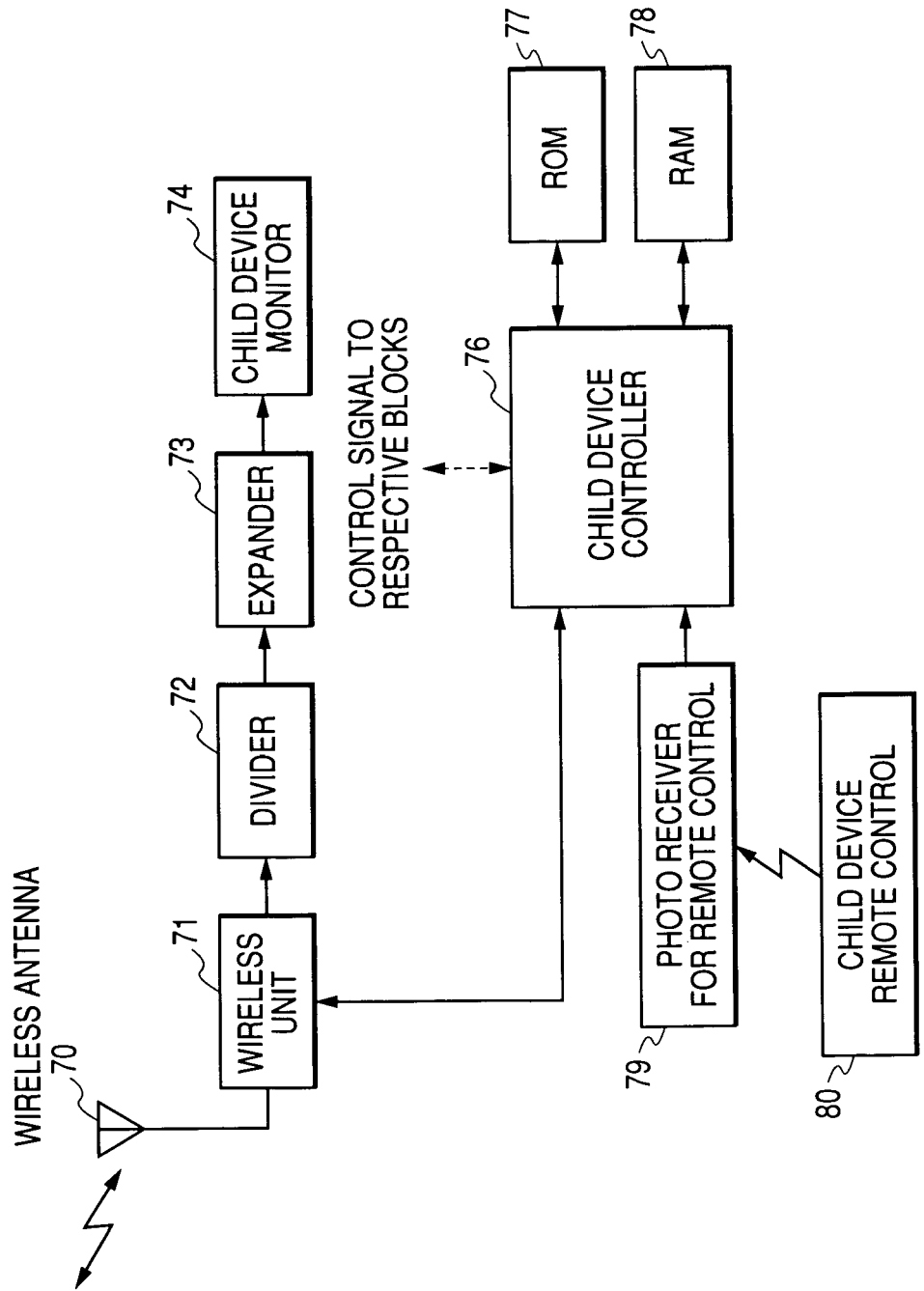
FIG. 35 is a block diagram showing the configuration of the child device of the TV system according to the fifth embodiment of the present invention.

Child devices that are used in combination with the parent device will now be described. FIG. 35 is a block diagram showing the configuration of a child device of a TV system according to the fifth embodiment of the present invention. The child device is provided with a child device controller 76 for controlling the overall child device and controlling communication of commands with the parent device. The child device controller 76 is provided with a counter (not shown) counting time, a peripheral input/output interface and the like, and a RAM 78 temporarily storing CPU data having a capability of operations, and a ROM 77 storing a control program are connected to the child device controller 76. The child device controller 76 may be comprised of a logical logic alone, or may be a CPU or media processor capable of performing parallel operations. The program for performing control may be included in the ROM 77, or may be transferred from outside via the peripheral input/output interface. Further, a photoreceiver for remote control 79 is connected to the child device controller 76, so that a command of a child device remote control 80 using infrared light can be accepted. For the child device remote control 80, not only a normal remote control but also, for example, a keyboard, mouse or joystick capable of emitting infrared light may be used.

Further, the child device is provided with a wireless antenna 70, a wireless unit 71, a divider 72, an expander 73 and a child device monitor 74. The internal configuration of the wireless unit 71 is same as that of the wireless transmitter 55.

The operation of the child device configured as described above will be described. In this description, first, the operation until audio/video data (video data and audio data) wirelessly transmitted from the parent and command data described previously is received will be described.

If the wireless antenna 70 receives a wireless signal compliant with a predetermined communication protocol, transmitted from the parent device, the signal is passed to the wireless unit 71. In the wireless unit 71, the RF-unit 55*d* therein divides a frequency band same as that of the channel for transmission of the parent by the BPF (bandpass filter), and amplifies the signal by the LNA (low noise filter) or the like. Then, the signal is subjected to decoding process or the like by the wireless receiver 55*c*, and passed to the MAC controller 55*a*, and the MAC controller 55*a* decodes multiplexed audio/video data from the parent device.

Then, only if the divider 52 recognizes the ID to which header information is transferred, and determines that it is transmission data destined for the child device, the multiplexed video data and audio data are divided. The expander 53 expands the video data divided by the divider 52, and the child device monitor 54 visualizes and displays the data.

The audio data divided by the divider 72 is expanded by an audio processor (not shown), then amplified and regenerated by a speaker.

Further, if it is determined that command data destined for the child device is included in received data from the parent device as in the case of the audio/video data described above, the MAC controller 55*a* converts the command data into a signal capable of being handled by the child device controller 15, and passes the signal to the child device controller 76.

The operation where the child device remote control 80 is operated to wirelessly transmit control information to the parent device will now be briefly described.

As described in detail later, the user operates the child device remote control 80, whereby acquirement of video resources of the parent device can be controlled. A control command of the child device remote control 80 is passed from the photoreceiver for remote control 79 to the child device controller 76. If the command is transmitted from the child device to the parent device, the child device controller 76 sends a received command signal to the MAC controller 55*a* of the wireless unit 71, and the MAC controller 55*a* similarly forms a transmission signal compliant with a predefined communication protocol. Then, the wireless transmitter 55*b* subjects the signal to coding process or the like defined by the physical layer of the wireless LAN standard, and the RF-unit 55*d* amplifies the signal in a frequency band same as that of the channel for reception of the parent device, and then transmits and outputs the signal from the wireless antenna 70. In the RF-unit 55*d*, frequency channels for transmission and reception are divided, thus making it possible to prevent the situation in which they interfere with each other.

The wireless antenna 70, the wireless unit 71, the divider 72 and the expander 73 are not required if a wired connection is selected as physical transmission means between the parent device and the child device instead of a wireless connection. For example, an LPF (ρ pass filter) or A/D converter is provided if the connection with the child device is an analog wired connection, and a TMDS, LVDS receiver or the like is provided if the connection is a digital wired connection.

In this way, this TV system has a configuration allowing one-way wireless communication of video data from the parent device to the child device and two-way wireless communication of a command between the parent device and the child device.

Furthermore, this TV system has a configuration in which wireless transmission from a plurality of child devices to one parent device may occur at a time. Thus, in the transmission of a command from the child device to the parent device as described previously, the same frequency channel is shared, and therefore at the time of transmission from each child device to the parent device, control should be performed such that data is transmitted after ensuring that no other child devices transmit data. This control is performed by the MAC controller 55*a* of the wireless unit 71 on the child device side. Such access control usually causes efficiency of wireless transferring to be lowered, but there arises no serious problem as long as QoS (Quality of Service) is not required like transmission of commands.

Figure 36:
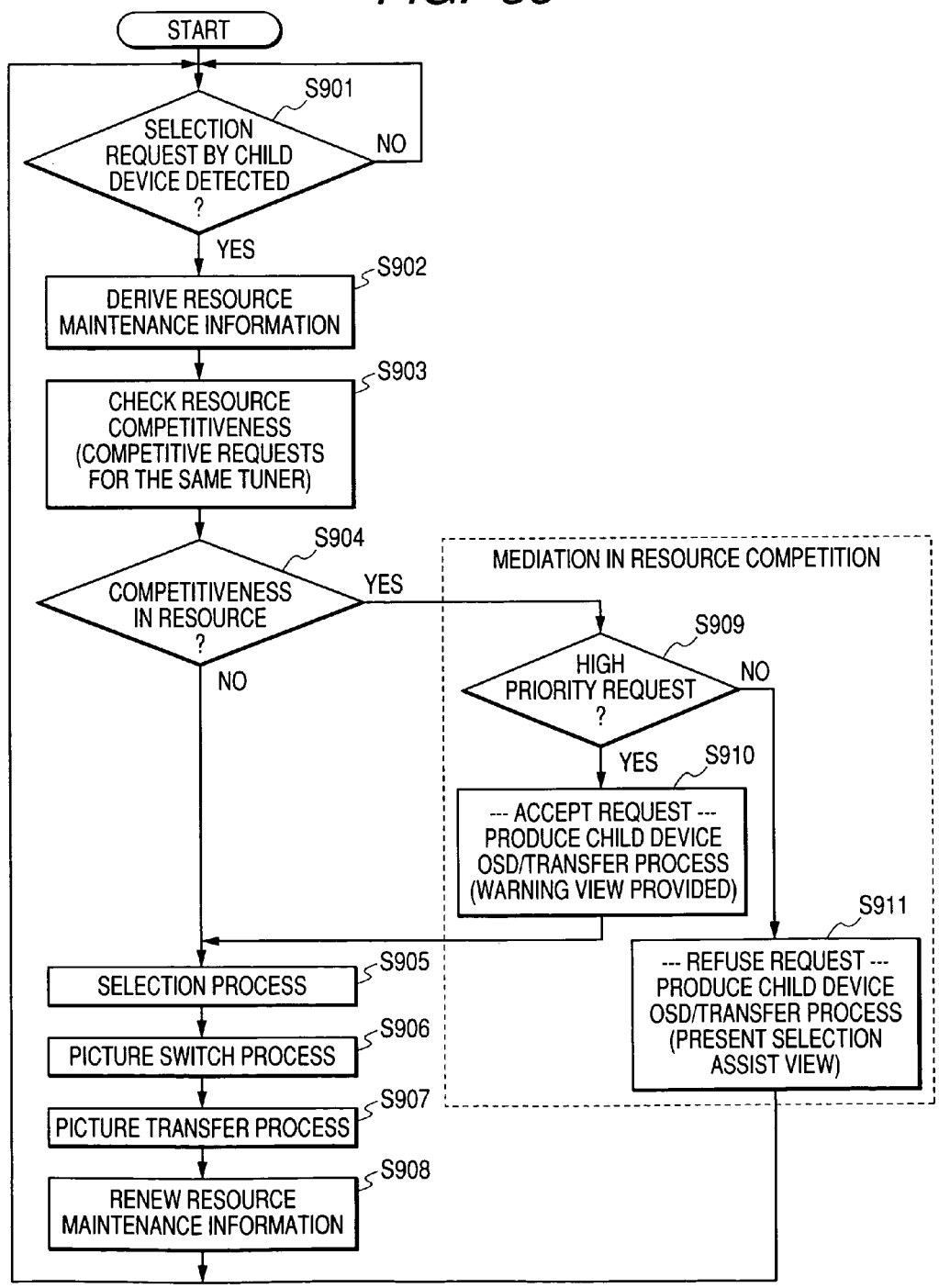
FIG. 36 is a flowchart showing the operation in process of transferring to the child device in the fifth embodiment of the present invention.

The operation of the TV system according to the fifth embodiment configured as described above will now be described. FIG. 36 is a flowchart showing the operation when process of transferring to the child device is performed in the fifth embodiment of the present invention.

Cases where resource competition occurs include cases where the types of tuners are different, and a plurality of requests are made for a resource operated by a tuner. The operation described here is to avoid such resource competition, and the types of tuners 2*a* to 2*c* are all different. For example, the tuner 2*a* is a BS digital tuner, the tuner 2*b* is a CS digital tuner, and the tuner 2*c* is a ground wave digital tuner.

Furthermore, the number of child devices connected to the parent device is three, which is equal to the number of tuners 2*a* to 2*c*, and the names of the child devices are child device A, child device B and child device C, respectively. In the parent device, the resolution converter 7*a* to compressor 9*a* is used for the child device A, the resolution converter 7*b* to compressor 9*b* is used for the child device B, and the resolution converter 7*c* to compressor 9*c* is used for the child device C as child device transmission output data paths.

(Non-Competitiveness for Resource)

First, as the case of non competitiveness for resource, the operation of the parent device will be described where the child device A uses the tuner 2*a* (BS digital tuner), the child device B uses the tuner 2*b* (CS digital tuner), and the child device C uses the tuner 2*c* (ground wave digital tuner).

If the user of the child device A operates the child device remote control 80 to select a BS digital broadcast distribution program, the photoreceiver for remote control 79 detects the request. The child device controller 76 produces, based on this request, a command having added thereto an identification ID of the child device allowing the command of the device A to be identified, determines that the wireless unit 71 is capable of transmission to the parent device, and then transmits the command to the parent device from the wireless antenna 70 of the child device A.

The transmitted command is received by the wireless antenna 56 of the parent device, reception of the command from the child device A is identified at the wireless transmitter 55, and then the command is passed to the controller 15 as a selection request from the child device A.

If the controller 15 detects the selection request from the child device A at step S901, process proceeds to step S902, where resource maintenance information is derived from the resource maintenance unit 52. The contents of resource maintenance information will now be described. The resource maintenance information in this embodiment is information describing a current status as to which child device terminal (of child devices A to C) uses the tuners 2a to 2c of the parent device. For example, the contents of resource maintenance information at the time of turning on the power source (initialization) are those shown in Table 3 described below.

TABLE 3

| Name of resource | User |
| --- | --- |
| Tuner 2a (BS digital tuner) | None |
| Tuner 2b (CS digital tuner) | None |
| Tuner 2c (ground wave digital tuner) | None |

At step S903, the derived resource maintenance information is compared with a resource corresponding to the selection request from the child device A to check resource competition. For the request of selecting a BS digital broadcast distribution program from the child device A, there is no user of the tuner 2a according to the above resource maintenance information, it is determined that there is no resource competition at step S904. Accordingly, the selection request from the child device A is admitted, and process proceeds to process of transferring pictures to the child device at steps S905 to S908.

At step S905, tuning control of the tuner 2a is performed in response to the request of selecting a BS digital broadcast distribution program from the child device A and at step S906, data from the tuner 2a is connected to the child device transmission output data paths (7a to 9a) to the child device A by controlling the video switch 30. More specifically, the video decoder 5a is connected to the resolution converter 7a, and the line between the video decoders 5b and 5c and the resolution converters 7b and 7c is disconnected.

At step S907, picture transfer process is performed. More specifically, the picture is subjected to resolution conversion process matching the display resolution of the child device monitor 74 of the child device A at the resolution converter 7a, video data is compressed at the compressor 9a, and then multiplexed by the multiplexer 10 with the identification ID of the child device A added to the data as described previously, and the picture is transferred to the child device A via the wireless transmitter 55. In this case, there is no transmitted output to the child devices B and C, and therefore data of the child device A alone is included for multiplexing.

The child device A receives data transmitted from the parent device, recognizes its own identification ID, and then displays the requested BS digital broadcast distribution program on the child device monitor 74 according to the process procedure described above. Finally, in the parent device, the controller 15 renews the contents of resource maintenance information to those shown in Table 4 described below at step S908.

TABLE 4

| Name of resource | User |
| --- | --- |
| Tuner 2a (BS digital tuner) | Child device A |
| Tuner 2b (CS digital tuner) | None |
| Tuner 2c (ground wave digital tuner) | None |

Furthermore, the operation of the parent device where the child device B uses the tuner 2b (CS digital tuner), and the child device C uses the tuner 2c (ground wave digital tuner) can be realized by repeating the procedure of steps S901 to S908 same as those described above. As a result, the video switch 30 connects the video decoder 5a with the resolution converter 7a, connects the video decoder 5b with the resolution converter 7b, and connects the video decoder 5c with the resolution converter 7c. Furthermore, the final contents of resource maintenance information are those shown in Table 5 described below.

TABLE 5

| Name of resource | User |
| --- | --- |
| Tuner 2a (BS digital tuner) | Child device A |
| Tuner 2b (CS digital tuner) | Child device B |
| Tuner 2c (ground wave digital tuner) | Child device C |

Examples of child device views at non-competitiveness for resource as described above are shown in FIG. 37A.

(Competitiveness for Resource)

As an example of the case of competitiveness for resource, the operation will be described where the user of the child device A tries to make a switch from a BS digital broadcast distribution program to a ground wave digital broadcast distribution program at non-competitiveness for resource as described above.

In this case, if a request of a ground wave digital broadcast is made from the child device A, it is determined that the request of selecting a ground wave digital broadcast distribution program from the child device A encounters resource competition at step S904 in the above resource maintenance information because the child device C is using the program in the check of resource competition at step S903. In this case, the controller 15 performs process of mediation in resource competition surrounded by a broken line in FIG. 36.

More specifically, the controller 15 performs the process according to a mediation rule defined in the resource mediator 51. Mediation rules defined in the resource mediator 51 include, for example, priority arbitration (priority mediation) and equity arbitration (equity mediation). The former is such that a request from a high priority child device is accepted at competitiveness, and the latter is such that a request of a child device making the request earlier is accepted at competitiveness regardless of the priority. Furthermore, how to determine the priority is not specifically limited.

First, process which the resource mediator 51 performs with priority arbitration at step, S909 and where the priority of the child device A is higher than the priority of the child device C will be described. In this case, if a request is made from the child device A, the request of the child device A is admitted, and the child device A can derive the ground wave digital broadcast distribution program. The child device C must allow the child device A to use the resource of the ground wave digital broadcast according to mediation process. However, if a picture displayed till then suddenly disappears from the view of the child device C, the user of the child device C may be confused. Thus, in this embodiment, a warning view indicating that the program must be given away because of the request of deriving the ground wave digital broadcast by the high priority child device A is displayed to the child device C as shown in FIG. 37B. As a result, confusion due to a sudden change in view can be inhibited.

Display of the warning view to the child device C can be realized by providing rendering instructions to the OSD producer 53 by the controller 15, and synthesizing OSD video data produced by the OSD producer 53 and the output picture from the resolution converter 7c, currently displayed at the child device C, by the output synthesizer for child device 18c.

Then, at step S905, selection process is performed and at step S906, the video switch 30 is controlled, so that the video decoder 5a is connected with the resolution converter 7c, the video decoder 5b is kept connected with the resolution converter 7b, and the video decoder 5c is connected with the resolution converter 7a. Subsequently, process of steps S907 to S908 is performed, whereby the broadcasted video resource is changed as shown in FIG. 6D.

Process which the resource mediator 51 performs with priority arbitration at step S909 and where the priority of the child device A is lower than the priority of the child device C, and process which the resource mediator 51 performs with equity arbitration will now be described. In these cases, because the child device C uses broadcasted video resource for the ground wave digital broadcast earlier, the request from the child device A is refused, and thus the view of the child device A is not switched. Therefore, the user of the child device A may be confused. Thus, in this embodiment, a selection assist view indicating that the request of deriving the program cannot be accepted because the broadcasted video resource for ground wave digital broadcast is being used by the child device C, and a video source selectable at that time is displayed as shown in FIG. 37C at step S911. As a result, confusion due to the request being refused can be inhibited.

By associating the mediation process at competitiveness for resource described above with display of the OSD intended for operation assistance for the child device during mediation, different types of tuners of the parent device can be shared by a plurality of child devices without confusing the user.

Sixth Embodiment

The sixth embodiment of the present invention will now be described. In the fifth embodiment, if the resource mediator 51 performs process with priority arbitration as resource competition, and a selection request is made from a low priority child device, and if the resource mediator 51 performs process with equity arbitration, and a selection request of using a broadcasted video resource already used is made, the selection request from the child device is refused at step S909 as described previously. This means that if competitiveness for resource occurs, resource mediation process is performed by tuner (by type of broadcast) to share the resource of the system. In particular, if competing tuners 2a to 2c are analog ground wave tuners matching the current analog ground wave broadcast, the selected program (channel) corresponds to the carrier frequency on a one-to-one basis, and therefore such process is essential.

Figure 38:
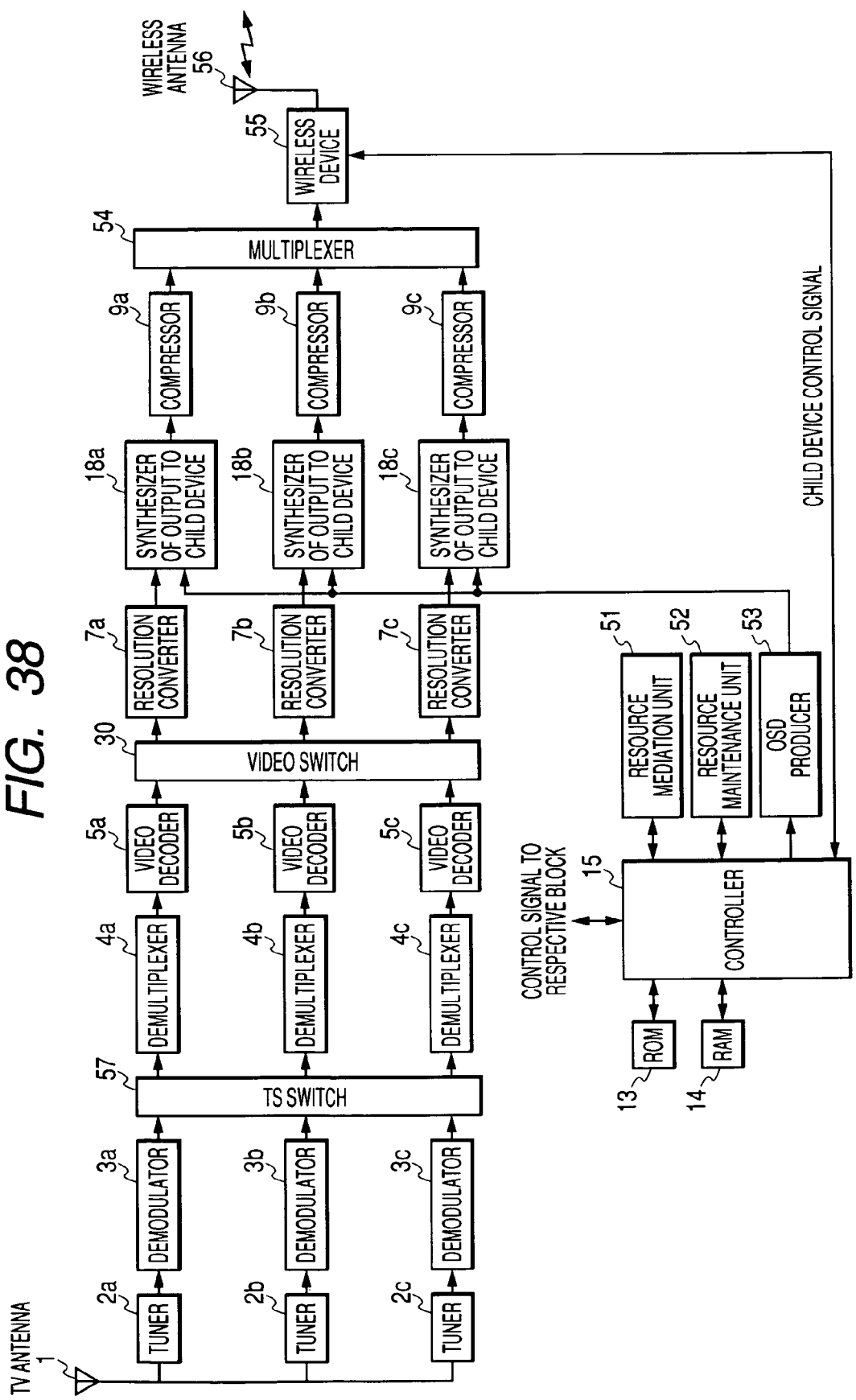
FIG. 38 is a block diagram showing the configuration of the parent device of the TV system according to the sixth embodiment of the present invention.

However, if some of the tuners 2a to 2c are the BS digital tuner, CS digital tuner, ground wave digital tuner or the like matching the digital broadcast, a plurality of programs (channels) are included in one carrier frequency, thus making it possible to increase opportunities to accept the selection request. This embodiment allows such opportunities to be increased. FIG. 38 is a block diagram showing the configuration of a TV system according to the sixth embodiment of the present invention. Components same as those of the fifth embodiment are given like symbols, and detailed descriptions thereof are not presented.

In this embodiment, a TS switch 57 is provided between decoders 3a to 3c and demultiplexers 4a to 4c. The TS (transport stream) switch 19 functions as a data path switch circuit intended for switching three independent TS data output from the decoders 3a to 3c to any of the demultiplexers 4a to 4c. Switching methods include two ways of methods. For the first way of method, the decoders 3a to 3c and the demultiplexers 4a to 4c are switched and connected on a one-to-one basis (e.g. 3a and 4c, 3b and 4a, 3c and 4b, etc.). For the second way of method, the decoders 3a to 3c and the demultiplexers 4a to 4c are switched and connected on a three-to-n basis (n is 1 or 2) (e.g. 3a and 4a, 3a and 4b, 3c and 4c, etc.). Furthermore, the TS switch 57 can have a role not only for switching the output destination as described previously, but also as a switch for turning off output to the demultiplexers 4a to 4c.

Figure 39:
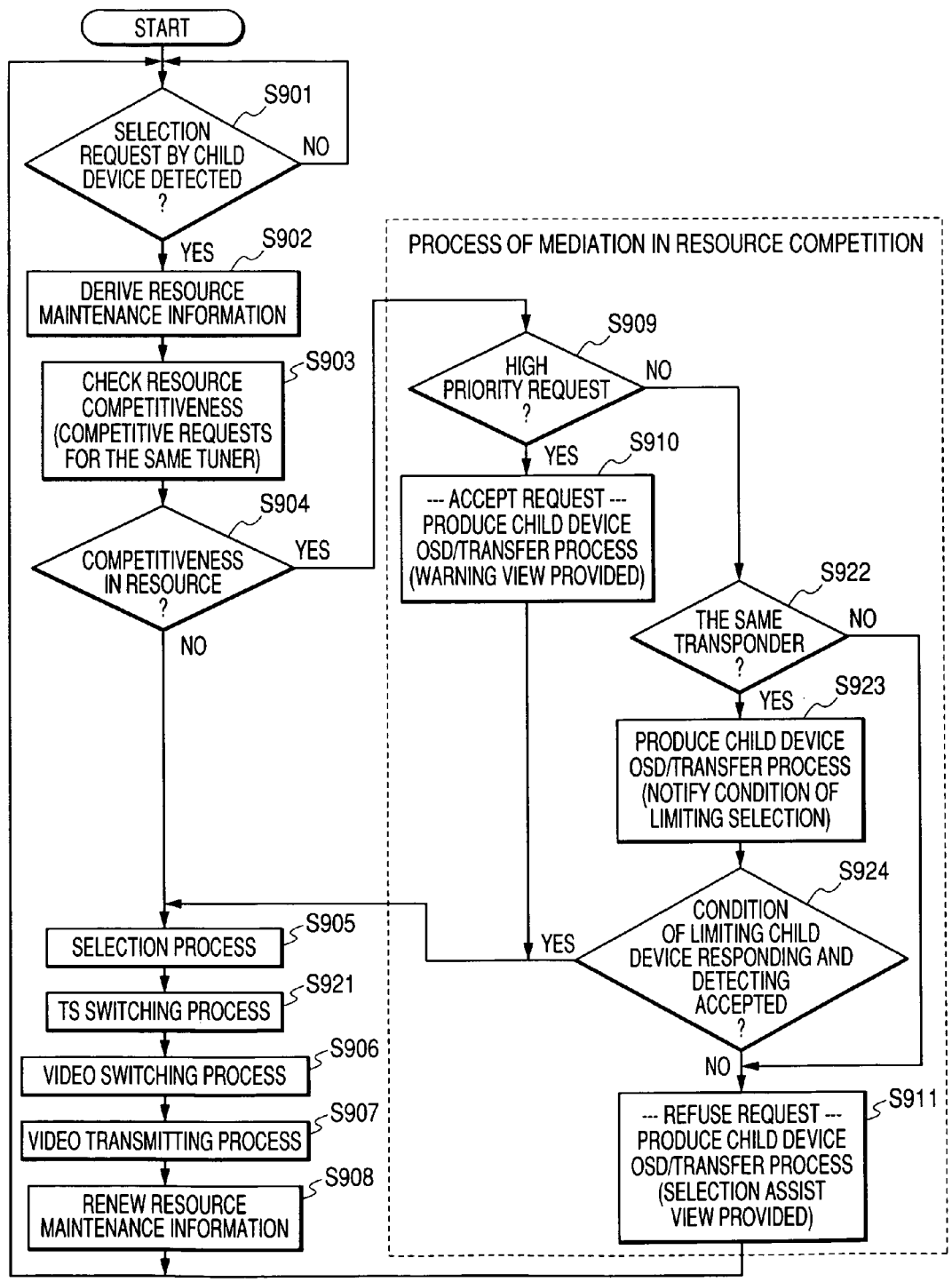
FIG. 39 is a flowchart showing the operation in process of transferring to the child device in the fifth embodiment of the present invention.
Figure 40A:
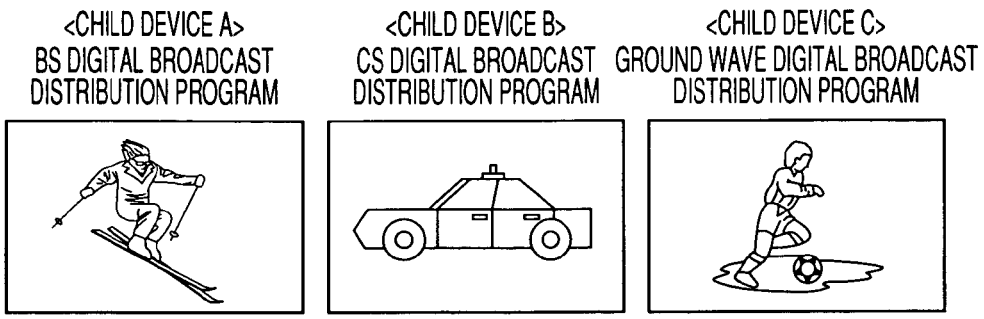
FIGS. 40A, 40B and 40C show a change of pictures displayed in each child device in the sixth embodiment of the present invention.

The operation of the parent device configured as described above will now be described. FIG. 39 is a flow chart showing the operation of process of transferring to the child device in the sixth embodiment of the present invention. Here, resource management information shown in Table 6 described below is produced, and transmission matching the information is performed. Furthermore, for example, the display state shown in FIG. 40A is provided.

TABLE 6

| Name of resource | User |
|---|---|
| Tuner 2a (BS digital tuner) | Child device A |
| Tuner 2b (CS digital tuner) | Child device B |
| Tuner 2c (ground wave digital tuner) | Child device C |

Here, the operation where the user of the child device A tries to switch the program from a BS digital broadcast distribution program to a ground wave digital broadcast distribution program will be described.

If it is determined that the priority of a new request is low at step S909, the request is immediately refused (step S911) as shown in FIG. 36 in the fifth embodiment, but in this embodiment, process moves to step S922, where whether transponders (relays) of data processed by competing resources are the same is determined. As a specific method of the determination, the controller 15 derives an NIT (network Information Table) from PSI session information of the competing resource and checks the description of its contents. Whether the program requested by the child device A and the program transferred to the child device C exist in the same transponder (same carrier frequency) is determined.

If the selection request is accepted when the transponders are not the same, the carrier frequency should be switched, and therefore the request is refused at step S911 as in the case of the fifth embodiment if it is determined that the programs do not exist in the same transponder.

Figure 40B:
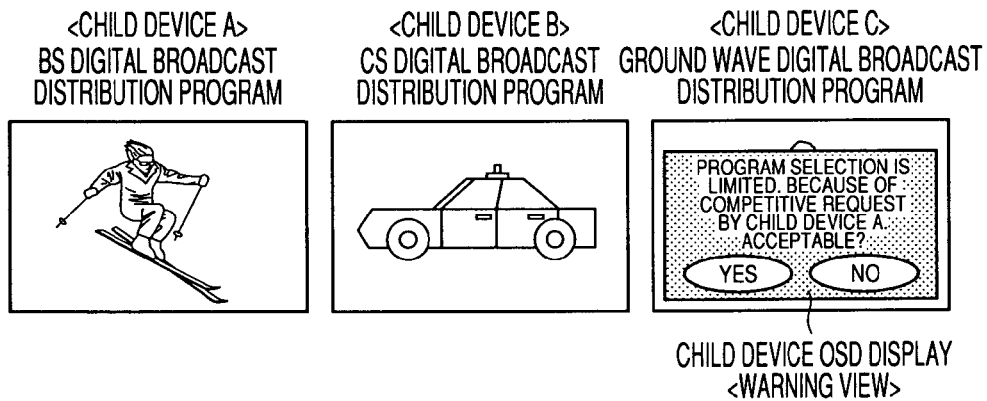

If it is determined that the transponders are the same, process proceeds to step S923, where a view for checking whether it is allowable to perform transferring for sharing the transponder with the child device A to the child device C is output as shown in FIG. 40B. The purpose of this lies in that if the same transponder is shared by the child device A and the child device C, the child device A and the child device C can share different programs if the programs are in the same transponder but on the other hand, there arises a limitation such that not only identical programs can not be transferred to both the child devices at the same time, but also the child device C cannot select programs included in different transponders, and thus the user is notified of a warning as to this limitation.

Then, if the child device C does not accept this limitation at step S924, process proceeds to step S911, where the request is refused. If the child device C accepts this limitation, process proceeds to step S905. In this embodiment, however, selection process is performed only if the transponders of video data transferred to the child device A and the child device C are the same, and therefore it is not necessary to switch the tuner 2c (ground wave digital tuner) in a strict sense.

Then, TS switching process is performed at step S921. In the TS switching process, since the same transponder is shared by the child device A and the child device C via the tuner 2c (ground wave digital tuner), the TS switch 57 connects the decoder 3c with the demultiplexer 4a, keeps the decoder 3b connected with the demultiplexer 4b, and keeps the decoder 3c connected with the demultiplexer 4c. The demultiplexer 4a separates audio/video data of a program requested by the child device A from the TS (transport stream) output from the decoder 3c and multiplexed with a plurality of programs. For separating a desired program from the multiplexed TS, the controller 15 should derive the PAT (Program Association Table) from PSI session information of the same transponder (same carrier frequency) and check the description of its contents. Consequently, the configuration of the service ID (channel) included in the TS can be known.

Process of steps S906 and S907 is performed in the same manner as in the fifth embodiment, and the contents of resource maintenance information are renewed to those shown in Table 7 described below at step S108.

TABLE 7

| Name of resource | User |
| --- | --- |
| Tuner 2c (ground wave digital tuner) | Child device A |
| Tuner 2b (CS digital tuner) | Child device B |
| Tuner 2c (ground wave digital tuner) | Child device C |

Figure 40C:
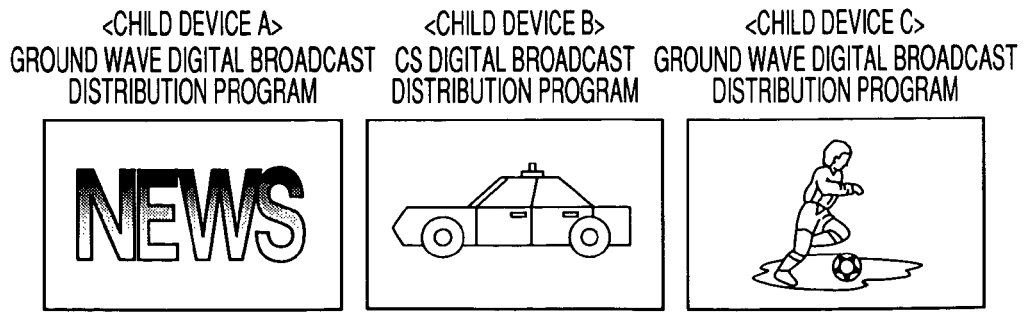

FIG. 40C shows an example of a display state of each child device where the child device A and the child device C display ground wave digital broadcast distribution programs in the same transponder at the same time.

As described above, in this embodiment, process of mediation in resource competition is performed not by tuner (type of broadcast), but by programs included in the multiplexed TS in the same transponder at competitiveness for resource, whereby the degree of freedom of program selection by the user can be improved, and efficiency of sharing the resource of the system can be enhanced. Such a process of mediation in resource competition is advantageous especially in digital broadcast.

Seventh Embodiment

Figure 41:
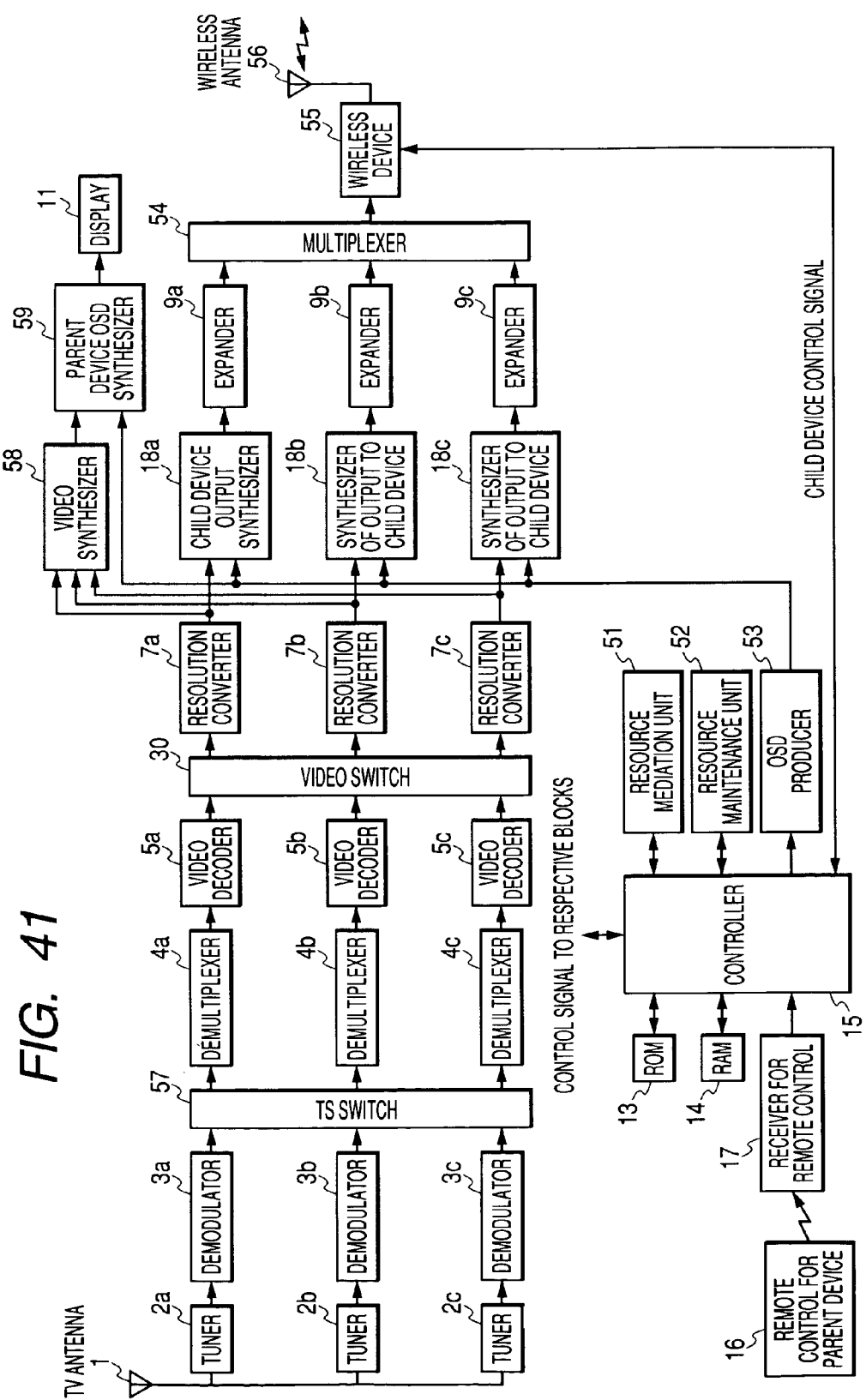
FIG. 41 is a block diagram showing the configuration of the parent device of the TV system according to the seventh embodiment of the present invention.

The seventh embodiment of the present invention will now be described. In the fifth and sixth embodiments, a parent device having no display function at the parent device, but having only a function to transmit broadcasted pictures to child devices wirelessly connected to the parent device is used, and the allocation of the broadcasted video resource to each child device is one resource (single view) at the maximum. In this embodiment, a display terminal having a multi view function is connected to the parent device to solve problems when resource competition occurs. FIG. 41 is a block diagram showing the configuration of a parent device of a TV system according to the seventh embodiment of the present invention. Components same as those of the sixth embodiment are given like symbols, and detailed descriptions thereof are not presented.

In this embodiment, as in the case of the first embodiment, a remote control for parent device 16 and a photoreceiver for remote control 17 are provided, a video synthesizer 58 is provided in the post-stage of resolution converters 7a to 7c, and a parent device OSD synthesizer 59 is provided between the video synthesizer 58 and a display 11 for parent device. In this embodiment, main output means is constituted by the video synthesizer 58 and the parent device OSD synthesizer 59. The video synthesizer 58 can synthesize maximum three lines of video output from the resolution converters 7a to 7c. The parent device OSD synthesizer 59 further synthesizes an OSD view such as GUI produced by an OSD producer 18 based on rendering instructions issued from a controller 15, and synthetic video data output from the video synthesizer 58 as in the case of the output synthesizing portion 18a to 18c for the child device. The display 11 displays pictures based on OSD synthetic video data synthesized by the parent device OSD synthesizer 59 and produced. In this embodiment, the display device 11 has a multi view display function.

The tuner 2a is a BS digital tuner, the tuner 2b is a CS digital tuner, and the tuner 2c is a ground wave digital tuner as in the case of the sixth embodiment. Further, the number of child devices wirelessly connected to the parent device is three, which is equal to the number of tuners 2a to 2c, and the names of the child devices are child device A, child device B and child device C, respectively. In the parent device, as a data path for transmission and output to the child device, the resolution converter 7a to compressor 9a is used for the child device A, the resolution converter 7b to compressor 9b is used for the child device B, and the resolution converter 7c to compressor 9c is used for the child device C.

(Non-Competitiveness for Resource)

First, the multi view display function of the parent device will be described where only the user of the parent device exists, and no user uses the child devices A to C as the case of non-competitiveness for resource.

In this embodiment, the display 11 for parent device can monopolize all the tuners 2a to 2c if the child devices A to C are not used.

Figure 44A:
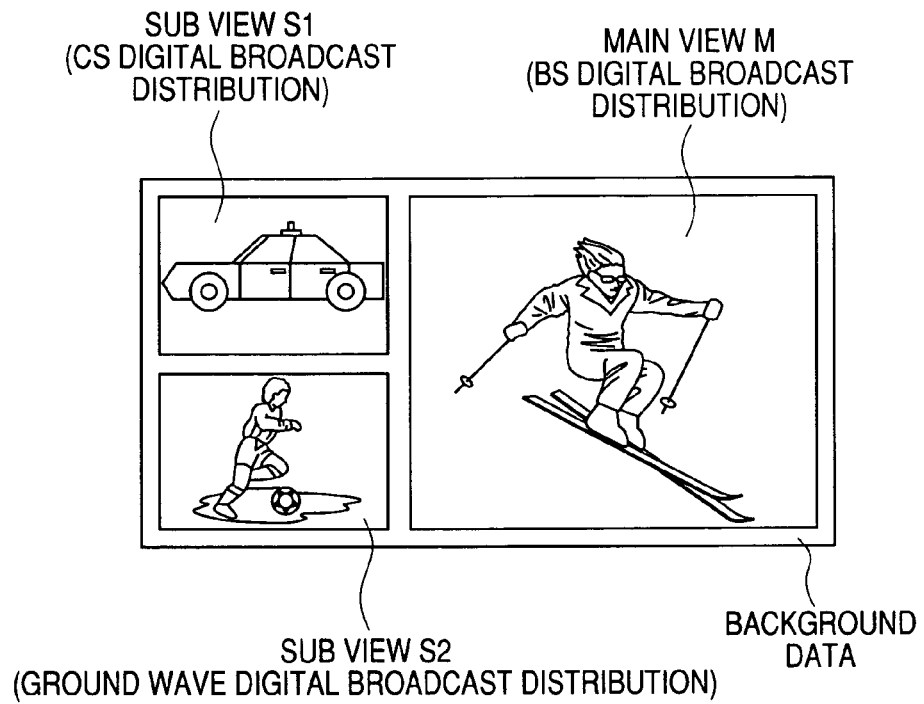
FIGS. 44A and 44B show the state of multi view display of triple views in the seventh embodiment of the present invention.

For example, if the user of the parent device operates the remote control for parent device 16 to request multi view triplet view display, the controller 15 allocates broadcasted video resources 2a to 5a for the main view M of the parent device, broadcasted video resources 2b to 5b for the sub view S1 of the parent device, and broadcasted video resources 2c to 5c for the sub view S2 of the parent device as shown in FIG. 44A.

Process at steps S905 and S906 is performed and then at step S935, the resolution converters 7a to 7c are set to perform conversion into the display resolutions of the views (main view M, sub view S1, sub view S2) in consideration of the display resolution of the display (parent device monitor) 11 and the layouts of the views, and pictures are synthesized in consideration of the view layout at the video synthesizer 58. In this case, the contents of resource management information are renewed to those shown in Table 8 described below at step S908.

TABLE 8

| Name of resource | User |
| --- | --- |
| Tuner 2a (BS digital tuner) | Main view M |
| Tuner 2b (CS digital tuner) | Sub view S1 |
| Tuner 2c (ground wave digital tuner) | Sub view S2 |

(Competitiveness for Resource)

Figure 42:
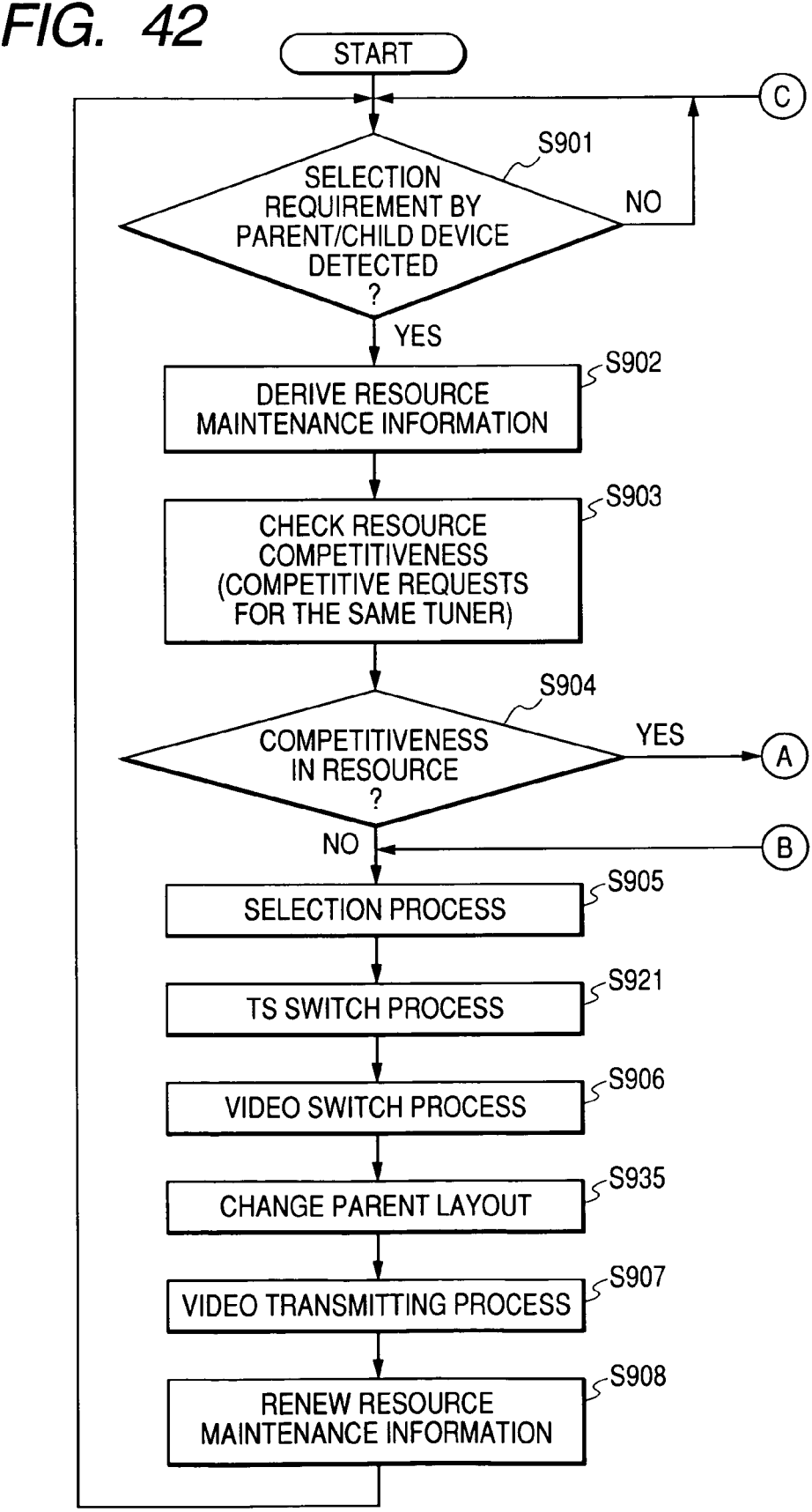
FIG. 42 is a flowchart showing the operation in process of transferring to the child device in the seventh embodiment of the present invention.

As an example of competitiveness for resource, the operation where the user of the child device A selects a CS digital broadcast distribution program in a state of non-competitiveness for resource as described above will now be described using FIGS. 42 and 43.

Figure 43:
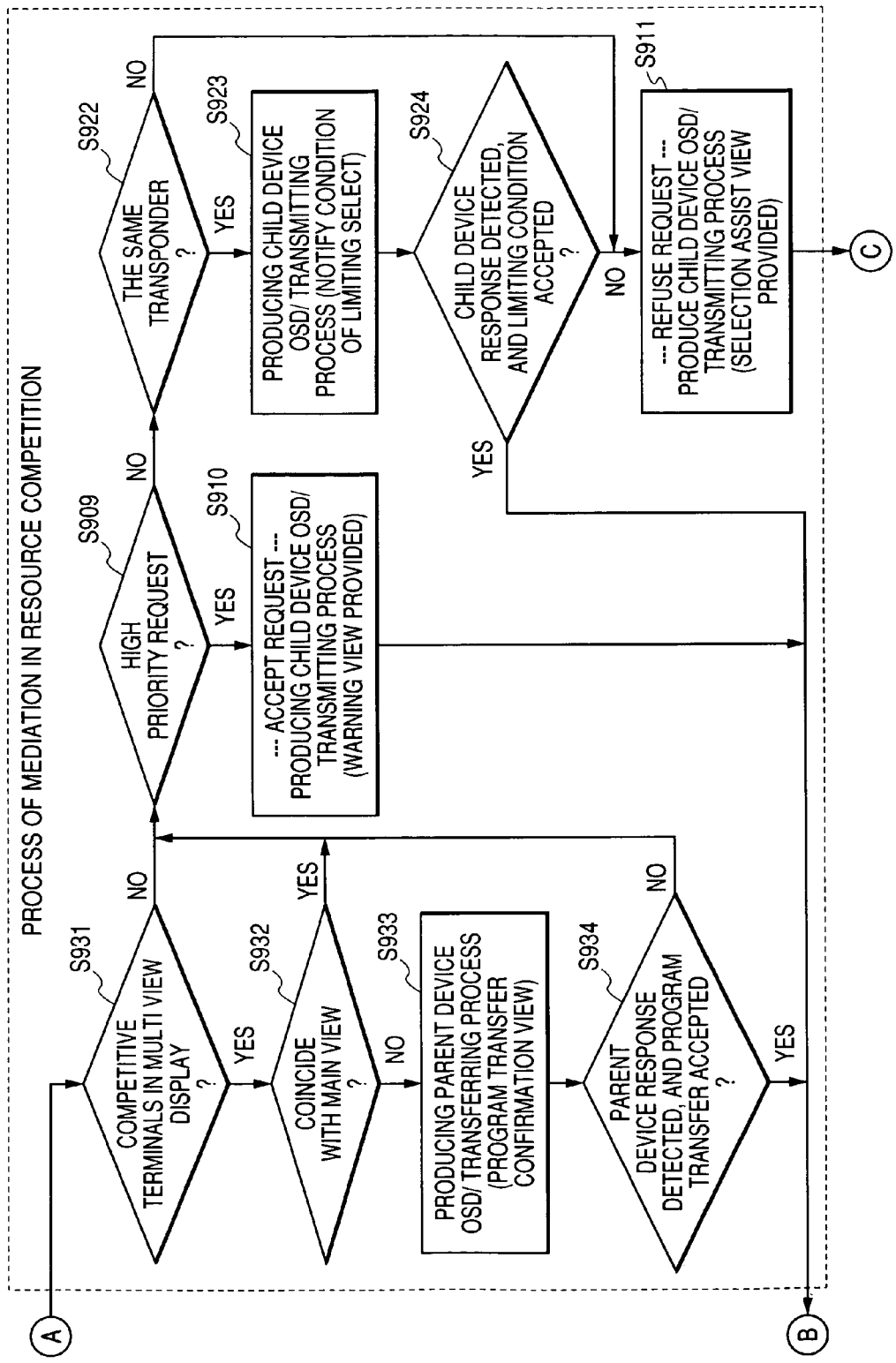
FIG. 43 is a flowchart showing the operation in process of transferring to the child device in the sixth embodiment of the present invention.

In this case, if a request of a ground wave digital broadcast is made from the child device A, it is determined that the request of selecting a CS digital broadcast distribution program from the child device A encounters resource competition at step S904 in the above resource maintenance information because the sub view S1 is using the program in the check of resource competition at step S903. In this case, process by the controller 15 moves to step S931, where process of mediation in resource competition shown in FIG. 43 is performed.

More specifically, first, whether the competitive terminal in resource competition is in multi view display or not is determined at step S931. This determination can easily be made by recognizing the state of resource maintenance information. If it is determined that the competitor (competitive view) is not in multi view display, but in single view display, process at step S909 and subsequent steps is performed in the same manner as in the sixth embodiment.

If the competitor is in multi view display as shown in Table 8, process proceeds to step S932, and whether the broadcasted video resource of the competitor coincides with the broadcasted video resource of the main view M in multi view display or not is determined at step S932. The main view in multi view display is a view to which audio matching the view is output, and other views are sub views. However, such a way of defining the main view is only one example, definition of the main view is not limited thereto. If it is determined at step S932 that the competitor is the main view of multi view display, it is determined that the requested broadcasted video resource is the highest priority broadcasted video resource for users of parent devices, and process at step S909 and subsequent steps is performed.

Here, the request of selecting a CS digital broadcast distribution program from the child device A competes with the sub view S1 of the parent device, and thus process proceeds to step S933.

At step S933, whether a program on the sub view considered to have a low priority may be transferred to the user of the child device A is confirmed with the user of the parent device. The "transfer of view" implicates not only that the broadcasted video resource is used exclusively by the child device as in the fifth embodiment, but also that selection using the broadcasted video resource is limited as in the sixth embodiment.

Figure 44B:
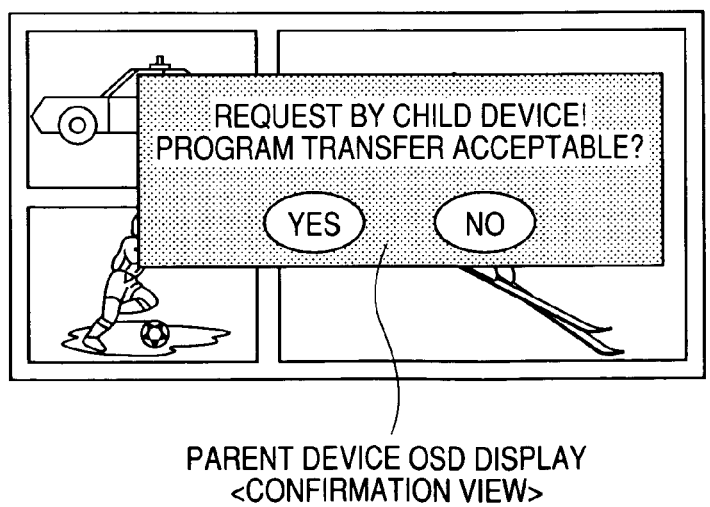
Figure 46:
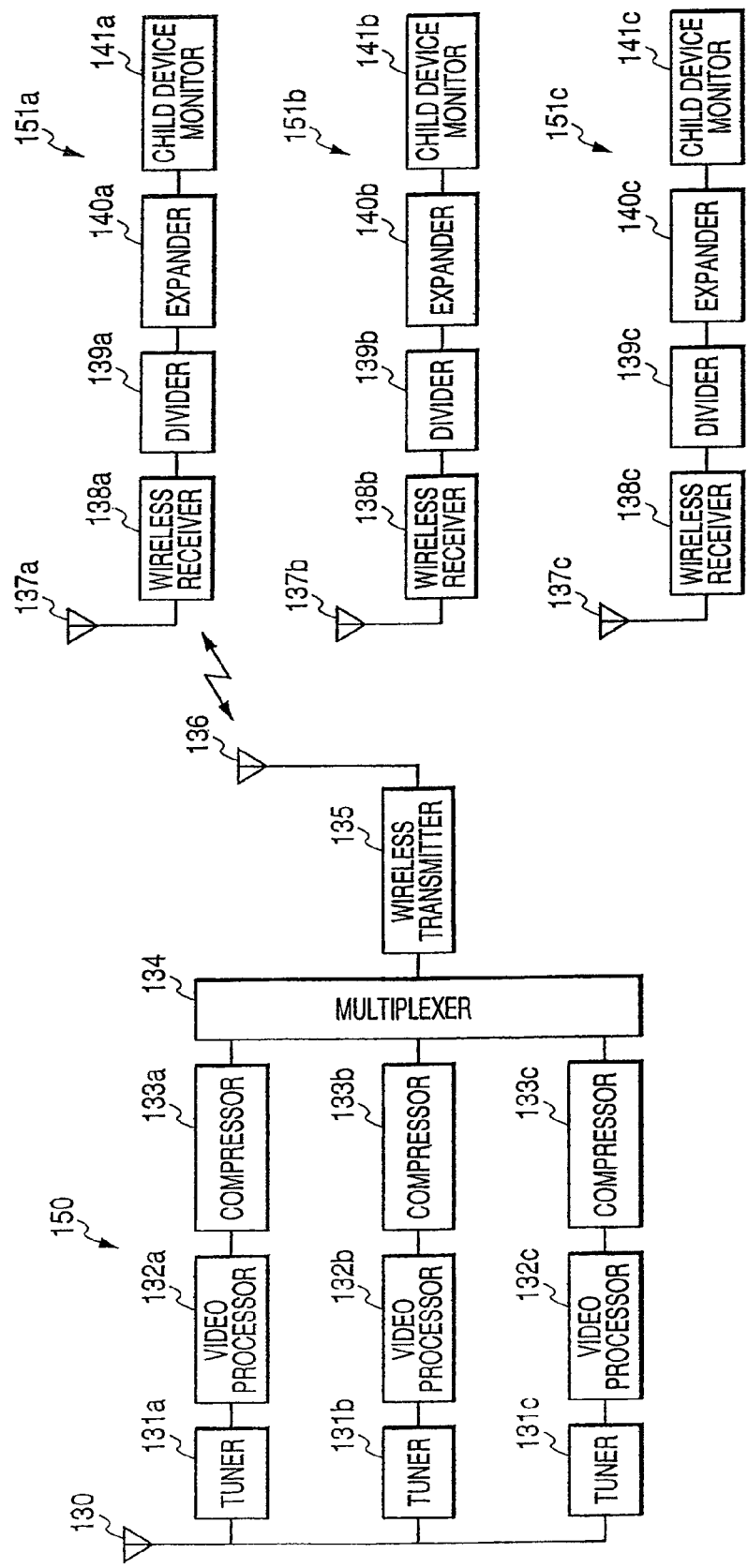
FIG. 46 is a block diagram showing the configuration of the TV system using a conventional wireless LAN.

As the method of confirmation, for example, the controller 15 provides rendering instructions to the OSD producer 53, the parent device OSD synthesizer 59 synthesizes the picture output from the video synthesizer 58 and the OSD produced by the OSD producer 53 to display on the view of the display 11 a conformation view shown in FIG. 44B.

If acceptance of transfer of the program by the user of the parent device is confirmed at step S934, process at step S905 and subsequent steps is performed. If transfer of the program is refused, process at step S909 and subsequent steps is performed.

Main process performed at steps S905 to S907 according to acceptance of transfer of the program by the user of the parent device at step S934 is selection of a CS digital broadcast distribution program requested by the child device A (step S905) and change of the layout of the parent device (step S935). The method for changing the layout of the parent device is not specifically limited, but display at the parent device may be switched to twin view display as shown in FIG. 45A, for example. Furthermore, the picture of the CS digital broadcast distribution program accepted to be transferred is transmitted and output to the child device A. In this case, the contents of resource management information are renewed to those shown in Table 9 described below at step S908.

TABLE 9

| Name of resource | User |
| --- | --- |
| Tuner 2a (BS digital tuner) | Main view M |
| Tuner 2b (CS digital tuner) | Child device A |
| Tuner 2c (ground wave digital tuner) | Sub view S2 |

If the user of the child device B selects a ground wave digital broadcast distribution program subsequently, resource competitiveness is checked at step S903. In this case, according to the resource management information shown in Table 9, the broadcasted video resource for ground wave digital broadcasts is used by the sub view S2 of the parent device, and therefore it is determined that there is competitiveness for resource at step S904. Then, process similar to the process when a request of transfer is made from the child device A is performed, and if transfer of the program is accepted by the user of the parent device at step S934, one view display is provided at the parent device, so that programs are displayed on the child device A and the child device B as shown in FIG. 45B, for example. In this case, the contents of resource management information are renewed to those shown in Table 10 described below at step S908.

TABLE 10

| Name of resource | User |
| --- | --- |
| Tuner 2a (BS digital tuner) | Main view M |
| Tuner 2b (CS digital tuner) | Child device A |
| Tuner 2c (ground wave digital tuner) | Child device B |

Furthermore, in the seventh embodiment, there may be cases where no display 11 is used. In this case, a state same as that in the sixth embodiment is provided, for example, and as shown in FIG. 45C, the child devices A to C can use all broadcasted video resources of the parent device.

As described above, by performing process of mediation in resource competition considering the view priority of the multi view if there is a display terminal having a multi view display function, the multi view function of the parent device and the selection request from the child device to the parent device can be performed equitably and efficiently.

Eighth Embodiment

Figure 47B:
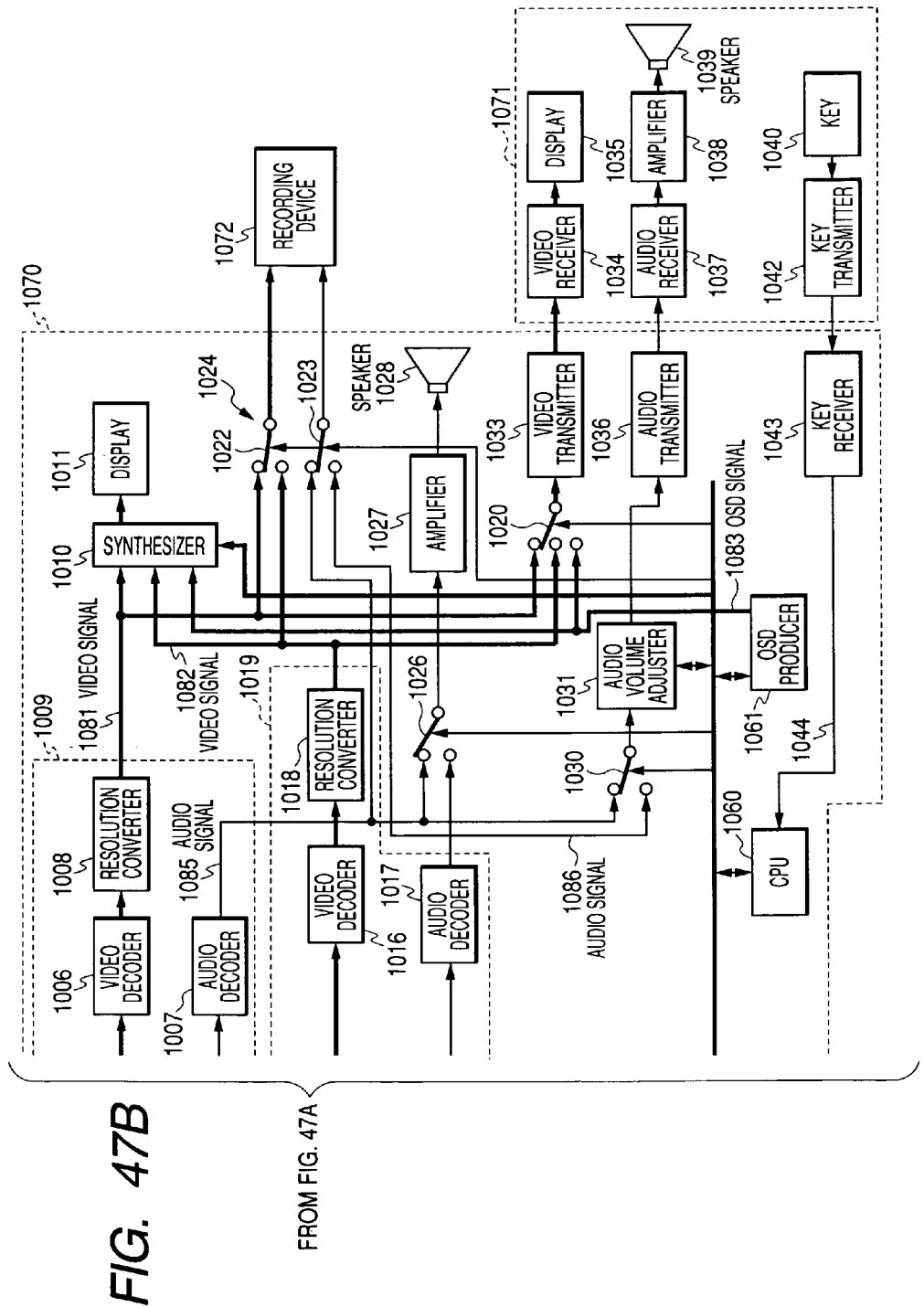
FIG. 47 is comprised of FIGS. 47A and 47B which are block diagrams showing the configuration of the TV system according to the eighth embodiment of the present invention.

A TV system according to the eighth embodiment of the present invention will be described. The TV system is provided with one parent device, one child device and one recorder such as a VTR, but the number of child devices is not specifically limited. FIG. 47 is a block diagram showing the configuration of the TV system according to the eighth embodiment of the present invention.

The parent device 1070 in the eighth embodiment is provided with a CPU 1060 controlling the overall parent device 1070 according to a program, a program ROM 1057 storing a program, and a common bus 1053 connecting the CPU 1060 with each unit. In addition to the CPU 1060 and the program ROM 1057, an IC card controller 1052, a remote control interface 1055, a RAM 1056, a timer 1058, a non-volatile memory 1059 and an OSD producer 1061 are connected to the common bus 1053.

The OSD producer 1061 produces video data of any character or drawing to be displayed on a display 1011 according to instructions from the CPU 1060. In this embodiment, the video data is an OSD signal 1083. For using the parent device 1070, an IC card storing contract information of the user and key information for solving key information for descramble included in transport stream data is required, and the IC card controller 1052 reads information stored in the IC card and transmits the information to the common bus 1053. The remote control interface 1055 receives an infrared code of the remote control 1054 conveying the will of the user to the CPU 1060. The RAM 1056 is a work memory of the CPU 1060. The non-volatile memory 1059 stores setting information such as a password for setting required to be stored even if the power of the parent device is turned off. The timer 1058 receives time information in transport stream data from a demultiplexer 1005 or 1015 described later, makes a correction for correct time when a digital broadcast is being received, and the timer 1058 operates an internal timer to manage time when a digital broadcast is not being received.

Furthermore, in this embodiment, the broadcast is transmitted according to the standard of the digital broadcast system of DVB (Digital Video broadcasting), the picture is transmitted according to the MPEG 2 standard of ISO/IEC 61818-2, and audio is transmitted according to MPEG 2 of ISO/IEC 61818-3.

In this embodiment, an antenna 1001 receiving digital broadcast waves is provided, and the parent device 1070 is provided therein with digital tuners 1002 and 1012 selecting a desired frequency from received broadcast waves according to instructions of the CPU 1060. Signals output from the digital tuner 1002 and 1012 are decoded and corrected in error by decode and error correction circuits 1003 and 1013, respectively, and then output as transport streams.

If transport stream data scrambled for limitation of view is input, descramblers 1004 and 1014 cancel scramble based on key information of the descrambler included in the transport stream data and key information from the IC card controller 1052. The descrambled signals are passed to the demultiplexers 1005 and 1015, respectively. The demultiplexers 1005 and 1015 select streams having a PID (Packet IDentifier) designated by the CPU 1060 from multiplexed streams, pass video streams to video decoders 1006 and 1016 and pass audio streams to audio decoders 1007 and 1017.

The video decoders 1006 and 1016 decode video streams into non-compressed video data to obtain broadcasted video data. Then, resolution converters 1008 and 1018 convert video data into video data suitable for the resolution designated by the CPU 1060 to obtain video data of video signals 1081 and 1082, respectively.

For audio data, the audio decoders 1007 and 1017 decode audio streams into non-compressed audio data to obtain audio data of audio signals 1085 and 1086.

Furthermore, the demultiplexers 1005 and 1015 also select information of time and program contents called SI (System Information) included in the transport stream, and outputs the information to the CPU 60 via the common bus 53.

An audio video deriving unit 1009 is constituted by a part deriving video signals and audio signals, ranging from the digital tuner 1002 to the resolution converter 1008 and audio decoder 1007, and an audio video deriving unit 1019 is constituted by a part deriving video signals and audio signals, ranging from the digital tuner 1012 to the resolution converter 1018 and audio decoder 1017. The audio video deriving units 1009 and 1019 can function mutually independently according to instructions of the CPU 1060, receive different channels and output respective video and audio signals.

The synthesizer 1010 synthesizes the video signal 1081 or 1082 suitable for any resolution and the OSD signal 1083 in any combination based on instructions of the CPU 1060, and the display 1011 visualizes the synthesized video data and displays the same on its view. Furthermore, a switch 1026 is switched according to instructions from the CPU 1060, the audio signal 1085 or 1086 is amplified by an amplifier 1027, and then audio is output from a speaker 1028.

The video signal 1081 or 1082 is switched by a switch 1022, the audio signal 1085 or 1086 is switched by a switch 1023, and the video signal and the audio signal are output to an external recorder 1072. In this way, the video signal and the audio signal can be recorded. In a recorder switching signal 1024 constituted by the switches 1022 and 1024, the switches 1022 and 1023 are switched at the same time, and a combination of the video signal 1081 and the audio signal 1085 or a combination of the video signal 1082 and the audio signal 1086 is output to the recorder 1072.

Furthermore, the parent device 1070 is provided with a video signal switch 1020 controlled according to instructions of the CPU 1060, and a video signal to be transmitted to the child device 1071 can be selected from the video signals 1081 and 1082 and the OSD signal 1083. The selected video signal (video data) is transmitted to the child device 1071 via a video transmitter 1033.

The parent device 1070 is further provided with an audio signal switch 1030 controlled according to instructions of the CPU 1060, and an audio signal to be transmitted to the child device 1071 can be selected from the audio signals 1085 and 1086 and silent signals. Furthermore, an audio volume adjuster 1031 sets an upper limit of audio volume for the audio signal based on control by the CPU 1060. The audio signal (audio data) output from the audio volume adjuster 1031 is transmitted to the child device 1071 via an audio transmitter 1036.

In the child device 1071, a video receiver 1034 receives the video signal transmitted from the parent device 1070, and then a display 1035 visualizes the video signal and displays the same on its view. Furthermore, an audio receiver 1037 receives the audio signal, then an amplifier 1038 amplifies the audio signal, and audio is output from a speaker 1039. Further, code data of a key 1040 provided in the child device 1071 is transmitted to a key receiver 1043 of the parent device 1070 via a key transmitter 1042 if the key 1040 is depressed. When receiving the code data, the key receiver 1043 passes the code data to the CPU 1060, and the CPU 1060 interprets its contents.

The signal may be transmitted between the parent device 1070 and the child device 1071 via either a wired or wireless connection.

Figure 48:
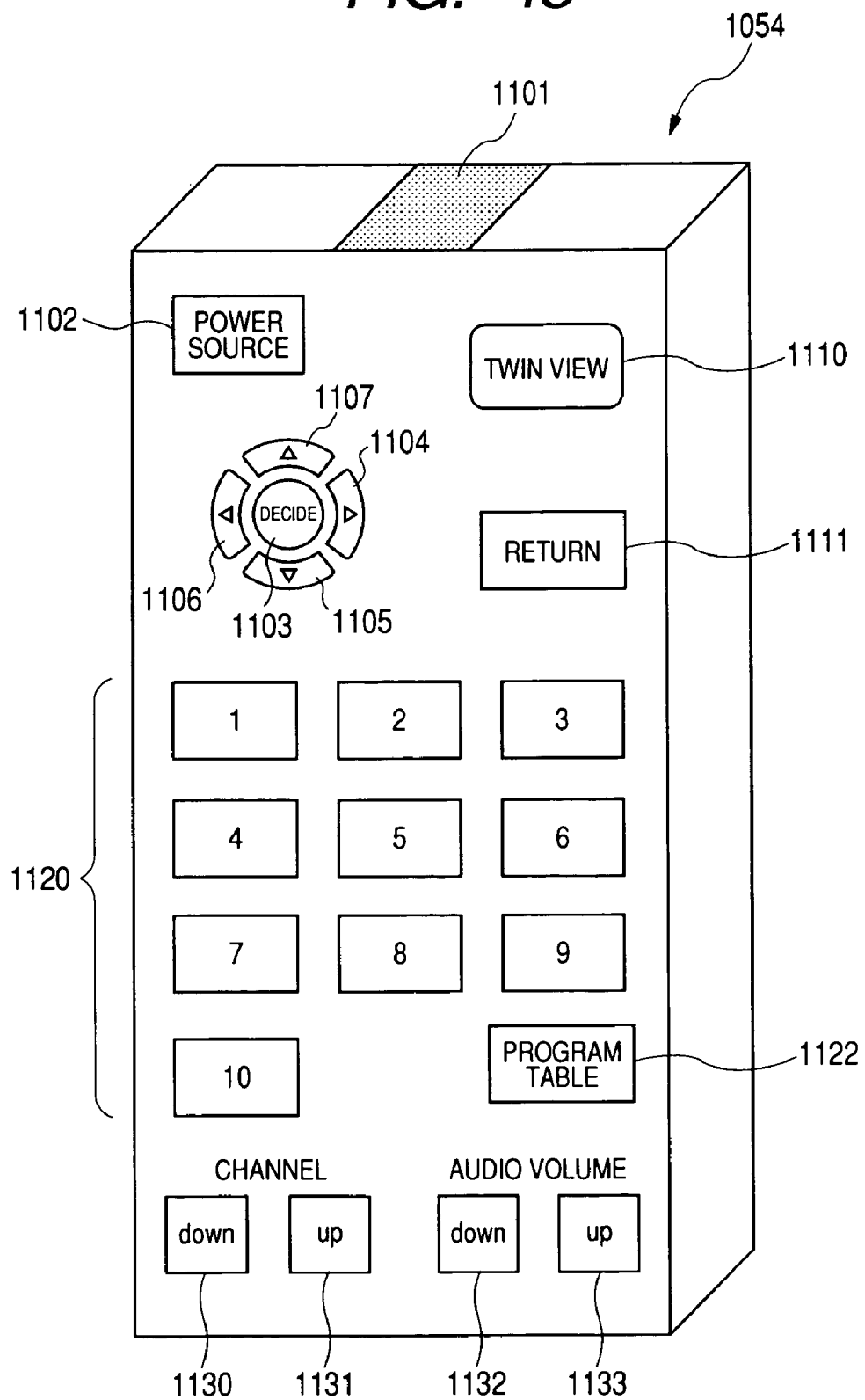
FIG. 48 shows the configuration of a remote control 1054 attached to a parent device 1070.

FIG. 48 shows the configuration of the remote control 1054 attached to the parent device 1070. The remote control 1054 is provided with an infrared light emitter 1101 and keys 1102 to 1133, and if any one of keys 1102 to 1133 is depressed, a code corresponding to the depressed key is converted into an infrared signal, and emitted from the infrared light emitter 1101.

The remote control 1054 is further provide with a twin view key 1110 and a return key 1111, and if the twin view key 1110 is depressed, video data output from the audio video deriving unit 1009 or 1019 is synthesized by the synthesizer 1008, and the display form of the display 1011 is brought into twin view display. Furthermore, if the twin view key 1110 is depressed when the display form of the display 1011 is in twin view display, the display form is brought into one view display. The view displayed at this time is, for example, a view in which audio is output when twin view display is provided.

A set of channel direct keys 1120 is constituted by ten keys given numbers of "1" to "10", respectively. If any one of ten keys constituting the set of channel direct keys 1120 is depressed, a channel corresponding to the key is directly selected, and pictures broadcasted at the channel are displayed on the display 1011.

Furthermore, if a program table key 1122 is depressed, an electronic program table (EPG) produced by the OSD producer 1061 is displayed on the display 1011.

Furthermore, each time a channel down key 1130 is depressed, the channel is changed in a descending order, and each time a channel up key 1131 is depressed, the channel is changed in an ascending order. Further, each time an audio volume down key 1132 is depressed, the audio volume decreases, and each time an audio volume up key 1133 is depressed, the audio volume increases.

Figure 49:
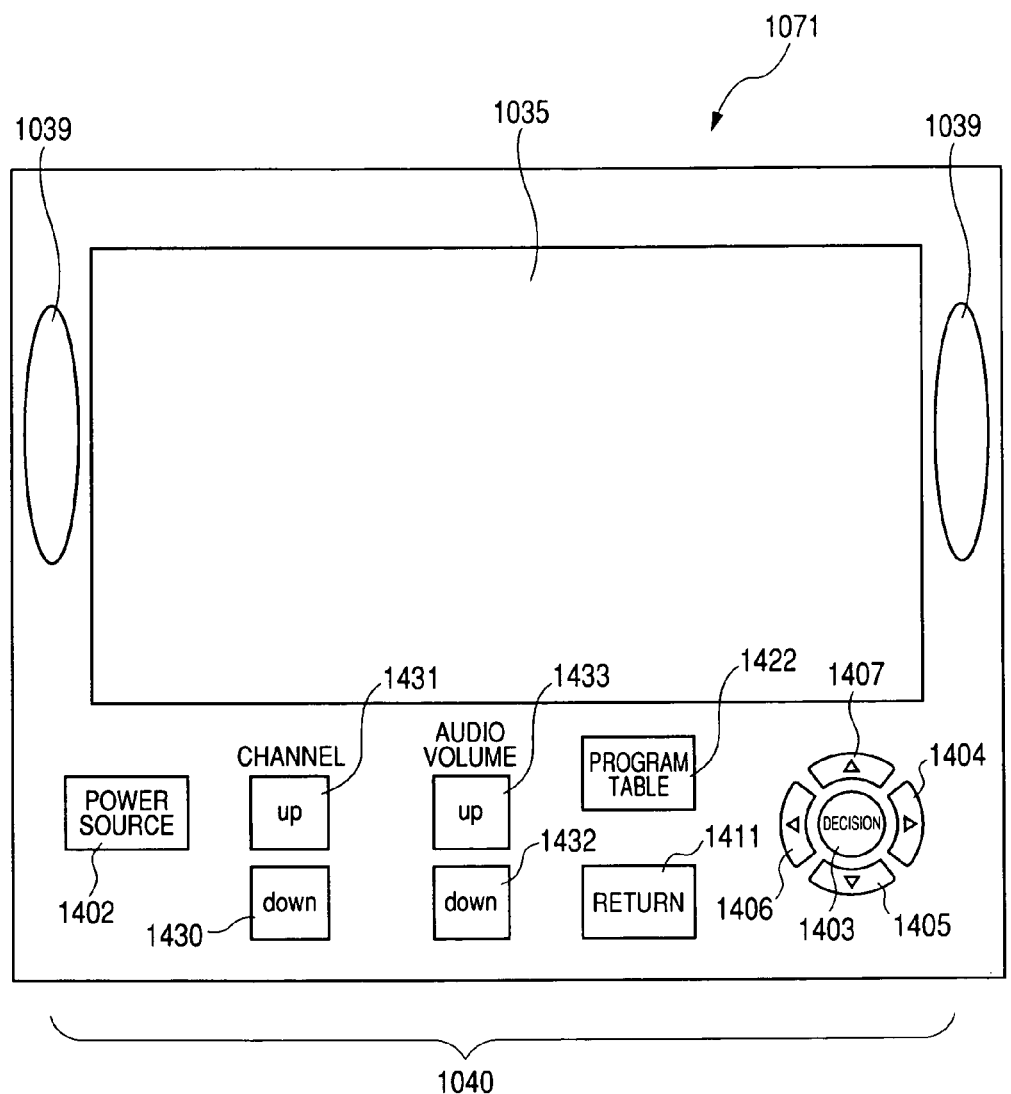
FIG. 49 shows the exterior appearance of a child device 1071 when viewed from the front in the eighth embodiment.

FIG. 49 shows the exterior appearance of the child device 1071 in the eighth embodiment when viewed from the front. The display 1035, the speaker 1039 and a set of keys 1040 constituted by keys 1402 to 1433 are placed in the child device 1071 on the front side. Further, a power source key 1402, a decision key 1403, a right cursor key 1404, a lower cursor key 1405, a left cursor key 1406, an upper cursor key 1407 and a return key 1411 are provided.

If the program table key 1422 is depressed, the child device 1071 requests the electronic program table (EPG) from the parent device 1070, the display 1035 displays the electronic program table (EPG) transmitted from the parent device 1070.

Furthermore, each time a channel down key 1430 is depressed, the channel is changed in a descending order, and each time a channel up key 1431 is depressed, the channel is changed in an ascending order. Further, each time an audio volume down key 1432 is depressed, the audio volume decreases, and each time an audio volume up key 1433 is depressed, the audio volume increases. However, the upper limit of the maximum audio volume is an audio volume set by the audio volume adjuster 1031 of the parent device 1070.

The operation of the TV system according to the eighth embodiment configured as described above will now be described.

(Method for Reserving Program at Parent Device 1070)

The method for reserving a program at the parent device 1070 will now be described. If the user depresses the program table key 1122 of the remote control 1054, the CPU 1060 detects it via the remote control interface 1055. The CPU 1060 produces a table including time zones and names of programs based on program information transmitted from demultiplexer 1005 or 1015, and instructs the OSD producer 1061 to form the contents of the table into video data. As shown in FIG. 50, an image of a program table of a program list in which time zones are arranged in the longitudinal direction and names of programs are arranged in the lateral direction, for example, is displayed on the display 1011. For example, programs of three hours are displayed in the longitudinal direction, and programs of three channels are displayed in the lateral direction. Thus, if the current time is 7:20, programs of the hours after 7 o'clock and before 10 o'clock are displayed.

If the cursor is moved using cursors 1104 to 1107 of the remote control 1054 when such a program table is displayed, the color of the background of a column in which the cursor is located becomes darker as shown in FIG. 50, so that the column in which the cursor is located is indicated. The program of the OSD producer 1061 is configured to produce a message 1303 of, for example, "Reserve Of Program In Recording Or Viewing" when the cursor is moved to the column where a program to be reserved is indicated, and the decision key 1103 is depressed as shown in FIG. 51. Furthermore, "Recording" and "Viewing" in the message 1303 can be selected with the cursor.

For example, if the user depresses the decision key 1103 on "Recording", reserve for recording is decided, a specified frequency is set to the tuner of the audio video deriving unit 1009 or 1019 at the time of start of the program, and a video signal and an audio signal are produced, and output to the recorder 1072 via the switches 1022 and 1023. At this time, when recording is started, the designated channel cannot be changed until the time at which recording is ended.

Furthermore, if the user depresses the decision key on "Viewing", reserve for viewing is decided, a specified frequency is set to the tuner of the audio video deriving unit 1009 or 1019 at the time of start of the program, and a video signal and an audio signal are produced as in the case of reserve for recording. The video signal is output to the display 1011 via the synthesizer 1010 and a picture is displayed on the view of the display 1011, and the audio signal is amplified via the switch 1026 by the amplifier 1027 and audio is output from the speaker 1028.

Furthermore, a plurality of programs can be designated, and programs to be reserved can be designated one after another.

(Method for Reserving Program at Child Device 1071)

The method for reserving a program at the child device 1071 will now be described. If the user depresses the program table key 1422 of the child device 1071, the CPU 1060 detects it via the key transmitter 1042 and the key receiver 1043. The CPU 1060 produces a table including time zones and names of programs based on program information transmitted from the demultiplexer 1005 or 1015, and instructs the OSD producer 1061 to form the contents of the table into data. As a result, the program table shown in FIG. 50 is displayed on the display 1035.

If the cursor is moved using cursors 1404 to 1407 of the key 1040 when such a program table is displayed, the color of the background of a column in which the cursor is located becomes darker as shown in FIG. 50, so that the column in which the cursor is located is indicated. The program of the OSD producer 1061 is configured to produce a message 1313 of, for example, "Reserve Of Program In Viewing" when the cursor is moved to the column where a program to be reserved is indicated, and the decision key 1403 is depressed as shown in FIG. 52.

For example, if the user depresses the decision key 1403 on "Viewing", reserve for viewing is decided, a specified frequency is set to the tuner of the audio video deriving unit 1009 or 1019 at the time of start of the program, and a video signal and an audio signal are produced, the video signal is output to the child device 1071 via the switch 1020 and the video transmitter 1033, and the audio signal is output to the child device 1071 via the switch 1030 and the audio transmitter 1036. In the child device 1071, the video signal is received by the video receiver 1034, and a picture is displayed on the view of the display 1035. Furthermore, the audio signal is received by the audio receiver 1037, and then amplified by the amplifier, and audio is output from the speaker 1039.

(Method of Mediation)

The operation at the time of reserving the start of recording or viewing will now be described more specifically. In this embodiment, two audio video deriving units 1009 and 1019 are provided, while three views including two views of the parent device 1070 and one view of the child device 1071 are provided. That is, in terms of hardware, the number of pictures capable of being displayed exceeds the number of tuners 1002 and 1012 constituting broadcast resources. Thus, mediation may be required depending on the timing and type of the request of changing a channel from the parent device 1070 and the child device 1071. In this embodiment, a program required in such a case is stored in the program ROM 1057. The contents of this program and the operation of the CPU 1060 based on the contents will be described.

In this embodiment, the priority decreases in the order of "reserve for recording by parent device 1070", "reserve for viewing by child device 1071" and "channel request by parent device 1070" for the channel operation at the parent device 1070. For the channel operation at the child device 1071, the priority decreases in the order of "reserve for recording or viewing by parent device 1070", "reserve for viewing by child device 1071" and "channel request by child device 1071". Operations for the channel operation at the parent device 1070 and the channel operation at the child device 1071 will be described in this order below.

If the user operates any one of the channel keys 1120 of the remote control 1054 of the parent device 1070, or the channel up key 1131 or down key 1130 at step S1202 as shown in FIG. 53, the CPU 1060 determines whether the audio video deriving unit 1009 or 1019 is used at the present time for recording based on the reserve for recording by the parent device 1070 at step S1203.

If it is determined at step S1203 that the audio video deriving unit 1009 or 1019 is not used to reserve recording, process proceeds to step S1208. If the audio video deriving unit 1009 or 1019 is used, process proceeds to step S1204, where whether the audio video deriving unit 1009 or 1069, which is not used to reserve recording, is used for viewing by reserve for viewing is determined. If none of the audio video deriving units 1009 and 1019 is used, process proceeds to step S1210, and if one of them is used, process proceeds to step S1205.

Figure 55:
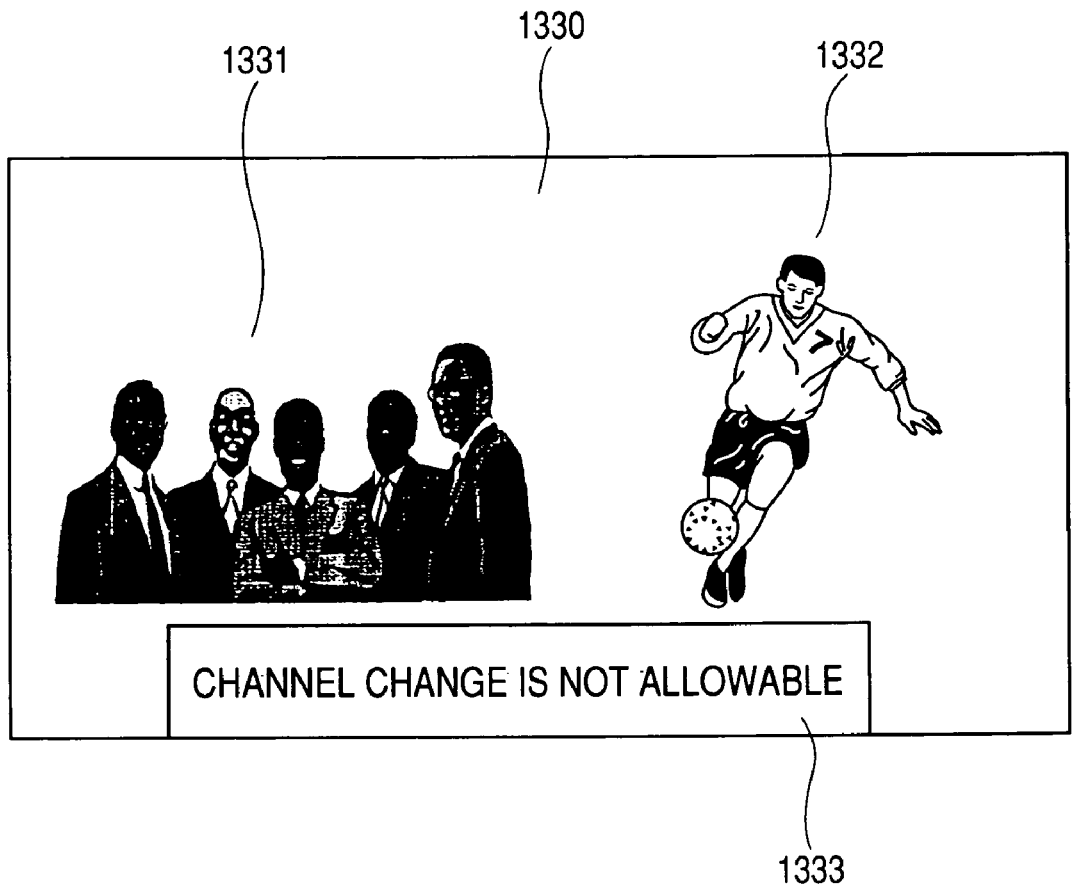
FIG. 55 shows an example of a picture displayed on the display 1011 in process at step S1205.

At step S1205, since both the audio video deriving units 1009 and 1019 are used in two systems, the CPU 1060 causes the OSD producer 1061 to produce a message of "Channel Change Is Not Allowable", so that a channel change is not accepted even if the remote control 1054 is operated. FIG. 55 shows an example of a picture displayed on the display 1011 by process at step S1205. As shown in FIG. 55, on a view 1330 of the display 1011, a monitor view 1331 for a program reserved in recording and a monitor view 1332 for a program reserved in viewing at the child device 1071 are displayed, and the OSD signal 1083 output from the OSD producer 1061 is synthesized with the video signals 1081 and 1082 by the synthesizer 1010 and an OSD view 1333 is also displayed, for example.

At step S1210, since only one of the audio video deriving units 1009 and 1019 is used to reserve recording, the priority of the channel request at the parent device 1070 is the second according to the set priority, and therefore the picture of a designated channel is displayed using the audio video deriving unit 1009 or 1010, which is not used.

Furthermore, at step S1208, whether the audio video deriving unit 1009 or 1019 is used in reserve by the child device 1071 is determined, and if it is not used, process proceeds to step S1209. If one of the audio video deriving units 1009 and 1019 is used, one system of the audio video deriving units is used to reserve viewing by the child device 1071, and therefore the picture of a designated channel is displayed using one system of the audio video deriving units, which is not used, at step S1207. At step S1209, none of the audio video deriving units 1009 and 1919 is used by reserving recording or viewing, and therefore the channel is changed to a designate channel and a picture is displayed in the audio video deriving unit 1009 or 1019.

In this way, process is ended at step S1211.

Figure 54:
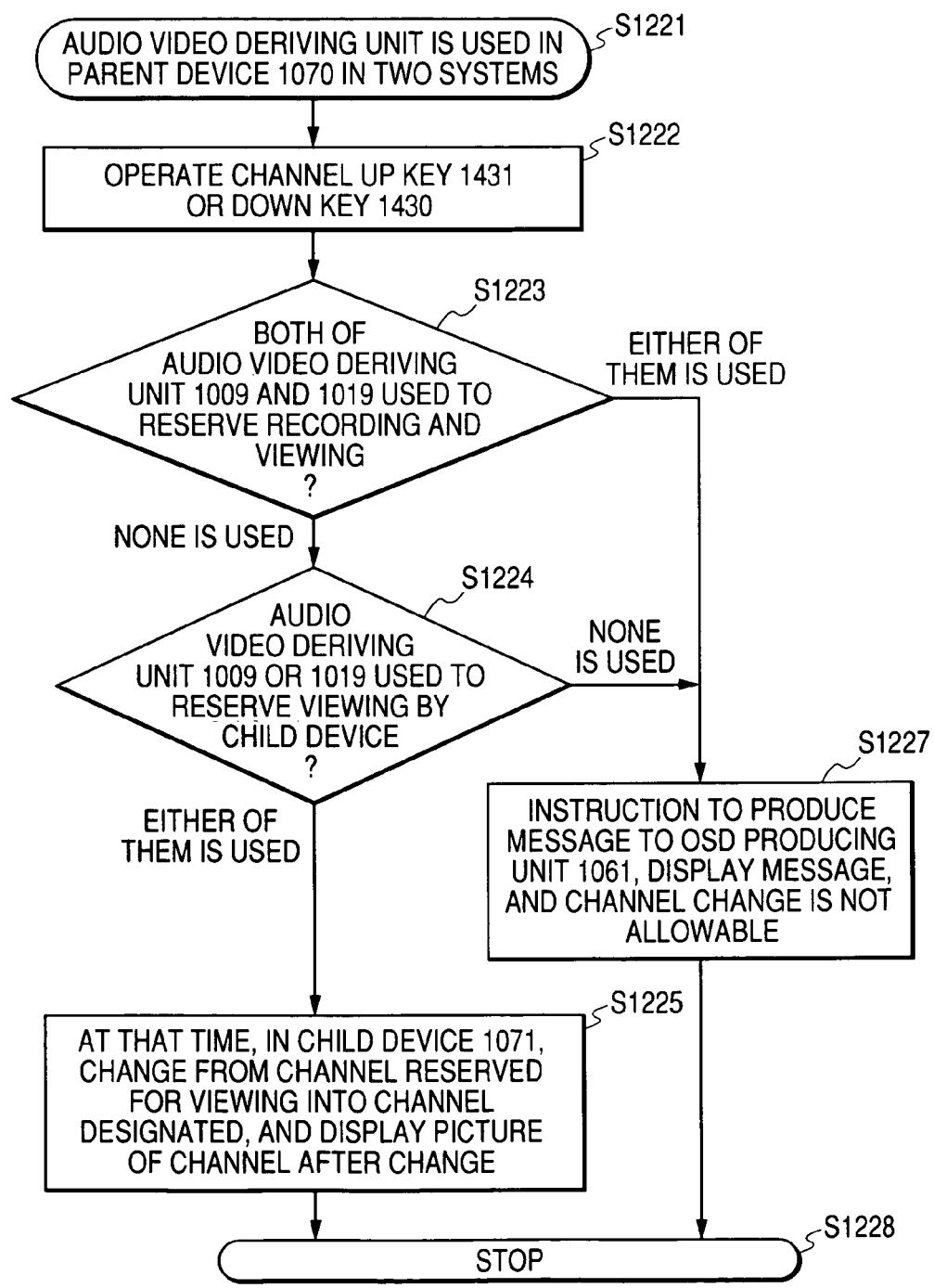
FIG. 54 is a flowchart showing the channel operation when the channel operation is performed at the CHILD device 1071.

The operation where the channel operation is performed at the child device 1071 will now be described. As shown in FIG. 54, two systems of the audio video deriving units 1009 and 1019 are used by the deriving unit 1070 in an initial state (step S1221), and the CPU 1060 recognizes it.

If the user operates the channel up key 1431 or down key 1430 of the child device 1071 at step S1222, the CPU 1060 determines whether both of the audio video deriving units 1009 and 1019 are used to reserve recording and viewing at step S1223.

If it is determined at step S1223 that any of the deriving units is used, process proceeds to step S1227, and if they are not used (one or none of them is used), process proceeds to step S1224. At step S1224, whether the audio video deriving unit 1009 or 1019 is used to reserve viewing at the child device 1071 is determined, and if none is used, i.e. both of the audio video deriving units are used for normal viewing at the parent device 1070, process proceeds to step S1227. If the audio video deriving unit 1009 or 1019 is used to reserve viewing at the child device 1071, process proceeds to step S1225, where the channel reserved for viewing at this time in the child device 1071 is changed to the designated channel, and a picture is displayed.

At step S1227, since both audio video deriving units 1009 and 1019 are used in two systems for viewing at the parent device 1070, the CPU 1060 causes the OSD producer 1061 to produce a message of "Channel Change Is Not Allowable", so that a channel change is not accepted even if the up key 1431 or down key 1430 is operated.

In this way, process is ended at step S1228.

When the user operates the up key 1431/down key 1430 of the channel of the child device 1071 if only one of the audio video deriving units 1009 and 1019 is used by the parent device 1070, one system of the audio video deriving units, which is not used for the parent device 1070, exists and can be therefore used for the child device 1071 and the channel is immediately changed.

Ninth Embodiment

Figure 56:
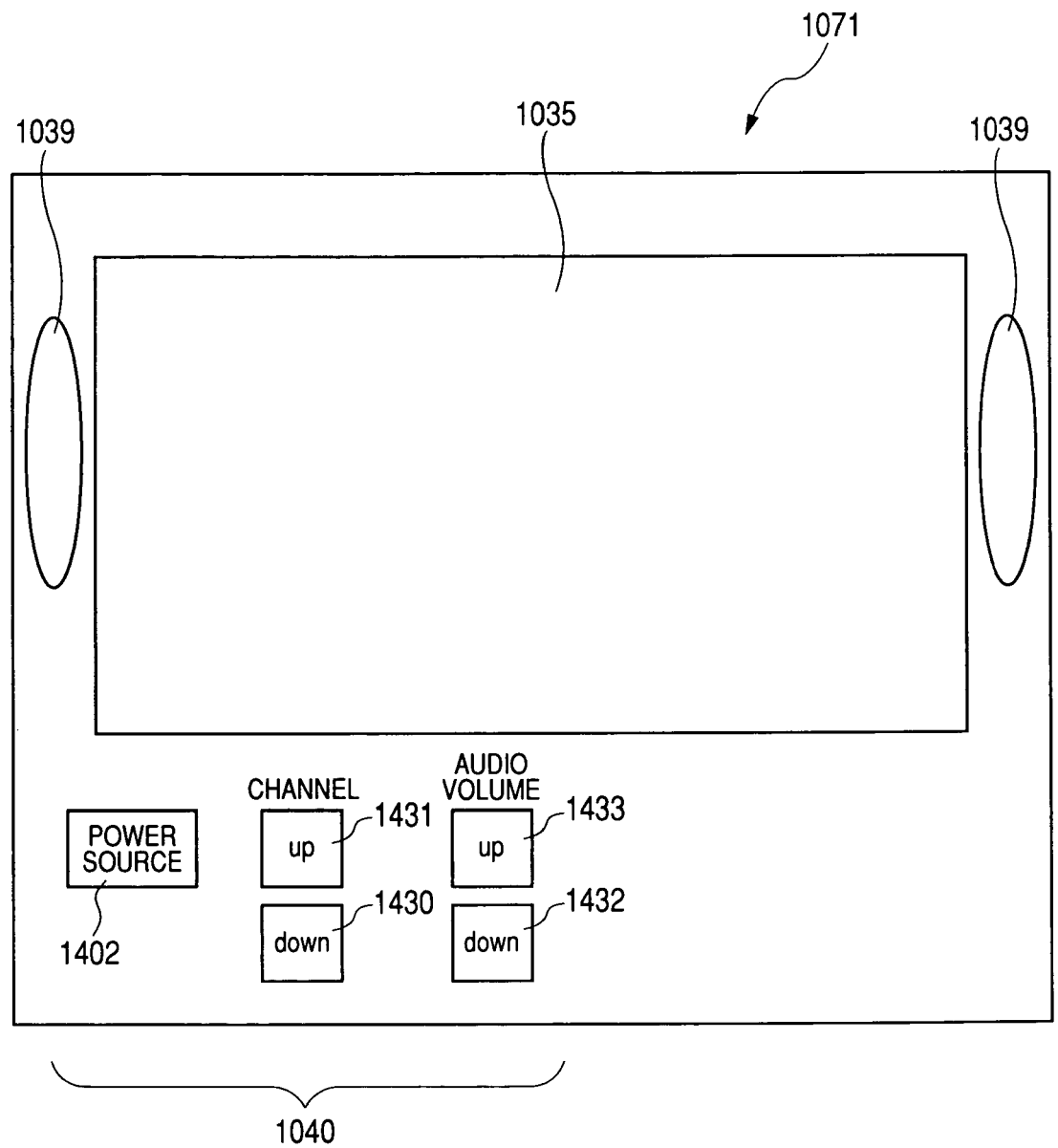
FIG. 56 shows the exterior appearance of the child device 1071 when viewed from the front in the ninth embodiment of the present invention.

The ninth embodiment of the present invention will now be described. In the ninth embodiment, the child device 1071 has no function of reserving viewing. FIG. 56 shows the exterior appearance of the child device 1071 in the ninth embodiment when viewed from the front.

In this embodiment, the key 1040 is constituted only by the channel down key 1430, the channel up key 1431, the audio volume down key 1432, the audio volume up key 1433 and the power source key 1402 as shown in FIG. 56.

In this embodiment, mediation is required if the channel change is requested by the parent device 1070 and the child device 1071. In this embodiment, the priority decreases in the order of "reserve for recording by parent device 1070", "channel request by parent device 1070" and "channel request by child device 1071" for the channel requests. That is, the channel operation at the parent device 1070 can be performed independently of the state of the child device 1071. The channel operation cannot be performed at the child device 1071 if the audio video deriving units 1009 and 1019 are used in two systems at the parent device 1070.

Tenth Embodiment

Figure 57:
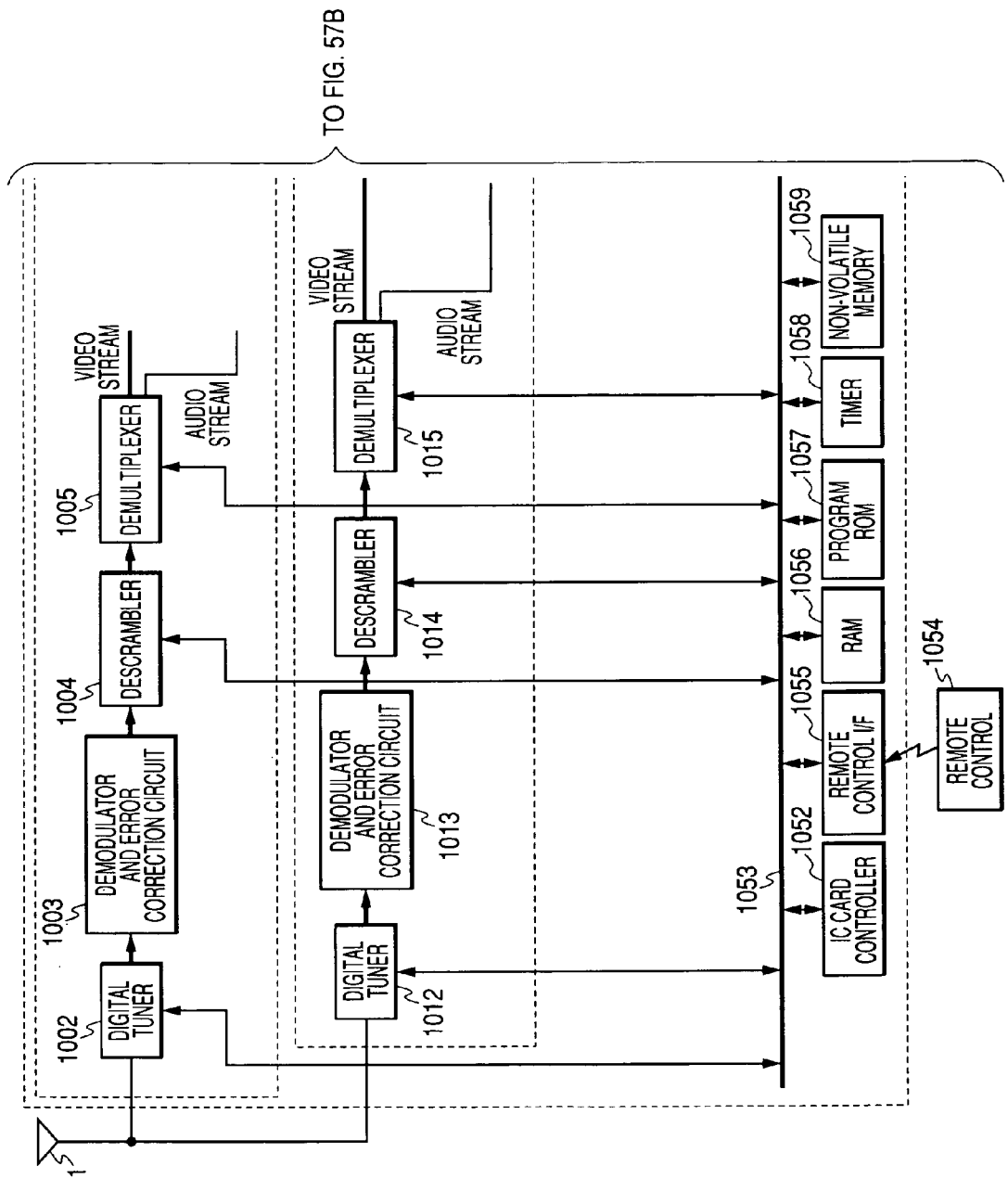
FIG. 57 is comprised of FIGS. 57A and 57B which are block diagrams showing the TV system according to the tenth embodiment of the present invention.
Figure 57B:
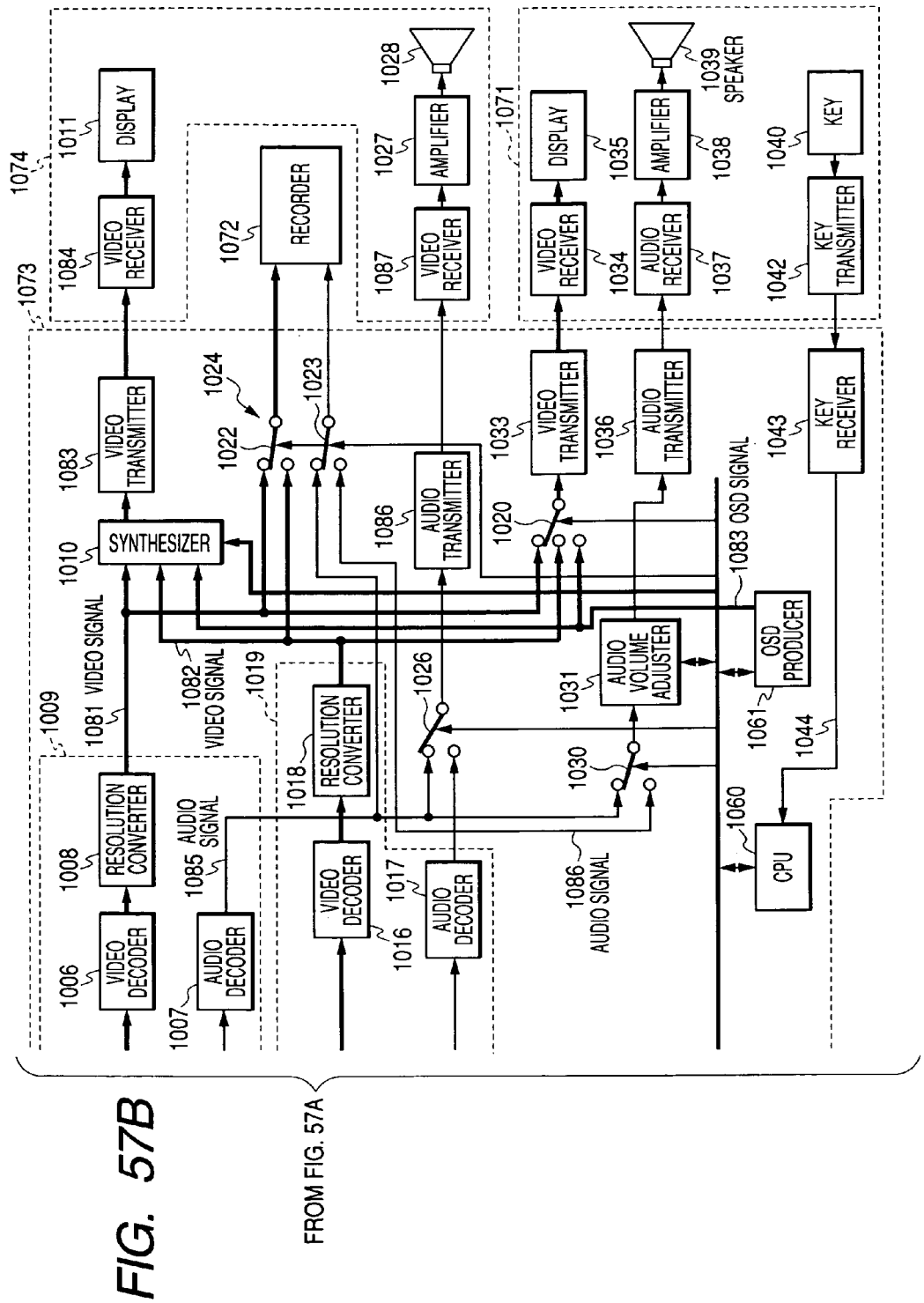

The tenth embodiment of the present invention will now be described. In the tenth embodiment, an audio video input processor including an audio video deriving unit and an audio video output processor including a display and a speaker are mutually separated. FIGS. 57A and 57B are block diagrams showing the configuration of a TV system according to the tenth embodiment of the present invention.

In this embodiment, the parent device is constituted by an audio video input processor 1073 and an audio video output processor 1074 as shown in FIGS. 57A and 57B.

In the audio video input processor 1073, the display 1011, amplifier 1027 and speaker 1028 provided in the parent device 1070 are not provided, but the video transmitter 1083 is provided in the post-stage of the synthesizer 1010, and the audio transmitter 1086 is provided in the post-stage of the switch 1026.

Furthermore, the audio video output processor 1074 is provided with the display 1011, the amplifier 1027 and the speaker 1028, and also provided with a video receiver 1084 receiving a video signal transmitted from the video transmitter 1083 and outputting the video signal to the display 1011, and an audio receiver 1087 receiving an audio signal transmitted from the audio transmitter 1086 and outputting the audio signal to the amplifier 1027.

Operations of reserve for viewing, reserve for recording and the like in the audio video output processor 1074 are performed using the remote control 1054. Furthermore, the priority of pictures displayed on the display 1011 is set in the same manner as in the embodiment 8 or 9.

In the tenth embodiment, operations same as those in the embodiment 8 or 9 are performed, and the same effect can be obtained.

Transmission of signals between the audio video input processor 1073 and the audio video output processor 1074 may be done by either a wired or wireless system.

Eleventh Embodiment

Figure 58:
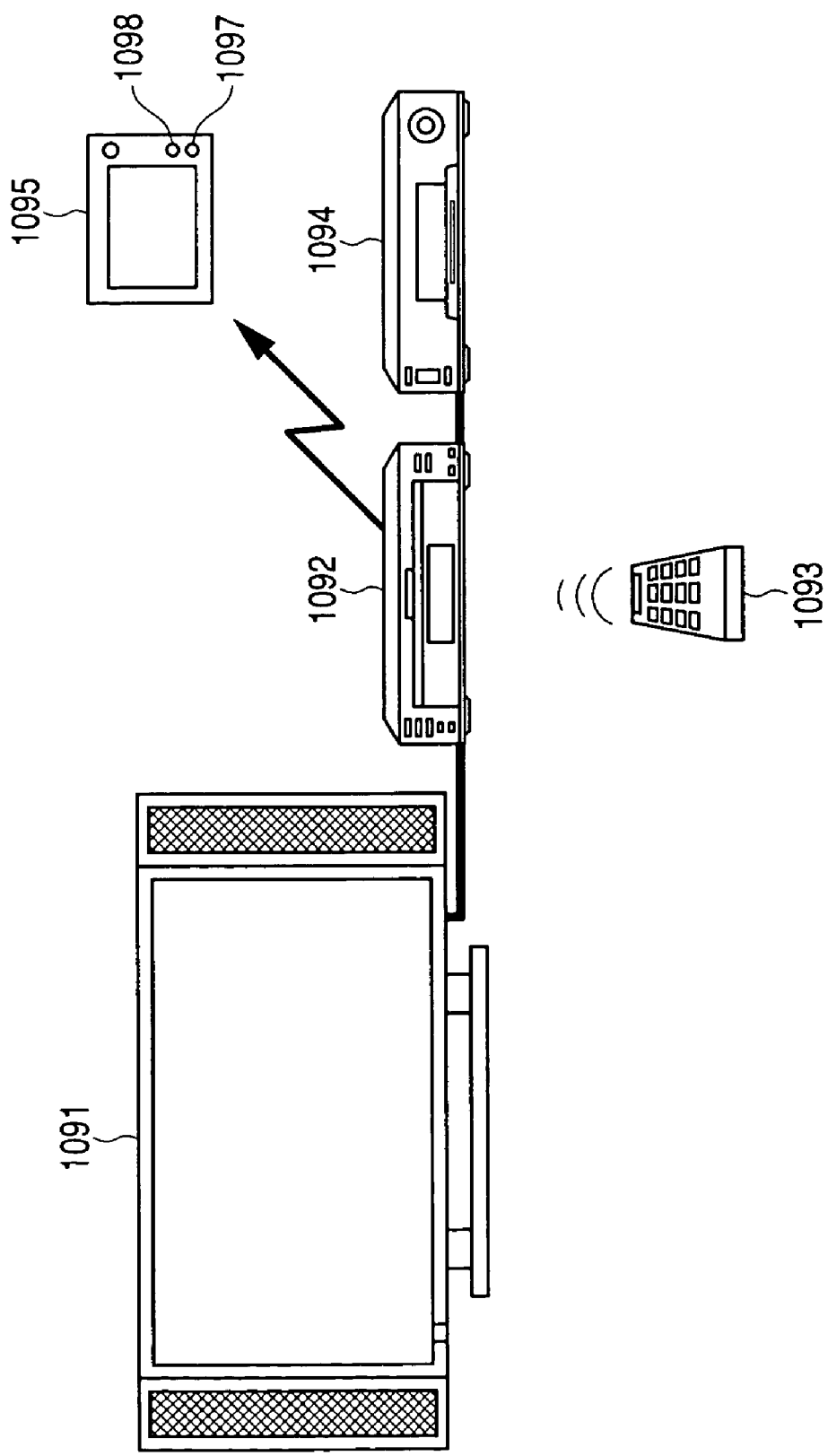
FIG. 58 shows the configuration of the TV system according to the eleventh embodiment of the present invention.

The eleventh embodiment of the present invention will now be described. FIG. 58 shows the configuration of a TV system according to the eleventh embodiment of the present invention.

The TV system is provided with a display 1091 using a display device such as a PDP or CRT, and a set top box (hereinafter abbreviated as STB) 1092 being a receiver having both functions of converting received broadcast radio wave into a signal displayed on the display 1091 and of transmitting video data. The parent device is constituted by the display 1091 (main display) and the STB 1092 (information processor).

Further, the TV system is provided with a remote control device (hereinafter abbreviated as remote control) 1093 for remotely operating the STB 1092, a video tape recorder (hereinafter abbreviated as VTR) 1094, and an analog TV receiver set using a display device such as a small-sized CRT as a child device 1095. The analog child device 1095 is equipped with an OK button (admitting button) 1097 and a cancel button (refusal button) 1098 for responding to a message from the STB 1092.

Figure 59:
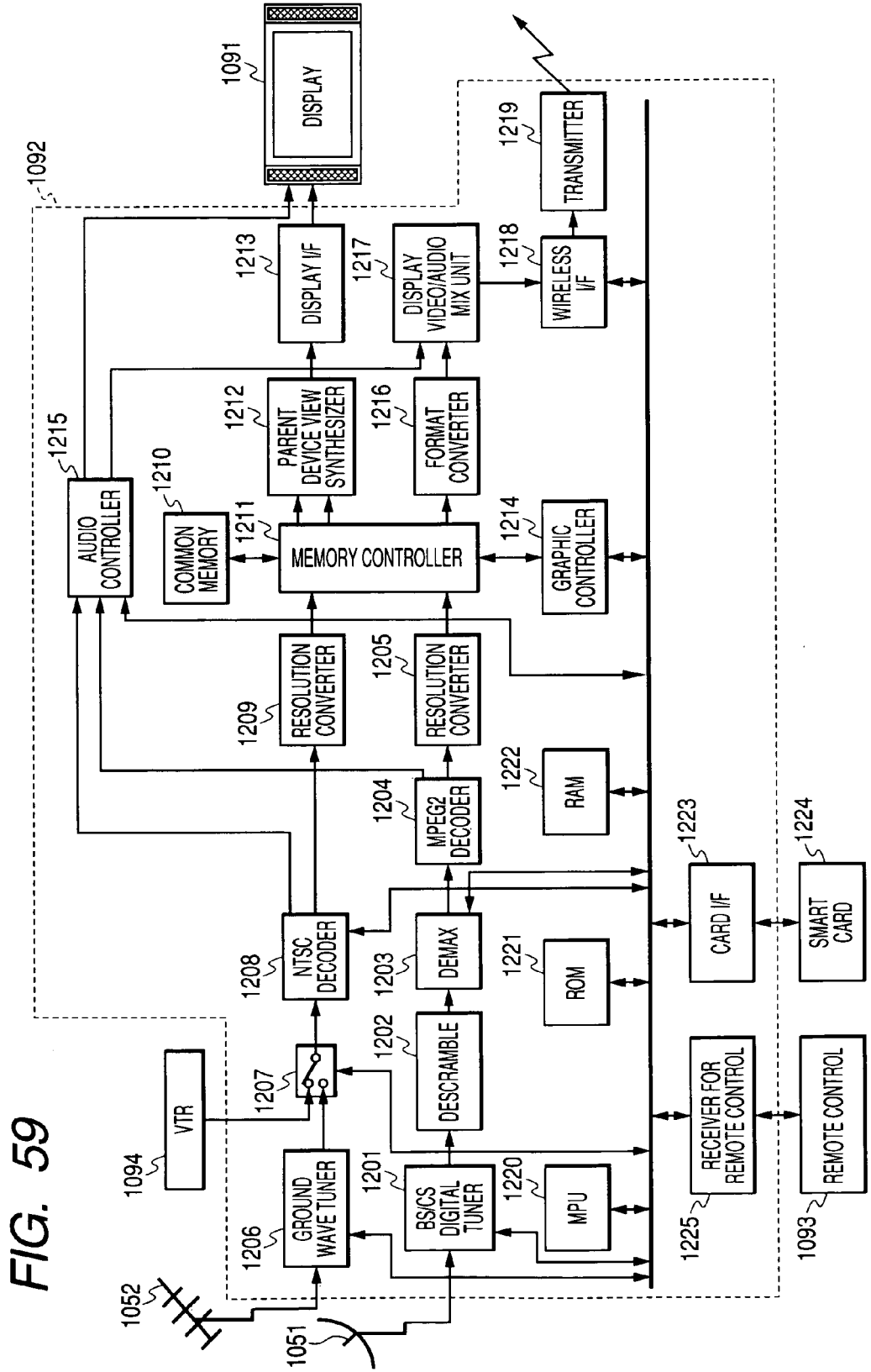
FIG. 59 shows a block diagram showing the outlined configuration of the STB 1092 and the peripheral devices.

FIG. 59 is a block diagram showing the outlined configuration of the STB 1092 and peripheral devices. To the STB 1092, not just a display 1091 is connected as described FIG. 58 but in addition, a BS/CS digital broadcast receiving antenna 1051 receiving broadcasts of, for example, TV programs, an analog ground wave transmission/reception antenna 1052 and the VTR 1094 are connected.

The STB 1092 is provided therein with a BS/CS digital tuner 1201, a scramble cancellation IC (descramble) 1202, demultiplexer 1203 (demux) separating pictures, audio and data, an MPEG 2 decoder 1204 expanding pictures and audio, and a resolution converter 1205 for video data expanded by the decoder 1204.

The STB 1092 is further provided therein with a ground a tuner 1206 for ground wave broadcasts, a switch circuit 1207 switching between NTSC signals from the tuner 1206 and the VTR 1034, an NTSC decoder 1208 decoding NTSC signals, and a resolution converter 1209 for decoded video data.

Further, the STB 1092 is provided therein with a common memory 1210 temporarily storing video data converted by the resolution converters 1205 and 1209, a memory controller 1211 controlling the common memory 1210, a parent device view synthesizer 1212 synthesizing a plurality of views for the display 1031, and a display I/F 1213 converting an output signal of the parent device view synthesizer 1212 into a signal for the display 1091. In this embodiment, main output means is constituted by the parent device view synthesizer 1212 and the display I/F 1213.

Further, the STB 1092 is provided therein with a graphic controller 1214, an audio controller 1215 dividing audio data expanded by the decoder 1204 or 1208 between the parent device and the child device, a format converter 1216 converting video data matching the size of the view of the child device 1095, a video/audio Mix unit 1217 synthesizing audio data divided from the audio controller 1215 and video data converted by the format converter 1216, a wireless I/F 1218 converting data synthesized by the video/audio Mix unit 1217 into a signal for transmission to the child device, and a transmitter 1219 transmitting the signal to the child device 1095. In this embodiment, sub-output means is constituted by the format converter 1216 and the wireless I/F 1218.

The STB 1092 is further provided therein with a microprocessor (hereinafter abbreviated as MPU) 1220 controlling the overall STB 1092, a ROM 1221 storing video data formed in advance, a RAM 1222 temporarily storing various data in the STB 1092, a card interface 1223, and a receiver for remote control 1225 receiving a signal from the remote control 1093. Information in a smartcard 1224 having the ID number and the like of the STB 1092 incorporated therein is read by the card interface (card I/F) 1223.

In the STB 1092 configured as described above, a stream of MPEG 2 received by the BS/CS digital tuner 1201 is descrambled by the scramble cancellation IC 1202 and divided into pictures, audio and added data by the demultiplexer 1203, and the picture and audio are decoded by the decoder 1204. For the broadcast radio wave received by the ground wave tuner 1206, and regenerated picture from the VTR 1094 connected to the STB 1092, the signal output from the switch circuit 1207 to the NTSC decoder 1208 by the input signal from the remote control 1093 is switched, and decoded by the NTSC decoder 1208.

Data of the picture decoded by the decoder 1204 or 1208 has its resolution converted by the resolution converter 1205 or 1209, respectively, and temporarily stored in the common memory 1210 through the memory controller 1211. Video data for OSD is previously stored in the ROM 1220, and the picture stored in the common memory 1210 and the picture for OSD are synthesized by the view synthesizer 1212 as appropriate, and output to the display 1091 through the display I/F 1213.

Furthermore, for audio data decoded by the decoder 1204 or 1208, audio data matching the picture output to the display 1091 by the audio controller 1215 is selected by the MPU 1220, sent to the display 1091 and output.

Furthermore, added data such as an electronic program table and program information is divided by the demultiplexer 1203, stored in the RAM 1222, analyzed by the MPU 1220, and displayed on the views through the graphic controller 1214 as appropriate.

Furthermore, video data designated by the remote control 1093 from video data stored in the common memory 1210 is converted into optimized video data of the view of the child device through the format converter 1216, synthesized with audio data sent from the audio controller by the video/audio Mix unit 1217, and converted into a signal for transmission by the wireless I/F 1218. Converted data is transmitted from the transmitter 1219 to the child device. The system of transmission to the child device is not limited to a wireless transmission system, but may be a wired system.

Figure 60:
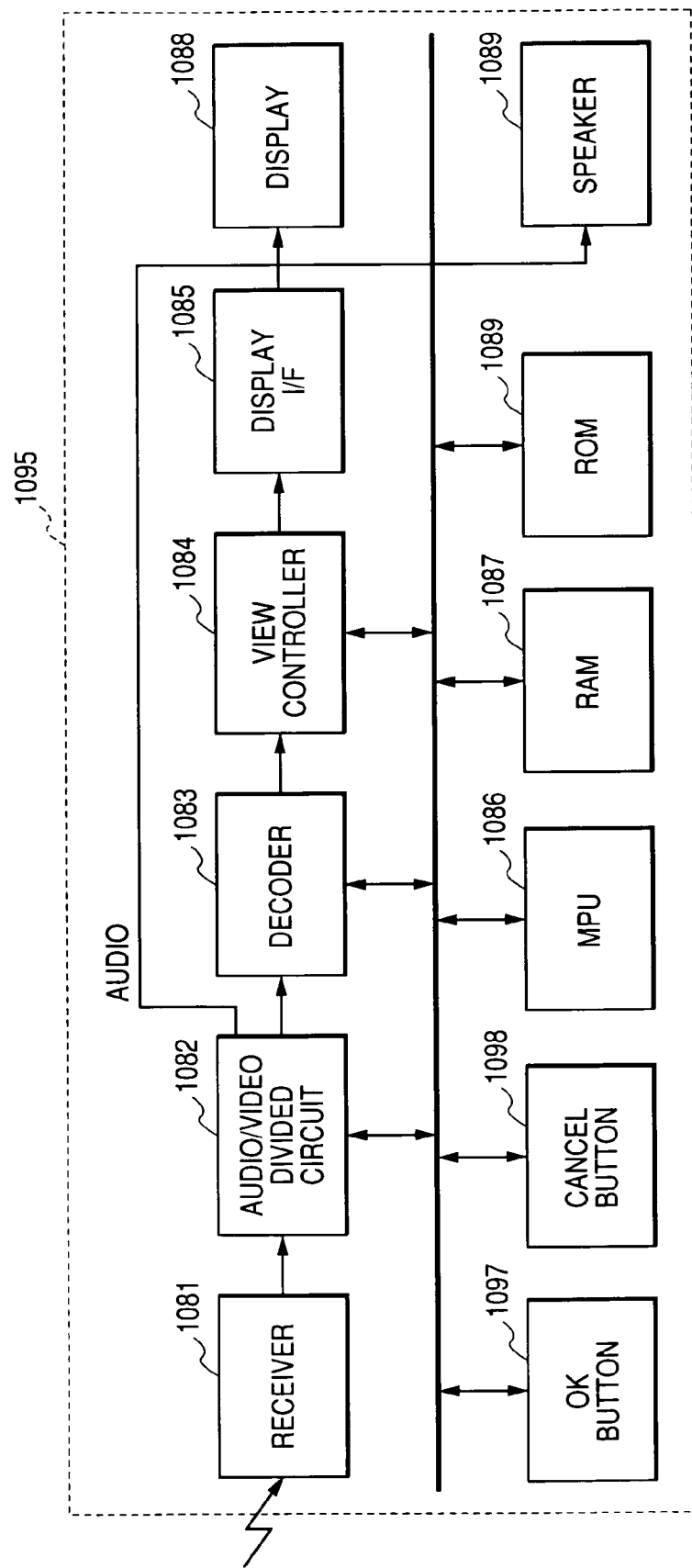
FIG. 60 is a block diagram showing the outlined configuration of the child device 1095.

FIG. 60 is a block diagram showing the outlined configuration of the child device 1095. The child device 1095 is provided with a receiver 1081 receiving a signal transmitted from the STB 1092 constituting the parent device, an audio/video divider circuit 1082 dividing mutually synthesized video data and audio data, a decoder 1083 decoding divided video data, a view controller 1084 controlling decoded video data, a display I/F 1085 converting data into a signal for display, an MPU 1086 controlling the overall analog TV receiver set 1045, a RAM 1087 temporarily storing video data and the like, a ROM 1089 storing a message produced in advance, a display 1088 such as a liquid crystal display, and a speaker 1090.

In the child device 1095 configured as described above, the receiver 1081 receives a signal transmitted from the STB 1092, and the audio/video divider circuit 1082 divides video data and audio data from each other. The audio data is transmitted to the speaker 1090, and audio is output from the speaker 1090. The video data is decoded by the decoder 1083, and converted into a signal for display by the display I/F 1085 through the view controller 1084. The converted video data is transmitted to the display 1088, and the picture is displayed on the view of the display 1088.

Figure 61:
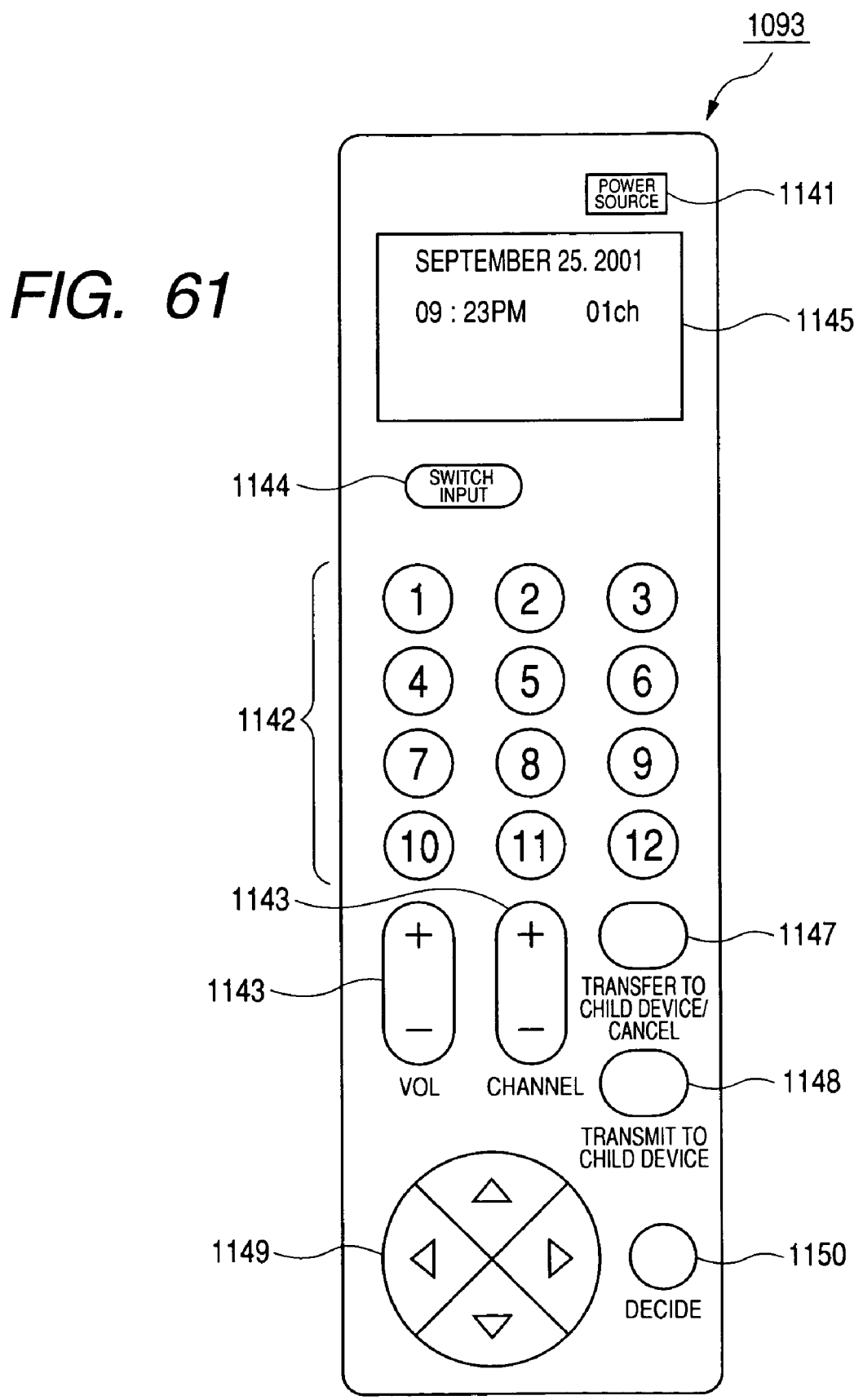
FIG. 61 shows one example of the exterior appearance of a remote control 1093.

FIG. 61 shows one example of the exterior appearance of the remote control 1093. The remote control 1093 is provided with a power source button 1141 controlling On/Off of the power of the STB 1092, 12 selection buttons 1142 selecting a channel of the STB 1092, an audio volume adjustment button 1143, an input switching button 1144 switching between the ground wave broadcast and the BS/CS digital broadcast and the external input, a display 1145 constituted by a liquid crystal display, LED or the like displaying a date, a time, the number of a channel in reception and the like, a channel switching button 1146 switching channels one after another, a button of transferring to the child device/cancel 1147 selecting start of transferring/cancel, a child device communication button 1148 transmitting a massage to the child device 1095, a cross key 1149 and a decision button 1150. In this remote control 1093, if the input switching button 1144 is depressed, the input source is switched from ground wave to BS/CS digital to external input to ground wave in this order.

When the channel is selected using the remote control 1093, a desired input source is selected from the tuner or external input using the input switching button 1144, and then any one of the selection buttons 1142, or the channel switching button 1146 is depressed. If data is transferred to the child device 1095, a program desired to be transferred or external input is selected, and the button of transferring to the child device/cancel 1147 is depressed. Furthermore, if the a request of canceling transferring is transmitted to the child device 1095, the child device communication button is depressed. The details of the contents of the request of canceling transferring to the child device 1095 and the operation at this time will be described later.

FIGS. 62A to 62D and 63A to 63C show examples of the views of the display 1091 and the display 1088 in the eleventh embodiment of the present invention. In FIGS. 62A to 62D and 63A to 63C the larger view (left side) represents the view of the display 1091, and the smaller view (right side) represents the view of the display 1088 of the child device 1095.

Figure 62A:
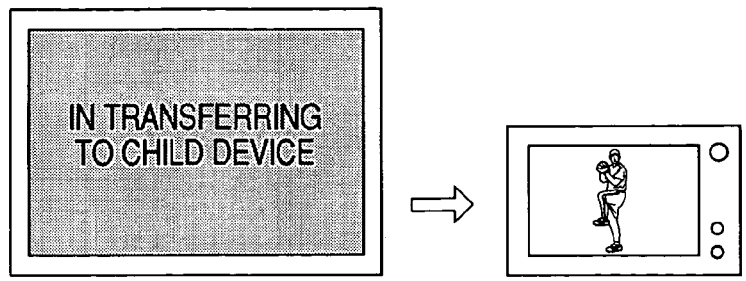
FIGS. 62A, 62B, 62C and 62D show examples of views of the display 1091 and the display 1088 in the eleventh embodiment of the present invention.

FIG. 62A shows a state in which a picture displayed on the display 1091 is being transferred to the child device 1095.

Figure 62B:
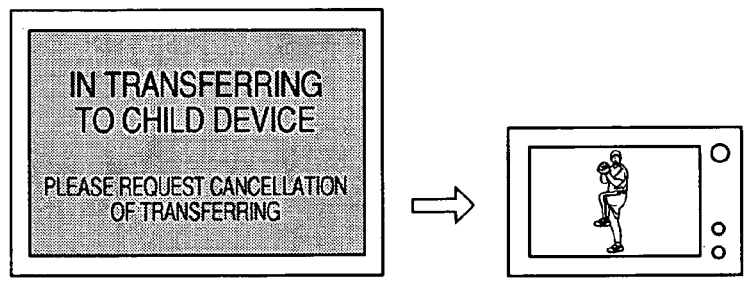

If a video source same as the child device 1095 is selected at the parent device side in the state shown in FIG. 62A, a message of "In Transferring To Child Device. Please Request Cancellation Of Transferring." is displayed on the display 1091 as shown in FIG. 62B.

Figure 62C:
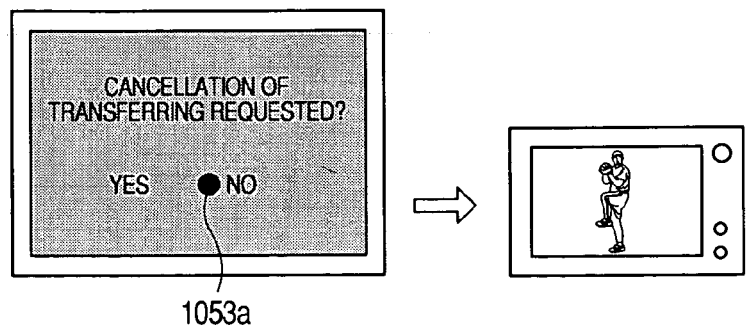

If the child device communication button 1148 of the remote control 1093 is depressed according to the message described above in the state shown in FIG. 62B, a message of "Cancellation of Transferring Requested?" is displayed on the display 1091 as shown in FIG. 62C.

Figure 62D:
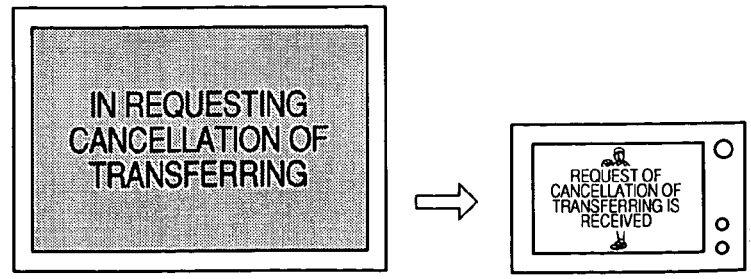

If a cursor 1053a is pointed at "Yes" using the cross key 1149 of the remote control 1093, and the decision button 1150 is depressed in the sate shown in FIG. 62C, a signal of requesting cancellation of transferring is transmitted to the child device, and a message of "In Requesting Cancellation Of Transferring" is displayed on the display 1091, and a message of "Requesting Cancellation Of Transferring Is Received" is displayed on the display 1088 of the child device 1095 as shown in FIG. 62D. These messages are continuously displayed until the OK button 1097 or cancel button 1098 is depressed before the elapse of, for example, 5 minutes after they are displayed.

If the user of the child device 1095 accepts cancellation of transferring in the state shown in FIG. 62D, the user depressed the OK button 1097. As a result, a signal indicating acceptance of cancellation of transferring is transmitted from the child device 1095 to the parent device, and a message of "Transferring Cancelled" and a picture, which has been transferred to the child device 1095, are displayed on the display 1091 of the parent device as shown FIG. 63A. A message of "Transferring Cancelled" is displayed on the display 1088 of the child device 1095.

Figure 63A:
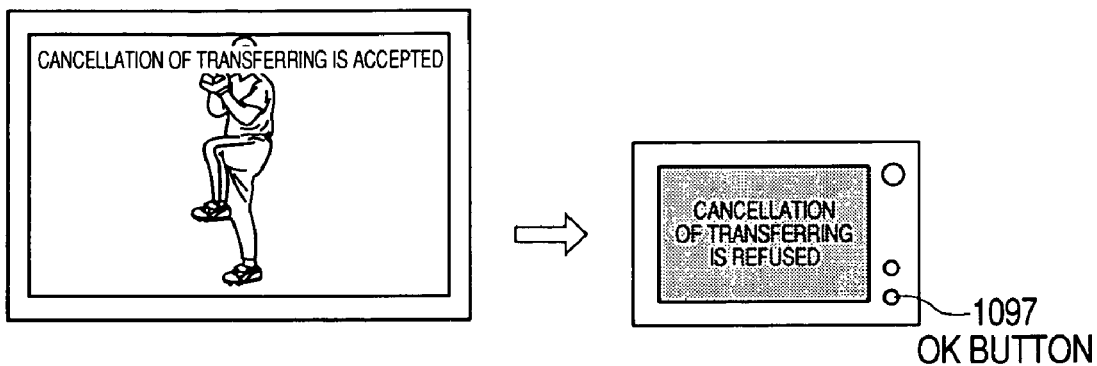
FIGS. 63A, 63B and 63C show examples of views of the display 1091 and the display 1088 in the eleventh embodiment of the present invention.
Figure 63B:
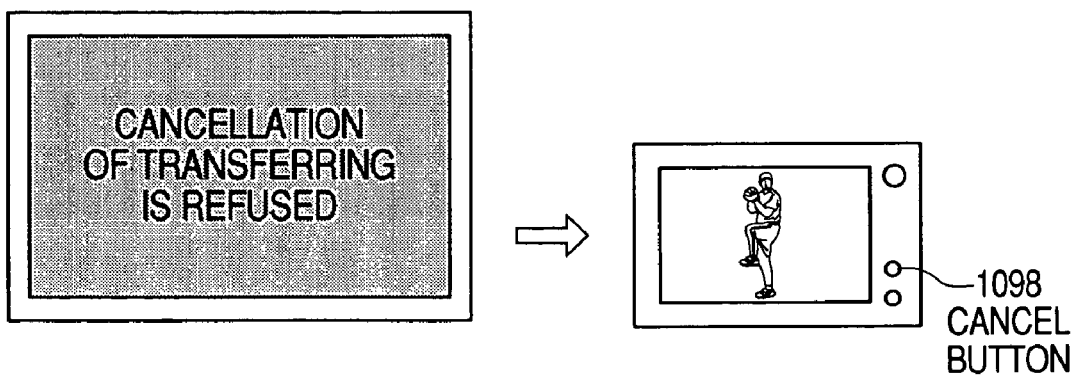

If the user of the child device 1095 refuses cancellation of transferring in the state shown in FIG. 62D, the user depresses the cancel button 1098. As a result, a signal indicating refusal of cancellation of transferring is transmitted from the child device 1095 to the parent device, and a message of "Cancellation Of Transferring Is Refused" is displayed on the display 1091 of the parent device as shown in FIG. 63B.

Figure 63C:
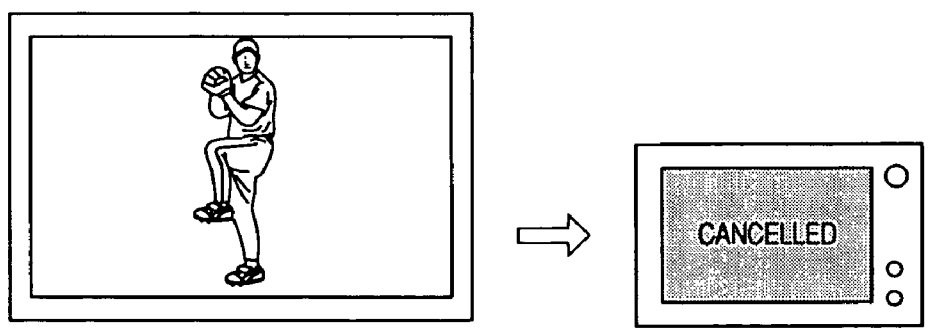

Furthermore, if the OK button 1097 or cancel button 1098 is not depressed during certain time (e.g., 5 minutes) despite that a signal of requesting cancellation of transferring is transmitted from the parent device to the child device 1095, and received by the child device 1095, the CPU 1060 determines that a picture at the child device 1095 is not viewed, and forcefully cancels transferring, and as shown in FIG. 63C, the picture, which has been transferred to the child device 1095, is displayed on the display 1091 of the parent device, and a message of "Transferring Cancelled" is displayed on the display 1088 of the child device.

Figures 64, 64A:
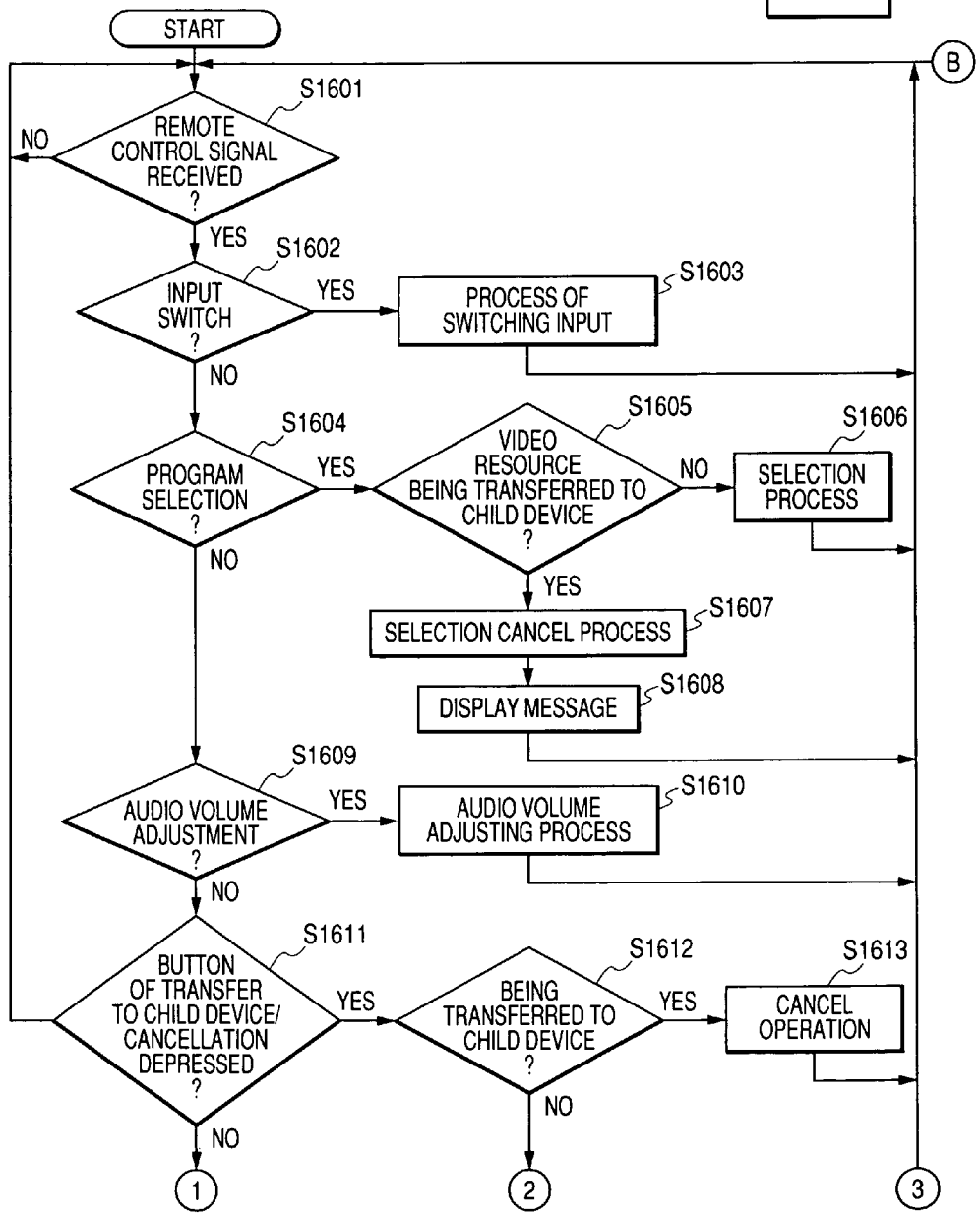
FIG. 64 is comprised of FIGS. 64A and 64B which are flowcharts showing the operation of the STB 1092 in the eleventh embodiment of the present invention.
Figure 64B:
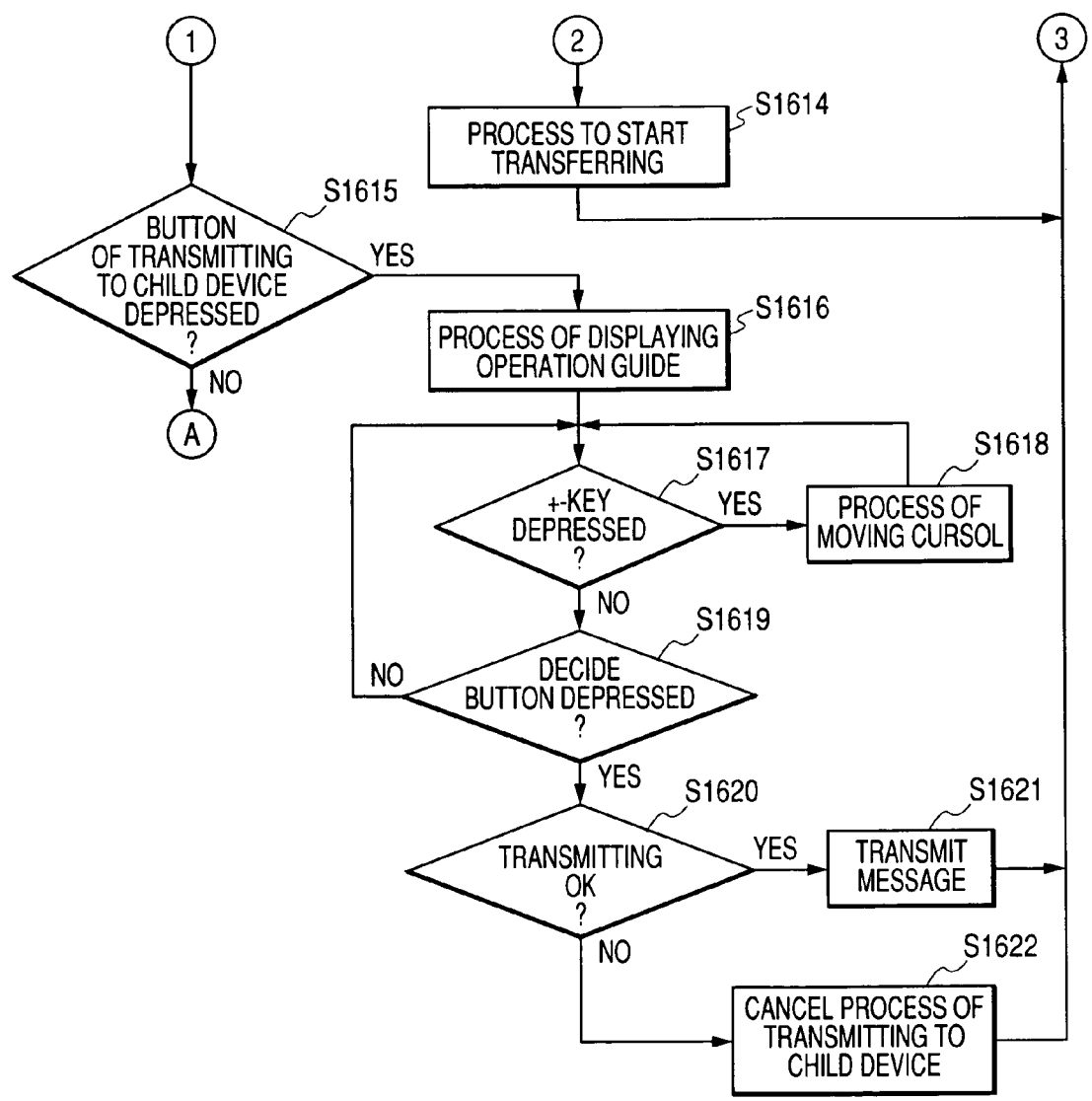
Figure 65:
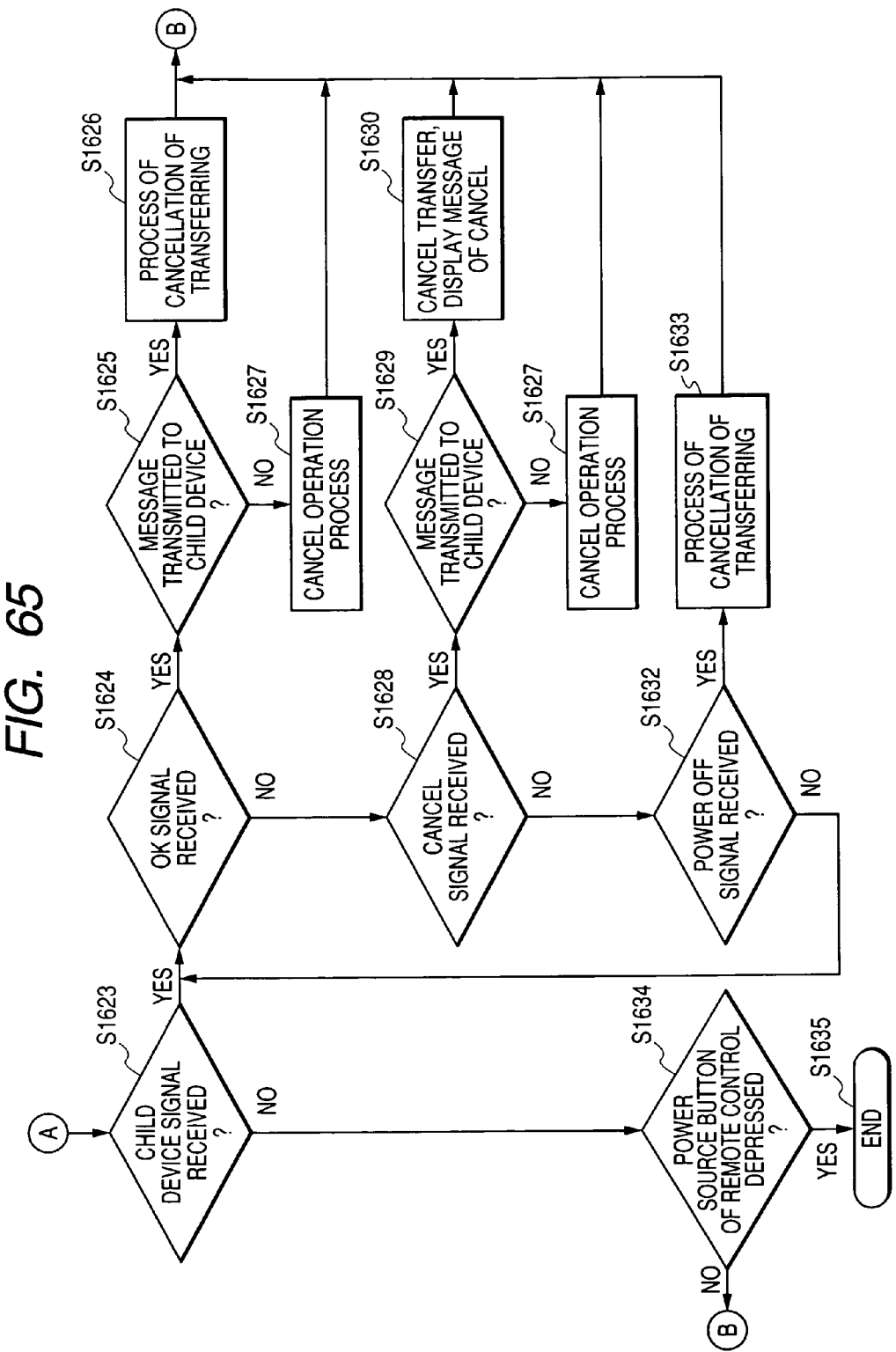
FIG. 65 is a flowchart showing the operation of the STB 1092 in the fourth embodiment of the present invention.

The operation of the STB 1092 in the eleventh embodiment will be described. FIGS. 64A, 64B and 65 are flowcharts each showing the operation of the STB 1092 in the eleventh embodiment of the present invention.

The powered STB 1092 determines whether a signal from the remote control 1093 is received or not at step S1601. If the signal from the remote control 1093 is received, whether the signal indicates input switch is determined at step S1602. If the signal indicates input switch, process of switching input is performed immediately at step S1603, and process returns to step S1601.

If the signal from the remote control 1093 does not indicate input switch at step S1602, whether the signal indicates program selection is determined at step S1604.

If the signal indicates program selection at step S1604, whether the selected video source is the video source being transferred to the child device 1095 or not is determined at step S1605. If the video source is not the video source being transferred to the child device 1095, process proceeds to step S1606, where selection process is performed, and process returns to step S1601.

If it is determined that the video source is the video source being transferred to the child device 1095 at step S1605, selection process is cancelled at step S1607, and a message shown in FIG. 62B is displayed (step S1608), and then process returns to step S1601. As long as the video source is transferred to the child device 1095, the message shown in FIG. 62A is displayed before the message shown in FIG. 62B is displayed.

If the signal from the remote control 1093 does not indicate program selection at step S1604, process proceeds to step S1609, where whether the signal indicates audio volume adjustment is determined. If the signal indicates audio volume adjustment, audio volume adjustment process is performed immediately at step S1610, and process returns to step S1601.

If the signal does not indicate audio volume adjustment at step S1609, whether the button of transferring to the child device/cancel 1147 has been depressed or not is determined at step S1611. If it is determined that the button of transferring to the child device/cancel 1147 has been depressed, whether the STB 1092 is in transferring to the child device 1095 or not is determined at step S1612. If it is in transferring to the child device 1095, process of canceling transferring is performed immediately at step S1613, and process returns to step S1601.

If the STB 1092 is not in transferring to the child device 1095 at step S1612, process of transferring a picture displayed at the parent device at this time is started immediately at step S1614, and process returns to step S1601.

If it is determined at step S1611 that the button of transferring to the child device/cancel 1147 has not been depressed, whether the child device communication button 1148 has been depressed or not is determined at step S1615. If it is determined that the child device communication button 1148 has been depressed, an operation guide shown in FIG. 62C is displayed at step S1616. Then, whether any one of the cross keys 1149 of the remote control 1093 has been depressed or not is determined at step S1617. If it is determined that any one of the cross keys 1149 has been depressed, process of moving a cursor is performed immediately at step S1618, and process returns to step S1617. If it is determined at step S1617 that the cross key 1149 has not been depressed, whether the decision button 1150 has been depressed or not is determined at step S1619.

If "Yes" is selected and then the decision button 1150 is depressed in the state shown in FIG. 62C at step S1619, whether transmitting to the child device is allowable or not is determined at step S1620. If it is determined that transmitting to the child device is allowable, process of transmitting (transmitting a message) to the child device 1095 is performed immediately at step S1621. Thereafter, a picture shown in FIG. 62D is displayed. If it is determined at step S1620 that transmitting to the child device is not allowable, process of transmitting to the child device is cancelled at step S1622, and process returns to step S1601. If "No" is selected and then the decision button 1150 is depressed in the state shown in FIG. 62C, process of transmitting to the child device is cancelled (not shown), and process returns to step S1601.

If it is determined at step S1615 that the button of transmitting to the child device 1148 has not been depressed, whether a signal has been received from the child device 1095 or not is determined at step S1623. If it is determined that the signal has been received from the child device 1095, whether an OK signal (signal generated when the OK button 1097 is depressed) has been received or not is determined at step S1624. If the OK signal has been received, whether a message signal has been transmitted from the STN 1092 to the child device 1095 or not is determined at step S1625. It is determined at step S1625 that the message signal has been transmitted to the child device 1095, it is determined that cancellation of transferring of the picture is accepted, and process of cancellation of transferring of the picture is performed immediately at step S1626. As a result, a picture shown in FIG. 63A is displayed.

If it is determined at step S1625 that the message signal has not been transmitted to the child device 1095, it is determined that the OK button 1097 has been depressed due to a wrong operation at the child device 1095, and operation process is cancelled at step S1627, and process returns to step S1601.

If the OK signal has not been received at step S1624, whether a cancel signal (signal generated when the cancel button 1098 is depressed) has been received or not is determined at step S1628. If the cancel signal has been received, whether the message signal has been transmitted from the STB 1092 to the child device 1095 or not is determined at step S1629. If it is determined that the message signal has been transmitted to the child device 1095, it is determined that cancellation of transferring of the picture is refused, and a message of refusal of cancellation of transferring shown in FIG. 63B is displayed on the display 1091, and process returns to step S1601.

If it is determined at step S1629 that the message signal has not been transmitted to the child device 1095, it is determined that the cancel button 1098 has been depressed due to a wrong operation at the child device 1095, operation process is cancelled at step S1631, and process returns to step S1601.

If the cancel signal has not been received at step S1628, whether a power off signal (signal generated when the power source button (not shown) is depressed) of the child device 1095 has been received or not is determined at step S1632. If it is determined that the power off signal has been received, process of cancellation of transferring of the picture is performed immediately at step S1634, and process returns to step S1601. If it is determined at step S1632 that the power off signal has not been received, process returns to step S1624.

If it is determined at step S1623 that the signal from the child device 1095 has not been received, whether the power source button of the remote control 1093 has been depressed or not is determined at step S1634. If it is determined that the power source button of the remote control 1093 has been depressed, process of stopping the STB 1092 is performed immediately, and the power of the STB 1092 itself is turned off at step S1635. It is determined at step S1634 that the power source button has not been depressed, process returns to step S1601.

At step S1621, the message to be displayed on the display 1088 may be previously stored in the ROM 1089 of the child device 1095, and instead of transmitting the message itself, a signal indicating read of the stored message may be transmitted.

Figure 66:
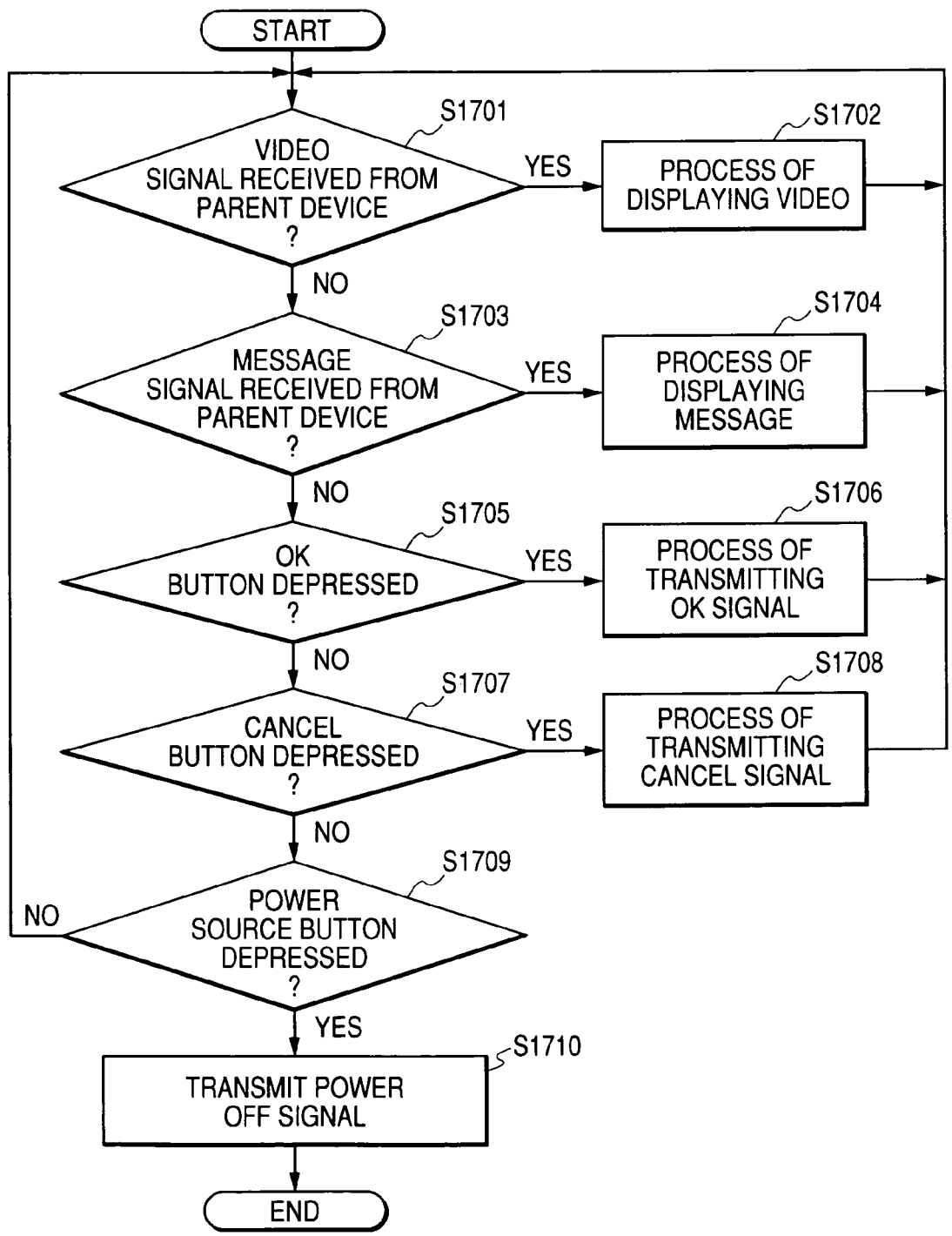
FIG. 66 is a flowchart showing the operation of the child device 1095 in the eleventh embodiment of the present invention.

The operation of the child device 1095 in the eleventh embodiment will now be described. FIG. 66 is a flowchart showing the operation of the child device 1095 in the eleventh embodiment of the present invention.

The powered child device 1095 determines whether a video signal has been received from the STB 1092 constituting the parent device or not at step S1701. If it is determined that the video signal has been received, process of displaying video is performed immediately at step S1702, and process returns to step S1701. If it is determined at step S1701 that the video signal has not been received, whether the message signal has been received from the parent device or not is determined at step S1703.

If it is determined at step S1703 that the message signal has been received, process of displaying a message is performed immediately at step S1704, and process returns to step S1701. If it is determined at step S1703 that the message signal has not been received, whether the OK button 1097 of the child device 1095 has been depressed or not is determined at step S1705.

If it is determined at step S1705 that the OK button 1097 has been depressed, the OK signal is transmitted to the parent device (STB 1092) at step S1706. If it is determined at step S1705 that the OK button 1097 has not been depressed, whether the cancel button 1098 of the child device 1095 has been depressed or not is determined at step S1707.

If it is determined at step S1707 that the cancel button 1098 has been depressed, the cancel signal is transmitted to the parent device (STB 1092) at step S1708. If it is determined at step S1707 that the cancel button 1098 has not been depressed, whether the power source button of the child device 1095 has been depressed or not is determined at step S1709.

If it is determined at step S1709 that the power source button has been depressed, the power off signal is immediately transmitted to the parent device (STB 1092) at step S1710, and process of stopping the child device 1095 itself is performed at step S1711. If it is determined at step S1709 that the power source button has not been depressed, process returns to step S1701.

Twelfth Embodiment

The twelfth embodiment of the present invention will now be described. In contrast to the eleventh embodiment, the twelfth embodiment is a TV system where a display capable of providing multi view display is used as a display on the parent device side like the eighth to tenth embodiments. That is, a display capable of displaying video data for multi view display for displaying on the display in a window form video data from a plurality of video sources (e.g. input pictures from tuners and external devices) synthesized by the main view synthesizer 1212 of the STB 1092 is used as the display 1091. In description of the twelfth embodiment, components same as those of the eleventh embodiment are given like symbols, and descriptions thereof are not presented.

Figure 67:
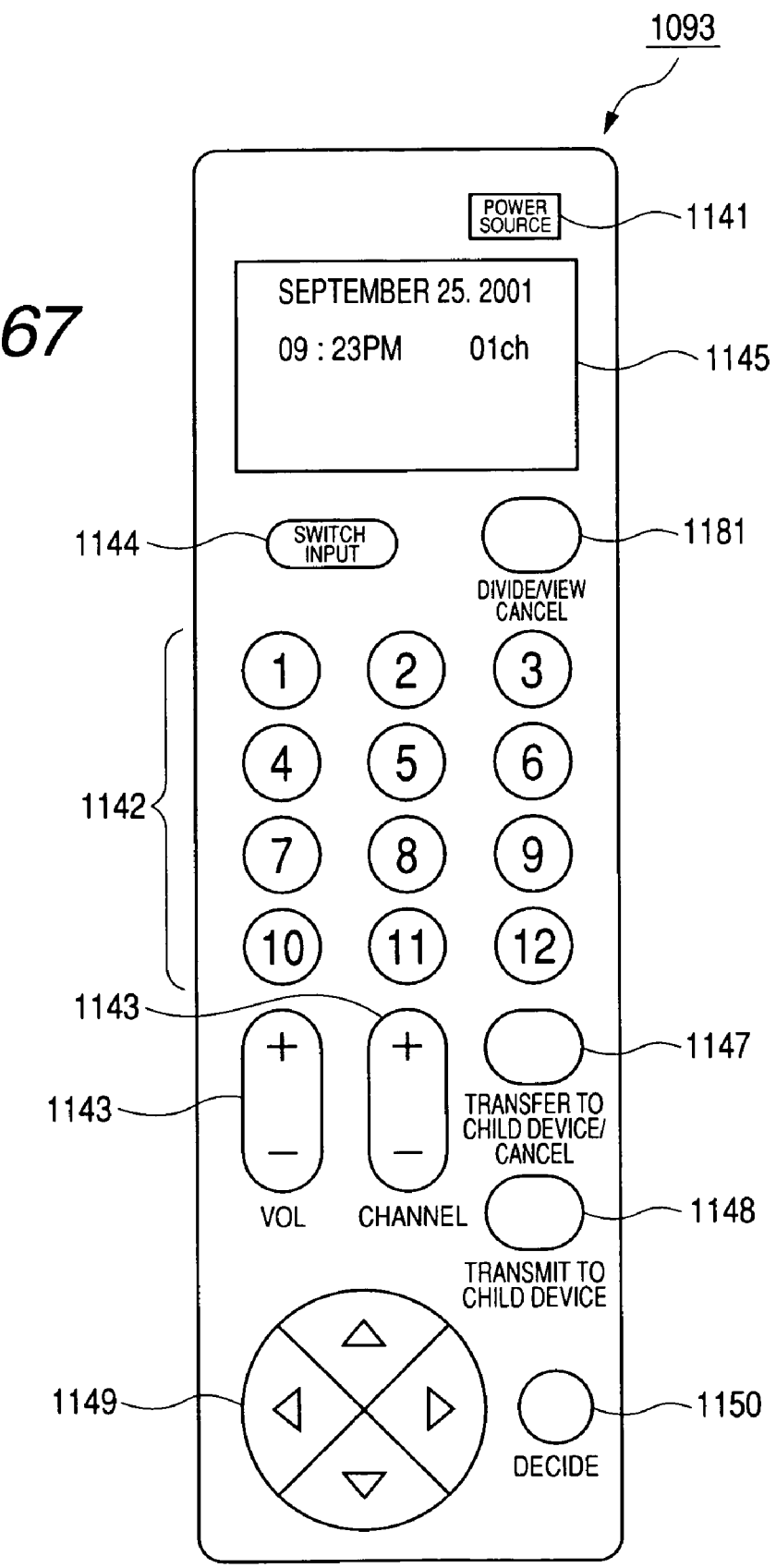
FIG. 67 shows one example of the exterior appearance of the remote control 1093 in the twelfth embodiment of the present invention.

FIG. 67 shows one example of the exterior appearance of the remote control 1093 in the twelfth embodiment of the present invention. The remote control 1093 is further provided with a button of dividing view/cancel unlike the unlike the eleventh embodiment.

If the button of dividing view/cancel 1181 is depressed, display of the view of the display 1091 is switched from multi window display to single view display to multi window display to . . . one after another. Specifically, for example, the main view M, the sub view S1 and the sub view S2 are separately displayed as shown in (a) of FIG. 28 in the case of multi window display, and only the main view M is displayed as shown in (b) of FIG. 28 in the case of single view.

Figure 28:
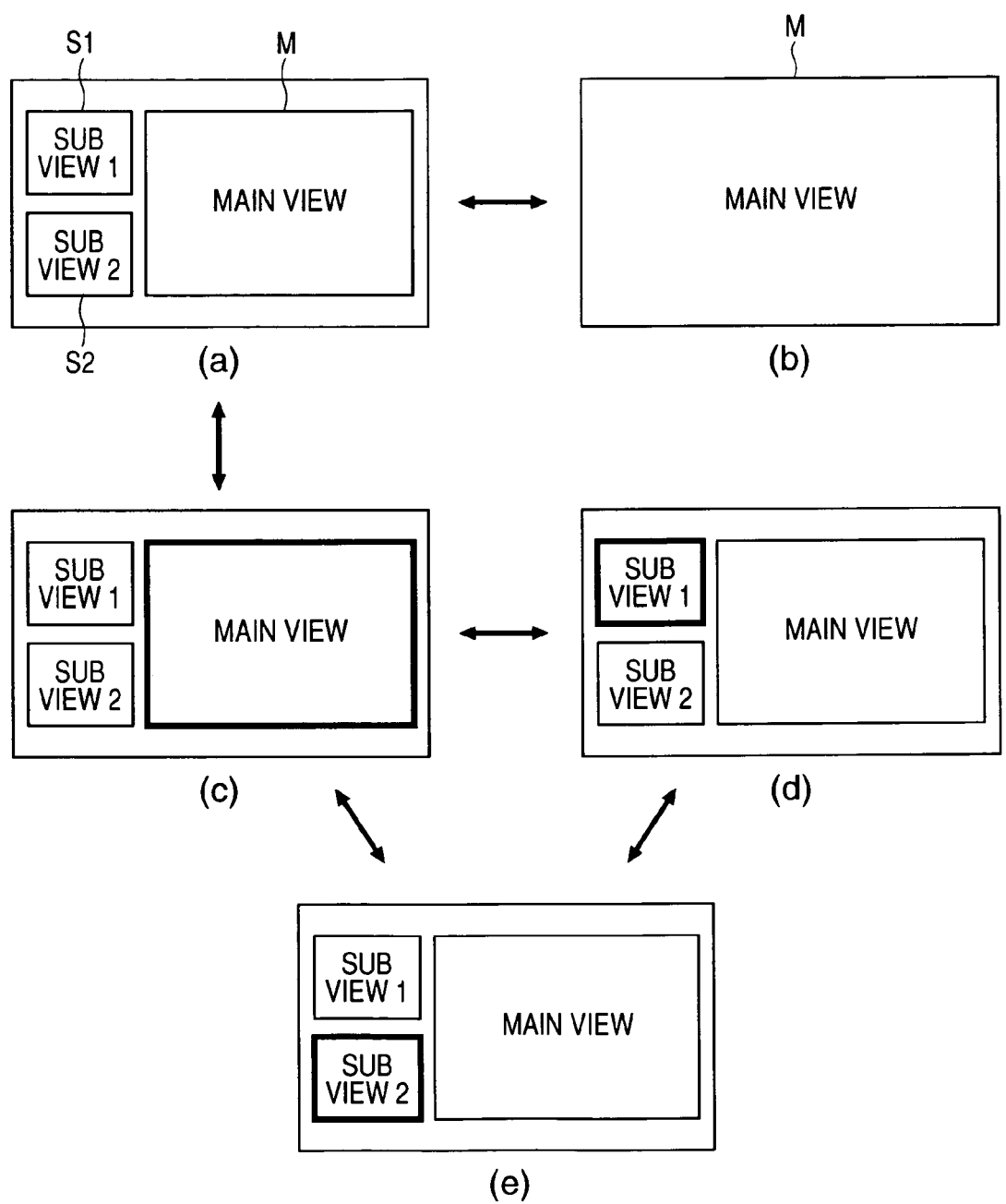
FIG. 28 shows an example of a change in view of the display 31 in the fourth embodiment of the present invention.

Furthermore, if any one of up-and-down and left-and-right keys constituting the cross key 1149 when multi window display shown in (a) of FIG. 28 is provided, a window selection frame for notifying the user of the fact that the view allows operations of program selection and the like appears on the main view M as shown in (c) of FIG. 28, and if any one of the keys of the cross key 1149 is further depressed, the window selection frame moves along a direction indicated by the depressed key as shown in (d) and (e) of FIG. 28.

The method for notifying the user of which view allows operations is the method of displaying a selection frame, but a small mark, e.g., a black circle mark, may be displayed to notify the user, any mark may be used as long as it can be recognized by the user, and particularly preferable is a mark that is easily recognizable.

FIGS. 68A to 68D and 69A to 69C show examples of views of the display 1091 and the display 1088 of the child device 1095 in the twelfth embodiment of the present invention. In FIGS. 68 and 69, the larger view (left side) represents the view of the display 1091, and the smaller view (right side) represents the view of the display 1088. Furthermore, here, the main view M is situated at the right, and the sub view S1 and the sub view S2 are arranged vertically at the left, but the number of sub views and arrangement are not limited to this example.

Figure 68A:
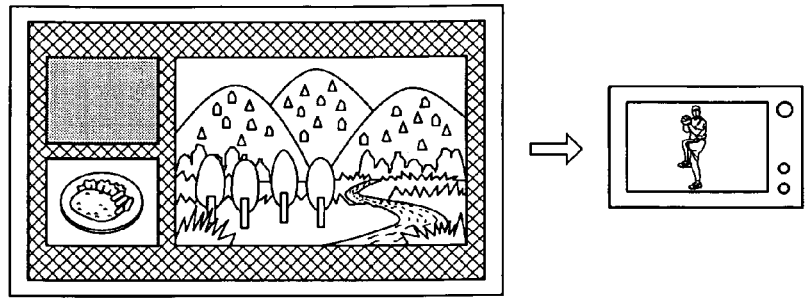
FIGS. 68A, 68B, 68C and 68D show examples of views of the display 1091 and the display 1088 of the child device 1095 in the twelfth embodiment of the present invention.

FIG. 68A shows a state in which a picture, which has been displayed on the sub view S1, is transferred to the child device. More specifically, a picture being transferred is displayed on the view of the display 1088 of the child device 1095, and a plain color (e.g. black color) or the like is displayed on the sub view S1 of the display 1091 on the parent device side.

Figure 68B:
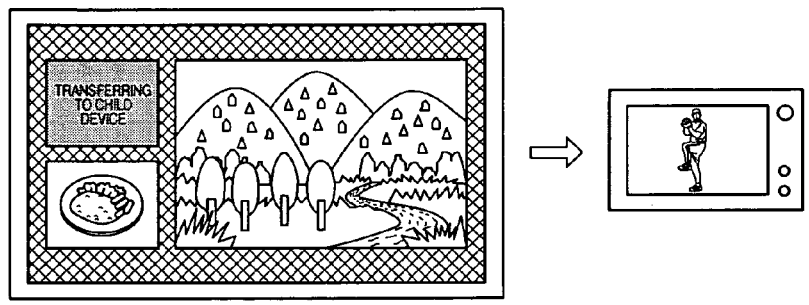

If a video source same as that of the child device 1095 is selected on the parent device side in the state shown in FIG. 68A, a message of "Transferring Of Child Device" is displayed on the sub view S1 as shown in FIG. 68B.

Figure 68C:
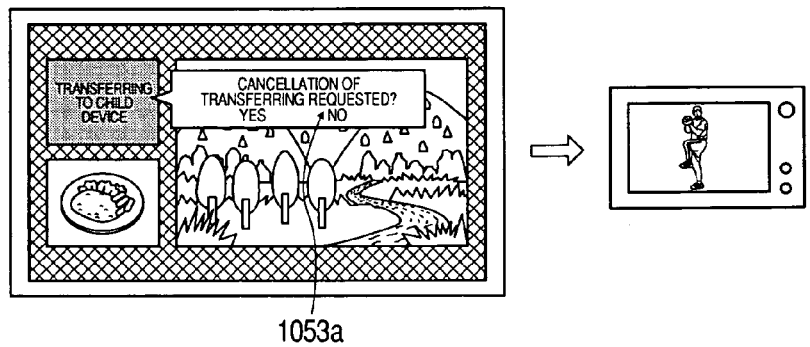

If the button of transmitting to the child device 1148 of the remote control 1093 is depressed according to the message described above in the state shown in FIG. 68B, a popup window appears from the sub view in transferring, and a message of "Transferring Requested?" is displayed in the popup window as shown in FIG. 68C.

Figure 68D:
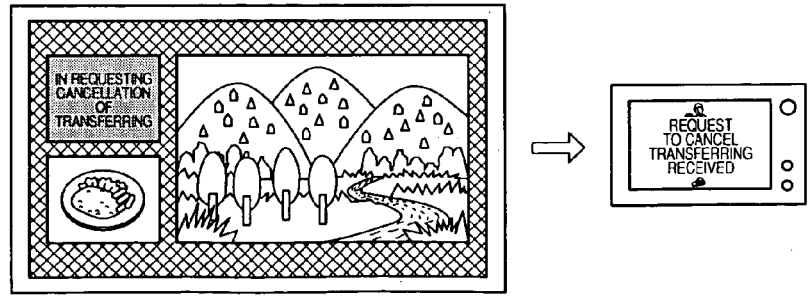

The cursor 1053*a* is pointed at "Yes" using the cross key 1149 of the remote control 1093, and the decision button 1150 is depressed in the state shown in FIG. 68C, a signal of requesting cancellation of transferring is transmitted to the child device, a message of "Requesting Cancellation Of Transferring" is displayed on the sub view S1 as shown in FIG. 68D, and a massage of "Request To Cancel Transferring Is Received" is displayed on the display 1088 of the child device 1095. These messages are continuously displayed until the OK button 1097 or cancel button 1098 is depressed before elapse of, for example, 5 minutes after the message is displayed.

Figure 69A:
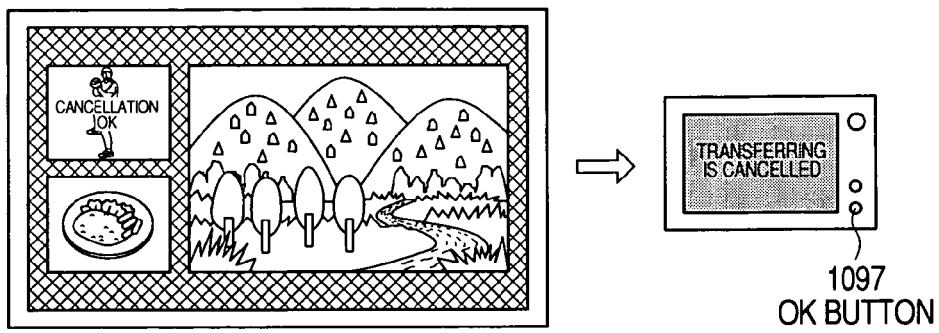
FIGS. 69A, 69B and 69C show examples of views of the display 1091 and the display 1088 of the child device 1095 in the twelfth embodiment of the present invention.

If the user of the child device 1059 accepts cancellation of transferring in the state shown in FIG. 68D, the user depresses the OK button 1097. As a result, a signal indicating acceptance of cancellation of transferring is transmitted from the child device 1095 to the parent device, and a message of "Cancellation OK", and a picture, which has been transferred to the child device 1095, are displayed on the sub view S1 as shown in FIG. 69A. A message of "Transferring Is Cancelled" is displayed on the display 1088 of the child device 1095.

Figure 69B:
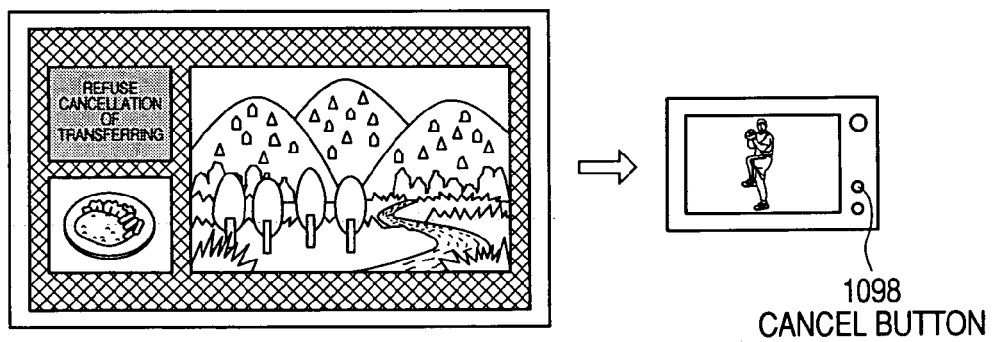

If the user of the child device 1095 refuses cancellation of transferring in the state shown in FIG. 68D, the user depresses the cancel button 1098. As a result, a signal indicating refusal of cancellation of transferring is transmitted from the child device to the parent device, and a message of "Refuse Cancellation Of Transferring" is displayed on the sub view S1 as shown in FIG. 69B.

Figure 69C:
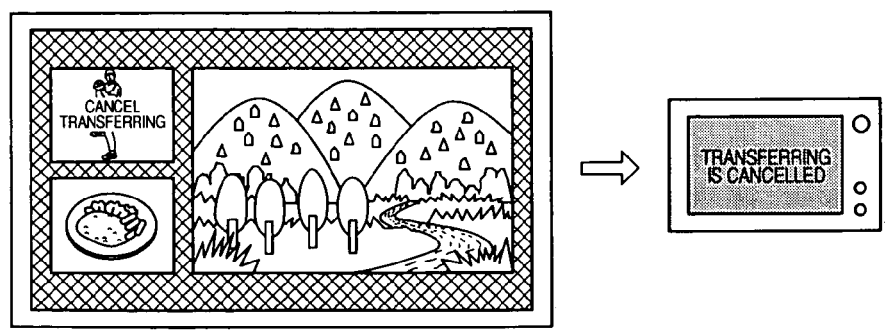

Furthermore, if the OK button 1097 or cancel button 1098 is not depressed during certain time (e.g. 5 minutes) despite that a signal of requesting cancellation of transferring is transmitted from the parent device to the child device 1095, and received by the child device 1095, the CPU 1060 determines that a picture at the child device 1095 is not viewed, and forcefully cancels transferring, and as shown in FIG. 69C, the picture, which has been transferred to the child device, is displayed on the sub view S1, and a message of "Transferring Is Cancelled" is displayed on the display 1088 of the child device 1095.

Figures 70, 70A:
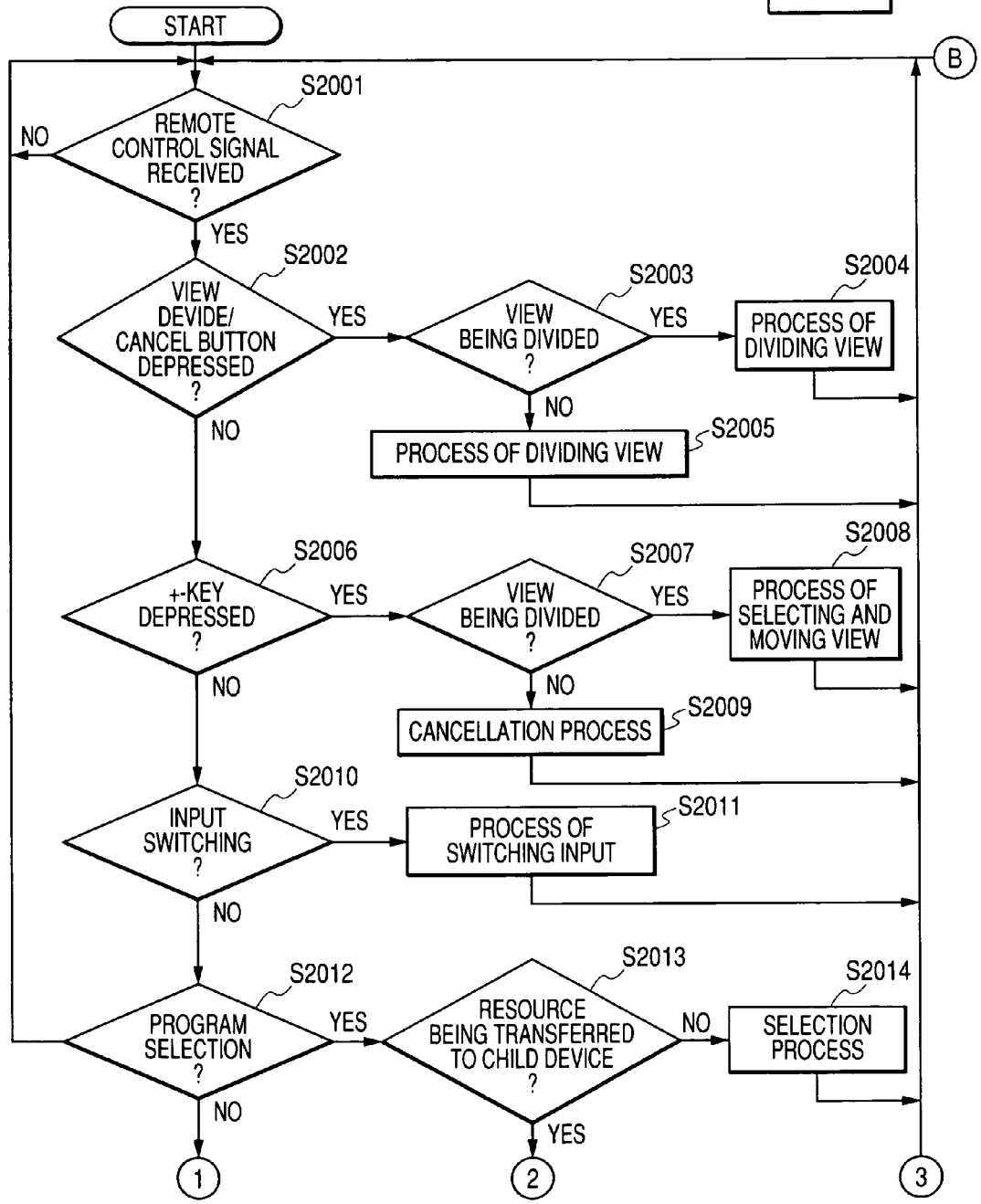
FIG. 70 is comprised of FIGS. 70A and 70B which are flowcharts showing the operation of the STB 1092 in the twelfth embodiment of the present invention.
Figure 70B:
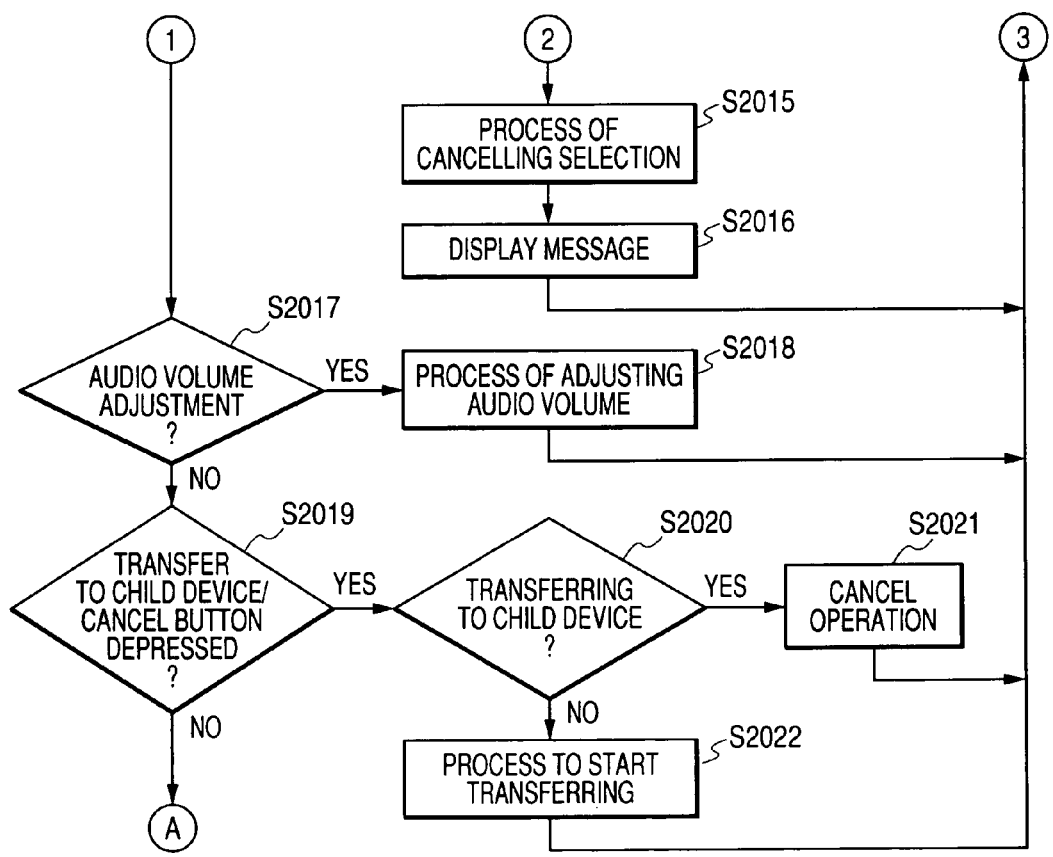
Figure 71B:
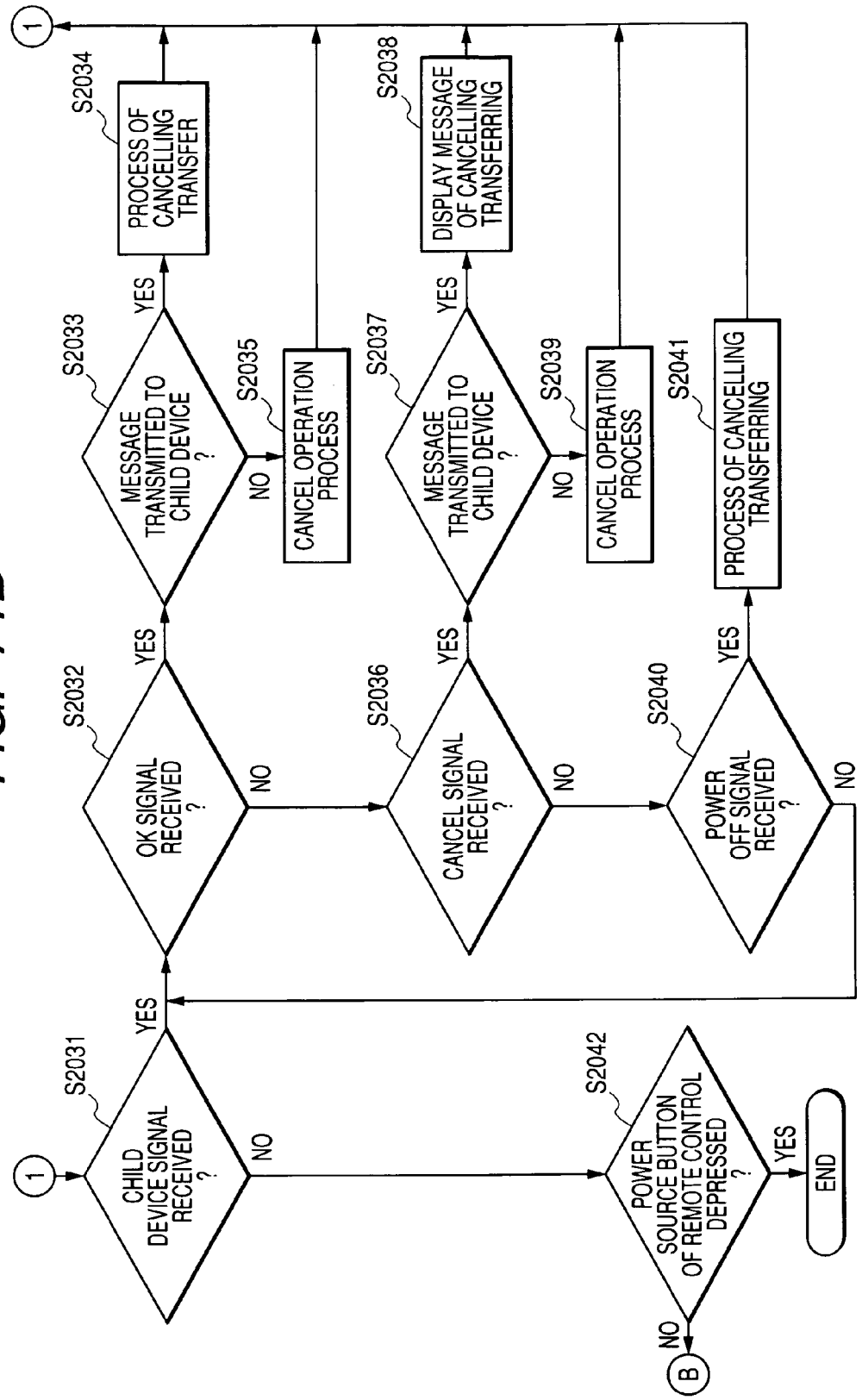
FIG. 71 is comprised of FIGS. 71A and 71B which are flowcharts showing the operation of the STB 1092 in the twelfth embodiment of the present invention.

The operation of the STB 1092 in the twelfth embodiment will now be described. FIGS. 70 and 71 are flowcharts each showing the operation of the STB 1092 in the twelfth embodiment of the present invention.

The powered STB 1092 determines whether a signal has been received from the remote control 1093 or not at step S2001. If the signal has been received from the remote control 1093, whether or not the signal indicates that the button of dividing view/cancel 1181 has been depressed is determined at step S2002. If it is determined that the button of dividing view/cancel 1181 has been depressed, whether the view being displayed is a divided view or not is determined at step S2003. If the view is being divided, process of canceling dividing view is performed immediately at step S2004, and process returns to step S2001. If the view is not being divided at step S2003, process of dividing view is performed at step S2005, and process returns to step S2001.

If it is determined at step S2002 that the button of dividing view/cancel 1181 has not been depressed, whether the cross key 1149 has been depressed or not is determined at step S2006. If it is determined that the cross key 1149 has been depressed, whether the view is being divided or not is determined at step S2007. If it is determined that the view is being divided, process of selecting and moving view shown in FIG. 28 is performed at step S2008, and process returns to step S2001. If the view is not being divided at step S2007, indication of operation of the cross key 1149 is canceled at step S2009, and process returns to step S2001.

If it is determined at step S2006 that the cross key has not been depressed, whether the signal indicates input switching is determined at step S2010. If the signal indicates input switching, process of switching input is performed immediately at step S2011, and process returns to step S2001.

If the signal from the remote control 1093 does not indicate input switching at step S2010, whether the signal indicates program selection is determined at step S2012.

If the signal indicates program selection at step S2012, whether the selected video source is the video source being transferred to the child device 1095 or not is determined at step S2013. If it is not the video source being transferred to the child device 1095, process proceeds to step S2014, where selection process is performed, and process returns to step S2001.

If it is determined at step S2013 that the selected video source is the video source being transferred to the child device 1095, selection process is canceled at step S2015, a message shown in FIG. 68B is displayed (step S2016), and then process returns to step S2001. As long as the video source is transferred to the child device 1095, the picture shown in FIG. 68A is displayed before the message shown in FIG. 68B is displayed.

If the signal from the remote control 1093 does not indicate program selection at step S2012, process proceeds to step S2017, where whether the signal indicates audio volume adjustment is determined. If the signal indicates audio volume adjustment, process of adjusting audio volume is performed immediately at step S2018, and process returns to step S2001.

If the signal does not indicate audio volume adjustment at step S2017, whether the button of transferring to the child device/cancel 1147 has been depressed or not is determined at step S2019. If it is determined that the button of transferring to the child device/cancel 1147 has been depressed, whether the STB 1092 is in transferring to the child device 1095 or not is determined at step S2020. If it is in transferring to the child device 1095, the operation of indicating process of transferring is canceled, i.e. process of canceling transferring is performed, immediately at step S2021, and process returns to step S2001.

If the STB 1092 is not in transferring to the child device 1095 at step S2020, process of transferring of the picture displayed at the parent device at this time is started immediately at step S2022, and process returns to step S2001.

If it is determined at step S2019 that the button of transferring to the child device/cancel 1147 has not been depressed, whether the button of transmitting to the child device 1148 has been depressed or not is determined at step S2023. If it is determined that the button of transmitting to the child device 1148 has been depressed, an operation guide is displayed in a popup window shown in FIG. 68C at step S2024. Then, whether any one of keys of the cross key 1149 of the remote control 1093 has been depressed or not is determined at step S2025. If it is determined that any one of keys of the cross key 1149 has been depressed, process of moving a cursor is performed immediately at step S2026, and process returns to step S2025. If it is determined at step S2025 that the cross key 1149 has not been depressed, whether the decision button 1150 has been depressed or not is determined at step S2027.

If "Yes" is selected and then the decision button 1150 is depressed in the state shown in FIG. 68C at step S2027, whether transmitting to the child device is allowable or not is determined at step S2028. If it is determined that transmitting to the child device is allowable, process of transmitting (transmitting a message) to the child device 1095 is performed immediately at step S2029. Thereafter, a picture shown in FIG. 68D is displayed. If it is determined at step S2028 that transmitting to the child device is not allowable, process of transmitting to the child device is cancelled at step S2030, and process returns to step S2001. If "No" is selected and then the decision button 1150 is depressed in the state shown in FIG. 68C, process of transmitting to the child device is cancelled (not shown), and process returns to step S2001.

If it is determined at step S2023 that the button of transmitting to the child device 1148 has not been depressed, whether a signal has been received from the child device 1095 or not is determined at step S2031. If it is determined that the signal has been received from the child device 1095, whether an OK signal has been received or not is determined at step S2032. If the OK signal has been received, whether a message signal has been transmitted from the STN 1092 to the child device 1095 or not is determined at step S2033. It is determined at step S2033 that the message signal has been transmitted to the child device 1095, it is determined that cancellation of transferring of the picture is accepted, and process of cancellation of transferring of the picture is performed immediately at step S2034. As a result, a picture shown in FIG. 69A is displayed.

If it is determined at step S2033 that the message signal has not been transmitted to the child device 1095, it is determined that the OK button 1097 has been depressed due to a wrong operation at the child device 1095, and operation process is cancelled at step S2035, and process returns to step S2001.

If the OK signal has not been received at step S2032, whether a cancel signal has been received or not is determined at step S2036. If the cancel signal has been received, whether the message signal has been transmitted from the STB 1092 to the child device 1095 or not is determined at step S2037. If it is determined that the message signal has been transmitted to the child device 1095, it is determined that cancellation of transferring of the picture is refused, and a message of refusal of cancellation of transferring shown in FIG. 69B is displayed on the sub view S1 at step S2038, and process returns to step S2001.

If it is determined at step S2037 that the message signal has not been transmitted to the child device 1095, it is determined that the cancel button 1098 has been depressed due to a wrong operation at the child device 1095, operation process is cancelled at step S2039, and process returns to step S2001.

If the cancel signal has not been received at step S2036, whether a power off signal of the child device 1095 has been received or not is determined at step S2040. If it is determined that the power off signal has been received, process of cancellation of transferring of the picture is performed immediately at step S2041, and process returns to step S2001. If it is determined at step S2040 that the power off signal has not been received, process returns to step S2032.

If it is determined at step S2031 that the signal from the child device 1095 has not been received, whether the power source button of the remote control 1093 has been depressed or not is determined at step S2042. If it is determined that the power source button of the remote control 1093 has been depressed, process of stopping the STB 1092 is performed immediately, and the power of the STB 1092 itself is turned off at step S2043. It is determined at step S2042 that the power source button has not been depressed, process returns to step S2001.

Thirteenth Embodiment

The thirteenth embodiment of the present invention will now be described. The thirteenth embodiment is a TV system enabling a video source transferred from the parent device to be operated from the child device in contrast to the twelfth embodiment. In description of the thirteenth embodiment, components same as those of the eleventh and twelfth embodiments are given like symbols, and detailed descriptions thereof are not presented.

Figure 72:
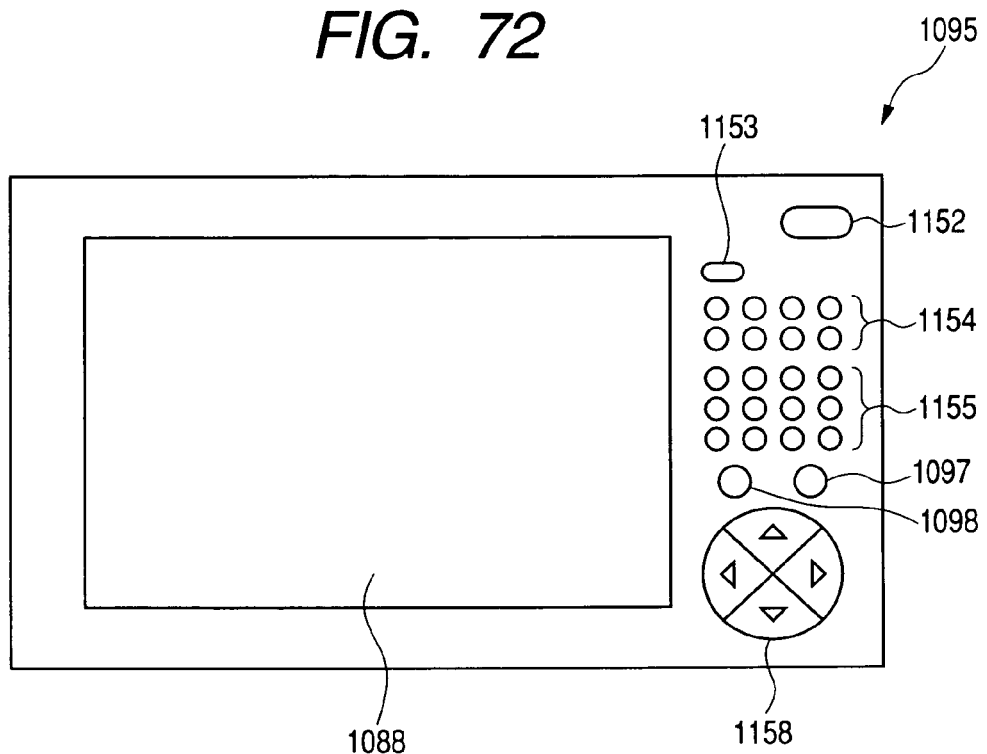
FIG. 72 shows the exterior appearance of the child device 1095 when viewed from the front in the thirteenth embodiment of the present invention.

FIG. 72 shows the exterior appearance of the child device 1095 in the thirteenth embodiment when viewed from the front. In the thirteenth embodiment, a display 1088 constituted by a liquid crystal display or the like, a power source button 152, selection buttons 1153 to 1155 for selecting video sources of the STB 1092 constituting the parent device, an OK button 1097, a cancel button 1098 and a cross button 1158 are placed in the child device 1095 on the front side. The selection button 1153 is an external input button for switching to external devices connected to the STB 1092, the selection button 1154 is a channel button for BS digital broadcasting, and the selection button 1155 is a channel button for ground wave broadcasting.

FIGS. 73A to 73D and 74A to 74D show examples of views of the display 1091 and the display 1088 in the thirteenth embodiment of the present invention. In FIGS. 73A to 73D and 74A to 74D, the larger view (left side) represents the view of the display 1091, and the smaller view (right side) represents the view of the display 1088 of the child device 1095.

Figure 73A:
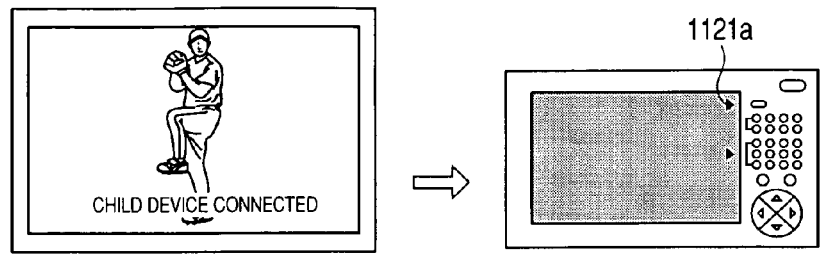
FIGS. 73A, 73B, 73C and 73D show examples of views of the display 1091 and the display 1088 in the thirteenth embodiment of the present invention.

FIG. 73A shows a state before video data is transferred to the child device, in which the power source button 1152 of the child device 1095 is depressed to turn on the power when a BS digital broadcast is received at the parent device. A message indicating that the power of the child device 1095 has been turned on is temporarily displayed on the view of the display 1091 constituting the parent device, and on the view of the display 1088 of the child device 1095, a mark 1121a indicating that selection is allowable is displayed at the side of the selection button of a video source which is not used at the parent device, i.e. a channel which can be selected and transferred.

If a ground wave broadcast is selected at the child device 1095 in the state shown in FIG. 73A, an icon 1122a indicating that the child device is connected is displayed on the display 1091, and a selected program is displayed on the display 1088 of the child device 1095.

Figure 73B:
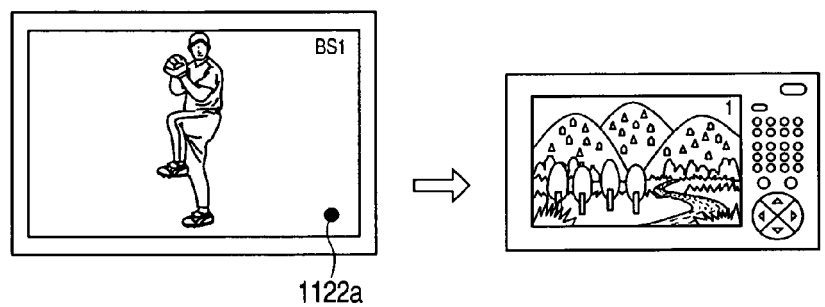
Figure 73C:
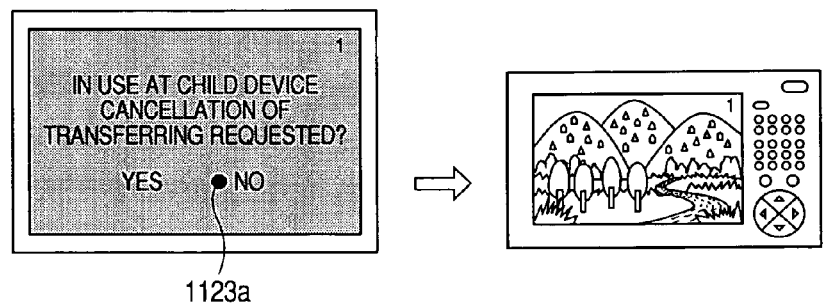
Figure 73D:
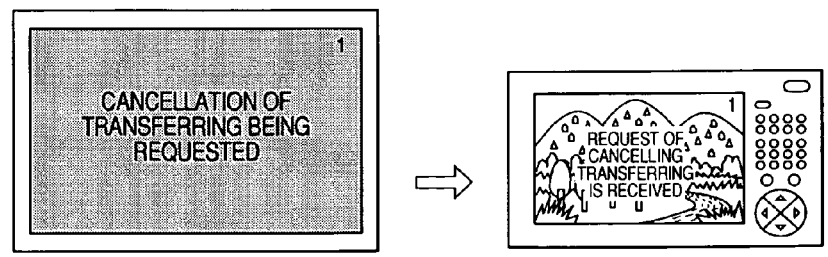

A video source being transferred to the child device, a ground wave broadcast in this case, is selected at the parent device in the state shown in FIG. 73B, a message of "In Use By Child Device. Cancellation of Transferring Requested? Yes No" is displayed on the display 1091 as shown in FIG. 73C. If a cursor 1123a is pointed at "Yes" using the cross key 1149 of the remote control 1093, and the decision button 1150 is depressed, a signal of requesting cancellation of transferring is transmitted to the child device 1095, and a message of "Cancellation Of Transferring Being Requested" is displayed on the display 1091 as shown in FIG. 73D, and a message of "Request Of Canceling Transmitting Is Received" is displayed on the display 1088 of the child device 1095. These messages are continuously displayed until the OK button 1097 or Cancel button 1098 is depressed before elapse of, for example, 5 minutes after they are displayed.

Figure 74A:
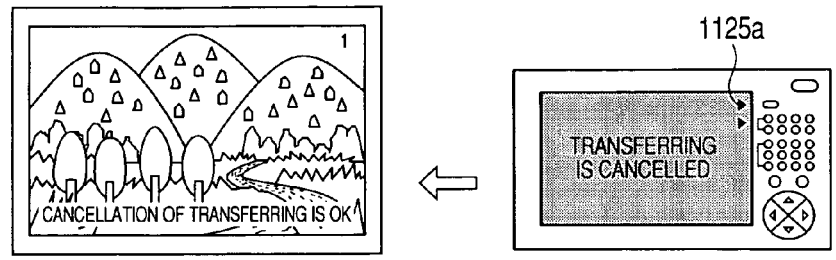
FIGS. 74A, 74B, 74C and 74D show examples of views of the display 1091 and the display 1088 in the thirteenth embodiment of the present invention.

If the user of the child device 1095 accepts cancellation of transferring in the state shown in FIG. 73D, the user depresses the OK button 1097. As a result, a signal indicating acceptance of cancellation of transferring is transmitted from the child device 1095 to the parent device, and a picture based on video data, which has been transferred to the child device, and a message of "cancellation Of Transferring Is OK" are displayed on the display 1091 of the parent device as shown in FIG. 74A. Furthermore, at the child device 1095, a message of "Transferring Is Canceled" is displayed on the display 1088, and a mark 1125a is displayed in the view at the side of a selectable selection button.

Figure 74B:
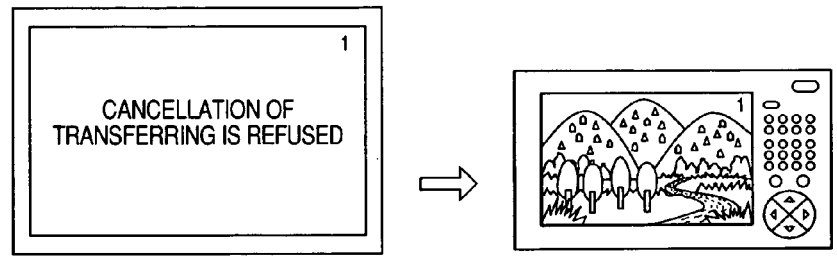

If the user of the child device 1095 refuses cancellation of transferring in the state shown in FIG. 73D, the user depressed the cancel button 1098. As a result, a signal indicating cancellation of transferring is transmitted from the child device 1095 to the parent device, and a message of "Cancellation Of Transferring Is Refused" is displayed on the display 1091 of the parent device, and pictures of video data being transferred from the parent device are continuously displayed on the display 1088 of the child device 1095 as shown in FIG. 74B.

Figure 74C:
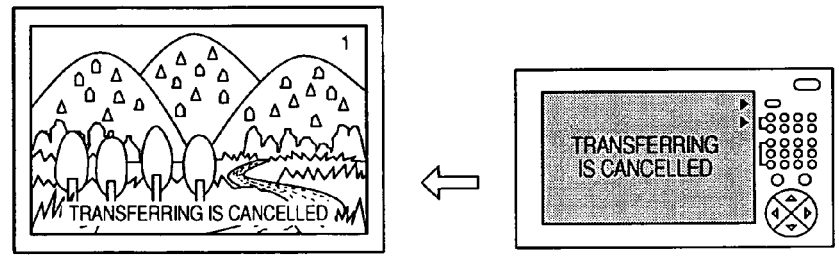
Figure 74D:
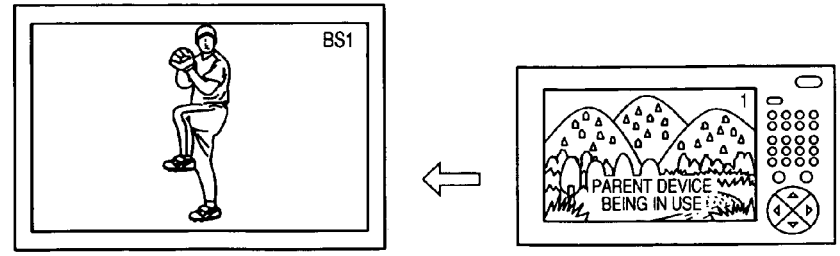

Furthermore, if the OK button 1097 or cancel button 1098 is not depressed during a certain time (e.g., 5 minutes) despite that a signal of requesting cancellation of transferring is transmitted from the parent device to the child device 1095, and received by the child device 1095, the CPU 1060 determines that a picture at the child device 1095 is not viewed, and forcefully cancels transferring, and as shown in FIG. 74C, a picture, which has been transferred to the child device 1095, is displayed on the display 1091 of the parent device, and a message of "Transferring Is Canceled" is also displayed on the display 1091. On the display 1088 of the child device 1095, a message of "Transferring Is Canceled" is displayed, and a mark is displayed in the view at the side of a selectable selection button.

When a video source being used at the parent device side (e.g. BS digital broadcast in this case) is selected at the child device, display of the display 1091 of the parent device is not changed, and a message of "In Use By Parent Device" is displayed on the display 1088 of the child device 1095. Furthermore, the selection operation is canceled a program, which gas been displayed" is displayed at the child device.

Figures 75, 75A:
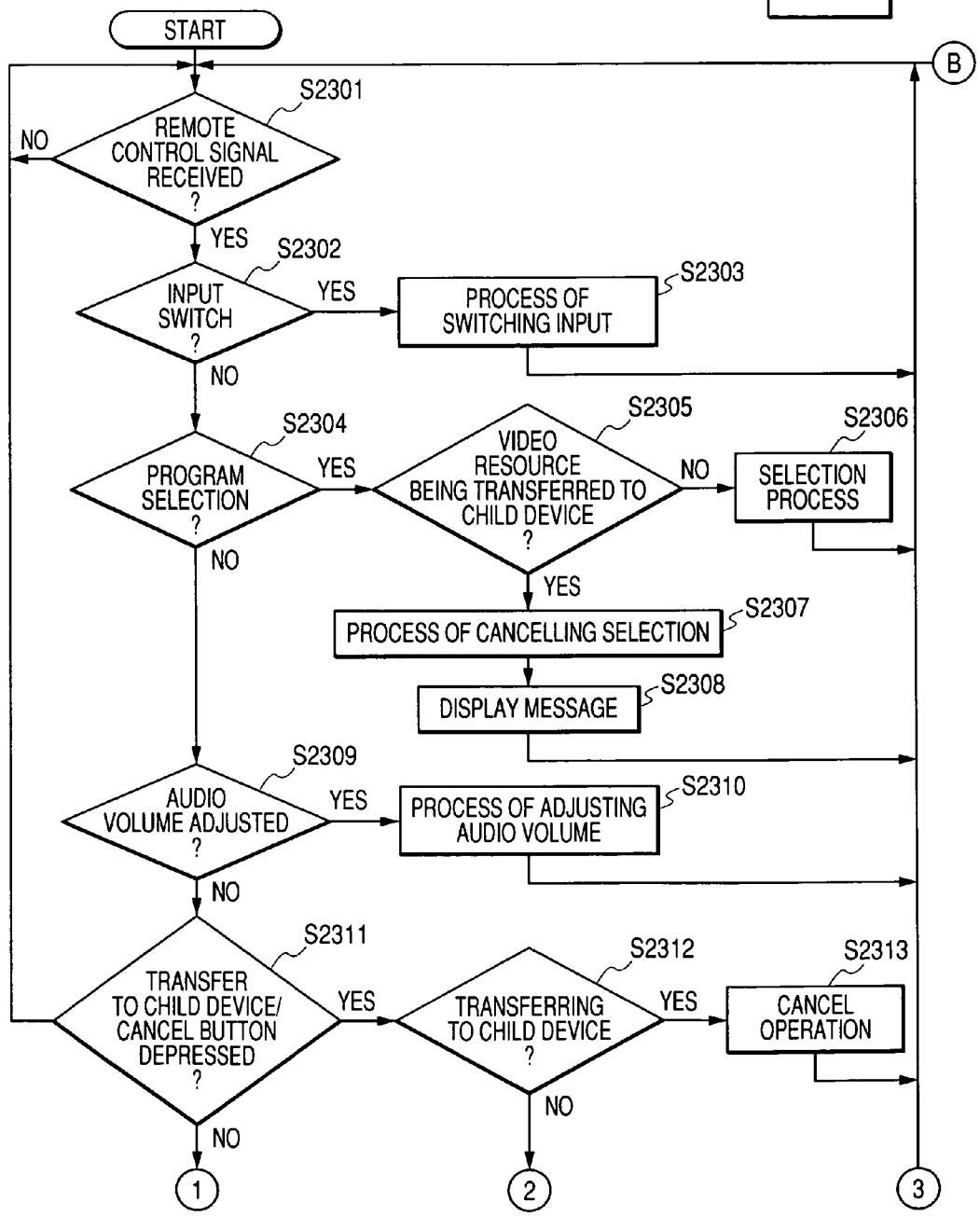
FIG. 75 is comprised of FIGS. 75A and 75B which are flowcharts showing the operation of the STB 1092 in the thirteenth embodiment of the present invention.
Figure 75B:
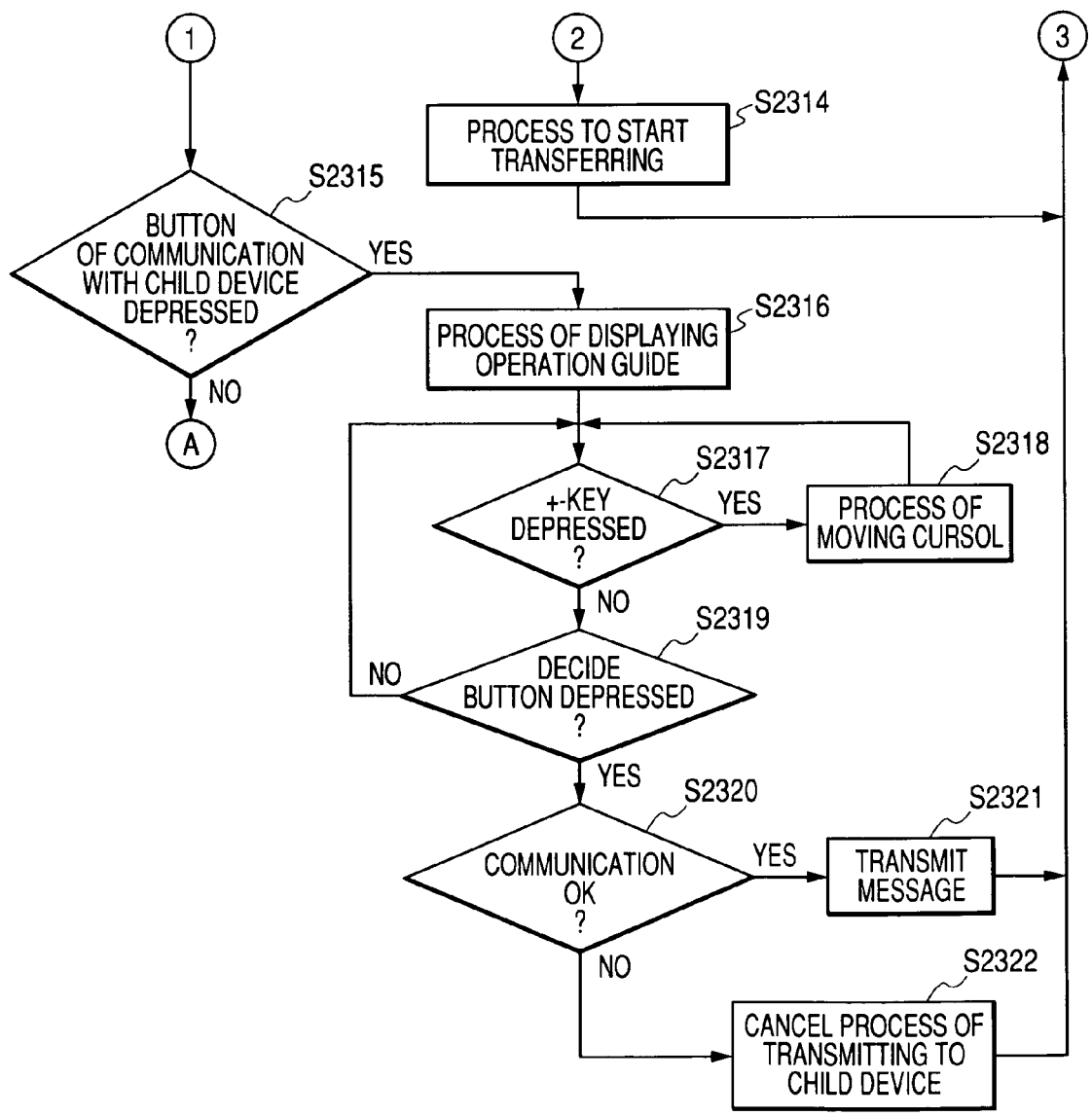
Figure 76:
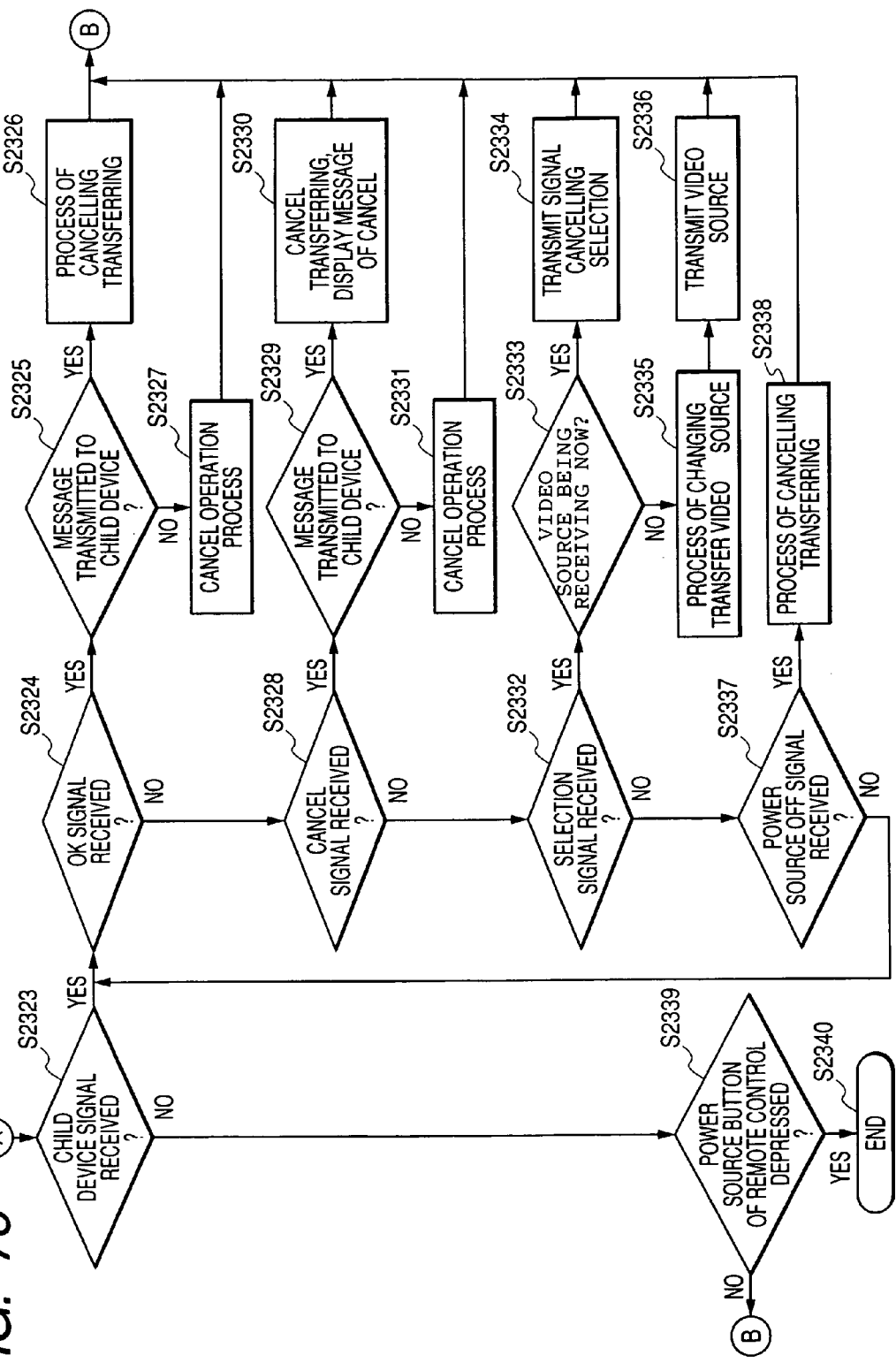
FIG. 76 is a flowchart showing the operation of the STB 1092 in the thirteenth embodiment of the present invention.

The operation of the STB 1092 in the thirteenth embodiment will now be described. FIGS. 75A, 75B and 76 are flowcharts each showing the operation of the STB 1092 in the thirteenth embodiment of the present invention.

The powered STB 1092 determines whether a signal has been received from the remote control 1093 or not at step S2301. If the signal has been received from the remote control 1093, whether the signal indicates input switching or not is determined at step S2302. If the signal indicates input switching, process of switching input is performed immediately at step S2303, and process returns to step S2301.

If the signal from the remote control 1093 does not indicate input switching at step S2302, whether the signal indicates program selection is determined at step S2304.

If the signal indicates program selection at step S2304, whether the selected video source is the video source being transferred to the child device 1095 or not is determined at step S2305. If it is not the video source being transferred to the child device 1095, process proceeds to step S2306, where selection process is performed, and process returns to step S2301.

If it is determined at step S2305 that the selected video source is the video source being transferred to the child device 1095, selection process is canceled at step S2307, a message shown in FIG. 73C is displayed (step S2308), and then process returns to step S2301. Before the message shown in FIG. 73C is displayed, a picture shown in FIG. 73A is displayed if the power source button 1152 of the child device 1095 is depressed to turn on the power, and a picture shown in FIG. 73B is displayed if transferring to the child device 1095 is performed.

If the signal from the remote control 1093 does not indicate program selection at step S2304, process proceeds to step S2309, where whether the signal indicates audio volume adjustment is determined. If the signal indicates audio volume adjustment, process of adjusting audio volume is performed immediately at step S2310, and process returns to step S2301.

If the signal does not indicate audio volume adjustment at step S2309, whether the button of transferring to the child device/cancel 1147 has been depressed or not is determined at step S2311. If it is determined that the button of transferring to the child device/cancel 1147 has been depressed, whether the STB 1092 is in transferring to the child device 1095 or not is determined at step S2312. If it is in transferring to the child device 1095, the operation of indicating transferring process is canceled, i.e. process of canceling transferring is performed immediately at step S2313, and process returns to step S2301.

If the STB 1092 is not in transferring to the child device 1095 at step S2312, process of transferring the picture displayed at the parent device at this time is started immediately at step S2314, and process returns to step S2301.

If it is determined at step S2311 that the button of transferring to the child device/cancel 1147 has not been depressed, whether the button of transmitting to the child device 1148 has been depressed or not is determined at step S2315. If it is determined that the button of transmitting to the child device 1148 has been depressed, an operation guide shown in FIG. 73C is displayed at step S2316. Then, whether any one of keys of the cross key 1149 of the remote control 1093 has been depressed or not is determined at step S2311. If it is determined that any one of keys of the cross key 1149 has been depressed, process of moving a cursor is performed immediately at step S2318, and process returns to step S2317. If it is determined at step S2317 that the cross key 1149 has not been depressed, whether the decision button 1150 has been depressed or not is determined at step S2319.

If "Yes" is selected and then the decision button 1150 is depressed in the state shown in FIG. 73C at step S2319, whether transmitting to the child device is allowable or not is determined at step S2320. If it is determined that transmitting to the child device is allowable, process of transmitting (transmitting a message) to the child device 1095 is performed immediately at step S2321. Thereafter, a picture shown in FIG. 73D is displayed. If it is determined at step S2320 that transmitting to the child device is not allowable, process of transmitting to the child device is cancelled at step S2322, and process returns to step S2301. If "No" is selected and then the decision button 1150 is depressed in the state shown in FIG. 73C, process of transmitting to the child device is cancelled (not shown), and process returns to step S2301.

If it is determined at step S2315 that the button of transmitting to the child device 1148 has not been depressed, whether a signal has been received from the child device 1095 or not is determined at step S2323. If it is determined that the signal has been received from the child device 1095, whether an OK signal has been received or not is determined at step S2324. If the OK signal has been received, whether a message signal has been transmitted from the STN 1092 to the child device 1095 or not is determined at step S2325. It is determined at step S2325 that the message signal has been transmitted to the child device 1095, it is determined that cancellation of transferring of the picture is accepted, process of cancellation of transferring of the picture is performed immediately at step S2326, and process returns to step S2301. As a result, a picture shown in FIG. 74A is displayed.

If it is determined at step S2325 that the message signal has not been transmitted to the child device 1095, it is determined that the OK button 1097 has been depressed due to a wrong operation at the child device 1095, and operation process is cancelled at step S2327, and process returns to step S2301.

If the OK signal has not been received at step S2324, whether a cancel signal has been received or not is determined at step S2328. If the cancel signal has been received, whether the message signal has been transmitted from the STB 1092 to the child device 1095 or not is determined at step S2329. If it is determined that the message signal has been transmitted to the child device 1095, it is determined that cancellation of transferring of the picture is refused, and a message of refusal of cancellation of transferring shown in FIG. 74B is displayed on the display 1091 at step 2330, and process returns to step S2301.

If it is determined at step S2329 that the message signal has not been transmitted to the child device 1095, it is determined that the cancel button 1098 has been depressed due to a wrong operation at the child device 1095, operation process is cancelled at step S2331, and process returns to step S2301.

If the cancel signal has not been received at step S2328, whether a selection signal has been received or not is determined at step S2332. If it is determined that the selection signal has been received, whether or not the video source of video data specified by the selection signal coincides with the video source being used is determined at step S2333. If it is determined that it coincides with the video source being used, the selection signal is transmitted to the child device 1095 at step S2333, and process returns to step S2301.

If it is determined at step S2332 that the video source does not coincide with the video source being used, process of changing the transfer video source is performed at step S2335, and the video data of the changed video source is immediately transmitted to the child device 1095 at step S2336.

If it is determined at step S2332 that the selection signal has not been received, whether a power source off signal for the child device 1095 has been received or not is determined at step S2337. If it is determined that the power source off signal has been received, process of canceling transferring the picture is performed immediately at step S2338, and process returns to step S2301. If it is determined at step S2337 that the power source off signal has not been received, process returns to step S2324.

If it is determined at step S2323 that the signal from the child device 1095 has not been received, whether the power source button of the remote control 1093 has been depressed or not is determined at step S2339. If it is determined that the power source button has been depressed, process of stopping the STB 1092 is performed immediately, and the power of the STB 1092 itself is turned off at step S2340. If it is determined at step S2339 that the power source button has not been depressed, process turns to step S2301.

Figures 77, 77A:
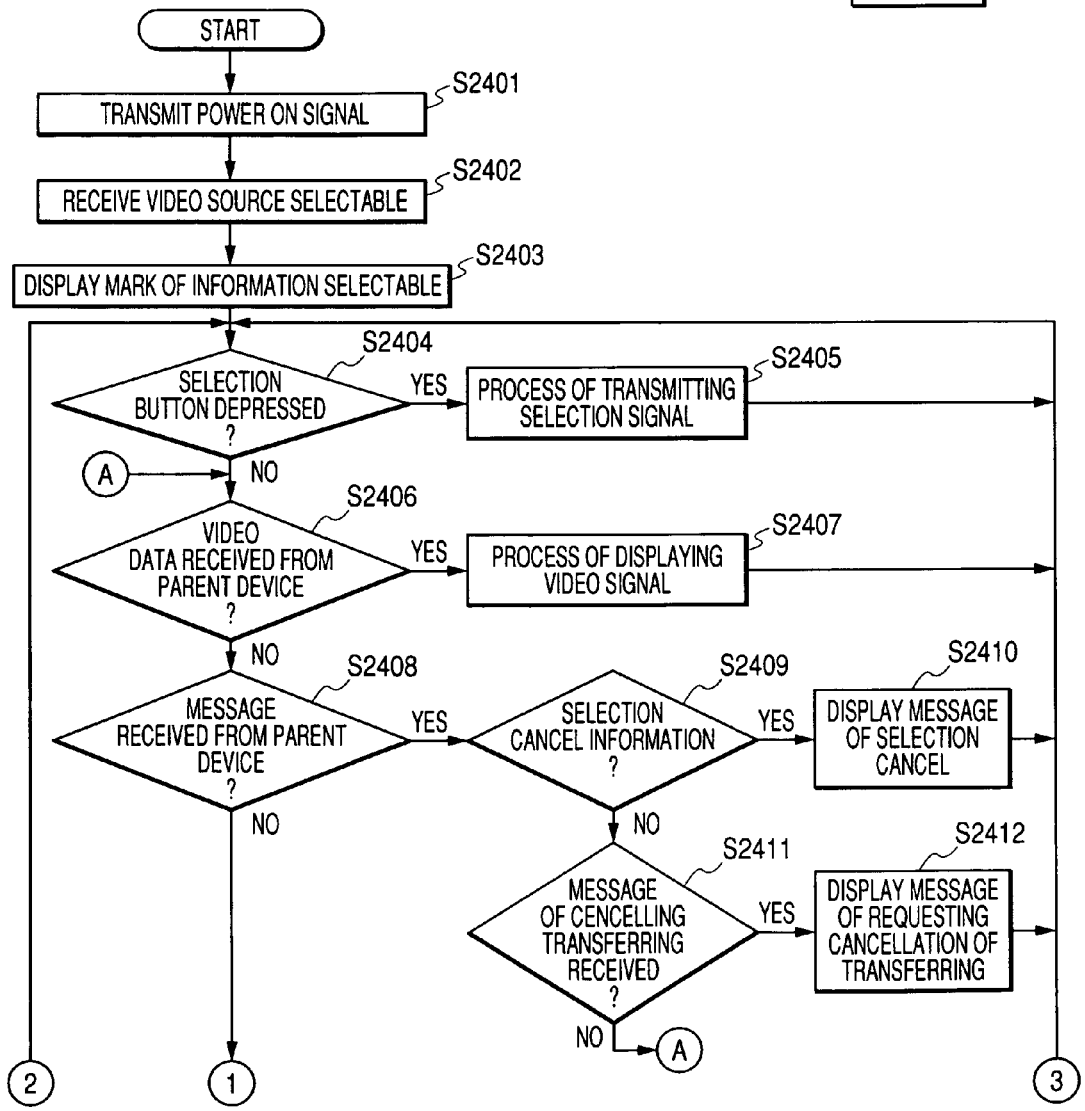
FIG. 77 is comprised of FIGS. 77A and 77B which are flowcharts showing the operation of the child device 1095 in the thirteenth embodiment of the present invention.
Figure 77B:
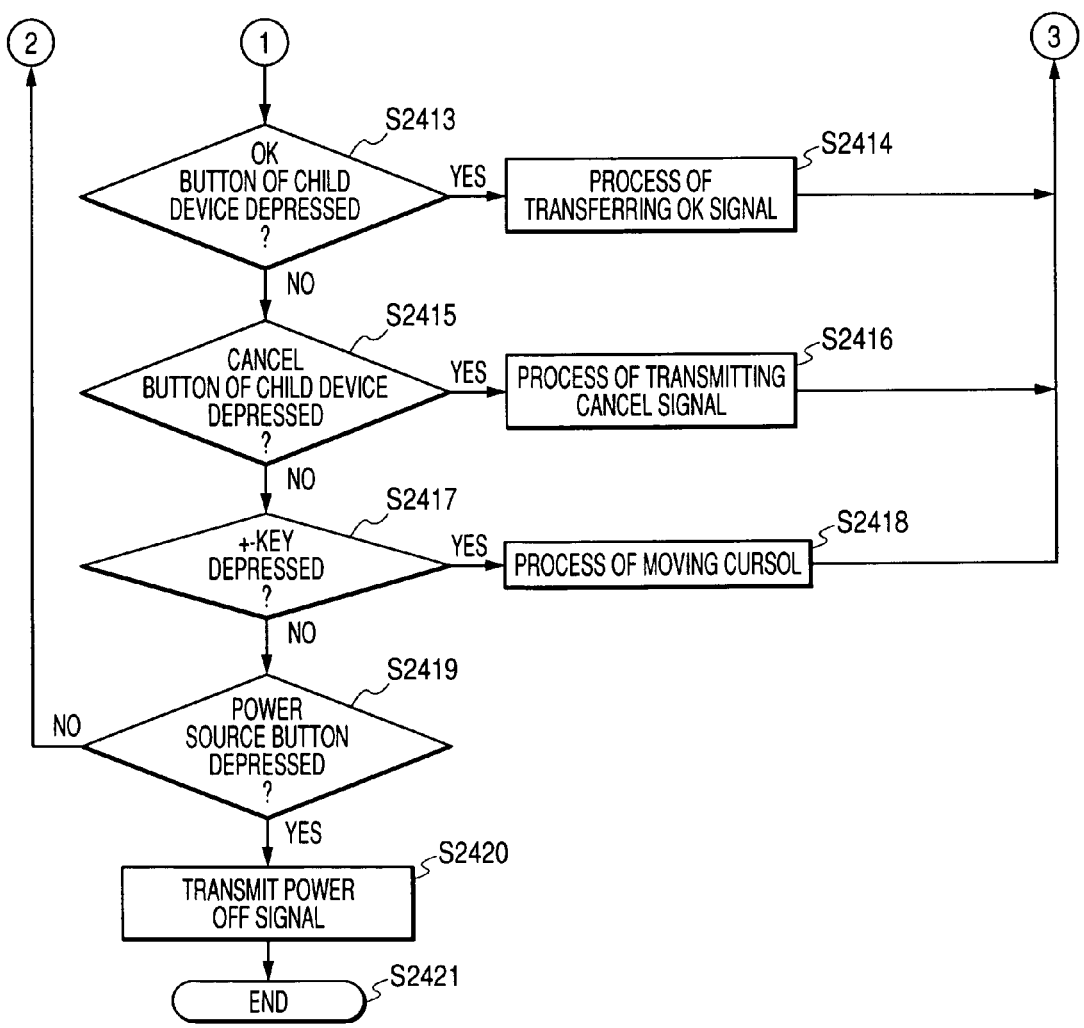

The operation of the child device 1095 in the thirteenth embodiment will now be described. FIGS. 77A and 77B are flowcharts showing the operation of the child device 1095 in the thirteenth embodiment of the present invention.

If a signal indicating that the power of the STB 1092 constituting the parent device has been turned on is transmitted at step S2401, the powered child device 1095 receives information of selectable video sources transmitted from the parent device at step S2402. Based on the received information, a mark indicating that selection is allowable is displayed at the side of a selectable channel selection button in the view of the display 1088 of the child device 1095 at step S2403.

Whether the selection button (selection button 1113, 1114 or 1115) mounted on the child device 1095 has been depressed or not is determined at step S2404. If it is determined that the selection button has been depressed, the selection signal is immediately transmitted to the parent device at step S2405, and process returns to step S2404.

If it is determined at step S2404 that the selection button has not been depressed, whether video data has been received from the parent device or not is determined at step S2406. If it is determined that video data has been received, process of displaying a picture is performed immediately at step S2407, and process returns to step S2404.

If it is determined at step S2406 that video data has not been received, whether a message signal has been received from the parent device or not is determined at step S2408. If it is determined that the message signal has been received, whether the message signal is to cancel selection or not is determined at step S2409. If it is determined that the signal is to cancel selection, a message of selection cancel is immediately displayed on the display 1088, and process returns to step S2404.

If it is determined at step S2409 that the message signal is not to cancel selection, whether it is a signal of a message of request of canceling transferring or not is determined at step S2411. If it is determined that the message signal is a signal of a message of request of canceling transferring, a message of request of canceling transferring is displayed immediately at step S2412, and process returns to step S2404. It is determined at step S2411 that the message signal is not a signal of a message of request of canceling transferring, process returns to step S2406.

If it is determined at step S2408 that the message signal has not been received from the parent device, whether the OK button 1097 of the child device 1095 has been depressed or not is determined at step S2413. If it is determined that the OK button 1097 has been depressed, an OK signal is transmitted to the parent device (STB 1092) at step S2414, and process returns to step S2404. If it is determined at step S2413 that the OK button 1097 has not been depressed, whether the cancel button 1098 of the parent device 1095 has been depressed or not is determined at step S2415.

If it is determined at step S2415 that the cancel button 1098 has been depressed, a cancel signal is immediately transmitted to the parent device (STB 1092) at step S2416, and process returns to step S2404. If it is determined at step S2415 that the cancel button 1098 has not been depressed, whether the cross key 1158 of the child device 1095 has been pressed or not is determined at step S2417.

If it is determined at step S2417 that the cross key 1158 ahs been depressed, process of moving a cursor along the direction of the depressed cross key 1158 is performed immediately at step S2418, and process returns to step S2404. If it is determined at step S2417 that the cross key 1158 has not been depressed, whether the power source button 1152 of the child device 1095 has been depressed or not is determined at step S2419.

If it is determined at step S2419 that the power source button 1152 has been depressed, a power source off signal is immediately transmitted to the parent device (STB 1092) at step S2420, and process of stopping the child device 1095 is performed at step S2421. If it is determined at step S2419 that the power source button 1152 has not been depressed, process returns to step S2404.

The STB 1092 may be included in a housing of the display 1091. Further, three or more tuners may be provided in the STB 1092, and a recorder such as a HDD may be included in the STB. Moreover, devices connectable to a general TV receiver set, such as a DVD and a digital video camera may be used in addition to the VTR 1094.

The embodiment of the present invention can be realized by executing a program by a computer as described above. Furthermore, means for supplying a program to the computer, for example a computer readable recording medium such as a CD-ROM in which such a program is recorded, or a transmission medium such as Internet transmitting such a program may also be applied as the embodiment of the present invention. Furthermore, the program described above may also be applied as the embodiment of the present invention. The above program, recording medium, transmission medium and program product are included in the category of the present invention.

This application claims priority from Japanese Patent Application Nos. 2003-346112 filed Oct. 3, 2003, and 2003-358299 filed Oct. 17, 2003, which are hereby incorporated by reference herein.

What is claimed is:

1. An information processor that inputs a plurality of types of video sources including compressed video data, selects from the video sources a video source for at least one of a plurality of sub-information processors, and outputs video data included in the selected video source, said information processor comprising:

a plurality of video decoders converting said compressed video data into non-compressed video data;

output means for outputting the video data in a non-compressed base band to at least one of a plurality of the sub-information processors, and outputting to a main display video data included in at least one type of video source selected from the plurality of types of video sources;

picture selection accepting means for accepting selection of a picture to be displayed on any of the sub-displays of the sub-information processors from pictures displayed on the main display;

designation accepting means for accepting designation of a sub-information processor on which the selected picture is displayed; and confirming means for confirming whether it is allowable or unallowable to output video data of the selected picture to the sub-information processor, wherein the video data is outputted based on the result of confirmation by said confirming means.

2. The information processor according to claim 1, wherein said confirming means displays on the main display a warning providing notification of a change in display function occurring when video data is output to the sub-information processor, and requests input of whether or not the change in the display function is admitted.

3. An information processor that inputs a plurality of types of video sources including compressed video data, selects from the video sources a video source for at least one of a plurality of sub-information processors, and outputs video data included in the selected video source, said information processor comprising:

a plurality of video decoders converting the compressed video data into non-compressed video data;

output means for outputting the video data in a non-compressed base band to at least one of a plurality of the sub-information processors, and outputting to a main display video data included in at least one type of video source selected from the plurality of types of video sources;

request accepting means for accepting a request from the sub-information processor of output of video data; and request allowable/unallowable determining means for determining whether it is allowable or unallowable to output video data requested by the sub-information processor, wherein the video data is outputted based on the result of determination by said request allowable/unallowable determining means.

4. The information processor according to claim 3, wherein if the video source of video data requested by the sub-information processor to be output is identical to the video source of a picture displayed on a main view of the main display, said request allowable/unallowable determining means determines that it is unallowable to transfer the video data to the sub-information processor.

5. The information processor according to claim 4, wherein if the video source of video data requested by the sub-information processor to be output is identical to the video source of a picture displayed on a sub view of the main display, said request allowable/unallowable determining means determines that it is allowable to transfer the video data to the sub-information processor.

6. The information processor according to claim 3, further comprising:

output confirming means for displaying on the main display a warning providing notification of a change in display function occurring when a picture of requested video data is displayed on the main display, and for requesting input of whether the change in the display function is admitted or not if video data requested to be output to the main display is identical to video data being output to the sub-information processor.

7. A TV system comprising:
the information processor according to claim 1;
a sub-information processor capable of performing two-way communication with the information processor; and
a main display connected to the information processor.

8. A TV system comprising:
the information processor according to claim 3;
a sub-information processor capable of performing two-way communication with the information processor; and
a main display connected to the information processor.

9. A method for controlling an information processor that inputs a plurality of types of video sources including compressed video data, selects from the video sources a video source for at least one of a plurality of sub-information processors, and outputs video data included in the selected video source, the method comprising the steps of:

converting the compressed video data into non-compressed video data;

outputting the video data in a non-compressed base band to at least one of a plurality of the sub-information processors, and outputting to a main display video data included in at least one type of video source selected from the plurality of types of video sources;

accepting selection of a picture to be displayed on any of sub-displays of the sub-information processors from pictures displayed on the main display;

accepting designation of a sub-information processor on which the selected picture is displayed; and confirming whether it is allowable or unallowable to output video data of the selected picture to the sub-information processor, wherein said video data is outputted based on the result of confirmation by said confirming step.

10. A control method for controlling the operation of an information processor that inputs a plurality of types of video sources including compressed video data, selects from the video sources a video source for at least one of a plurality of sub-information processors, and outputs video data included in the selected video source, the method comprising the steps of:

converting the compressed video data into non-compressed video data;

outputting the video data in a non-compressed base band to at least one of a plurality of the sub-information processors, and outputting to a main display video data included in at least one type of video source selected from the plurality of types of video sources;

accepting a request from the sub-information processor of output of video data; and determining whether it is allowable or unallowable to output video data requested by the sub-information processor, wherein the video data is outputted based on the result of the determination by said determining step.

11. A computer-readable storage medium storing a computer-executable program for implementing a method according to claim 9.

12. A computer-readable storage medium storing a computer-executable program for implementing a method according to claim 10.

* * * * *